United States Patent [19]

Yoshida et al.

[11] Patent Number: 5,315,643

[45] Date of Patent: May 24, 1994

[54] COMMUNICATION SYSTEM AND DATA COMMUNICATION METHOD

[75] Inventors: Takehiro Yoshida, Tokyo; Kenzo Sakakibara, Yokohama, both of Japan

[73] Assignee: Canon Kabushiki Kaisha, Tokyo, Japan

[21] Appl. No.: 34,658

[22] Filed: Mar. 22, 1993

Related U.S. Application Data

[63] Continuation of Ser. No. 774,649, Oct. 15, 1991, abandoned, which is a continuation of Ser. No. 278,260, Nov. 29, 1988, abandoned.

[30] Foreign Application Priority Data

| Nov. 30, 1987 | [JP] | Japan | 62-299806 |
| Nov. 30, 1987 | [JP] | Japan | 62-299807 |
| Dec. 8, 1987 | [JP] | Japan | 62-308678 |
| Dec. 8, 1987 | [JP] | Japan | 62-308679 |
| Dec. 10, 1987 | [JP] | Japan | 62-310906 |
| Dec. 10, 1987 | [JP] | Japan | 62-310907 |
| Dec. 10, 1987 | [JP] | Japan | 62-310908 |
| Dec. 18, 1987 | [JP] | Japan | 62-319012 |
| Dec. 19, 1987 | [JP] | Japan | 62-319013 |
| Jan. 11, 1988 | [JP] | Japan | 63-002405 |
| Jan. 28, 1988 | [JP] | Japan | 63-015734 |

[51] Int. Cl.$^5$ ............ H04M 11/00; H04M 1/32
[52] U.S. Cl. .............. 379/100; 358/438; 358/440
[58] Field of Search .............. 379/93-96, 379/100; 358/400-402, 407, 434-436, 438, 440, 442, 468

[56] References Cited

U.S. PATENT DOCUMENTS

| 4,353,097 | 10/1982 | Takeda et al. | 379/100 |
| 4,677,660 | 6/1987 | Yoshida | 379/100 |
| 4,773,080 | 9/1988 | Nakajima et al. | 379/100 |
| 4,800,439 | 1/1989 | Yoshino | 379/100 |
| 4,815,121 | 3/1989 | Yoshida | 379/100 |
| 4,825,461 | 4/1989 | Kurita et al. | 379/100 |
| 4,837,798 | 6/1989 | Cohen et al. | 379/94 |
| 4,847,891 | 7/1989 | Kotani | 379/100 X |
| 4,900,902 | 2/1990 | Sakakibara | 379/100 |
| 5,093,857 | 3/1992 | Yoshida et al. | 379/100 |
| 5,155,601 | 10/1992 | Toyama | 358/401 |

FOREIGN PATENT DOCUMENTS

| 57-46569 | 3/1982 | Japan | 379/100 |
| 58-69162 | 4/1983 | Japan | 379/100 |
| 59-214367 | 12/1984 | Japan | 379/100 |
| 61-260740 | 11/1986 | Japan | 379/100 |
| 63-100856 | 5/1988 | Japan | 379/100 |
| 63-100859 | 5/1988 | Japan | 379/100 |
| 63-151254 | 6/1988 | Japan | 379/100 |
| 0232560 | 9/1988 | Japan | 379/100 |

Primary Examiner—Wing F. Chan
Attorney, Agent, or Firm—Fitzpatrick, Cella, Harper & Scinto

[57] ABSTRACT

A communication system of this invention is constituted by a controller which accommodates a plurality of extensions connected to an office line and telephones, and includes a facsimile unit for performing facsimile communication with another communication apparatus through the office line, and a plurality of telephones connected to the extensions. The controller can inform an operation state during facsimile communication to the connecting telephone. The operation state of the facsimile unit can be recognized at the telephone. Information received by the facsimile unit can be confirmed at the telephone, and some data received by the facsimile unit can be controlled by the telephone. A registration result of an index number can be commonly used by the telephone and the facsimile unit.

27 Claims, 95 Drawing Sheets

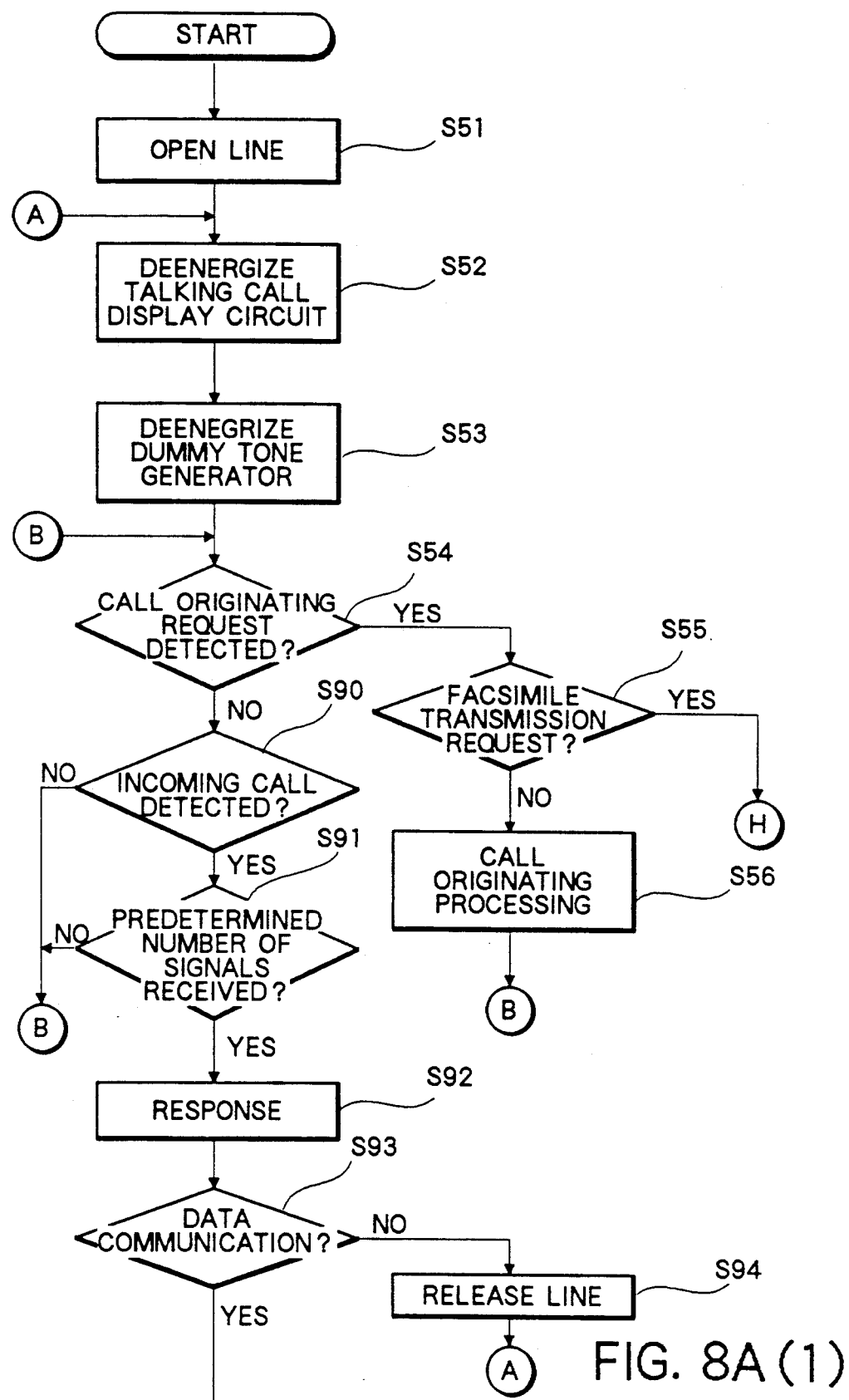
FIG. 8A(1)

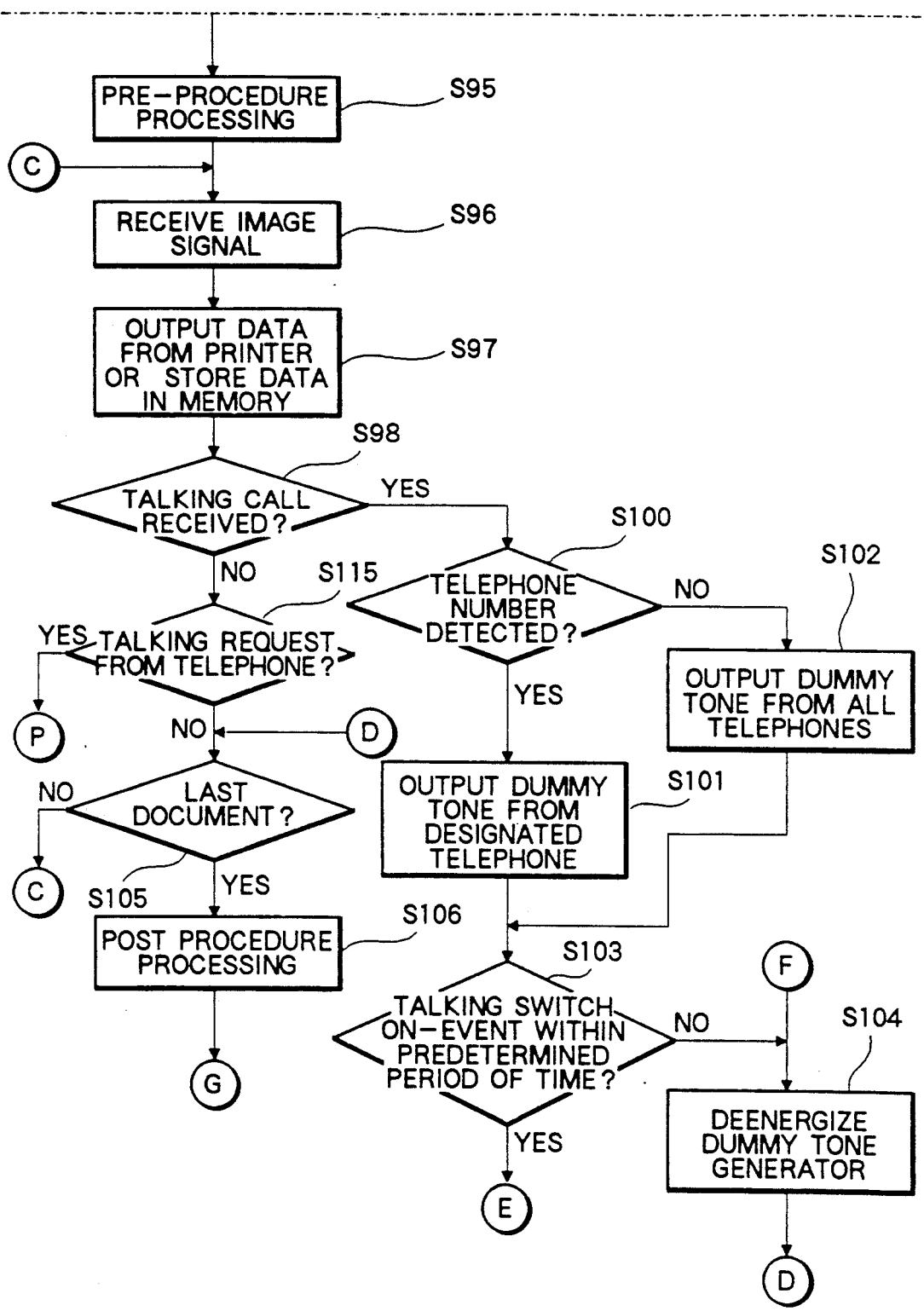
FIG. 8A (2)

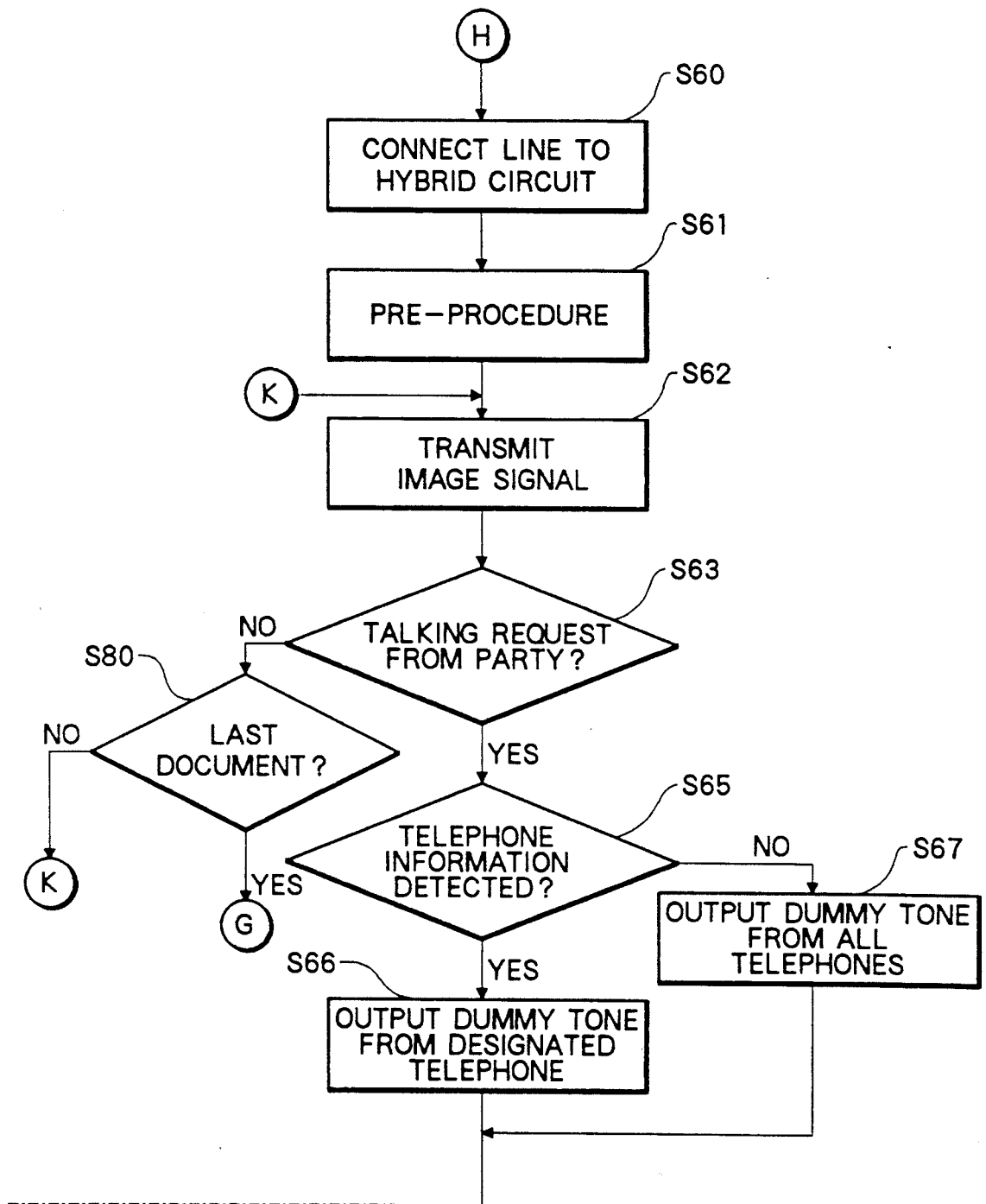
FIG. 8C (1)

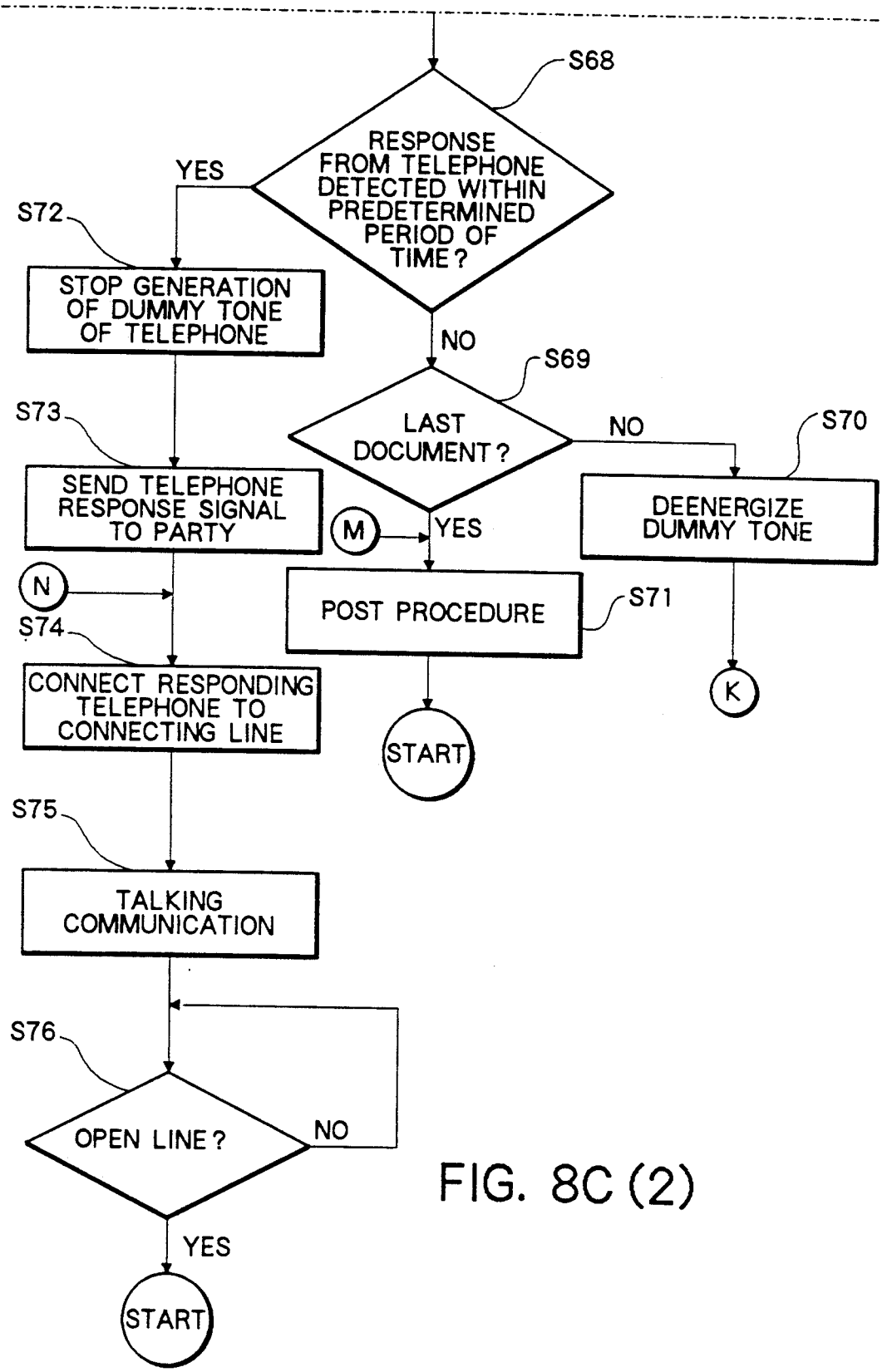
FIG. 8C (2)

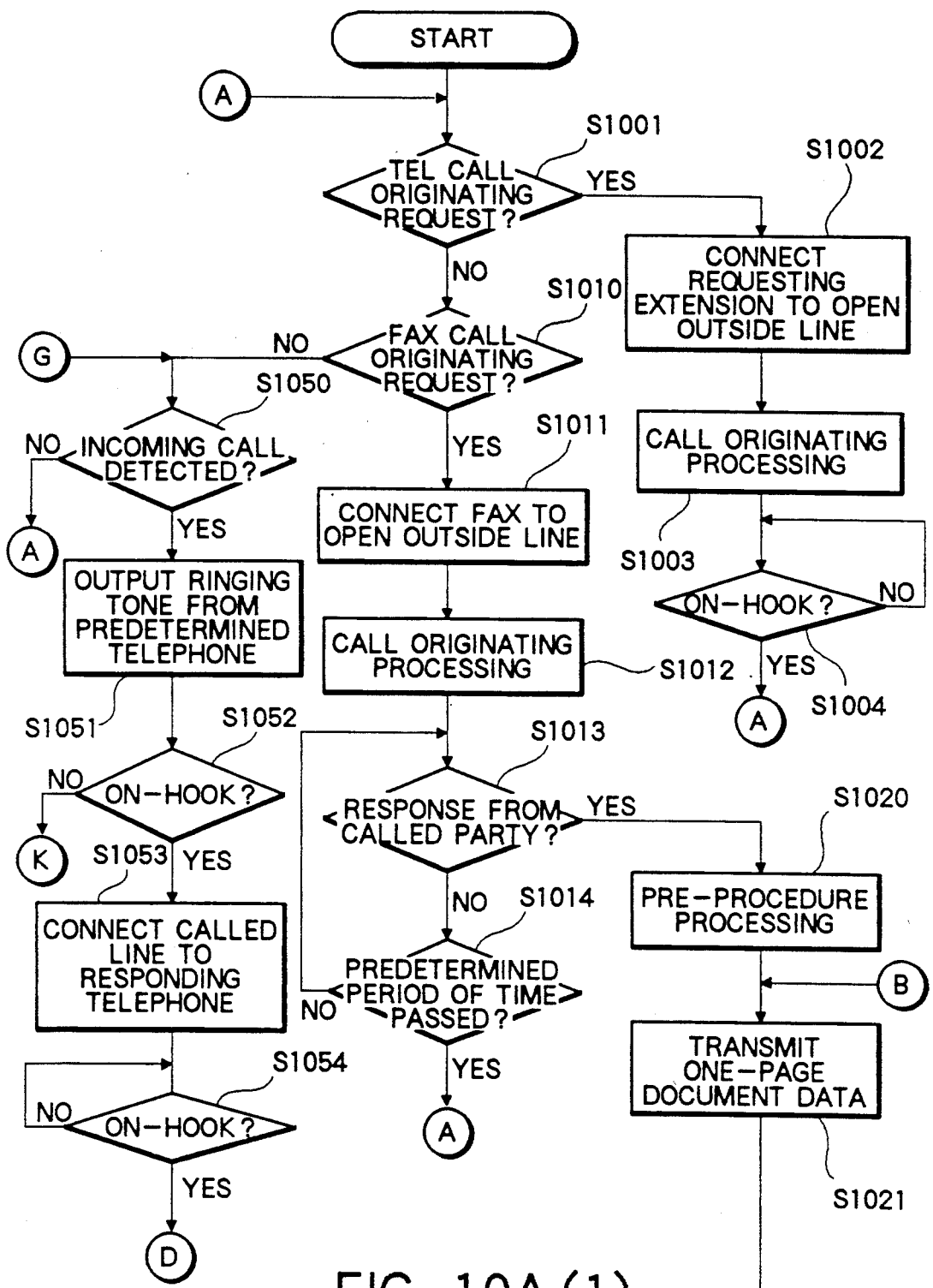
FIG. 10A(1)

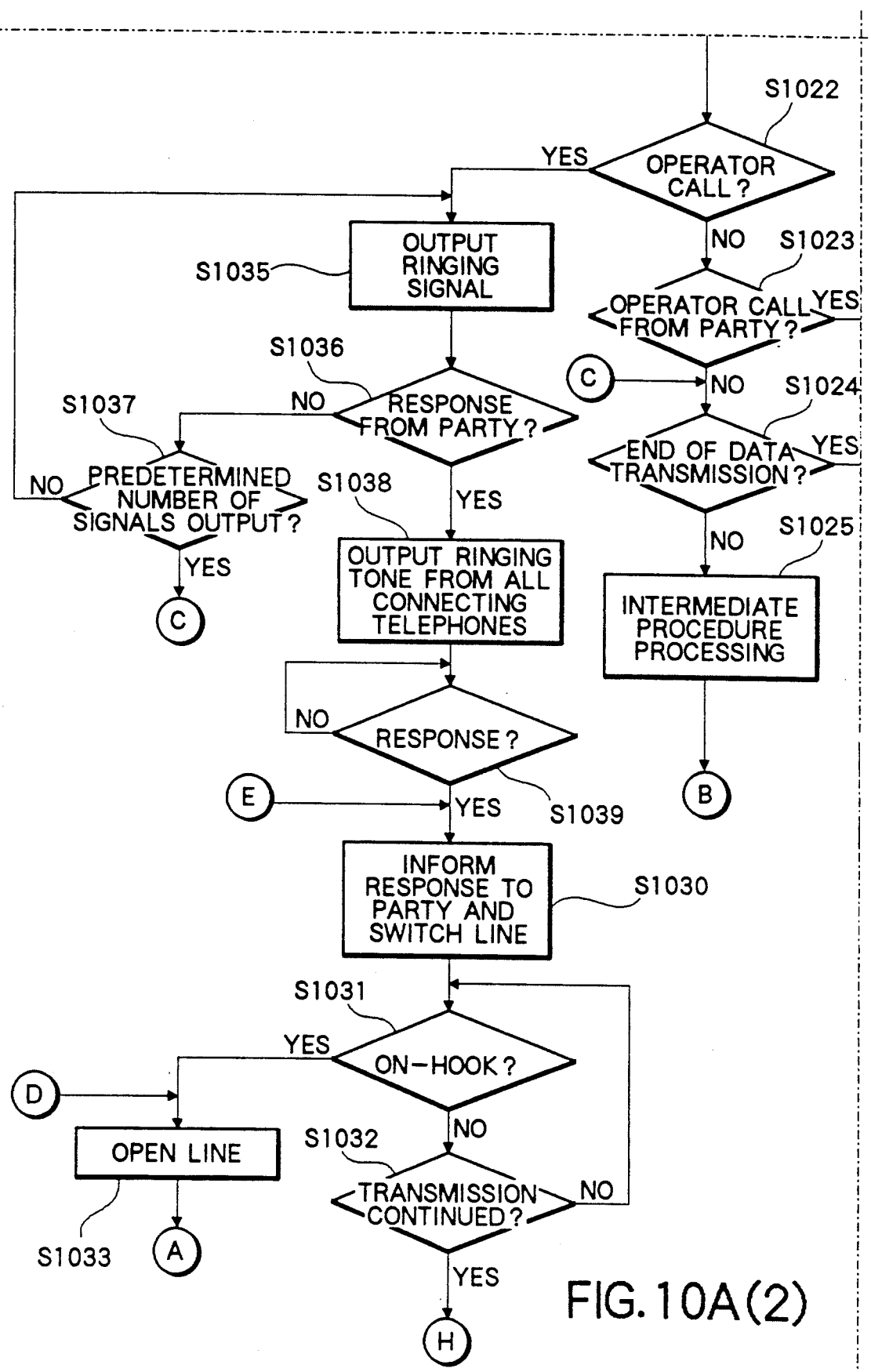
FIG.10A(2)

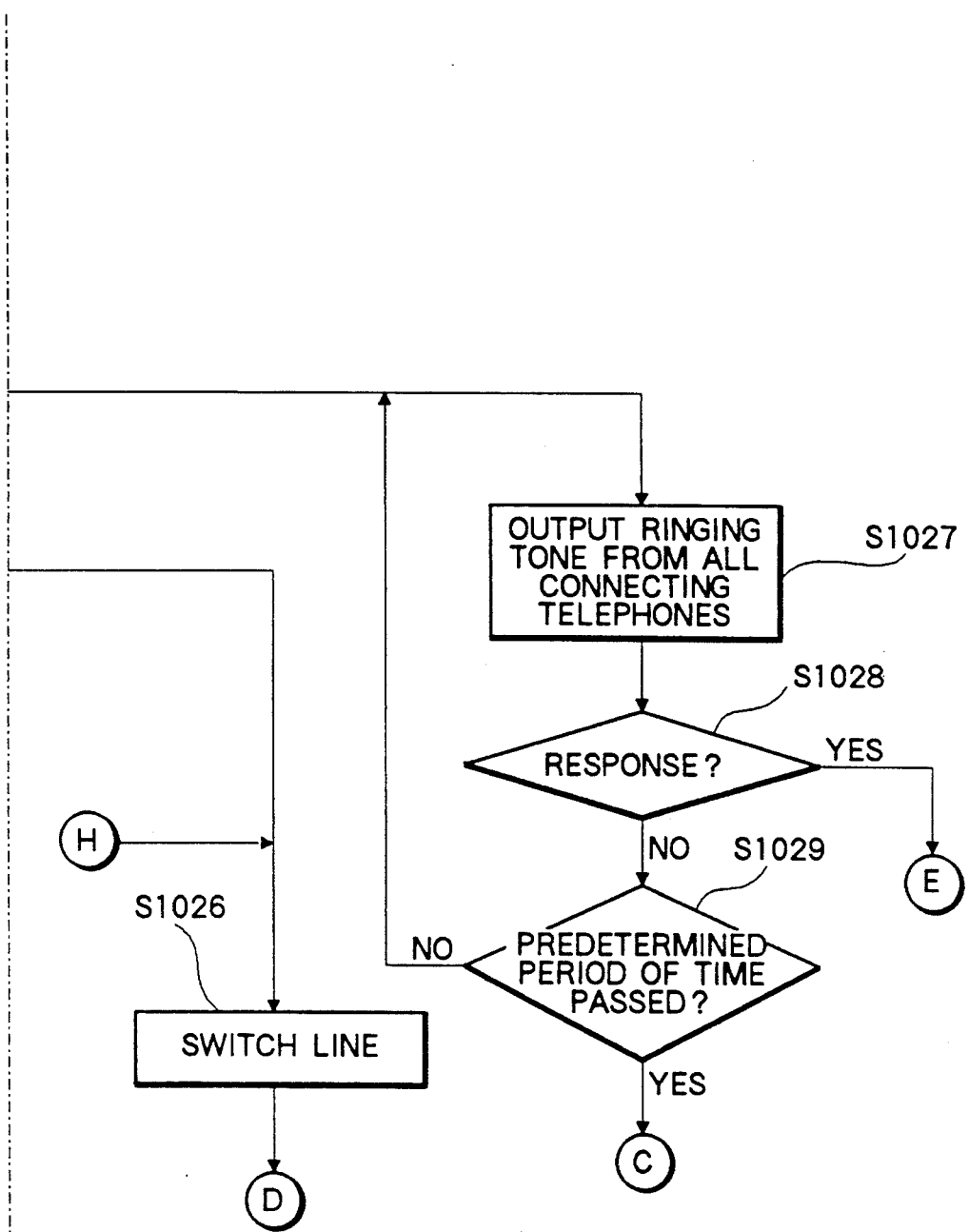
FIG. 10A (3)

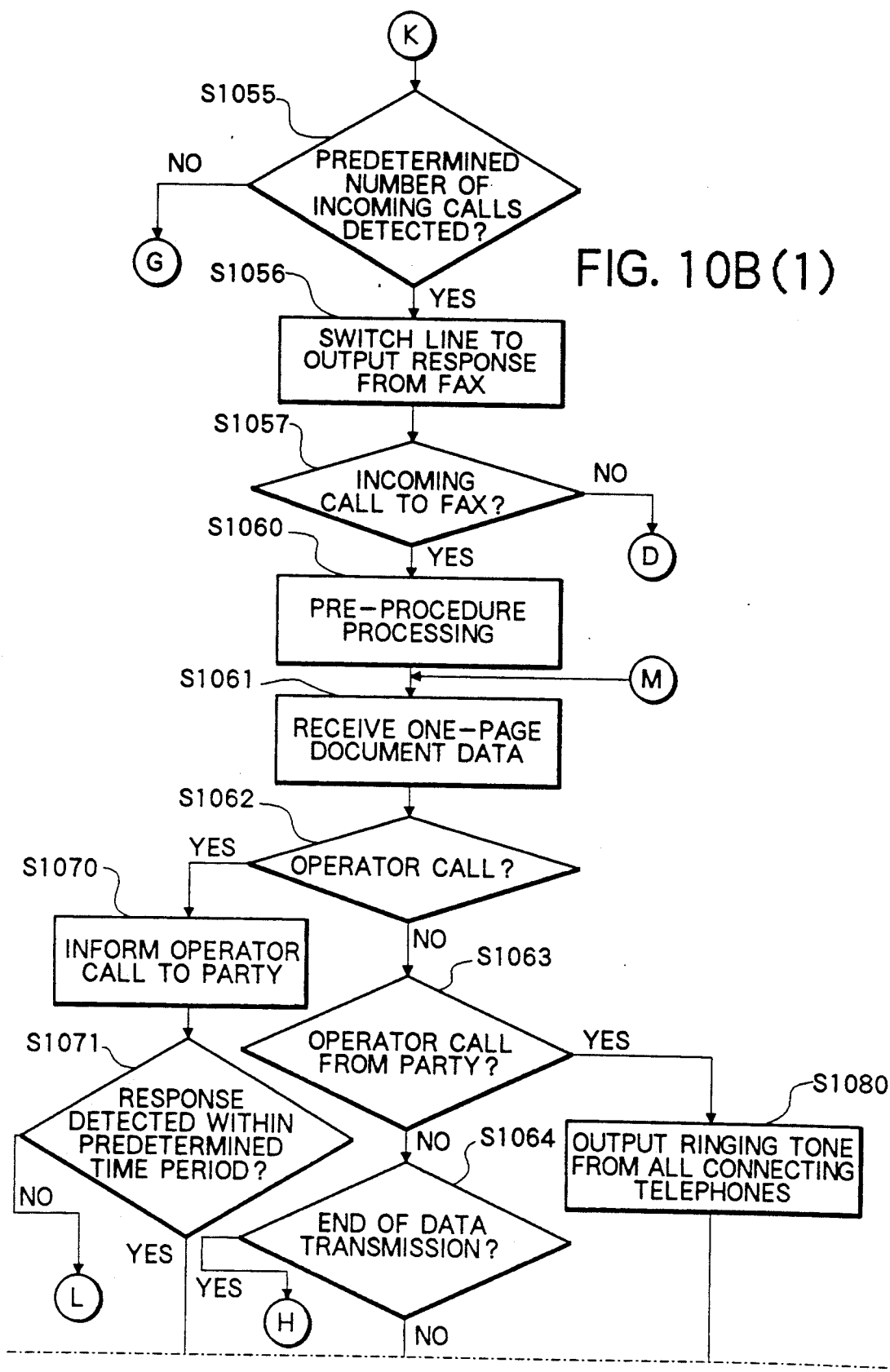
FIG. 10B(1)

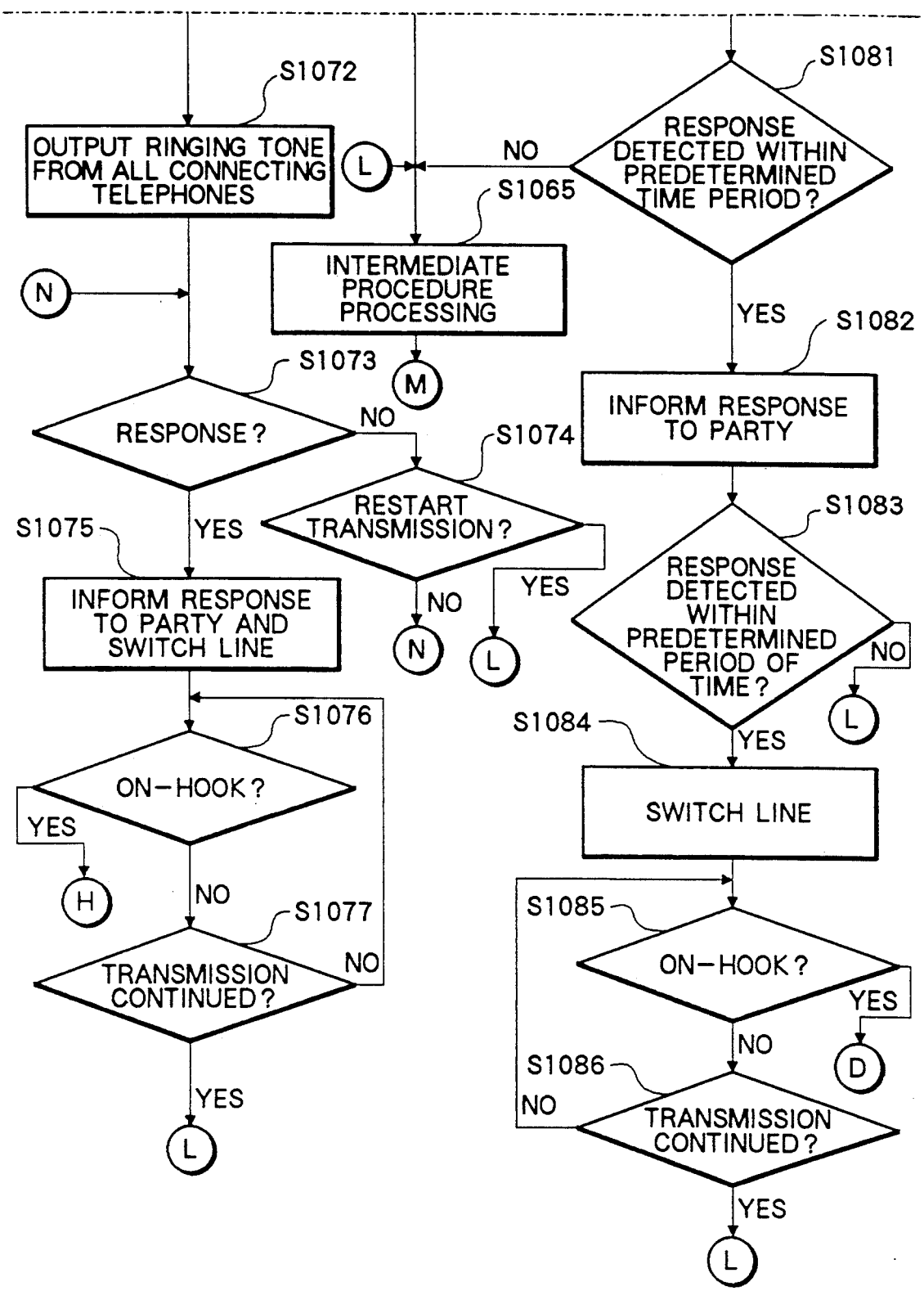
FIG. 10B(2)

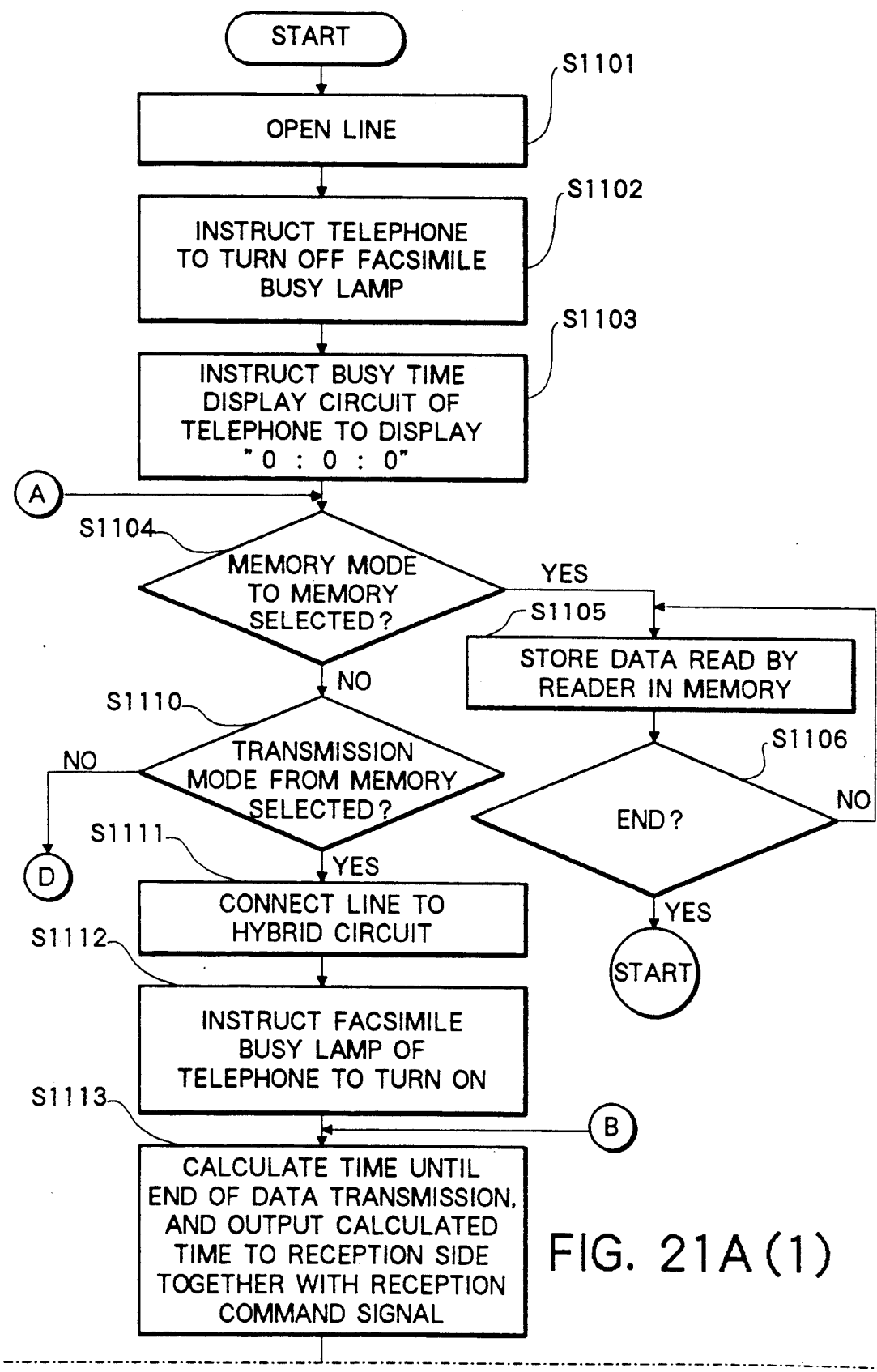
FIG. 21A(1)

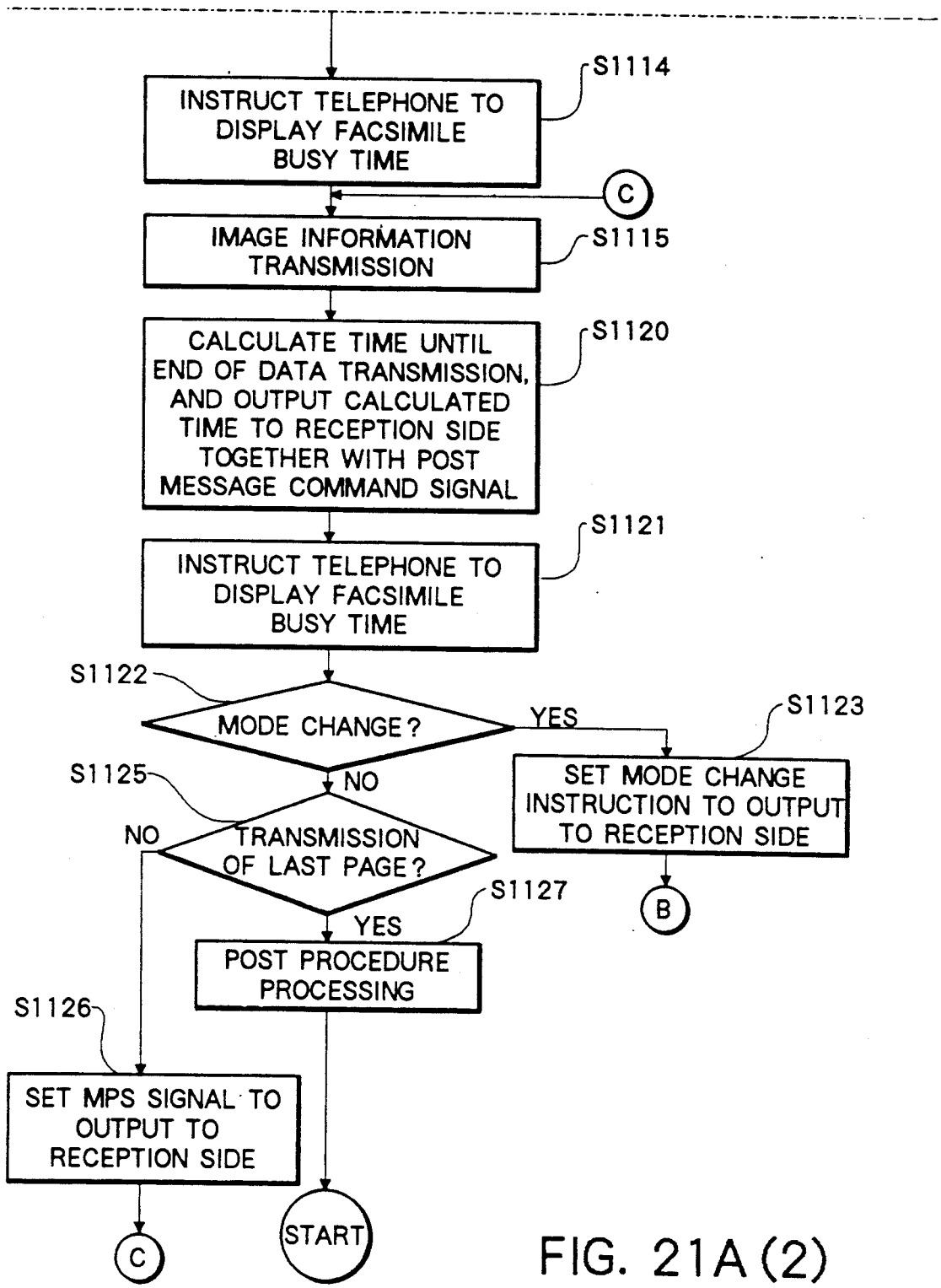
FIG. 21A (2)

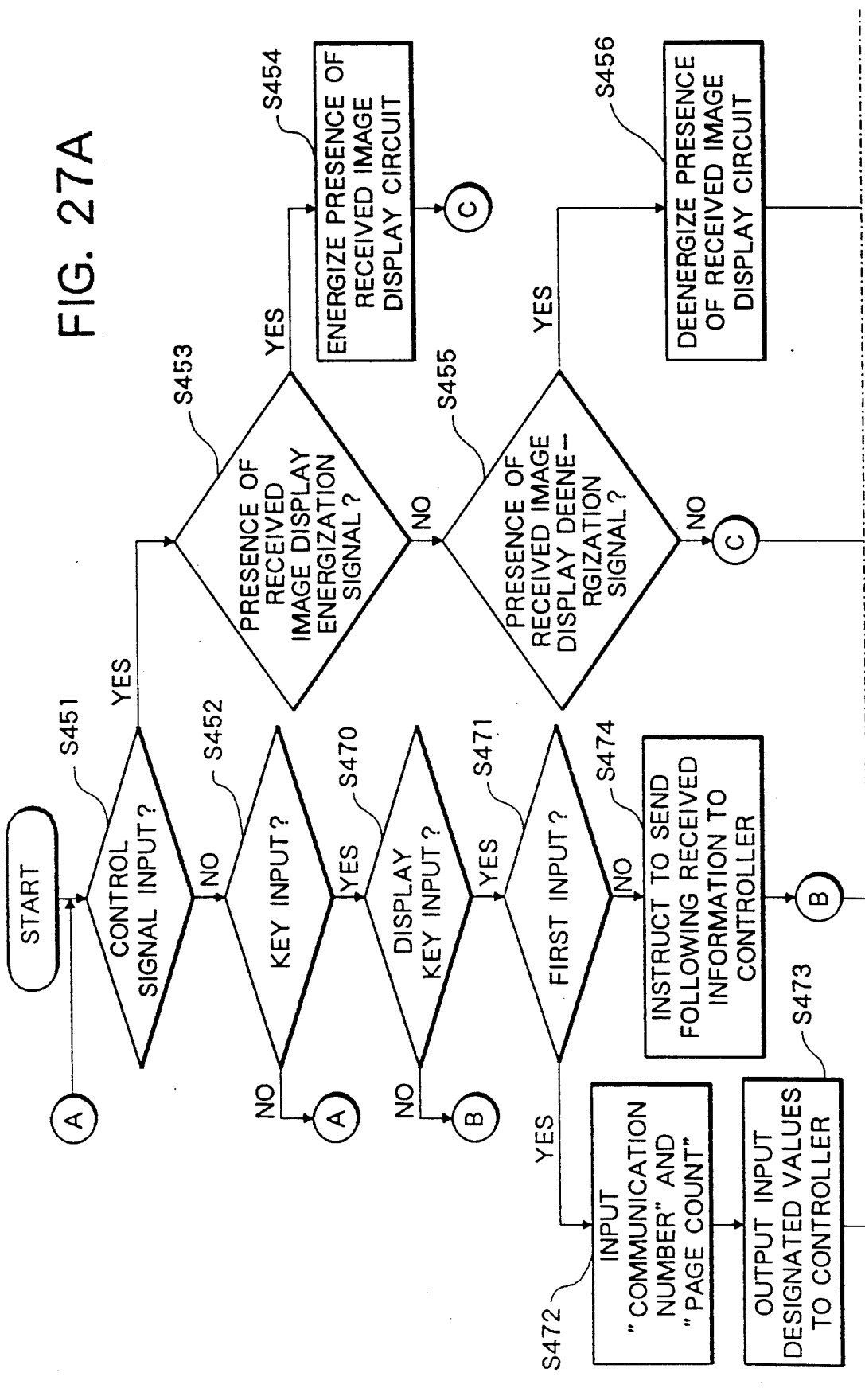

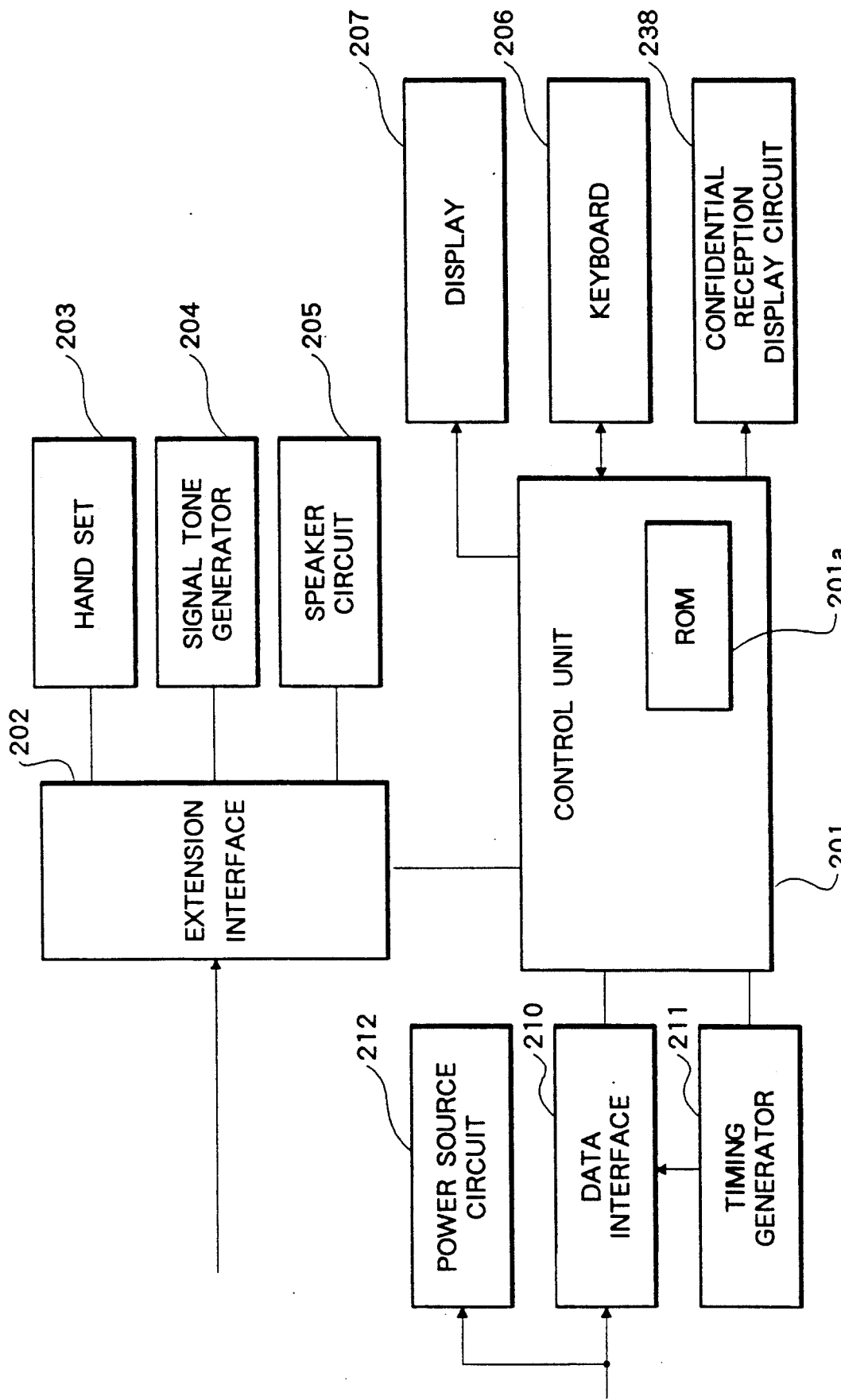

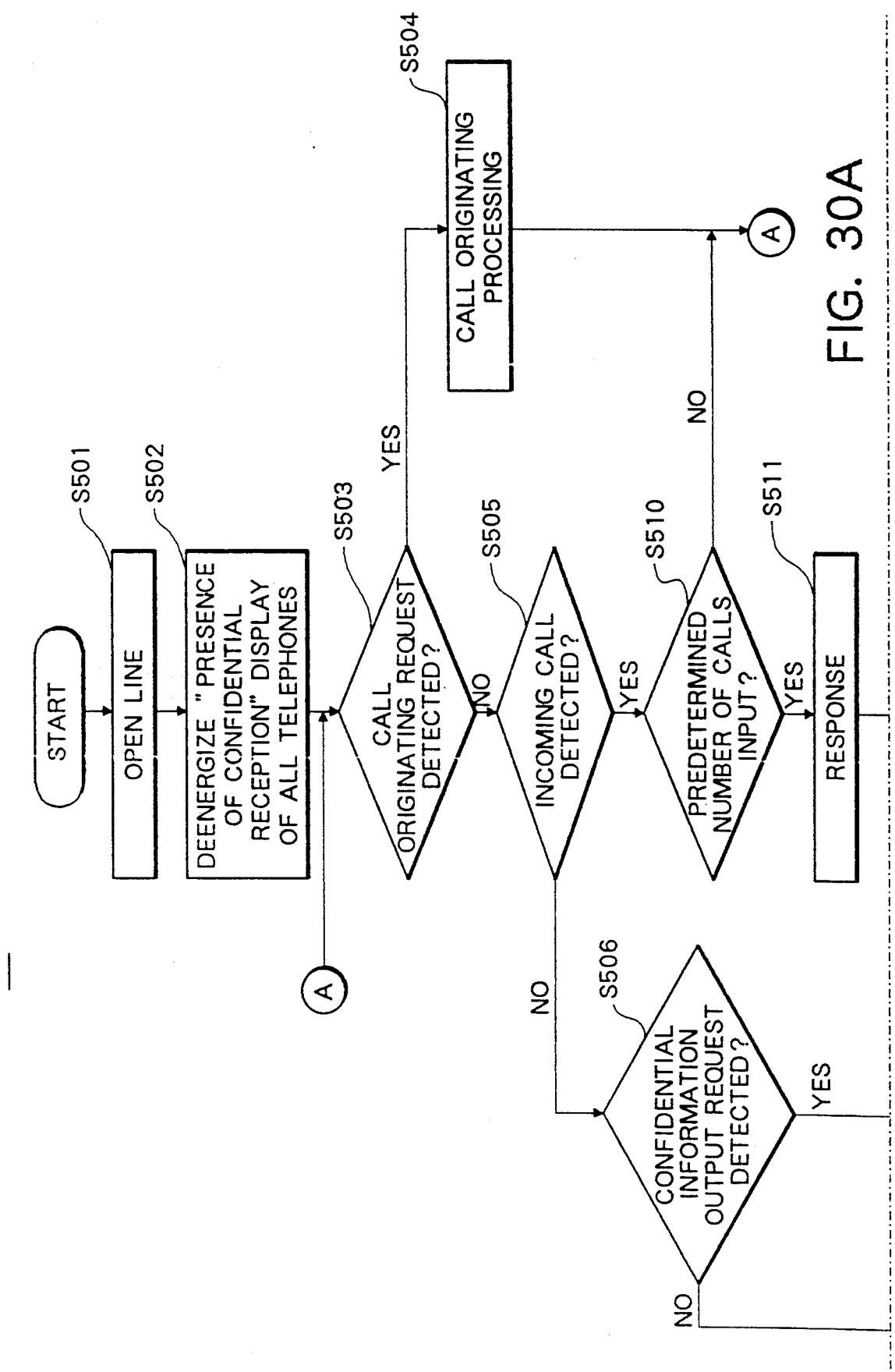

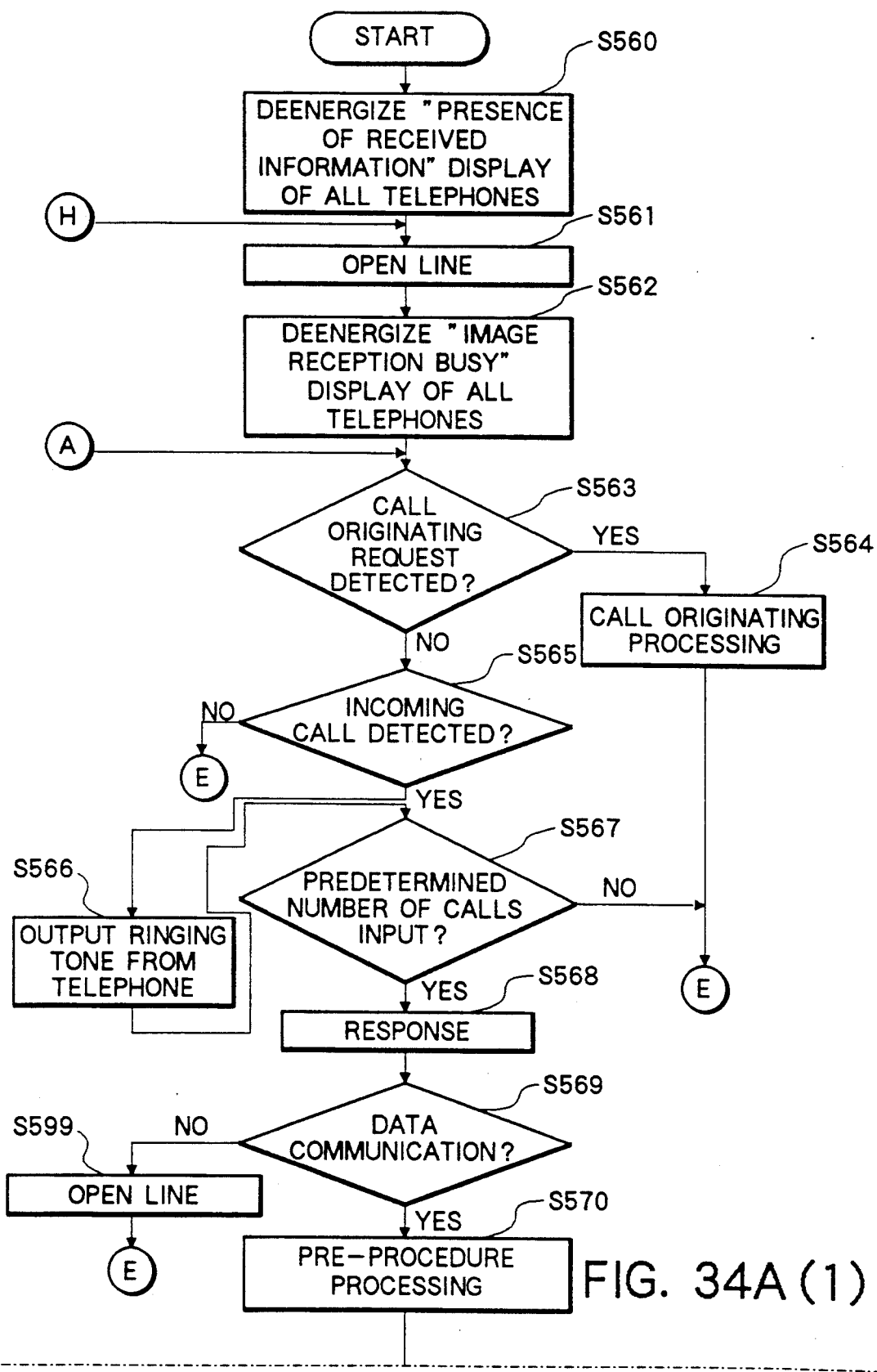
FIG. 34A(1)

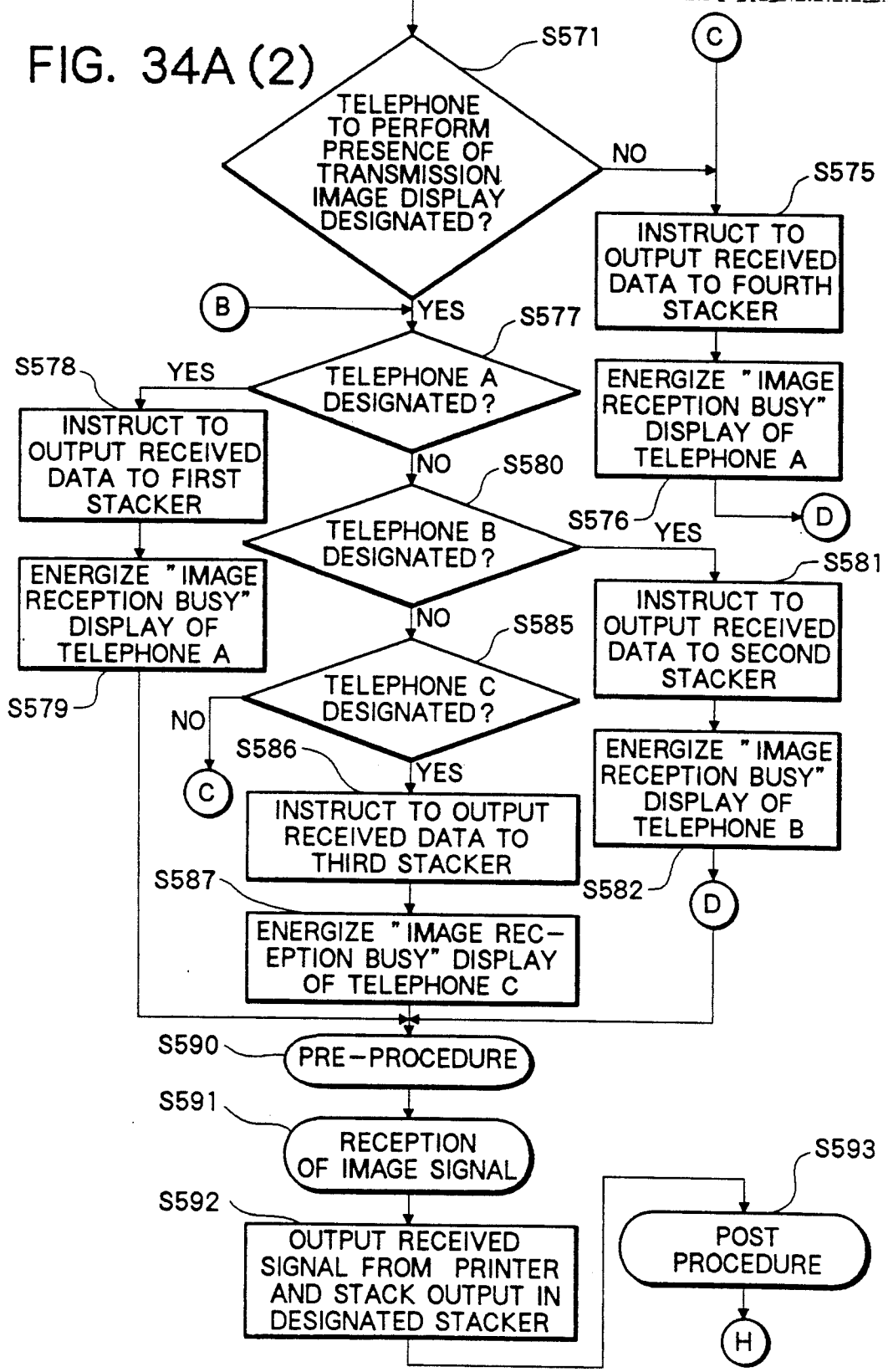
FIG. 34A(2)

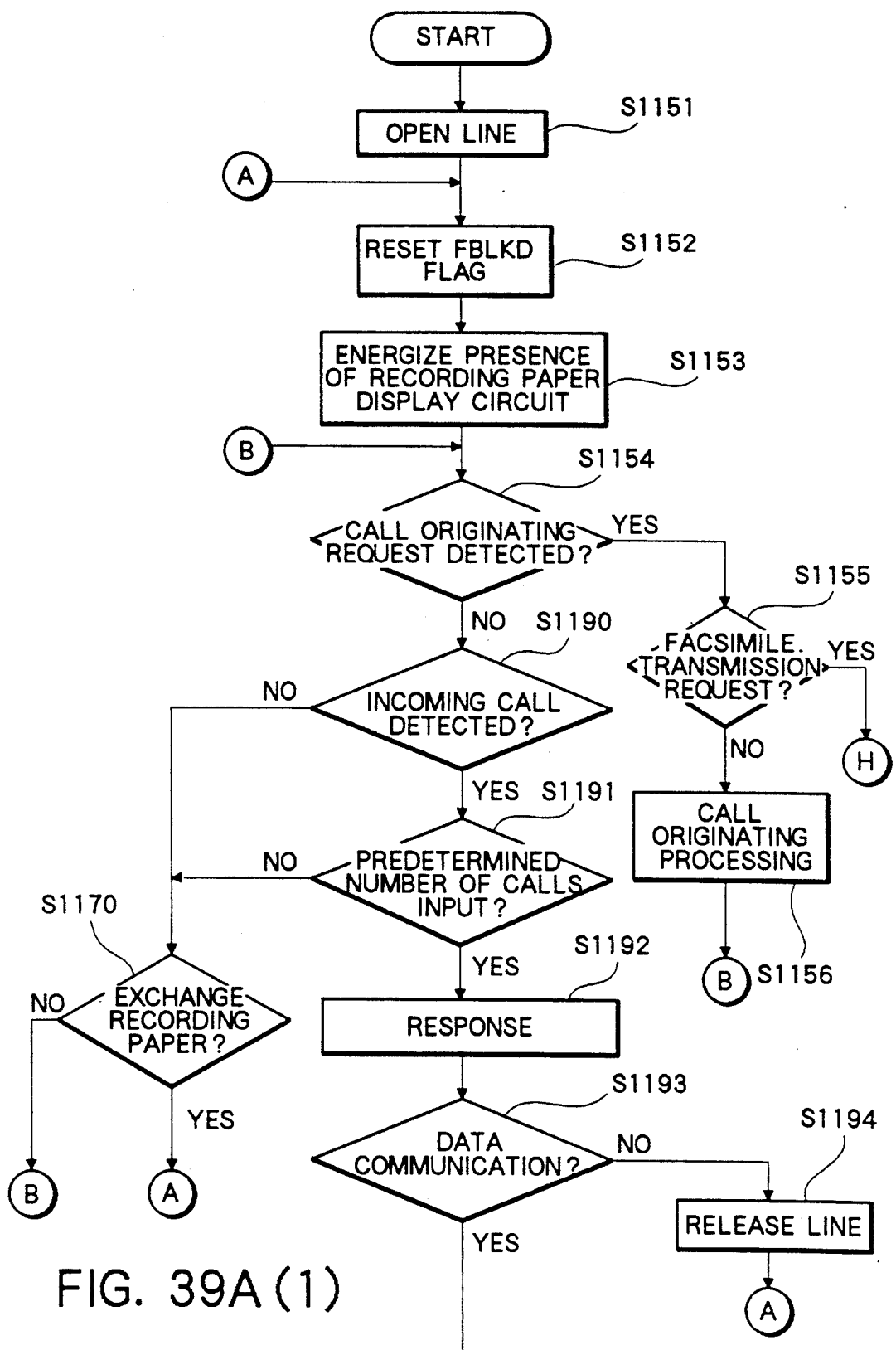
FIG. 39A(1)

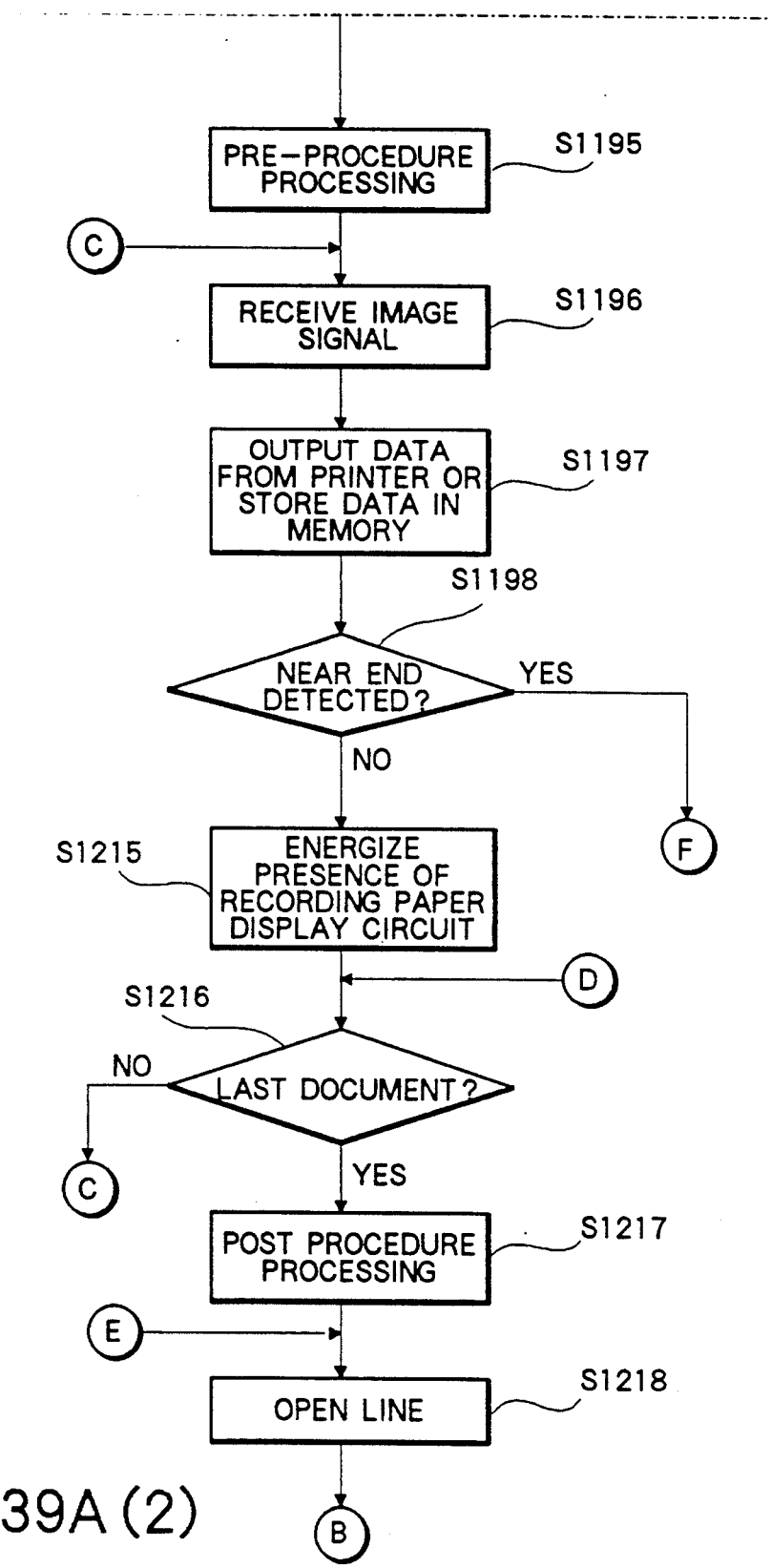
FIG. 39A(2)

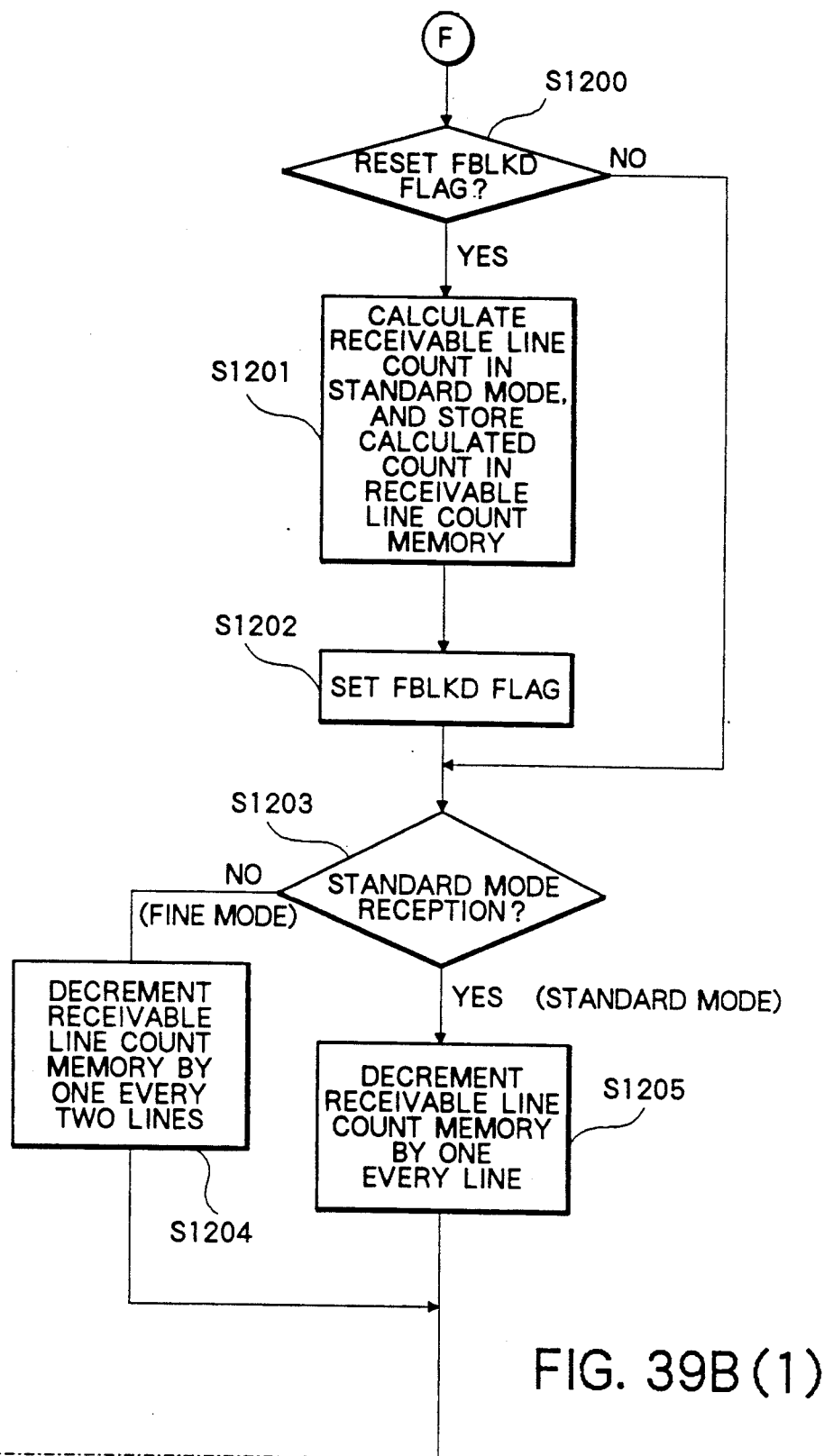
FIG. 39B(1)

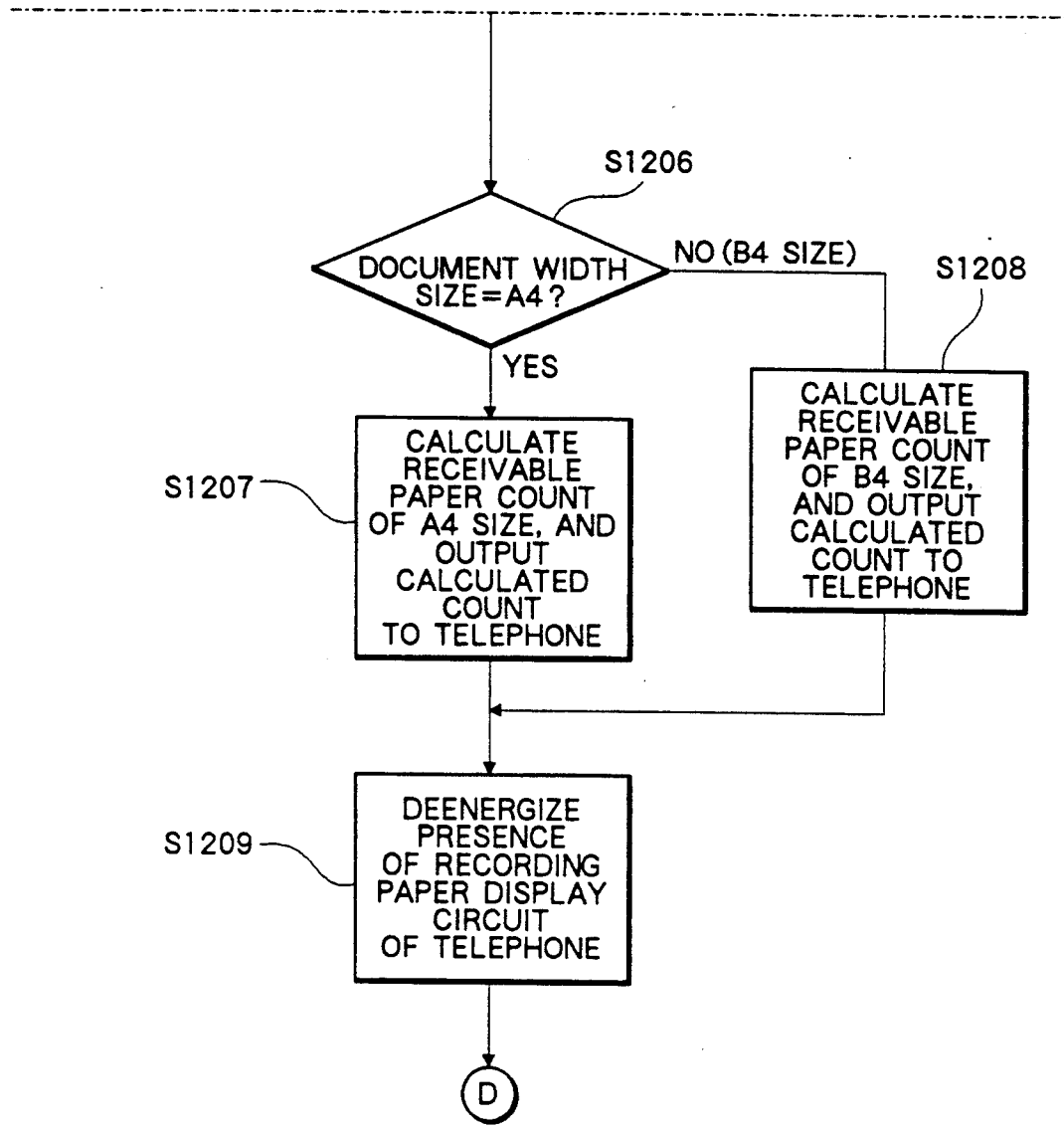
FIG. 39B (2)

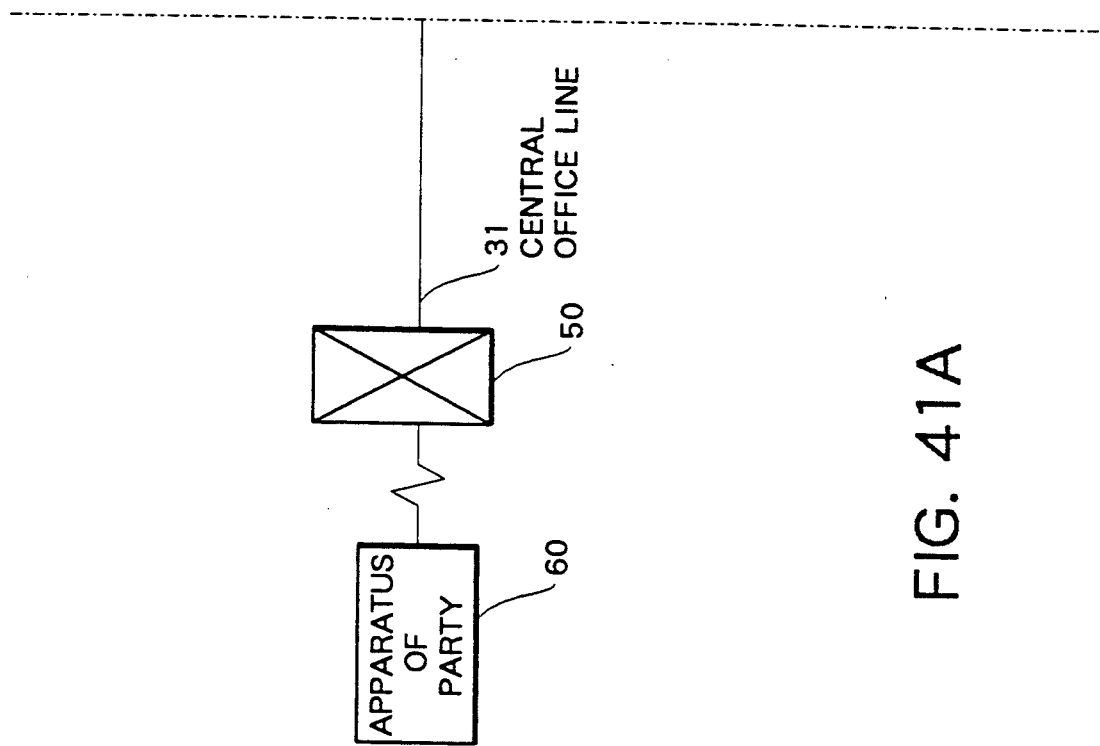

TEL [X] REC FORMAT

TEL [X] TRN FORMAT

TEL COMMON REC FORMAT

TEL [X] CALL ORIGINATING REQUEST FORMAT

| STEP | KEY OPERATION | DISPLAY | REMARKS |
|---|---|---|---|
| 1 | FUNCTION | PRESS ITEM KEY | |
| 2 | 0 | DIAL REGISTRATION | |
| 3 | A | A | |
| 4 | 0 3 SP / 1 2 3 / SP 4 5 / 6 7 | A  03  123  4567 | |
| 5 | START | A  03  123  4567 <br> DIAL REGISTRATION | ◄ BUZZER RINGS TO SIGNAL SUCCESSFUL REGISTRATION |
| 6 | B | B | |
| 7 | 0 1 6 / 6 SP 2 / 5 SP 6 / 2 5 1 | B 0166  25  6251 | |
| 8 | START | B 0166  25  6251 <br> DIAL REGISTRATION | ◄ BUZZER RINGS TO SIGNAL SUCCESSFUL REGISTRATION |

FIG. 47

| STEP | KEY OPERATION | DISPLAY | REMARKS |
|---|---|---|---|
| 1 | FUNCTION | PRESS ITEM KEY | |
| 2 | 0 | DIAL REGISTRATION | |
| 3 | * 0 1 | *01 | |
| 4 | 0 1 9<br>6 SP 4<br>6 SP 8<br>7 1 0 | *01 0196 46 8710 | |
| 5 | START | *01 0196 46 8710<br>DIAL REGISTRATION | ◂ BUZZER RINGS TO SIGNAL SUCCESSFUL REGISTRATION |
| 6 | * 0 2 | *02 | |
| 7 | 0 2 2<br>2 SP 6<br>7 SP 3<br>9 8 1 | *02 0222 67 3981 | |
| 8 | START | *02 0222 67 3981<br>DIAL REGISTRATION | ◂ BUZZER RINGS TO SIGNAL SUCCESSFUL REGISTRATION |

FIG. 48

COMMUNICATION SYSTEM AND DATA COMMUNICATION METHOD

This application is a continuation of application Ser. No. 07/774,649 filed Oct. 15, 1991, now abandoned, which is a continuation of application Ser. No. 07/278,260 filed on Nov. 29, 1988, now abandoned.

BACKGROUND OF THE INVENTION

The present invention relates to a communication system, which is connected to another communication apparatus through a communication medium, and consists of a controller which has a facsimile communication function, connects a plurality of telephone terminals, and performs channel control with the telephone terminals, and the telephone terminals connected to the controller.

The present invention also relates to a communication system comprising, e.g., a plurality of telephone communication apparatuses, and a facsimile apparatus and, more particularly, to a communication system in which these communication apparatuses can share index number dialing function.

The present invention further relates to a communication system incorporating a line control unit and a facsimile communication control unit, and can connect a plurality of telephone terminals.

As a conventional communication system constituted by connecting a plurality of telephones and a plurality of data communication apparatuses through a plurality of communication media, a system comprising a main controller which accommodates a large number of telephones lines and outside lines connected to facsimile apparatuses and key telephones and performs channel control among telephone lines is known.

FIG. 53 shows the arrangement of this system. As shown in FIG. 53, facsimile apparatuses 110 and 111 and a plurality of key telephones A 102, B 103, and C 104 are respectively connected to extensions 130 to 134, and a main controller 101 for performing channel formation control among these extensions and channel control among the extensions and connecting outside lines 121 to 123 is arranged. The main controller 101 also comprises a power supply unit for supplying power to the key telephones.

As another example, telephone lines 130 and 131 connected to the facsimile apparatuses 110 and 112 are separated from the remaining extensions 132 to 134. Normally, these lines 130 and 131 are connected to two of the outside lines 121 to 123, and each comprises a pair of signal lines which are disconnected from the outside lines using a manual selector or the like. The key telephones 102 to 104 are used as special-purpose telephones for the main controller. Each of the telephone lines 132 to 134 serving as connecting telephone lines comprises a total of two pairs of signal lines, i.e., a pair of control and power supply signal lines in addition to normal telephone line signal lines.

In this system, however, the key telephones and the facsimile apparatuses are not related to each other, and the facsimile apparatuses are merely connected to the controller of the key telephones and are not systematically connected. For this reason, this system has only a function of originating a call through the telephone lines of the facsimile apparatuses when the telephone line connected to the facsimile apparatuses is not busy.

When the facsimile apparatus as a non-telephone terminal receives information, a user must come to the non-telephone terminal to check if information reception is performed. If not, he or she cannot know the presence/absence of reception.

If the user knows that data reception was performed and comes to the facsimile apparatus to check if the received data is one addressed to him, the received data is often one addressed to a third party, and he often proves fruitless.

In order to avoid this, in addition to data transmission, a calling party calls a party to be called using another telephone line, and then transmits information to the called party, or must send a message indicating that the information has been transmitted.

When data reception or transmission processing is performed, a user cannot know when the communication is ended, and must frequently come to the communication apparatus to check if the communication is ended when there is urgent transmission data. In particular, when a user sits far from the facsimile apparatus, this results in poor efficiency.

When the facsimile apparatus as the non-telephone terminal performs data communication, a transmission-side operator cannot send specific information to a reception-side operator. More specifically, if letters "emergency" are inserted in a part of transmission image information, a receiver does not perform special processing for these letters, and only prints out these letters together with other information.

When the facsimile apparatus as the non-telephone terminal performs confidential reception, apparatuses other than one which performed this reception cannot detect the confidential reception.

Therefore, a user must come to the non-telephone terminal to check if the confidential reception is performed. If not, he cannot know the presence/absence of confidential reception.

When confidential reception is performed, the non-telephone terminal (e.g., the facsimile apparatus) cannot be effectively used unless the received data is output. When confidential reception is performed, it is preferably detected as quickly as possible.

While the facsimile apparatus as the non-telephone terminal performs information transmission/reception, a talking reservation cannot be made using a telephone, and the talking (telephone) reservation can only be made using an additional telephone integrally connected to the facsimile apparatus.

For this reason, a user must come to the non-telephone terminal every time he wants to make telephone reservation.

When the facsimile apparatus as the non-telephone terminal receives information, even if an amount of remaining recording paper sheets becomes small and hence, the number of sheets to be received becomes small, the user must come to the facsimile apparatus to check the remaining amount. For this reason, the user cannot know an exchange timing of recording paper, and reception is often interrupted.

The conventional facsimile apparatus or private telephone apparatus normally comprises an "index number dialing" function.

This function includes an "index number dialing" function in a narrow sense with which call originating processing is performed using a telephone number registered beforehand in correspondence with an index number upon depression of a combination of a key for selecting (designating) an index number function and a numerical key for inputting an index number, and a "one-touch dialing" function for originating a call of a registered telephone number upon depression of a single key.

Facsimile apparatuses and telephones must be connected to a central office network to provide their functions. However, since the facsimile apparatus is not always operated, it is inadvisable to fix one telephone line specially for the facsimile apparatus in view of running cost or the like.

In this situation, the present applicant proposed a facsimile apparatus incorporating a line exchange circuit. With this facsimile apparatus, a plurality of telephones and the facsimile apparatus share a central office line, and its exchange operation is performed by the line exchange circuit incorporated in the facsimile apparatus.

In this case, the telephone and the facsimile apparatus have basically different functions. An index number registered in the facsimile apparatus cannot be used by the telephone, and vice versa. In general, registration of an index telephone number to a telephone and that to a facsimile apparatus should be performed separately.

However, in view of cost of the apparatuses, it is preferable that index numbers are commonly used.

When a facsimile apparatus with a handset is used, the handset can be used as a handset for a telephone. When a call is originated from this handset, an index telephone number registered to the normal telephone is preferably accessed.

In a conventional communication system incorporating a line control unit and a facsimile communication control unit and capable of connecting a plurality of telephone terminals, when a telephone reservation is made using a telephone reservation function of facsimile communication, an operator call is made after message transmission is completed.

The conventional telephone reservation processing will be explained below with reference to FIGS. 54 and 55.

FIG. 54 illustrates a case wherein a telephone reservation is made from a transmission side, and FIG. 55 illustrates a case wherein a telephone reservation is made from a reception side.

A case will be described first with reference to FIG. 54 wherein a telephone reservation is made from the transmission side.

When a telephone reservation was made and message transmission was ended, the transmission-side apparatus sends out an RTC (Return To Control) signal indicating the last line data of a one-page message. The transmission side then sends out a preamble (a frame used for performing synchronization at the reception side in order to normally receive a binary code information portion following the preamble), and a PRI-Q signal (transmission-side telephone reservation signal). For example, the PRI-Q signal can be sent out a maximum of three times at equal time intervals until a response signal indicating that an operator answers the phone from the reception side is detected.

When the response signal from a party called is detected, the transmission side causes the facsimile communication control unit to generate a ringing tone of a telephone, thus performing a call of an operator who made the reservation. After a transmission-side operator who made the telephone reservation responds to this call, the transmission side sends out a PRI-Q signal (indicating off-hook), and switches a telephone line from the facsimile communication unit to a special-purpose connecting telephone. Thus, voice communication is allowed.

On the other hand, when the above-mentioned PRI-Q signal is received, the reception side causes the facsimile communication control unit to generate a telephone ringing tone to perform an operator call. When the operator answers this call, the reception-side apparatus sends out a "preamble+PIP/PIN" (reception-side operator answers the phone), and switches a telephone line from the facsimile control unit to a special-purpose connecting telephone. For this reason, when the transmission-side operator answers the phone, talking communication is allowed.

The operator call from the transmission side has been described.

A case will be described with reference to FIG. 55 wherein a telephone reservation is made from the reception-side apparatus.

When transmission of a one-page message is completed, the transmission-side apparatus sends out a "message+RTC" signal, and then sends out a "preamble+Q" (post message signal). Then, the transmission-side apparatus waits for a response signal from the reception-side apparatus.

In this case, since the telephone reservation was made at the reception-side apparatus, the response signal PIP/PIN (telephone reservation from the reception side) is received from the reception-side apparatus. When this signal is received, the facsimile communication control unit generates a ringing tone of a telephone to perform an operator call. When an operator answers the phone, a PRI-Q signal indicating that the operator is on the phone is sent to the reception-side apparatus, and a telephone line is switched from the facsimile communication control unit to the special-purpose connecting telephone.

When the telephone reservation was made and the post message signal Q is received, the reception-side apparatus sends out the signal PIP/PIN since the telephone reservation was made. When the PRI-Q signal from the transmission side, indicating that the operator is on the line, is received, the facsimile communication control unit generates a telephone ringing tone to perform an operator call. When an operator answers the phone, the signal PIP/PIN indicating an operator's response is sent out, and a telephone line is switched from the facsimile communication control unit to the special-purpose connecting telephone. Thus, talking communication is allowed.

Note that a hatched portion in FIGS. 54 and 55 indicates a preamble. This also applies to FIGS. 11, 12, and 13 to be described later.

However, in this case, the telephone line connected to the apparatus is connected to the facsimile communication control unit, and is not connected to a telephone terminal. For this reason, a ringing tone of the operator call is generated from only the facsimile communication control unit. Therefore, when an operator sits far from the facsimile communication control unit, he cannot often answer the phone.

SUMMARY OF THE INVENTION

The present invention has been made to solve the above-mentioned problems, and this embodiment comprises the following arrangement as a means for solving the above-mentioned problems.

More specifically, the embodiment comprises a main control unit having a facsimile function and a channel exchange function, and accommodating outside line and a large number of extensions, and telephone terminals connected to the extensions.

With the above arrangement, a facsimile unit and the telephone terminals are systematically connected, and the state of the facsimile unit or the like can be detected/controlled by the telephone.

In a communication system constituted by connecting a plurality of telephones and a plurality of data communication apparatuses through communication media, each data communication apparatus comprises memory means for storing a specific telephone and the data communication apparatus in correspondence with each other, confidential communication means for performing confidential communication to another data communication apparatus, and informing means for informing that the confidential communication is performed to the data communication apparatus using the corresponding telephone stored in the memory means.

With the above arrangement, when confidential communication is performed to the data communication apparatus, reception of confidential communication data can be known by a nearby telephone, and the confidential communication data can be derived as soon as possible.

In a communication system constituted by connecting a plurality of telephones and a plurality of data communication apparatuses through communication media, each data communication apparatus comprises discrimination means for discriminating whether or not specific information is received, and informing means for, when the discrimination means determines that the specific information is received, informing the reception of the specific information to a connecting telephone, and each telephone comprises information receiving means for receiving information from the informing means.

With the above arrangement, when data is communicated by the data communication apparatus, reception of specific information can be informed to the connecting telephone and an appropriate reaction can be taken.

In a communication system constituted by connecting a plurality of telephones and a plurality of data communication apparatuses through communication media, each data communication apparatus comprises of telephone information receiving means for receiving telephone designation information together with data reception information, and informing means for informing reception of the information to a telephone designated by the telephone information received by the telephone information receiving means, and each telephone comprises of information receiving means for receiving information from the informing means, and display means for displaying the information from the information receiving means.

With the above arrangement, when information is received by the data communication apparatus, a message indicating that the information is received can be informed to a receiving party through the data communication apparatus, and received data addressed to the receiving party can be derived as soon as possible.

In a communication system constituted by connecting a plurality of telephones and a plurality of data communication apparatuses through communication media, each data communication apparatus comprises of telephone information receiving means for receiving telephone designation information together with data reception information, informing means for informing reception of the information to a telephone designated by the telephone designation information received by the telephone information receiving means, responding means for detecting a response from the connecting telephone in response to the information from the informing means, and sending the response to an apparatus of a party on the other end of a line, connecting means for connecting a responding telephone and a connecting telephone line in correspondence with the response of the responding means, request accepting means for accepting a call request of a predetermined telephone connected to the apparatus of the party from the connecting telephone during data transmission or data reception, sending means for sending the telephone call request of the request accepting means to the data communication apparatus of the party, and channel forming means for, when a response to the telephone call request of the sending means from the apparatus of the party is received, forming a channel between the telephone requesting the telephone call and the connecting telephone line, and each telephone comprises of information receiving means for receiving information from the informing means, display means for displaying the information of the information receiving means, response detection means for detecting a response with respect to the display and outputting a response, and outputting means for outputting a call request of a predetermined connecting telephone of the apparatus of the party.

With the above arrangement, a communication system in which a data communication apparatus can intercommunicate with a desired telephone upon data communication can be provided.

Each data communication apparatus comprises of telephone information receiving means for receiving telephone designation information together with data reception information, classifying means for classifying received information in accordance with the telephone designation information received by the telephone information receiving means, and informing means for informing reception of the information to a telephone designated by the telephone designation information received by the telephone information receiving means, and each telephone comprises of information receiving means for receiving information from the informing means and display means for displaying the information of the information receiving means.

With the above arrangement, upon reception of information to the data communication apparatus, the information is classified and outputted to the units of receiving parties, and a message indicating the outputting of the information can be sent to the receiving party through the data communication apparatus. Thus, received data addressed to the receiving party can be derived as soon as possible.

A communication system constituted by connecting a plurality of telephones and a plurality of data communication apparatuses through communication media comprises of telephones each comprising of transmission instruction means for instructing transmission of received data stored in the data communication apparatus thereto, data receiving means for receiving data from the data communication apparatus, outputting means for outputting data received by the data receiving means, and recording information control means for instructing recording reception information control of the data communication apparatus, and data communication apparatuses each comprising of memory means for storing data reception information, transmission means for transmitting the reception information stored in the memory means in accordance with a transmission instruction from a connecting telephone for instructing transmission to the telephone, and memory control means for receiving control information of the reception information stored in the memory means and controlling the reception information stored in the memory means in accordance with the control information.

With the above arrangement, a communication system in which information received by a data communication apparatus can be confirmed by a telephone, and can be controlled by the telephone can be provided.

In the communication system of this embodiment, a data communication apparatus connected to the system comprises of time detection means for detecting a time until an end of transmission/reception upon data transmission/reception, and sending means for sending the time detected by the time detection means to a connecting telephone, and the connecting telephone comprises of receiving means for receiving the time sent from the sending means of the connecting data communication apparatus, and display means for displaying the time received by the receiving means.

With the above arrangement, a communication system in which a data communication apparatus of the system can cause a telephone to display a time until an end of data communication can be provided.

In a communication system constituted by connecting a plurality of telephones and a plurality of data communication apparatuses through communication media, each data communication apparatus comprises of party calling means for calling a party to communicate with the data communication apparatus using a connecting telephone during data communication.

According to a preferred embodiment, the party calling means is realized as follows. That is, the connecting telephone comprises of designation means for designating a party to be called, call informing means for detecting calling of the party designated by the designation means and informing the party calling, and response detection means for detecting a response from the party designated by the designation means, and the data communication apparatus comprises of party designation receiving means for receiving designation of the party to be called from the connecting telephone, party designation sending means for, when the party designation receiving means receives the designation of the party to be called, sending a talking request including the information designated by the designation means to an apparatus of the party during data communication, response receiving means for receiving a response signal from the apparatus of the party, call originating means for selecting a connecting telephone specified by the talking request and originating a call to the selected telephone, and channel forming means for forming a channel with the telephone issuing the talking request upon reception of a response from the telephone responding to the call originated by the call originating means.

With the above arrangement, a communication system in which talking communication can be made with a desired telephone (desired operator) during data communication of the data communication apparatus can be provided.

In a communication system constituted by connecting a plurality of telephones and a plurality of data communication apparatuses through communication media, each data communication apparatus comprises of receivable amount detecting means for detecting a data receivable amount, and transmission means for transmitting the amount detected by the receivable amount detection means to a connecting telephone, and each connecting telephone comprises of receiving means for receiving the information transmitted from the transmission means, and display means for displaying the amount received by the receiving means.

According to a preferred embodiment, the data communication apparatus comprises of at least facsimile communication means, the receivable amount is the number of pages to be able to be printed out by the facsimile communication means, and the receivable amount detection means includes near end mark detection means of recording paper and comprises an arrangement for recognizing a receivable line count after near end mark detection by the near end mark detection means and detecting a receivable paper count in accordance with a transmission condition.

With the above arrangement, a receivable amount of the data communication apparatus can be displayed on a connecting telephone during data communication by the data communication apparatus, and an operator can confirm the state of the data communication apparatus at his desk, thus taking an appropriate action.

The present invention has as its object to provide a communication system which includes a facsimile communication apparatus having a line exchange function like a facsimile apparatus having a composite function, and a telephone communication apparatus such as a normal telephone, and can commonly use index telephone numbers registered in both the facsimile and telephone communication apparatuses.

In order to achieve the above object, there is provided a communication system constituted by a facsimile communication apparatus connected to a central office network through an internal line exchange unit, and a plurality of telephone communication apparatuses which are connected to the line exchange unit in the facsimile communication apparatus through a communication medium so as to be connected to the central office network, wherein the facsimile communication apparatus comprises of registration means for registering and storing index telephone numbers therein and in the plurality of connecting telephone communication apparatuses.

With the above arrangement, the telephone communication apparatuses and the facsimile communication apparatus can commonly use index telephone numbers.

The system also comprises of detection means for detecting a ringing signal during facsimile communication, and ringing means for causing a facsimile communication control unit and a connecting telephone terminal to substantially simultaneously generate a ringing tone upon detection of the call signal by the detection means.

With the above object, a ringing tone can be output to the telephone terminal simultaneously with the facsimile communication control unit, and an operator can confirm an operator call wherever he is.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIGS. 10A(1) to 10B(2) are control flow charts according to a third embodiment of the present invention;

FIGS. 27A and 27B are control flow charts of the connecting telephone of the sixth embodiment;

FIG. 29 is a detailed block diagram of a connecting telephone of the seventh embodiment;

FIGS. 30A to 30C are control flow charts of the controller of the seventh embodiment;

FIGS. 41A and 41B are block diagrams of a communication system comprising a controller having a facsimile function and connecting telephones according to a tenth embodiment of the present invention;

FIG. 47 is a view for explaining an operation sequence of one-touch dial number registration of the tenth embodiment;

FIG. 48 is a view for explaining an operation sequence of index number dial number registration of the tenth embodiment;

DETAILED DESCRIPTION OF THE INVENTION

An embodiment according to the present invention will be described in detail hereinafter with reference to the accompanying drawings.

FIRST EMBODIMENT

Figure 1:
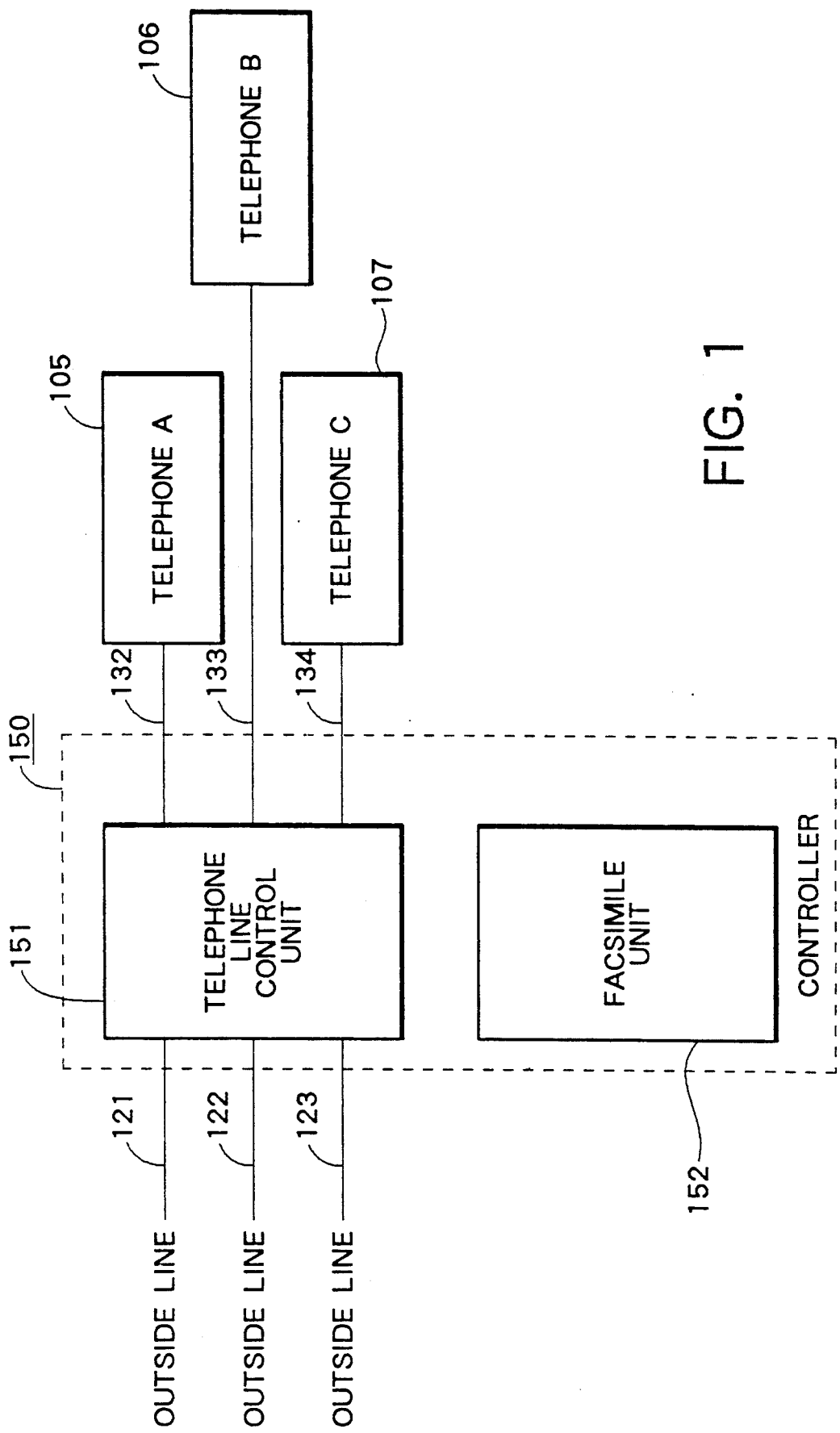
FIG. 1 is a schematic block diagram of a first embodiment according to the present invention.

FIG. 1 is a schematic block diagram of the first embodiment of the present invention, and illustrates a reception-side apparatus. The same reference numerals in FIG. 1 denote the same parts as in FIG. 53.

Figure 53:
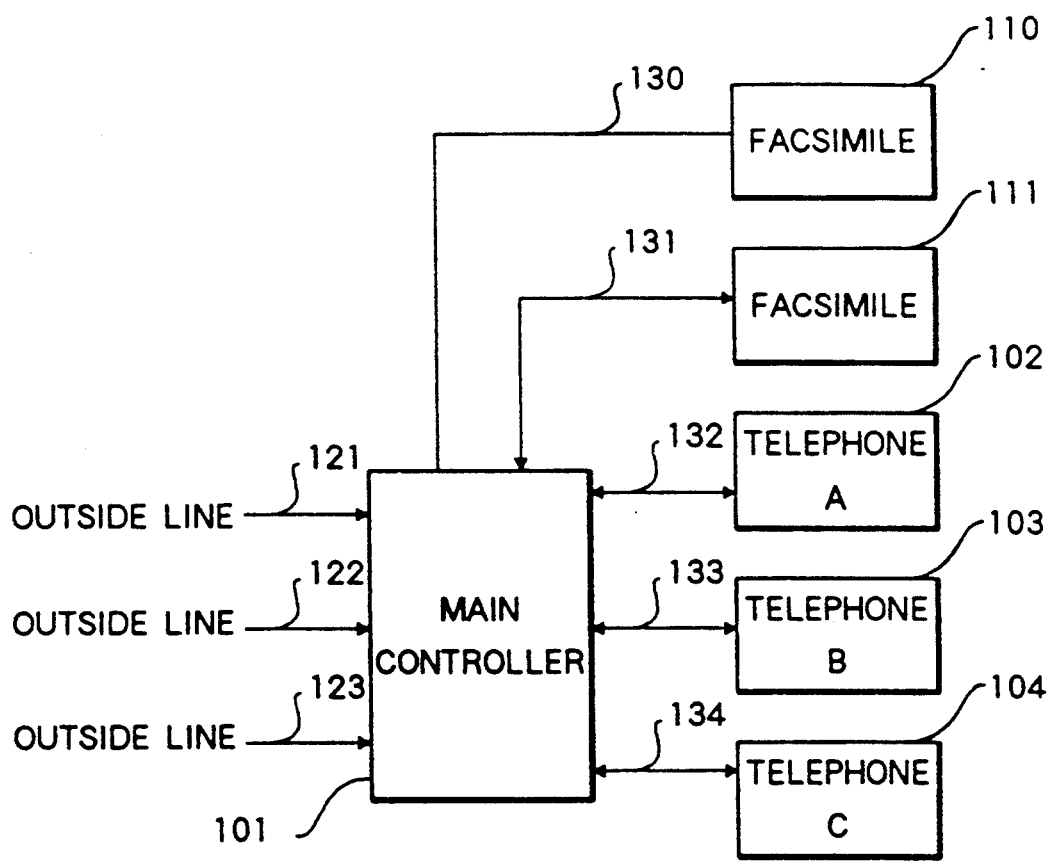
FIG. 53 is a block diagram showing a conventional telephone communication system.
Figure 54:
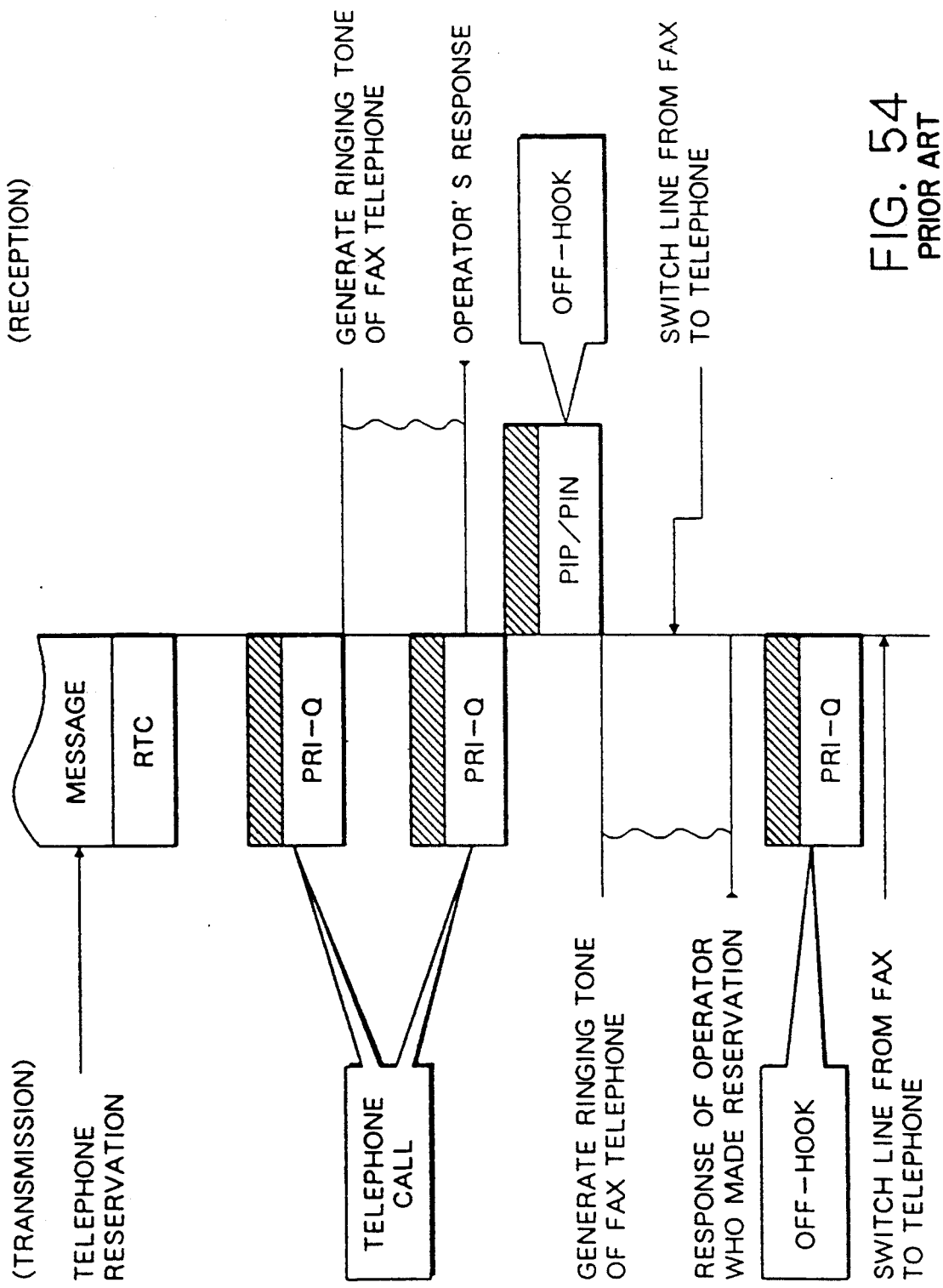
FIG. 54 is a chart showing a transmission control procedure when an operator call request is sent from a reception side, and is responded at a transmission side in the conventional system.
Figure 55:
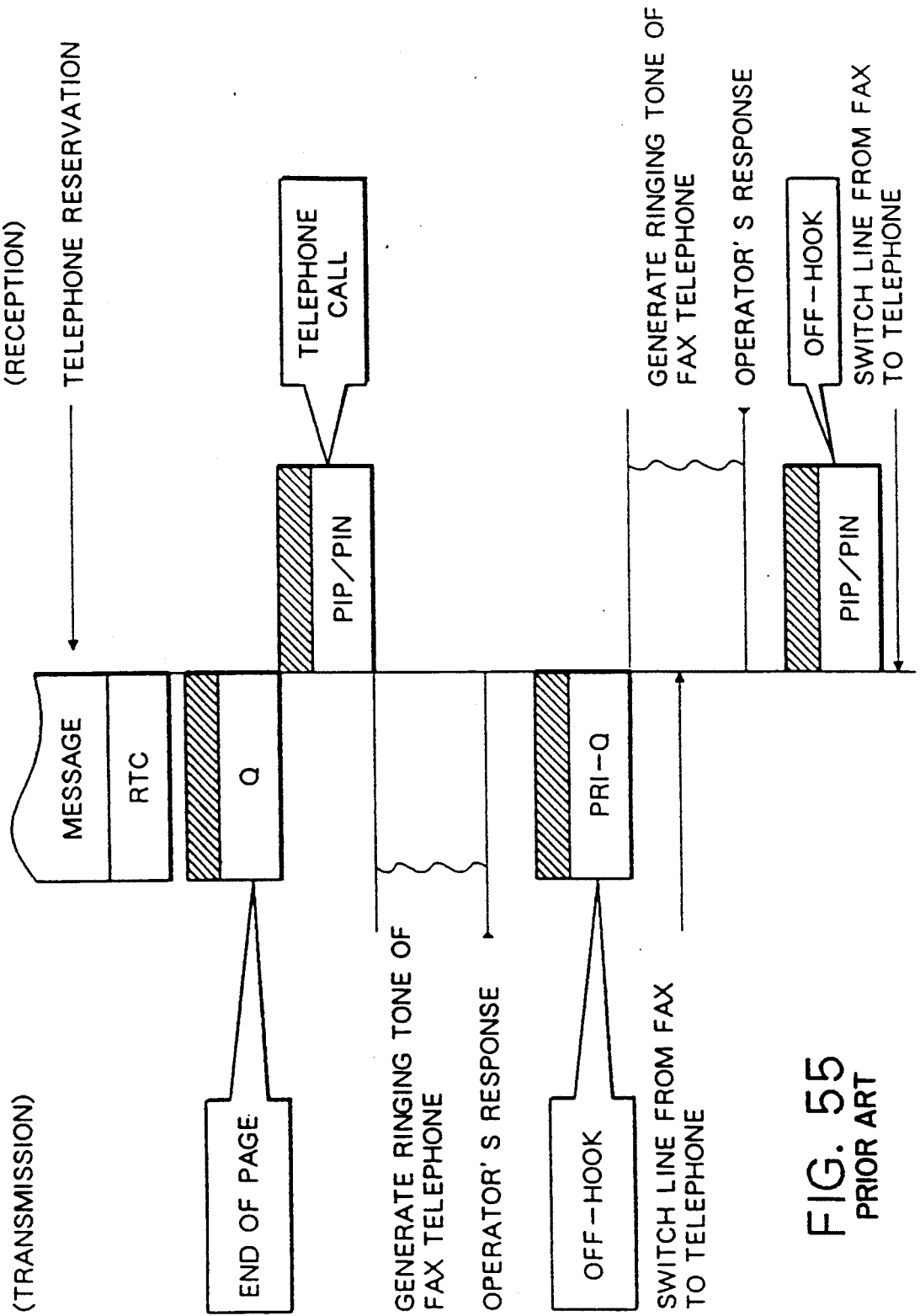
FIG. 55 is a chart showing a transmission control procedure when an operator call request is sent from a reception side, and is not responded at a transmission side in the conventional system.

In FIG. 1, reference numeral 150 denotes a controller having a function equivalent to a combination of the main controller 101 and the facsimile apparatus shown in FIG. 53. The controller 150 comprises a telephone line control unit 151 and a facsimile unit 152. The controller 150 accommodates three outside lines (office lines connected to the central office network), and three telephone lines 132 to 134 connected to key telephones A 105 to C 107. Each of the telephone lines 132 to 134 consists of a total of two pairs of signal lines, e.g., a pair of communication signal lines and a pair of control and power supply signal lines.

In this embodiment, when two or more facsimile apparatuses are to be arranged, the arrangements of the facsimile units need only be added, and there is no large difference in a control method or the like. For this reason, in the following description, a case will be explained wherein only one facsimile apparatus is arranged.

In the above arrangement, the functions of the conventional facsimile apparatus and telephone controller are integrated and systematically combined.

With the above arrangement, in a communication system constituted by connecting a plurality of telephones and a plurality of data communication apparatuses through communication media, when the data communication apparatus performs data exchange, a remaining time required for data exchange is confirmed by a telephone on a desk.

Figure 2A:
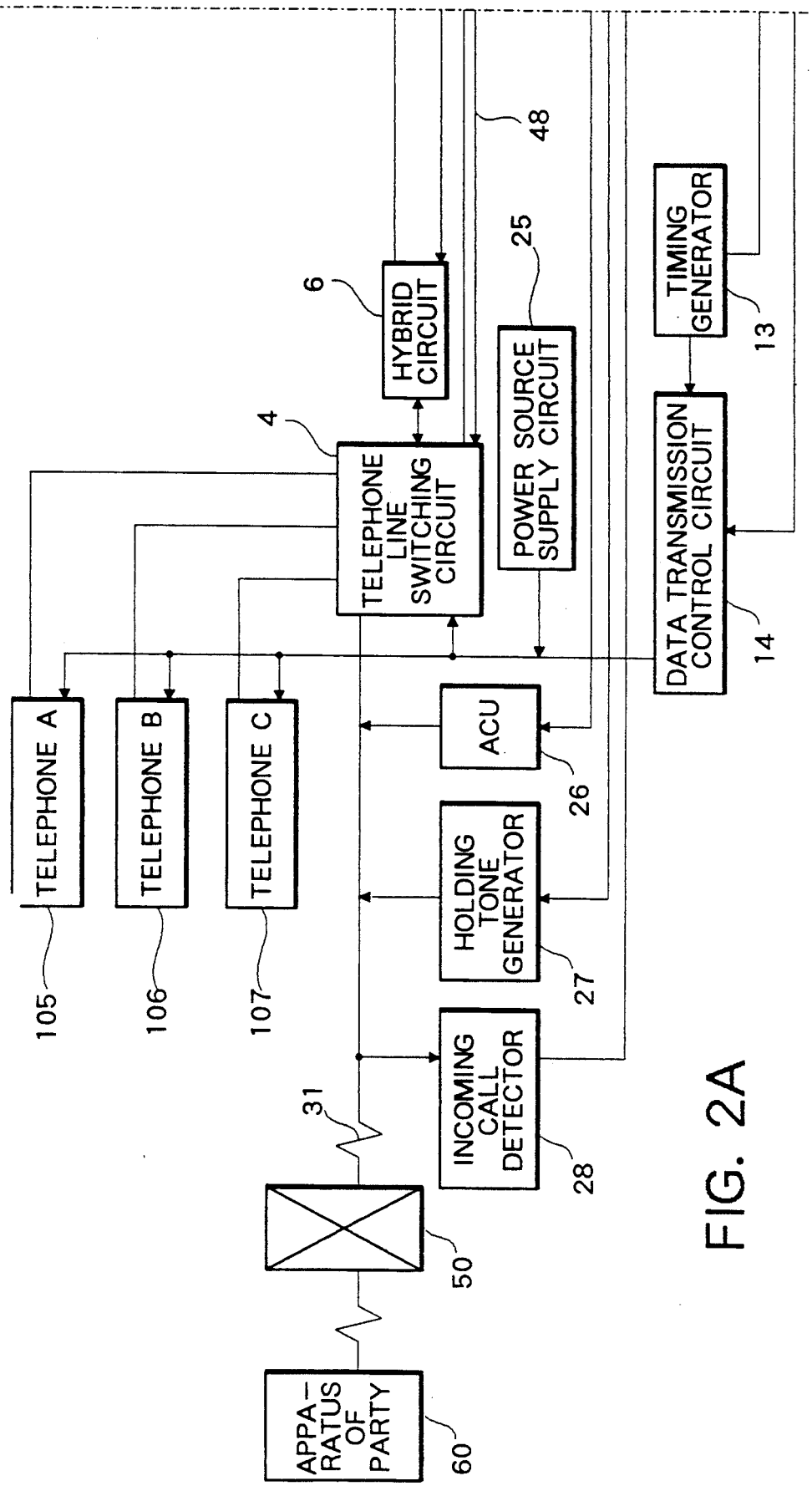
FIGS. 2A and 2B are detailed block diagrams of a controller of the first embodiment.
Figure 2B:
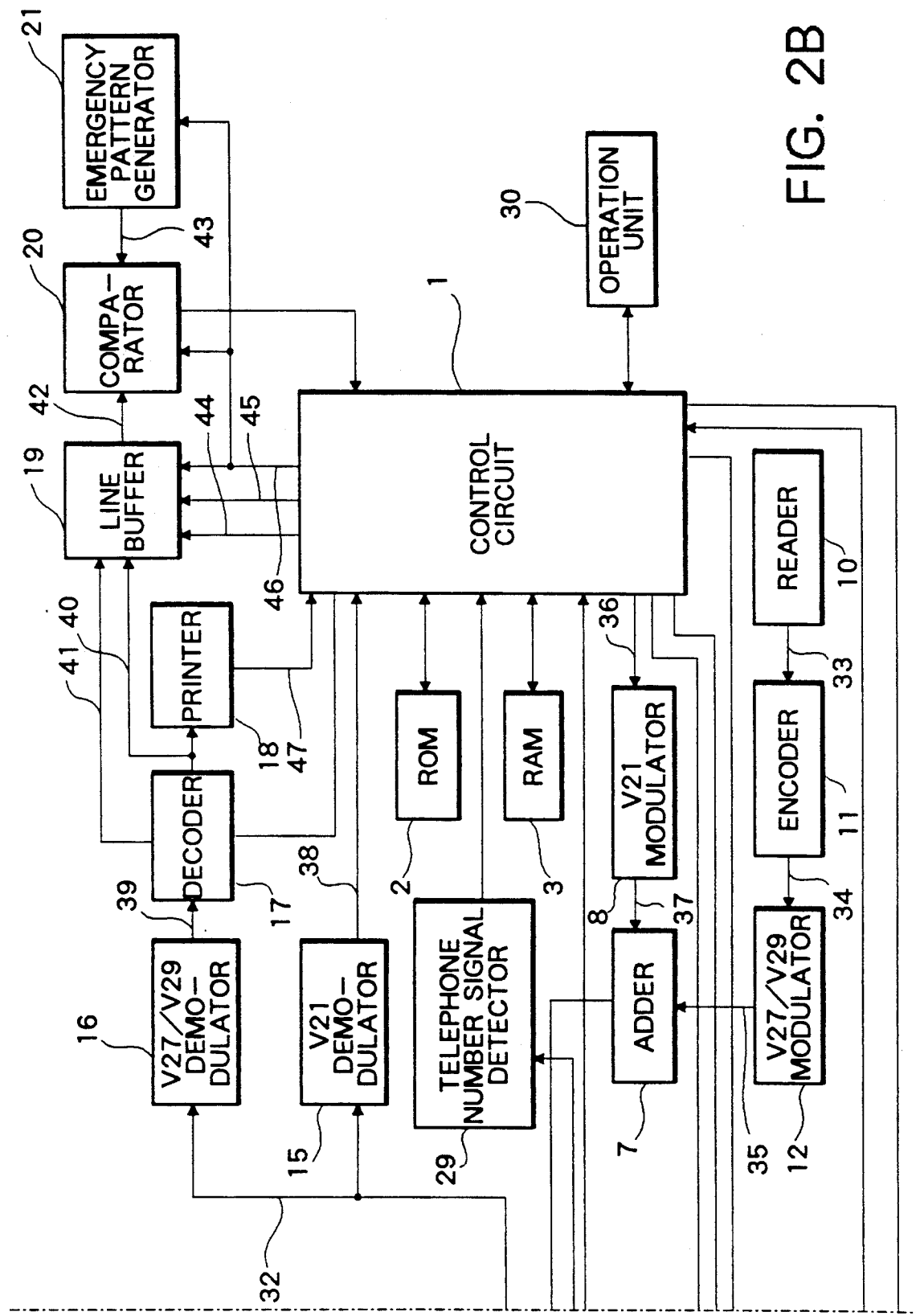

FIGS. 2A and 2B show the detailed arrangement of the controller 150.

Figure 4A:
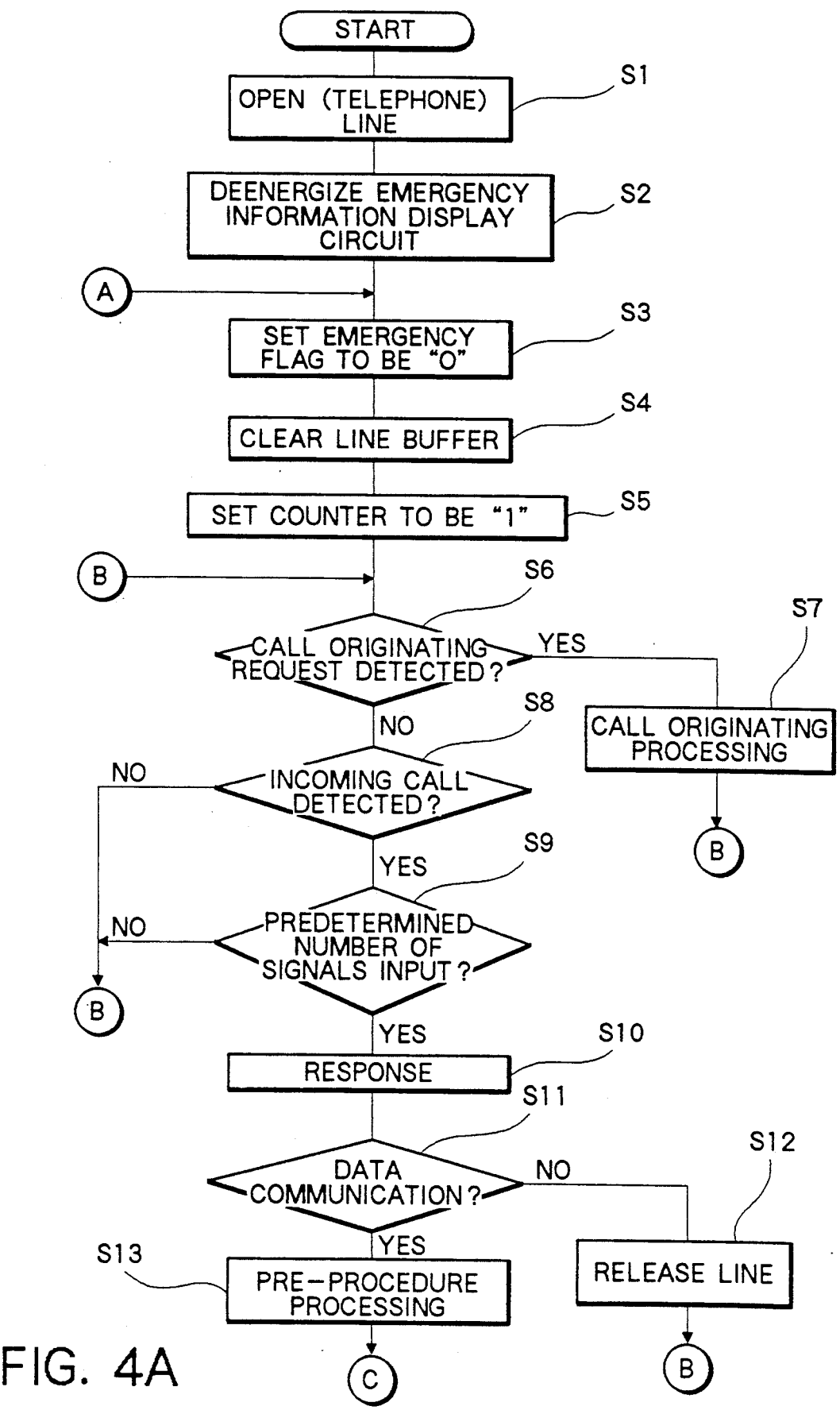
FIGS. 4A and 4B are control flow charts of the controller of the first embodiment.
Figure 4B:
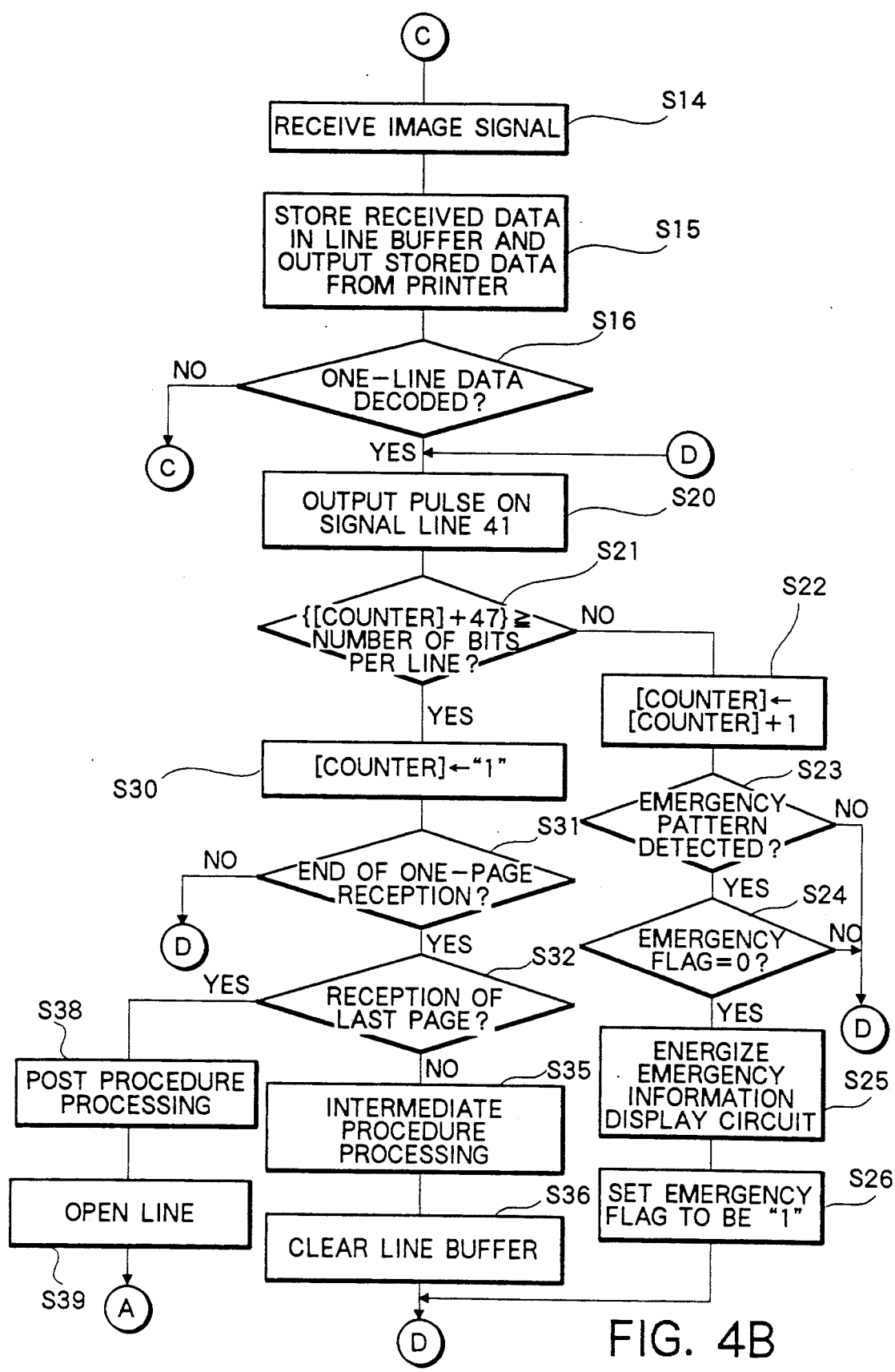

In FIGS. 2A and 2B, reference numeral 1 denotes a control circuit for controlling the entire controller in accordance with the a control program stored in a ROM 2 and shown in FIG. 5 (to be described later); 2, the read-only memory (ROM) for storing the above-mentioned program and various parameters; 3, a random access memory (RAM) for temporarily storing processing data; and 4, a telephone line switching circuit, connected to a central office network 50 through a telephone line 31, for performing data communication with, e.g., an apparatus 60 of a party on the other end of the line (e.g., a facsimile apparatus or the like having an arrangement shown in FIGS. 4A and 4B to be described later) connected to the central office network 50. The telephone line switching circuit 4 is connected to the three telephones A to C (105 to 107) through extensions. The telephone line switching circuit 4 performs channel control among connecting telephone lines and channel control with the telephones connected to the extensions in accordance with a control signal 48 from the control circuit 1.

Note that FIGS. 2A and 2B illustrate only one line, i.e., the telephone line 31. However, of course, other lines are also connected, and an ACU 26, a holding tone generator 27, and an incoming call detector 28 (to be described later) are similarly connected thereto.

Reference humeral 6 denotes a hybrid circuit for separating transmission and reception signals in signal connection between the facsimile apparatus and the telephone line switching circuit 4; 7, an adder for adding a signal from a V21 modulator 8 and a signal from a V27/V29 modulator 12 (to be described later) and outputting the sum to the hybrid circuit 6 as a transmission signal; and 8, the V21 modulator for modulating a procedure signal 36 from the control circuit 1 based on the known CCITT recommendation V21. Reference numeral 10 denotes a reader for sequentially scanning a set transmission document for every line in a main scanning direction to read a document image, converting the read image into a known binary signal consisting of "white" and "black", and outputting the binary signal as a read signal 33. The reader 10 comprises an image sensing element such as a charge-coupled device (CCD) and an optical system. Since the technology of the reader is known to those who are skilled in the art, a detailed description thereof will be omitted. Reference numeral 11 denotes an encoder for encoding the transmission signal 33 to an MH (modified Huffman) or MR (modified READ) code; and 12, the V27/V29 modulator for performing modulation based on the known CCITT recommendation V27ter (differential phase modulation) or modulation based on the known CCITT recommendation V29 (orthogonal modulation).

Reference numeral 13 denotes a timing generator for generating an operation clock signal and a timing signal for data transmission and the like; and 14, a data transmission control circuit for performing data transmission control between the extension telephones and the telephone line control unit 151 under the control of the control circuit 1. Binary digital data is employed between the data transmission control circuit 14 and the control circuit 1. An FSK-modulated signal, for example, is output to the extension telephones. Since these control operations are known to those who are skilled in the art, a detailed description thereof will be omitted.

Reference numeral 15 denotes a V21 demodulator for demodulating a reception signal sent from the hybrid circuit 6 based on the known CCITT recommendation V21. A demodulated procedure signal 38 from the V21 demodulator 15 is sent to the control circuit 1, and the control circuit 1 executes reception control in accordance with a transmission control procedure using the demodulated procedure signal 38. Reference numeral 16 denotes a V27/V29 demodulator for demodulating a reception signal sent from the hybrid circuit 6 based on the known CCITT recommendation V27ter (differential phase modulation) or the known CCITT recommendation V29 (orthogonal modulation). Reference numeral 17 denotes a decoder for performing known decoding processing, e.g., MH (modified Huffman) or MR (modified READ) decoding processing, of a demodulated signal 39 from the V27/29 demodulator 16. The decoder 17 outputs a pulse signal onto a signal line 41 every time decoding of a one-line signal is completed, and outputs decoded data onto a signal line 40. The decoded data is sent to a printer 18 and a line buffer 19. The printer 18 is a known printer for printing out data in accordance with the decoded data 40 for every line in the main scanning direction. When the printer 18 outputs paper, it informs to the control circuit 1 through a signal line 47 that the output paper is present.

Reference numeral 19 denotes the line buffer for sequentially storing decoded information received latest for 24 lines in a fine mode and for 12 lines in a standard mode. When the pulse signal is output onto the signal line 41, this means that decoding for a one-line signal is completed. Thus, the line buffer 19 receives one-line data output onto the signal line 40 every time the pulse signal is output, and erases the oldest one-line data. The line buffer 19 outputs, onto a signal line 42, 48-bit information counted from the number of bits output onto a signal line 44 toward the MSB in the main scanning direction, and information corresponding to the number of lines currently stored for the sub-scanning direction. For example, if data "11" is output onto the signal line 44 in the fine mode, 11th- to 58th-bit data in the main scanning direction of data for 24 lines currently stored are output onto the signal line 42. On the other hand, when the pulse signal is output onto a signal line 45, the storage content of the line buffer 19 is cleared. A signal line 46 is a signal line for indicating whether reception data is standard or fine mode data. When data "1" is output onto the line 46, this indicates the fine mode.

Reference numeral 20 denotes a comparator for receiving 48×24 bit data from the signal lines 42 and 43 and comparing both the data in the fine mode. When a coincidence between both the data is detected, the comparator 20 outputs a coincidence signal to the control circuit 1. Reference numeral 21 denotes an emergency pattern generator for generating a dot pattern of letters "emergency" in this embodiment. In the standard mode, the generator 21 generates a 48×12 bit (main scanning direction×sub-scanning direction) dot pattern of letters "emergency", and a 48×24 bit dot pattern in the fine mode.

The patterns to be generated are not limited to these, and may be appropriately selected. In the standard mode, a pattern can be generated such that even-numbered line data in the sub-scanning direction in the fine mode are controlled to be output. In this manner, a special pattern for the standard mode need not be stored.

Reference numeral 25 denotes a power source supply circuit for supplying an operation power source to a telephone. For example, the circuit 25 supplies a voltage of 24 V onto a signal line. Reference numeral 26 denotes an ACU for sending a telephone number signal corresponding to a telephone number output from the controller 1 to the central office network through the telephone line switching circuit 4; 27, a holding tone generator for sending a holding tone onto a telephone line upon instruction from the control circuit 1; and 28, an incoming call detector for detecting an incoming call signal. Reference numeral 29 denotes a telephone number signal detector for detecting a telephone number signal output onto a connecting telephone line. In this embodiment, since the telephone is a key telephone, and the telephone line 31 is a key telephone line, the detector 29 detects a DTMF signal. However, the detector 29 may have an arrangement for detecting a dial pulse signal in accordance with the type of connecting telephone line, as a matter of course. The telephone number signal detector 29 analyzes a telephone number signal from the extension telephone. If the analyzed telephone number signal is a connecting request to another extension telephone, the detector 29 forms a channel between the corresponding telephones, and if it is an outside line call originating request, the detector 29 connects the telephone issuing the request to the outside line to allow an outside-line call. Reference numeral 30 denotes an operation unit which comprises telephone number keys, abbreviation keys, one-touch dialing keys, and the like, and performs operation instruction inputs, and the like.

The controller of this embodiment with the above arrangement transmits normal transmission data as follows. That is, a transmission document is read using the reader 10, the read data is encoded by the encoder 11, the encoded data is modulated by the V27/V29 modulator 12, and the modulated data is then input to the adder 7 together with the modulated procedure signal 37 from the V21 modulator 18. The input signals are added by the adder 7, and a sum signal is transmitted to the apparatus 60 of the party through the hybrid circuit 6 and the telephone line switching circuit 4.

Since these processing operations are known to those who are skilled in the art, a detailed description thereof will be omitted.

Reception data from the apparatus 60 is received by the telephone line switching circuit 4, and is sent to the V27/V29 demodulator 16 through the hybrid circuit 6 to be demodulated thereby. The demodulated data is output to the decoder 17 to be decoded thereby, and the decoded data is then stored in the line buffer 19. The comparator 20 then determines if the data stored in the line buffer 19 includes a specific dot pattern. Simultaneously, the reception data decoded by the decoder 17 is sent to the printer 18, and is printed out. The procedure signal is demodulated by the V21 demodulator 15, and is sent to the control circuit 1.

Since these processing operations are also known to those who are skilled in the art, a detailed description thereof will be omitted.

The detailed arrangement of the telephones A to C (105 to 107) having the same arrangement will be described below with reference to FIG. 3.

Figure 3:
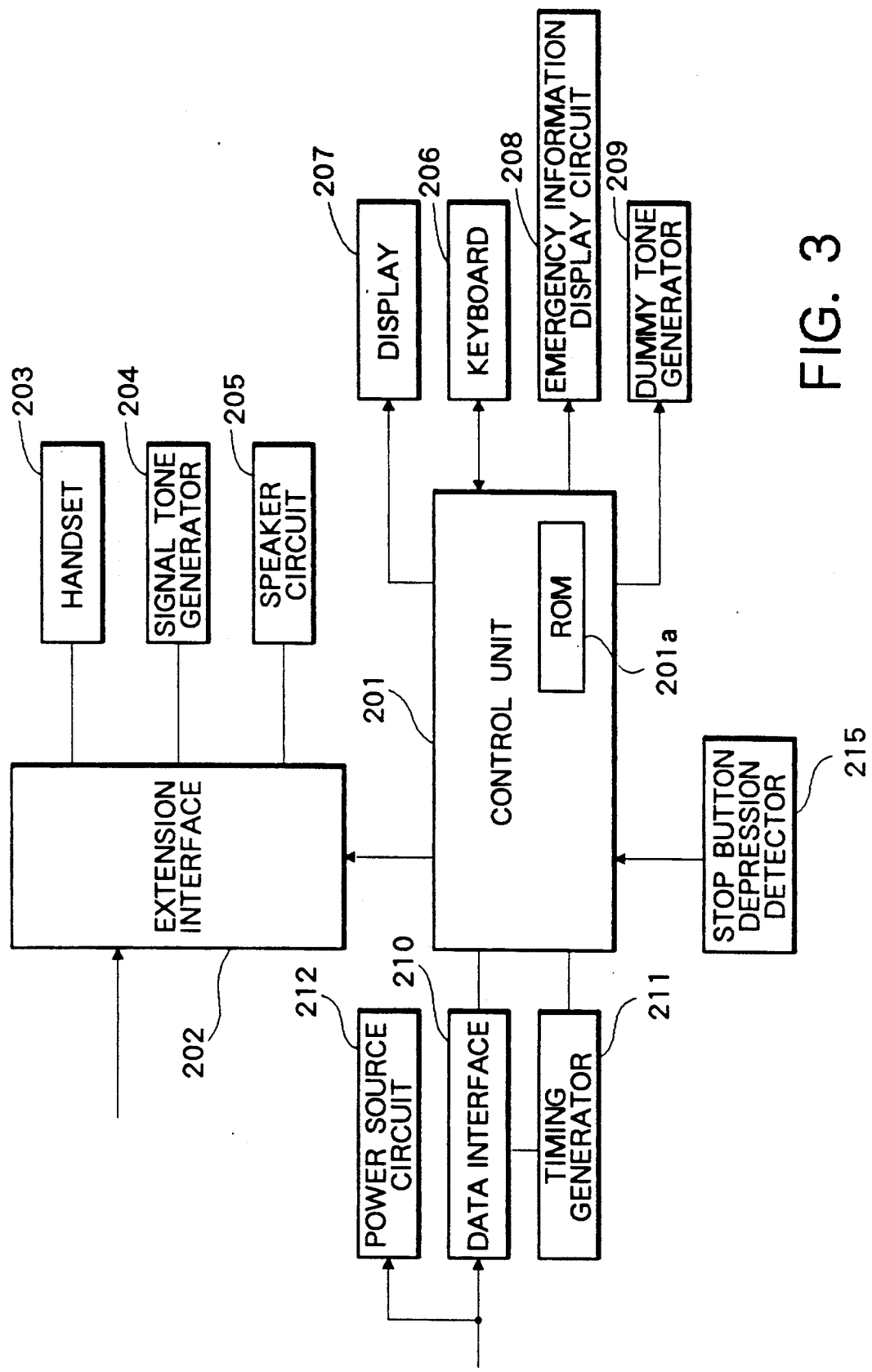
FIG. 3 is a detailed block diagram of a connecting telephone of the first embodiment.
Figure 5:
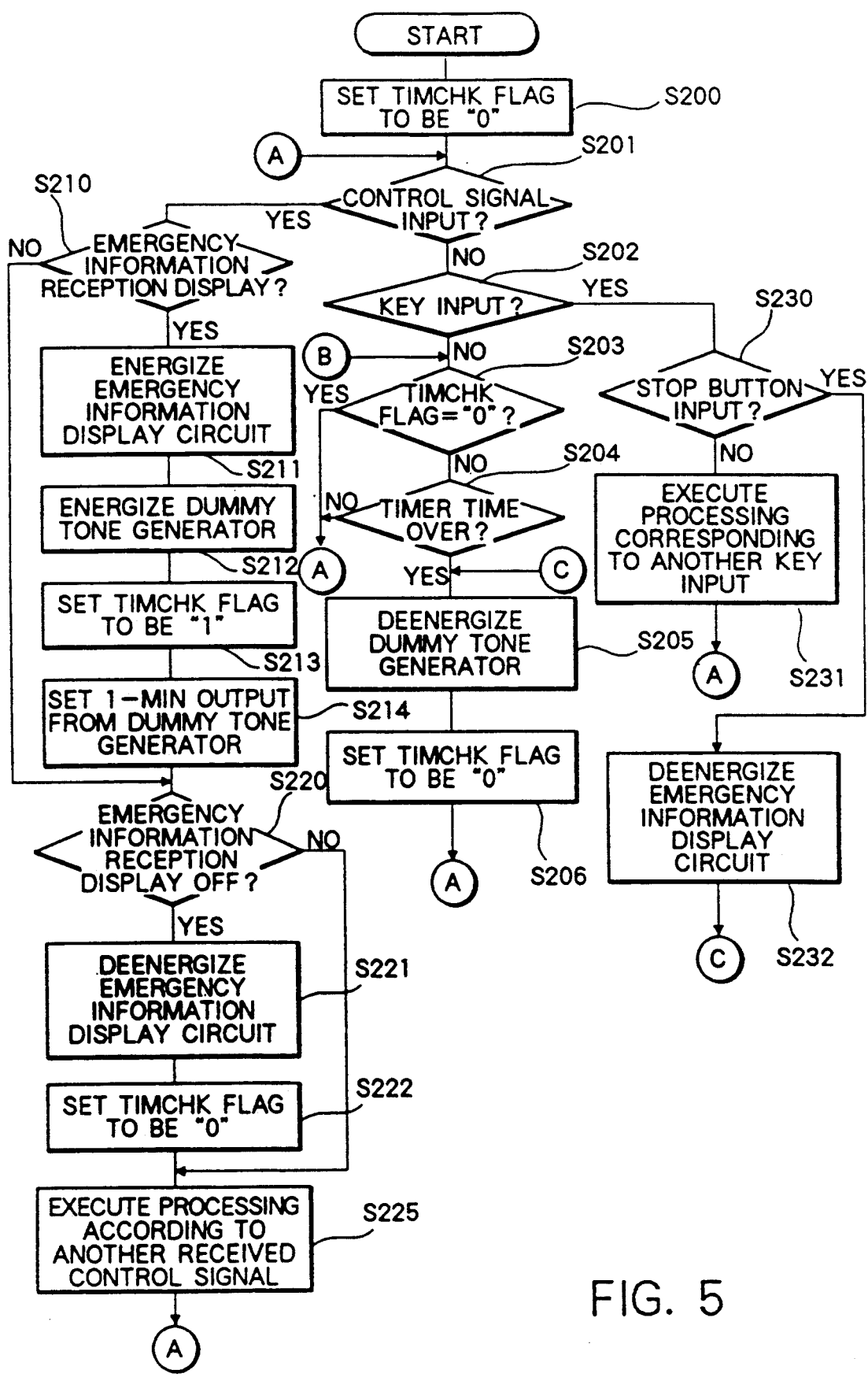
FIG. 5 is a control flow chart of the connecting telephone of the first embodiment.

In FIG. 3, reference numeral 201 denotes a control unit for controlling the entire telephone of this embodiment in accordance with a program stored in an internal ROM 201a and shown in FIG. 5; 202, an extension interface for connecting the communication telephone line (extension) with the telephone line switching circuit 4 to one of a handset 203, a signal tone generator 204, and a speaker circuit 205; 203, the handset; 204, the signal tone generator for outputting various signal tones onto a telephone line; 205, the speaker circuit for monitoring a talking tone on the telephone line; 206, a keyboard including a ten-key pad for inputting a telephone number; 207, a display for performing various displays under the control of the control unit 201; 208, an emergency information display circuit for displaying "reception of emergency information" under the control of the control unit 201; and 209, a dummy tone generator for generating a dummy tone of "reception of emergency information" so as to inform this.

Reference numeral 210 denotes a data interface for interfacing with the data transmission control circuit 14; 211, a timing generator for generating an operation clock signal for the control unit 201, and a timing signal or data transfer in the data interface 210; 212, a power source circuit for receiving electrical power supplied from the power source supply circuit 25 and supplying it to the respective components; and 215, a stop button depression detector for detecting depression of a stop button and outputting a detection signal.

In the telephone, when a connecting extension is selected by the telephone line switching circuit 4, an incoming call signal is output from the telephone line switching circuit 4. When the extension interface 202 receives the incoming call signal, the interface 202 outputs a ringing tone in accordance with the incoming call signal. When an operator who hears the ringing tone takes up the handset 203 (off-hook), a DC loop is formed with the telephone line. The telephone line switching circuit 4 detects this, and detects a response of the telephone to form a channel. Various control instructions and the like are input/output using FS-modulated signals between the data interface 210 of the telephone and the data transmission control circuit 14 of the controller 150.

The operation of this embodiment with the above arrangement will be described hereinafter with reference to the flow charts shown in FIGS. 4A and 4B and FIG. 5.

The operation of the controller 150 will be described below with reference to the flow charts shown in FIGS. 4A and 4B.

When the controller 150 is powered, the flow advances to step S1, and the telephone line switching circuit 4 is instructed to open to the telephone line 31. In step S2, the data transmission control circuit 14 is controlled to output a deenergization signal for deenergizing the emergency information reception display circuits 208 of all the telephones connected. In step S3, an EMERGENCY flag in the RAM 3 is set to be "0" so that the dummy tone is output once from the dummy tone generator 209 during a single communication. In step S4, the pulse signal is output onto the signal line 45, and the content of the line buffer 19 is cleared. In step S5, a counter in the RAM 3 is set to be "1". This counter is used to detect a bit count, from which a 48-bit character dot pattern "emergency" starts toward the MSB, in the main scanning direction of a plurality (12 or 24) line data currently stored in the line buffer 19.

In step S6, it is monitored if a call originating request is input by operating a one-touch dialing or index number dialing key of the operation unit 30 or if the handset 203 of the connecting telephone is taken off the hook to issue a call originating request. If the call originating request is detected, the flow advances to step S7, and known telephone line call originating processing is performed.

If no call originating request is detected in step S6, the flow advances to step S8 to check if the incoming call detector 28 detects an incoming call from the telephone line 31 or the like. If NO in step S8, the flow returns to step S6.

If the incoming call detector 28 detects an incoming call signal, when a telephone which should output a ringing signal (to ring a bell) is designated, the designated telephone is connected to the telephone line 31, so that the incoming call signal is transferred to the corresponding telephone, and the telephone is caused to output a ringing tone. It is checked in step S9 if the incoming call signal is input predetermined times (e.g., three times). If NO in step S9, the ringing tone is kept generated. If the handset 203 is taken up during this interval, a channel is formed between this telephone and a calling party, and talking communication is performed.

If the incoming call signal is input the predetermined times but the handset 203 is not taken up, the flow advances from step S9 to step S10, and the telephone line switching circuit 4 is instructed to form a DC loop with the telephone line 31 to respond to the call. Thus, the telephone line 31 is connected to the hybrid circuit 6. It is checked in step S11 if data reception accompanying a carrier signal as facsimile reception is performed. If a carrier signal is not detected from the telephone line, since data communication cannot be performed, the telephone line is released as a wrong telephone call in step S12, and the flow returns to step S6. Note that when another specific processing is determined in step S12, the corresponding processing is executed.

If YES in step S11, the flow advances to step S13, pre-procedure processing, e.g., detection of states of various apparatuses, is executed, and synchronization processing with the apparatus of the party is executed. When the standard mode is selected, data "0" is output onto the signal line 46 to indicate that reception is performed in the standard mode. When the fine mode is selected, data "1" is output onto the signal line 46 to indicate that reception is performed in the fine mode. In step S14, reception processing of following image information is executed after the pre-procedure processing. At the same time, in step S15, the received information is sent to the V27/V29 demodulator 16 through the above-mentioned path, and is demodulated thereby. The demodulated information is stored in the line buffer 19 and is printed out by the printer 18. It is then checked in step S16 if the decoder 17 completes one-line decoding processing. If NO in step S16, the flow returns to step S14, and the reception processing is continued. If YES in step S16, the flow advances to step S20, and the counter value is output onto the signal line 44. It is checked in step S21 if the value {[counter value]+[47]} exceeds the number of bits per line, i.e., if checking of one line is ended. If YES in step S21, the flow advances to step S30. If NO in step S21, the flow advances to step S22.

In step S22, the counter value is incremented by one. It is then checked in step S23 if a coincidence signal is input from the comparator 20, i.e., the character dot pattern "emergency" is detected. If NO in step S23, the flow returns to step S20 to check if the character dot pattern "emergency" is detected from the subsequent bits. If YES in step S23, the flow advances to step S24 to check if the EMERGENCY flag in the RAM 3 is "0". If NO in step S24, the flow returns to step S20. If YES in step S24, since the "emergency" information is received for the first time during this communication, the flow advances to step S25. In step S25, the data transmission control circuit 14 outputs an energization signal for the emergency information display circuits 208 of all the telephones. For this reason, the data interfaces 210 of the connecting telephones detect this signal, and inform detection to the corresponding control units 201. Each control unit 201 energizes the emergency display circuit 208 to display "reception of emergency information", and at the same time, causes the dummy tone generator 209 to generate a dummy tone for a predetermined period of time, thus informing to the operator "reception of emergency information". In step S26, since the dummy tone is already output from the dummy tone generator 209 during one communication, the EMERGENCY flag is set to be "1" so as to stop generation of the dummy tone from the dummy tone generator 209 thereafter. Then, the flow returns to step S20.

If it is determined in step S21 that the value {[counter value]+[47]} exceeds the number of bits per line, and the flow advances to step S30, the counter value is set to be "1". Thereafter, it is checked in step S31 if image information for one page is received. If NO in step S31, the flow returns to step S14. If YES in step S31, the flow advances to step S32 to check if the final page is received. Note that the above information has been designated during pre-procedure processing in step S13 or intermediate procedure processing in step S35. If NO in step S32, the flow advances to step S35, and the intermediate procedure processing is executed. If the reception mode is to be changed, the corresponding mode is selected. For example, when the reception mode is changed to the standard mode, the signal line 46 is set at "0". When the reception mode is changed to the fine mode, the signal line 46 is set at "1". In step S36, the reset signal is output onto the signal line 45 to clear the line buffer 19, and the flow returns to step S14.

If YES in step S32, the flow advances to step S38, and known post procedure processing is executed. After the known processing, the telephone line is released in step S39, and the flow returns to step S3.

Control on the telephone side with respect to the controller 150 will be described below with reference to FIG. 5.

When the emergency information is received, the control unit 201 sets a TIMCHK flag used for outputting a dummy tone, which informs reception of the emergency information, for a predetermined period of time (e.g., one minute) to be "0" in step S200. It is checked in step S201 if the data interface 210 receives a control signal from the data transmission control circuit 14. If NO in step S201, it is checked in step S202 if a key input from the keyboard 206 is detected.

If NO in step S202, the flow advances to step S203 to check if the TIMCHK flag is "0". If YES in step S203, the flow returns to step S201. If NO in step S203, since the dummy tone is output from the dummy tone generator 209, the flow advances to step S204 to check if a predetermined period of time has passed from outputting of the dummy tone. If NO in step S204, the flow returns to step S201. If YES in step S204, i.e., if the predetermined period of time, e.g., 1 minute, has passed, the flow advances to step S205. In step S205, the dummy tone generator 209 is deenergized, thus stopping outputting the dummy tone for informing reception of the emergency information. In step S206, the TIMCHK flag is set to be "0", and the flow returns to step S201.

Meanwhile, if the control signal from the data transmission control circuit 14 is received, the flow advances from step S201 to step S210 to check if the received control signal is an energization signal for the emergency information display circuit 208. If YES in step S210, the emergency information display circuit 208 is energized in step S211 to display "reception of emergency information". In step S212, the dummy tone generator 209 is energized to output a dummy tone. In step S213, the TIMCHK flag is set to be "1", and the flow advances to step S214. In step S214, in order to output the dummy tone from the dummy tone generator 209 for a predetermined period of time, e.g., 1 minute, a timer circuit or the like (not shown) is set to do so. The flow then advances to step S220.

If NO in step S210, i.e., if the received control signal is not the energization signal of the emergency information display circuit 208, the flow advances to step S220 to check if the deenergization signal of the emergency information display circuit is received. If NO in step S220, the flow advances to step S225. If YES in step S220, the flow advances to step S221. In step S221, the emergency information display circuit 208 is deenergized to turn off "reception of emergency information" display, and the flow then advances to step S205.

In step S225, processing corresponding to another received control signal is executed.

If the key input from the keyboard 206 is detected, the flow advances from step S201 to step S230 to check if the stop button on the keyboard 206 is operated and the input signal is a detection signal from the stop button depression detector 215. If YES in step S230, the flow advances to step S232, the emergency information display circuit 208 is deenergized to turn off the "reception of emergency information" display, and the flow advances to step S205.

If NO in step S230, the flow advances to step S231, and processing corresponding to another input key is executed. Then, the flow returns to step S201. For example, if a telephone number key is operated while the handset 203 of the telephone is taken off the hook, the signal tone generator 204 is caused to send a telephone number signal (DTMF signal) corresponding to the input number.

As described above, according to this embodiment, during the reception operation of the data communication apparatus, when specific pattern information, e.g., character dot pattern "emergency" is written on a document to be transmitted on the transmission side and is transmitted, reception of the specific pattern can be detected at the reception side, and the reception of the specific pattern can be displayed on the connecting telephones. For this reason, an operator can know reception of emergency information or specific information at his or her desk.

In the above description, a specific pattern, e.g., the "emergency" dot pattern sent from the transmission side has a predetermined size, and is a 24×24 dot pattern in the fine mode of this embodiment. A dot pattern to be compared from the emergency pattern generator 21 is also constituted by a dot pattern of (48 bits in the main scanning direction)×(24 bits in the sub-scanning direction) (12 bits in the standard mode). However, the present invention is not limited to this. A known handwritten character recognition circuit comprising a pattern feature extraction unit, a stroke analyzing unit, and a pattern dictionary can be arranged so as to detect character information handwritten on a document.

Thus, even when telephones are placed on desks and the facsimile apparatus is set on the corner of a room, a receiving party of information can immediately know at his or her desk that specific information, e.g., emergency information is received, and can take an action as soon as possible.

In this embodiment, the case has been exemplified wherein when the "emergency" character dot pattern is detected, the telephone displays a message that data including the pattern is received.

However, the present invention is not limited to this. For example, when confidential reception is performed by utilizing a facsimile communication network, a message "Confidential reception was made. Data will be kept until ×time, ×day." is sent from the facsimile communication network. The printer outputs only this message, and received data is stored in a memory (not shown). For this reason, an operator sees this received message to confirm the confidential reception, and instructs to print out the confidential-received information and to output reception data. For this purpose, the comparator 20 and the pattern generator 21 are arranged to detect the above message indicating that the confidential reception was made. When the above message is detected, the above message indicating that the confidential reception utilizing the facsimile communication network was made may be displayed on the connecting telephone.

In this case, control is made so that the message of the confidential reception is not output from the printer, thus saving recording paper.

According to the present invention as described above, reception of specific information can be reliably and quickly detected, and an action can be taken soon.

SECOND EMBODIMENT

In this embodiment, in a communication system constituted by connecting a plurality of telephones and a plurality of data communication apparatuses through communication media, when the data communication apparatus receives data, a transmission side can designate a party to be called, and at a reception side, a telephone corresponding to the designated party can be called. The telephone to be called can be designated during a transmission control procedure following setting of a call by the data communication apparatus.

Figure 6A:
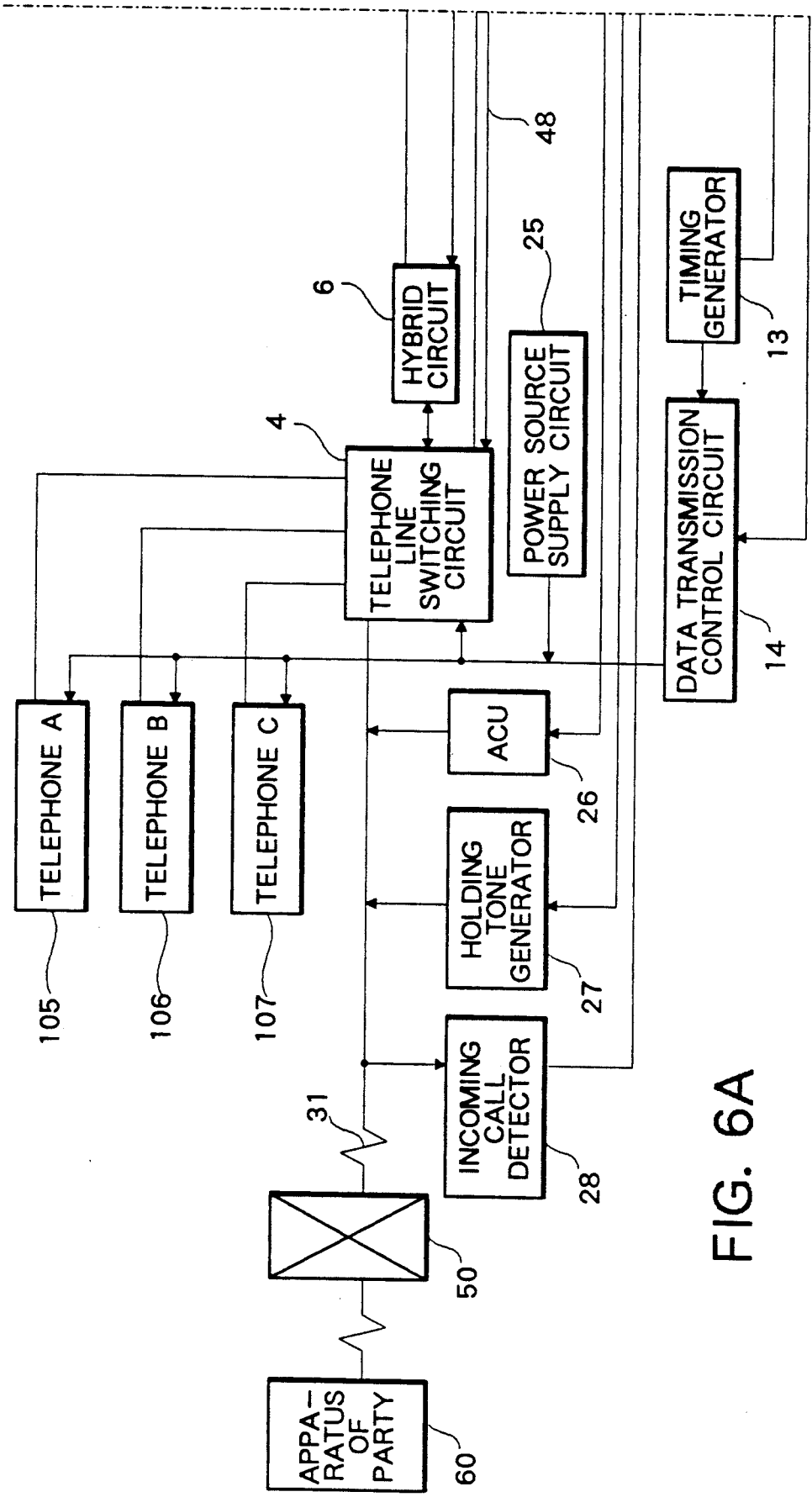
FIGS. 6A and 6B are detailed block diagrams of a controller according to a second embodiment of the present invention.
Figure 6B:
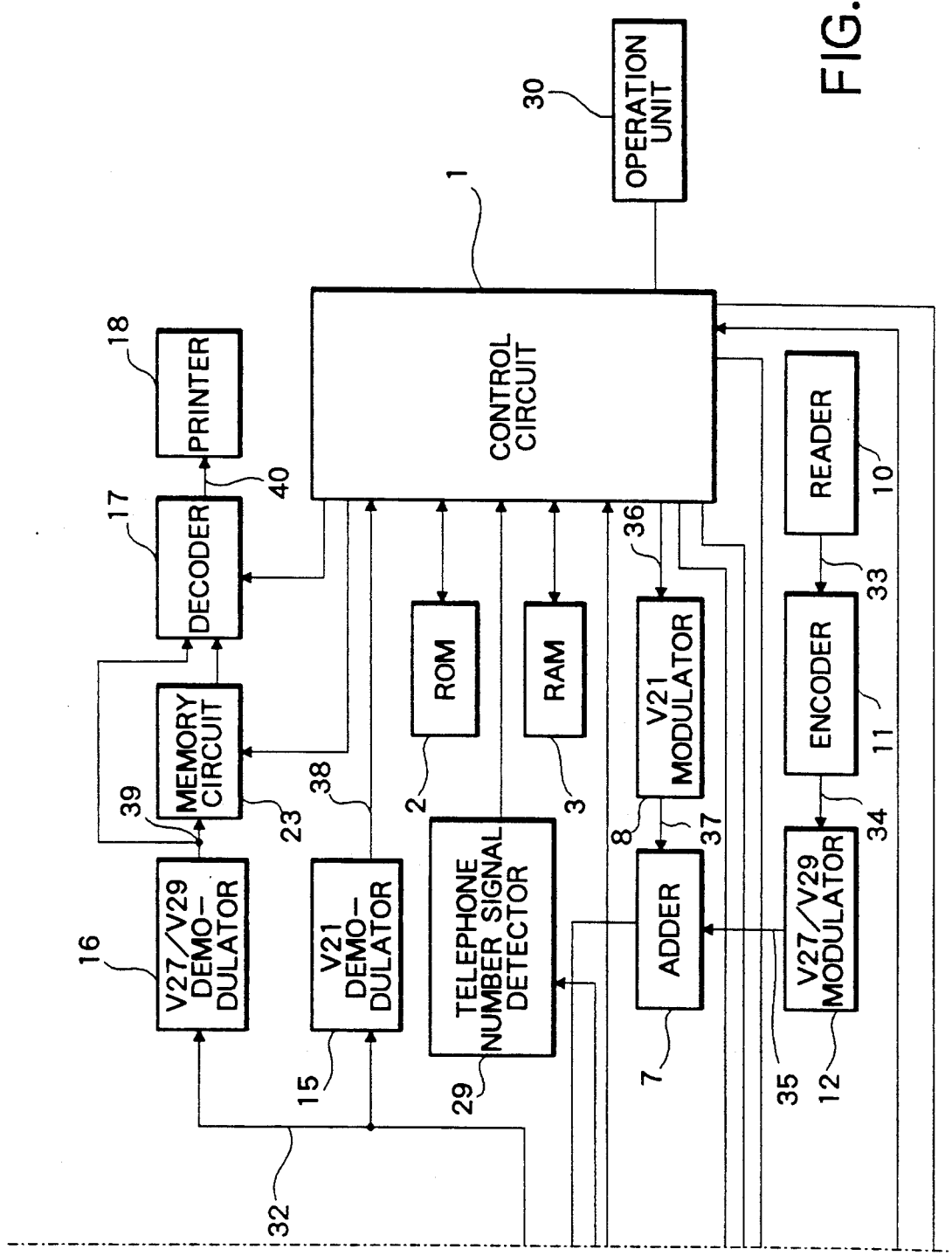

FIGS. 6A and 6B show the detailed arrangement of a controller 150 of this embodiment.

Referring to FIGS. 6A and 6B, the line buffer 19, the comparator 20, and the emergency pattern generator 21 shown in FIG. 2 are omitted, and a memory circuit 23 is added between the decoder 17 and the printer 18.

The memory circuit 23 temporarily stores demodulated data from the V27/V29 demodulator 16. More specifically, the circuit 23 temporarily stores received information when recording paper of the printer 18 is used up.

Other arrangements are the same as those in FIGS. 2A and 2B, and a detailed description thereof will be omitted to avoid a repetitive description.

The detailed arrangement of telephones A to C (105 to 107) used in this embodiment will be described hereinafter with reference to FIG. 7.

The telephones of this embodiment have the same arrangement, and a difference from the telephone illustrated in FIG. 3 is that the emergency information display circuit 208 and the stop button depression detector 215 are omitted, and a talking request button depression detector 213, a talking call display circuit 214, and a talking switch 216 are added.

Figure 7:
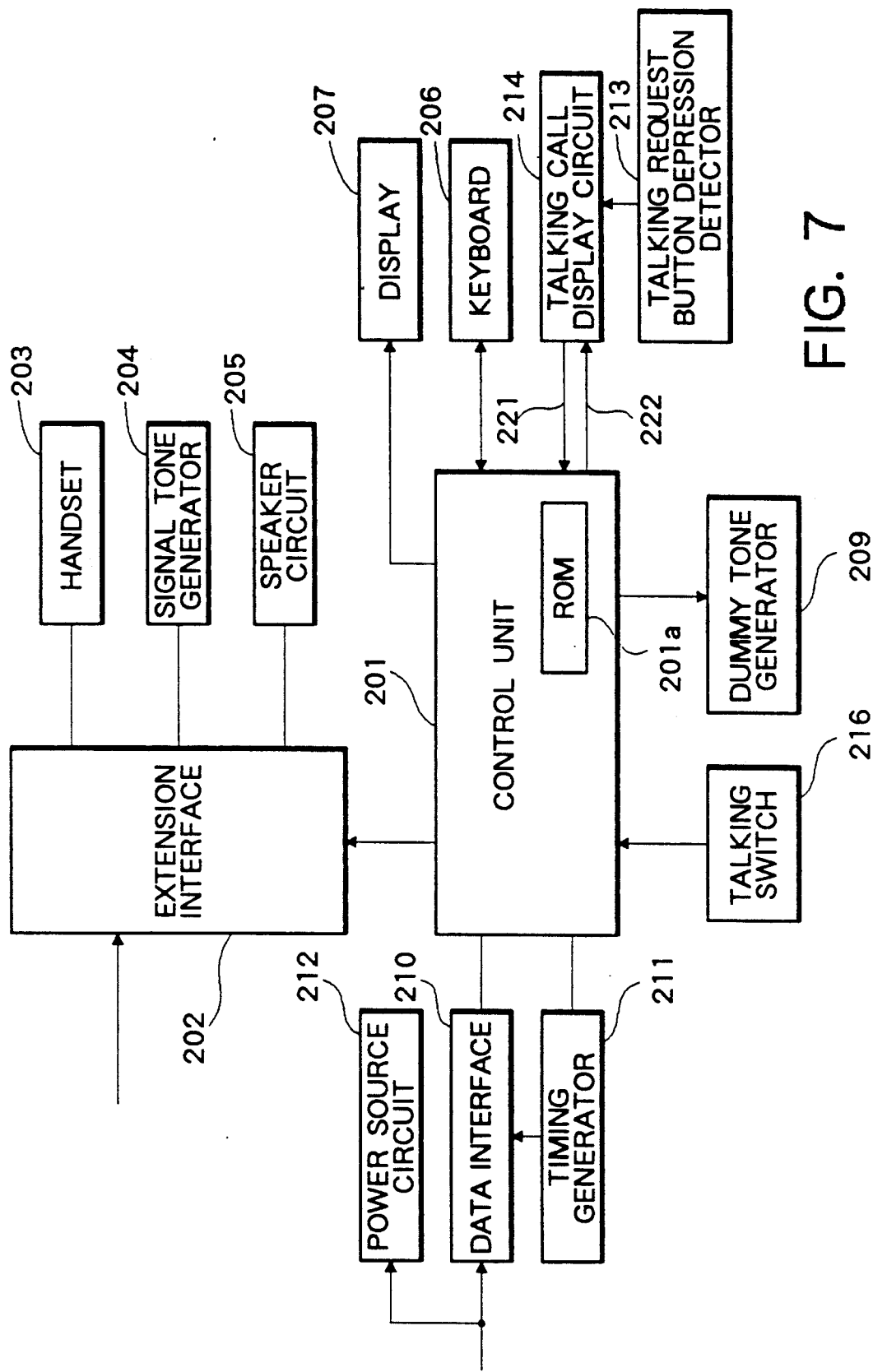
FIG. 7 is a detailed block diagram of a connecting telephone of the second embodiment.

In FIG. 7, the talking request button depression detector 213 outputs a pulse signal to the talking call display circuit 214 every time a talking request button is depressed. The talking call display circuit 214 repetitively turns on/off a "talking call" display every time the pulse signal from the detector 213 arrives. When the "talking call" display is kept on, the circuit 214 enables a signal line 221. The display circuit 214 forcibly turns off the "talking call" display in response to a display reset signal 222 input from the control unit 201. The talking switch 216 is used for issuing a talking request. Each time the switch 216 is depressed, an input signal is output to the control unit 201.

With the above arrangement, while image information communication processing is performed between the facsimile units 152 of the transmission- and reception-side controllers 150, an arbitrary telephone on the other end of the line can be called using a telephone connected to the controller.

General processing when an operator reservation is made for forming a channel with a telephone of a party (reception side) using a telephone connected to the transmission-side controller 150 will be described below.

In this embodiment, an operator call is performed after transmission of all the image information is completed. When the control circuit 1 receives information indicating a telephone to be called of the other party from a telephone (to be described later), the circuit 1 outputs a talking request signal (e.g., a PRI-EOP signal having an FIF (facsimile information field)) including the information indicating the telephone to be called to an apparatus of the party. For example, a 1-byte called telephone designation area is allocated as an FIF signal, and is transmitted to the apparatus of the party. When the party's telephone responds within a predetermined period of time and a response signal (e.g., a PIP signal) is received, a control signal is output to the telephone issuing the talking request, and the dummy tone generator 209 is caused to generate a dummy bell tone. An operator responds to this dummy bell tone, a DC loop is formed with the telephone line, and depression of the talking switch 216 is detected. Then, outputting of the dummy bell tone is stopped, and a channel is formed between the responding telephone and the party's telephone to allow talking communication therebetween.

Assume that an operator call request is issued from a telephone connected to the transmission-side apparatus during reception of image information. In this case, when the reception-side apparatus receives a talking request signal (e.g., a PRI-EOP signal having an FIF (facsimile information field)) including information of a telephone to be called from the transmission-side apparatus, it controls a connecting telephone designated by the FIF signal to generate a dummy bell tone. In response to this, when an operator inputs the talking switch, and so on, outputting of the dummy bell tone of this telephone is stopped, and a signal (e.g., a PIP signal) indicating that the telephone on the reception side responds is sent to the transmission-side apparatus. Thereafter, a connecting telephone line is connected to the responding telephone to form a channel.

In this embodiment, response detection by a telephone is not limited to a response from a telephone which outputs the dummy bell tone. For example, if another telephone responds during outputting of the dummy bell tone, it is determined that a response is made from a designated called party using another responding telephone, and a channel is formed with the responding telephone.

When a normal talking request signal (e.g., a PRI-Q signal) which does not include information specifying a telephone to be called is received, all the connected telephones are caused to output a dummy bell tone.

A case will be described below wherein an operator call request from a telephone connected to the reception-side apparatus is detected during transmission of image information. A talking call by the reception-side telephone is performed upon completion of reception of a one-page document.

When the control circuit 1 receives a talking request signal (e.g., a PIP signal having an FIF (facsimile information field)) including information indicating a telephone to be called from the reception-side apparatus (e.g., 60), the circuit 1 outputs a control signal to a connecting telephone designated by the FIF signal, and controls the dummy tone generator 209 to generate a dummy bell tone. In response to this, when an operator depresses the talking button, and so on, outputting of the dummy bell tone from this telephone is stopped, and a signal (e.g., a PRI-Q signal) indicating that the telephone on the transmission side responds is sent to the reception-side apparatus. Then, a connecting telephone line is connected to the responding telephone to form a channel.

In this embodiment, response detection by a telephone is not limited to a response from a telephone which outputs the dummy bell tone. For example, if another telephone responds during outputting of the dummy bell tone, it is determined that a response is made from a designated called party using another responding telephone, and a channel is formed with the responding telephone.

When a normal talking request signal (e.g., a PIP signal) which does not include information specifying a telephone to be called is received, all the connected telephones are caused to output a dummy bell tone.

In this case, operator reservation designation control of the reception-side apparatus is made as follows. That is, when the control circuit receives information indicating a telephone to be called of a party on the other end of the line from a telephone to be described later, it sends a talking request signal (e.g., a PIP signal having an FIF (facsimile information field)) including the information indicating the telephone to be called to the apparatus of the party after reception of one-page image information. When a telephone of the party responds within a predetermined period of time and a response signal (e.g., a PRP-Q signal) is received, the control circuit 1 outputs a control signal so as to cause the telephone issuing the talking request to generate a dummy bell tone. Thus, the corresponding telephone outputs the dummy bell tone. An operator responds to this dummy bell tone, a DC loop is formed with the telephone line, and depression of the talking switch 216 is detected. Then, outputting of the dummy bell tone is stopped, and a channel is formed between the responding telephone and the party's telephone, thus allowing talking communication therebetween.

Figure 8B:
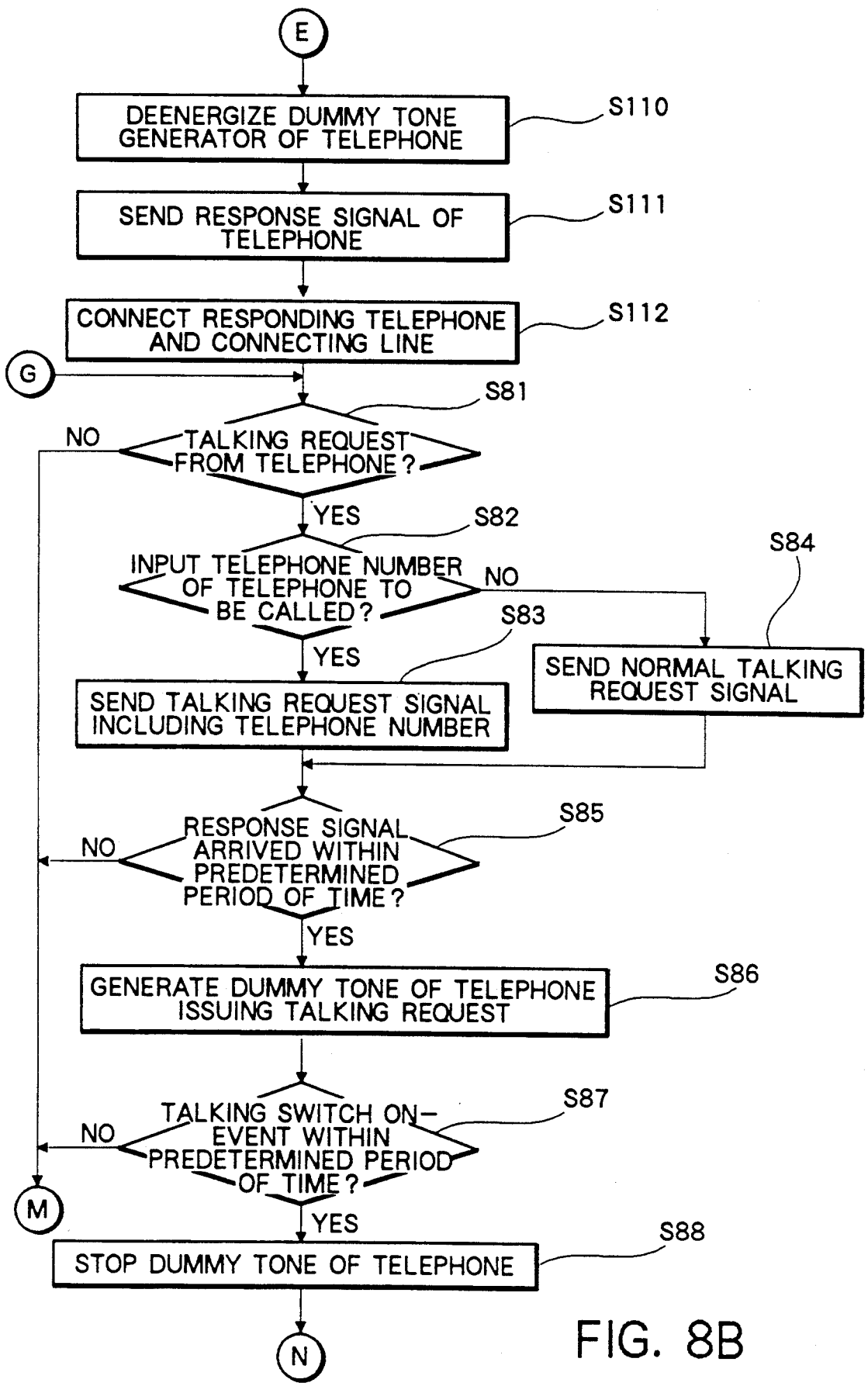
FIGS. 8A(1) to 8D are control flow charts of the controller of the second embodiment.
Figure 8D:
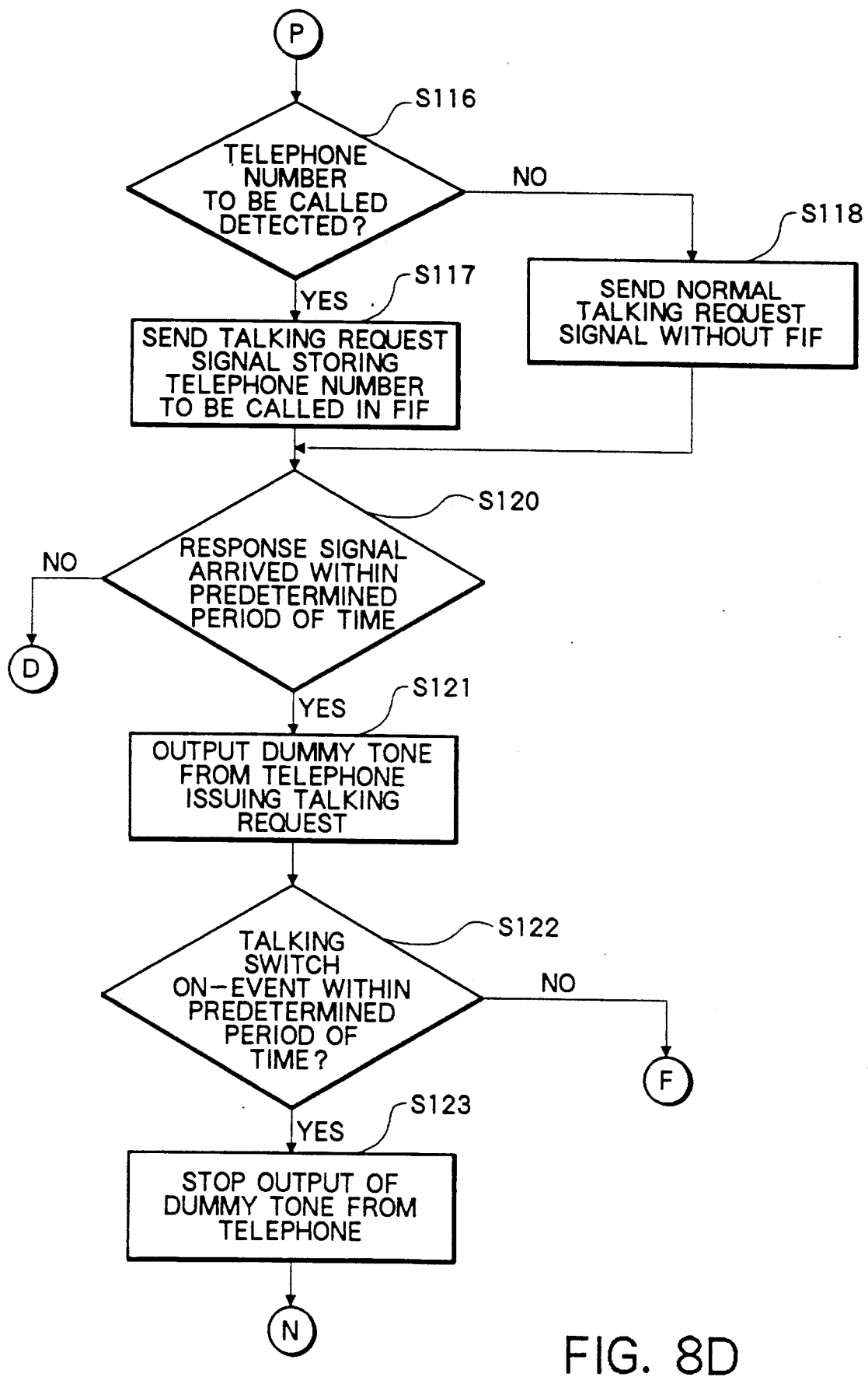
Figure 9A:
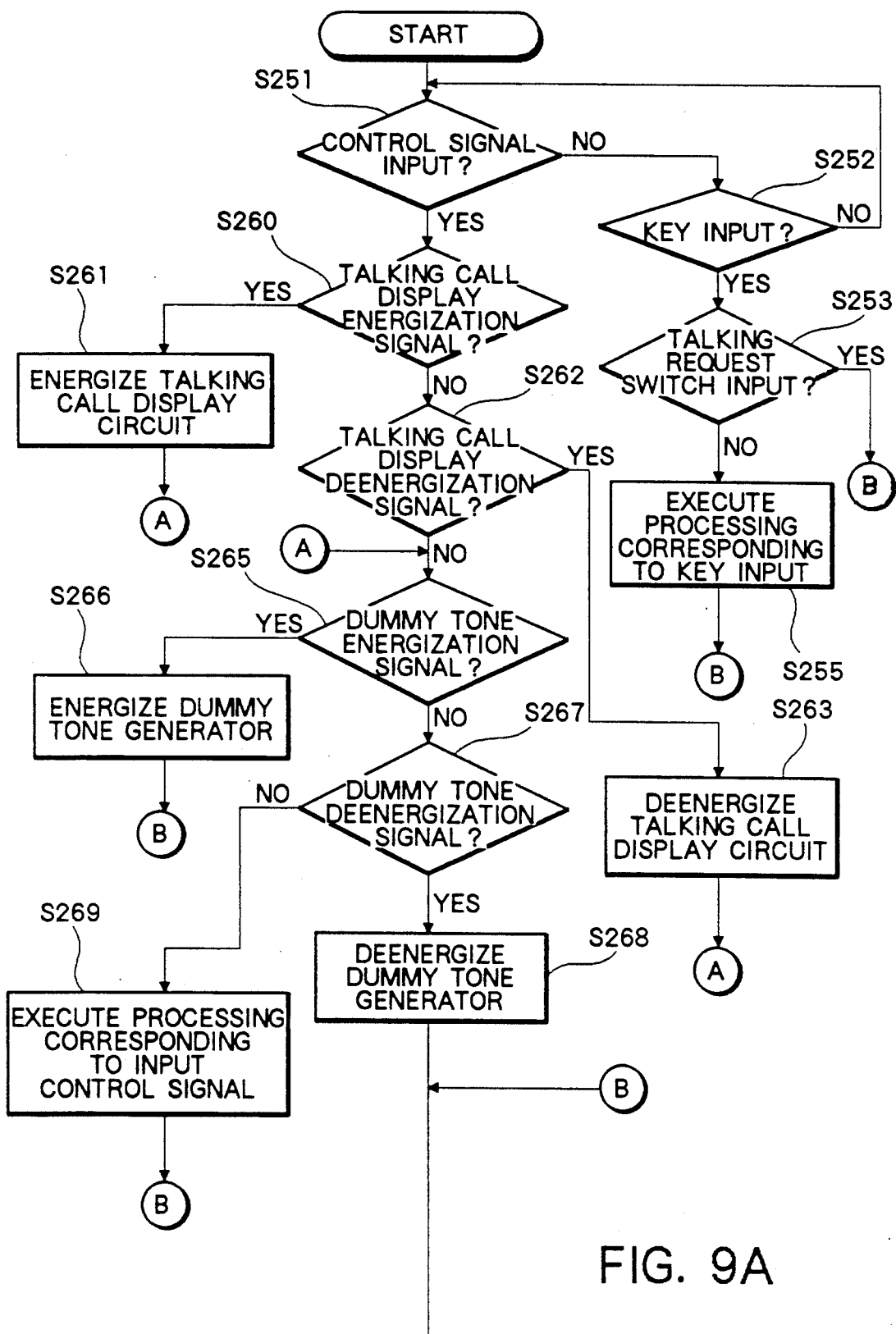
FIGS. 9A and 9B are control flow charts of the connecting telephone of the second embodiment.
Figure 9B:
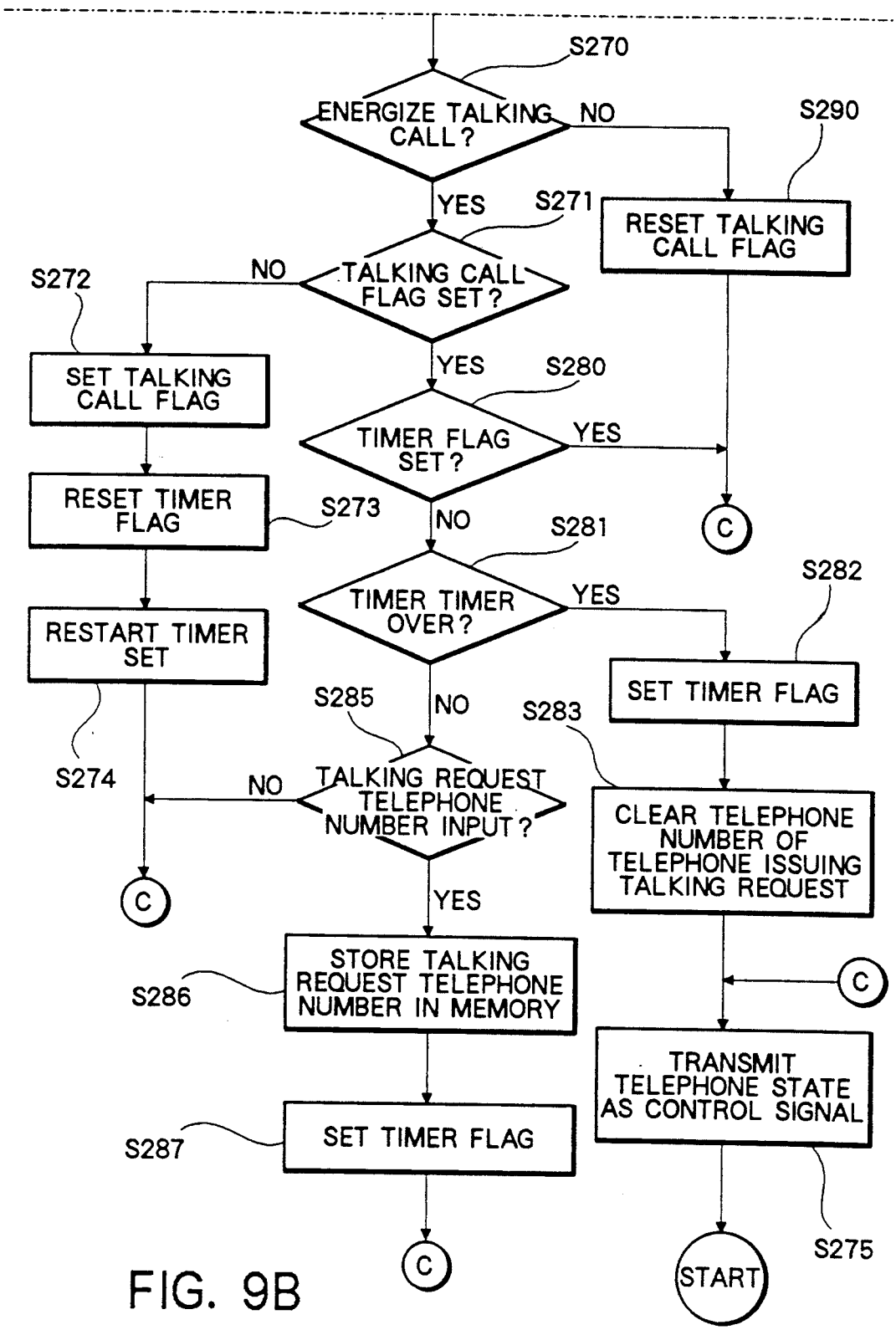

The above-mentioned control will be described in more detail hereinafter with reference to the flow charts shown in FIGS. 8A(1) to 8E and, FIGS. 9A and 9B.

The control operation of the controller 150 as the reception-side apparatus shown in FIGS. 6A and 6B will be described below with reference to FIGS. 8A(1) to 8E.

When the controller 150 is powered, the flow advances to step S51 to cause the telephone line switching circuit 4 to open the telephone line 31. In step S52, the data transmission control circuit 14 is controlled to output a reset signal for deenergizing the talking call display circuits 214 of all the telephones. It is monitored in step S54 if a call originating request is input by operating the one-touch dialing or index number dialing key of the operation unit 30 or the handset 203 of the connecting telephone is taken off the hook to issue a call originating request. If YES in step S54, the flow advances to step S55 to check if a facsimile communication transmission mode is set. If NO in step S55, the flow advances to step S56, and known telephone line call originating processing is executed.

If YES in step S55, the flow advances to step S60, and the telephone line switching circuit 4 is instructed to form a DC loop with the telephone line 31 to issue a call originating request. Thus, the telephone line 31 is connected to the hybrid circuit 6. In step S61, pre-procedure processing is executed. The flow advances to step S62, and image information to be transmitted is read from a document set on the reader 10, and one-page information is sent to a party on the other end of the line. When transmission of image information is completed, the flow advances to step S63, and a PIP/PIN signal is received to check if an operator call is received from the party. If NO in step S63, the flow advances to step S80. However, if YES in step S63, the flow advances to step S65. It is checked in step S65 whether or not information indicating one of connected telephones is included. More specifically, it is checked if the PIP/PIN signal includes the FIF. If YES in step S65, the flow advances to step S66, and a connecting telephone designated by the received FIF signal is controlled to output a dummy bell tone, and the flow advances to step S68.

If a normal talking request signal (e.g., a PIP signal) which does not include information for specifying a telephone to be called is received, the flow advances to step S67, and all the connected telephones are controlled to output a dummy bell tone. The flow then advances to step S68.

In step S68, a response by an operator, e.g., inputting of the talking button of a telephone which outputs the dummy bell tone is monitored for a predetermined period of time. If no response is detected within the predetermined period of time, the flow advances to step S69 to check if another document to be transmitted is present like in a case wherein a document to be transmitted is kept placed on the reader 10. If YES in step S69, the flow advances to step S70, and the dummy tone generator 209 which has been energized is deenergized to turn off the dummy bell tone. The flow then returns to step S62, and transmission of the next page is continued. If NO in step S69, the flow advances to step S71, and known post procedure processing is executed. Then, the flow returns to step S52.

If the response, e.g., inputting of the talking switch 216 is made within the predetermined period of time, the flow advances from step S68 to step S72, and the energized telephone is caused to stop outputting of the dummy bell tone, and a signal (e.g., a PRI-Q signal) indicating that a telephone of the reception-side apparatus responds is sent to the transmission-side apparatus. In step S74, a connecting telephone line is connected to the responding telephone to form a channel, and talking communication is made in step S75.

In this embodiment, response detection by a telephone is not limited to a response from a telephone which outputs the dummy bell tone. For example, if another telephone responds during outputting of the dummy bell tone, it is determined that a response is made from a designated called party using another responding telephone, and a channel is formed with the responding telephone. In step S76, completion of talking communication and opening of the telephone line are waited. When the telephone line is opened, the flow returns to step S51.

If no operator call is received in step S63, the flow advances to step S80 to check if another document to be transmitted is present like a case wherein a document to be transmitted is placed on the reader 10. If YES in step S80, the flow returns to step S62, and transmission of next image information is continued.

If the last document is detected, the flow advances to step S81, and the control signal 221 from the talking call display circuit 214 of the connecting telephone is enabled to check if a talking request is detected. If NO in step S81, the flow advances to step S71, and post procedure processing is executed. However, if YES in step S81, the flow advances to step S82. It is checked in step S82 if the talking request signal includes information for specifying a telephone to be called. If YES in step S82, a talking request signal (a PRI-EOP signal having an FIF) including information indicating a telephone to be called is sent to the apparatus of the party, in step S83.

If NO in step S82, the flow advances to step S84, and a normal talking request signal (a PRI-EOP signal without an FIF) is sent The flow then advances to step S85.

It is checked in step S85 if a response signal (e.g., a PIP signal) indicating that the party's telephone responds is received within a predetermined period of time. If NO in step S85, the flow advances to step S71. However, if YES in step S85, the flow advances to step S86, a control signal is output to the telephone issuing the talking request so as to generate a dummy bell tone. As a result, the corresponding telephone outputs a dummy bell tone. It is then checked in step S87 if an operator responds to the dummy bell tone within a predetermined period of time, a DC loop is formed with the telephone line, and the talking switch is depressed to make a response. If NO in step S87, the flow advances to step S71.

If YES in step S87, the flow advances to step S88, and a control signal is output to the corresponding telephone, which has energized the dummy bell tone in step S86, to deenergize the dummy bell tone. Thus, the dummy bell tone of the corresponding telephone is stopped, and the flow advances to step S74.

Meanwhile, if no call originating request is detected in step S54, the flow advances to step S90 to check if the incoming call detector 28 detects an incoming call from the telephone line 31 or the like. If NO in step S90, the flow returns to step S54.

If the incoming call detector 28 detects an incoming call signal, when a telephone which should output a ringing signal (should ring a bell) is designated, the designated telephone is connected to the telephone line 31, and the corresponding telephone is caused to output a ringing tone. It is checked in step S91 if the incoming call signal is input predetermined times (e.g., three times). If NO in step S91, calling is continued. If the handset 203 is taken off the hook during this interval, a channel is formed between the corresponding telephone and a calling party, and talking communication is made.

If the handset 203 is not taken off the hook after the incoming call signal is input the predetermined times, the flow advances from step S91 to step S92. In step S92, the telephone line switching circuit 4 is instructed to form a DC loop with the telephone line 31, thus making a response. Then, the telephone line 31 is connected to the hybrid circuit 6. It is then checked in step S93 if data reception accompanying a carrier signal as facsimile reception is performed. If no carrier signal is detected from the telephone line, since data communication cannot be performed, the telephone line is released in step S94 as a wrong telephone call, and the flow returns to step S54.

Note that if another specific processing is determined in step S94, the corresponding processing is executed.

If the data signal is detected in step S93, the flow advances to step S95, pre-procedure processing, e.g., detection of states of various apparatuses, is executed, thus executing synchronization processing with the apparatus of the party. In step S96, reception processing of image information sent after, the pre-procedure processing is executed. At the same time, in step S97, the received information is sent to the V27/V29 demodulator 16 through the above-mentioned path. The demodulated signal is sent to the decoder 17 without going through the memory circuit 23, and is printed out by the printer 18. Upon completion of reception of image information, the flow advances to step S98 to check if an operator call request is input from a telephone connected to the transmission-side apparatus. More specifically, it is checked if a talking request signal (e.g., a PRI-Q signal having an FIF) including information indicating a telephone to be called is received from the transmission-side apparatus after reception of the image information. If YES in step S98, the flow advances to step S100 to check if the talking request signal includes information for specifying a telephone to be called. If YES in step S100, the flow advances to step S101, and a connecting telephone designated by the FIF signal is controlled to energize its dummy tone generator 209, thereby generating a dummy bell tone. If NO in step S100, i.e., if a normal talking request signal (e.g., a PRI-Q signal) which does not include information for specifying a telephone to be called is received, the flow advances to step S102, and all the connected telephones are controlled to energize their dummy tone generators 209, thus generating dummy bell tones. The flow then advances to step S103 to check if a response by an operator, e.g., inputting of the talking button is made using the connecting telephone within a predetermined period of time in response to this. If NO in step S103, the flow advances to step S104, and the dummy tone generator 209 energized in advance is deenergized to turn off the dummy bell tone. Thereafter, the flow advances to step S105. It is checked in step S105 if the last document information is received. If NO in step S105, the flow returns to step S98, and reception of the next page is continued. If YES in step S105, the flow advances to step S106, and known post procedure processing is executed. Thereafter, the flow advances to step S81.

If the response, e.g., inputting of the talking switch 216 is made within the predetermined period of time in step S103, the flow advances to step S110, and outputting of the dummy bell tone from the energized telephone is stopped. In step S111, a signal (e.g., a PIP signal) indicating that the telephone on the reception side responds is sent to the transmission-side apparatus. In step S112, a connecting telephone line is connected to the responding telephone to form a channel, and the flow advances to step S81.

If no operator call request is detected from the apparatus of the party in step S98, the flow advances to step S115 to check if a talking request is issued from a connecting telephone by, e.g., depressing the talking switch 216. If NO in step S115, the flow advances to step S105, and data transmission processing is continued. If YES in step S115, the flow advances to step S116.

It is checked in step S116 if designation information of a party's telephone is included in the talking request.

If YES in step S116, the flow advances to step S117, and a talking request signal (e.g., a PIP signal-having an FIF) including information indicating a telephone to be called is transmitted. The FIF stores designated telephone information. Thereafter, the flow advances to step S120.

Meanwhile, if the talking request signal does not include information for specifying a telephone to be called, a normal talking request signal (e.g., a PIP signal) without an FIF is transmitted to a connecting telephone of the party. The flow then advances to step S120. It is checked in step S120 if a response signal (e.g., a PRI-Q signal) is received from the connecting telephone of the party within a predetermined period of time. If NO in step S120, the flow advances to step S105. However, if YES in step S120, the flow advances to step S121, and the dummy tone generator 209 of the telephone which has issued the talking request is energized to generate a dummy bell tone. It is then checked in step S122 if the talking switch is operated at any connecting telephone and the talking request button depression detector 213 detects the depression and informs this to the connecting controller 150. Note that a response from any other telephones need not be validated, and a response from only a telephone which outputs the dummy bell tone may be validated.

If NO in step S122, the flow advances to step S104. However, if YES in step S122, the flow advances to step S123. In step S123, the dummy tone generator 209 of this responding telephone is deenergized to stop a dummy bell tone. Then, the flow advances to step S74.

With the above-mentioned control, talking communication can be made with an arbitrary telephone during data transmission/reception, and a receiving party can obtain desired received information without taking an fruitless action.

Control of the telephone in the above-mentioned processing of the controller 150 will be described below with reference to FIGS. 9A and 9B.

The control unit 201 checks in step S251 if the data interface 210 receives a control signal from the data transmission control circuit 14. If NO in step S251, it is checked in step S252 if a key input from the keyboard 206 is detected If NO in step S252, the flow returns to step S251.

If YES in step S252, the flow advances to step S253 to check if the key input corresponds to the input from the talking switch 216. If YES in step S253, the flow advances to step S270; otherwise, the flow advances to step S255, and processing corresponding to the key input is executed. After the processing, the flow returns to step S251 to prepare for the next key input. The corresponding processing is performed as follows. For example, when the handset 203 is taken off the hook and a telephone number key is operated, a signal tone generator 204 is caused to send a corresponding telephone number signal (DTMF signal or the like). When a party's telephone number is input after depression of the talking switch 216, the input number is temporarily held, and is output together with the talking request signal thereafter.

When the control signal from the data transmission control circuit 14 is received, the flow advances from step S251 to step S260 to check if the received control signal is an energization signal of the talking call display circuit 214. If YES in step S260, the talking call display circuit 214 is energized in step S261 to display "talking call". The flow then advances to step S265 to prepare for a response by, e.g., taking up the handset 203.

If NO in step S260, the flow advances to step S262 to check if the received control signal is a deenergization signal of the talking call display circuit 214. If YES in step S262, the flow advances to step S263, and the talking call display circuit 214 is deenergized. Thereafter, the flow advances to step S265. If NO in step S262, the flow advances to step S265 to check if the received control signal is an energization signal of the dummy tone generator 209. If YES in step S265, the dummy tone generator 209 is energized in step S266 to generate a dummy bell tone. The flow then advances to step S270.

If NO in step S265, the flow advances to step S267 to check if the received control signal is a deenergization signal of the dummy tone generator 209. If YES in step S267, the flow advances to step S268, and the dummy tone generator 209 is deenergized to stop a dummy bell tone. Thereafter, the flow advances to step S270.

If NO in step S267, the flow advances to step S269, and processing corresponding to the received control signal is executed. The flow advances to step S270. It is checked in step S270 if the talking call display circuit 214 is energized. If NO in step S270, a talking call flag is reset in step S290, and the flow advances to step S275. If YES in step S270, the flow advances to step S271 to check if the talking call flag in the control unit 201 is reset. If YES in step S271, the talking call flag is set in step S272, and a timer flag is reset in step S273. Then, a predetermined time period is set in a timer (not shown), e.g., a 5-sec timer of the control unit 201 in step S274, and the flow advances to step S275. In step S275, the current state of the telephone is transmitted as a control signal to the data transmission control circuit 14 through the data interface 210. The state of the telephone includes a set state of a talking call, a telephone number information input state, a talking switch input state, and the like.

If NO in step S271, the flow advances to step S280 to check if the timer flag is set. If YES in step S280, the flow advances to step S275. If NO in step S280, the flow advances to step S281 to check if the timer started in step S274 is time over. If YES in step S281, the timer flag is set in step S282, and the the input of the telephone number to be called is cleared in step S283. The flow then advances to step S275.

If NO in step S281, the flow advances to step S285 to check if a designation input of a telephone number to be called is completed. If NO in step S285, the flow advances to step S275; otherwise, the input telephone number is stored in a memory in step S286. In step S287, the timer flag is set, and the flow then advances to step S275.

As described above, according to this embodiment, when the data communication apparatus performs a reception operation, an operator can know the reception by a nearby telephone. Thus, a receiver of information can immediately know that reception addressed to him or her at his or her desk, and can immediately output received information.

In this embodiment, a "talking call" is made from a connecting telephone. However, the system need not be a system constituted by connecting a data transmission apparatus and a telephone terminal. For example, a talking request button is arranged on an operation unit of a facsimile apparatus, so that a telephone number is input within a predetermined period of time after the button is depressed.

In the above description, a telephone number of a party to be called is input, and a party's telephone is specified by the input number However, the present invention is not limited to this. For example, in place of inputting a party's telephone number, a name of a receiving party is input, and the transmission- or reception-side apparatus comprises a table in which names and telephone numbers are corresponded to each other, so that a telephone number can be specified with reference to this table. In addition, the number of names corresponding to a telephone is not limited to one. If a plurality of nicknames are given, a single telephone may be specified by these nicknames.

If a name is transmitted to the reception side but cannot find a coincidence, a telephone corresponding to a most similar name can be specified.

With this arrangement, a desired telephone can be designated using a name normally used in place of a series of numerals which are not easy to remember. As a result, an apparatus which can be easily used and free from a designation error can be provided.

In the above description, when a telephone to be called is not designated, a predetermined telephone is caused to perform "talking call" display. However, the present invention is not limited to this. When a telephone is not designated, all the telephones connected to the reception-side apparatus can be controlled to display "talking call". Thus, if a receiving party does not sit at a specific telephone position, he can reliably know reception of image information.

In the above description, the number of external connecting telephone lines (outside lines) is one. However, a plurality of outside lines may be input. Similarly, a plurality of communication apparatuses may be arranged.

Assume that two communication apparatuses are operated. In this case, a connecting key telephone is arranged to be able to display a telephone number of an outside line connected to the operating communication apparatus, and an ID of the communication apparatus connected to the outside line. When the communication apparatuses are respectively connected to outside lines 1 and 2 and are operated, a telephone can display a telephone number (aaa-bbb-cccc) and an ID (YY department of X corporation) of the outside line 1, and a telephone number (AA-BBB-CCCC) and an ID (yy department of x corporation) of the outside line 2. When a telephone reservation is made from a telephone, the displayed designated number of the outside line is input after depression of, e.g., a telephone reservation button. If necessary, a telephone number of a telephone connected to a communication apparatus of a party on the other end of the line is input.

When a telephone call is made from the party on the other end of the line, only outside line information originating a call may be output to the telephone so that an operator can know the outside line originating a call.

In the above description, talking communication is performed after data communication is started. However, the present invention is not limited to this. For example, data communication can be performed before data communication is started.

More specifically, a previous telephone call is allowed such that if a facsimile apparatus is set in an automatic line connection mode, a data transmission mode does not start, and talking communication can be performed with a telephone designated by a talking request signal from a calling party.

In this case, a talking request signal (e.g., a PRI-Q signal) including information of a telephone to be called, which is designated in advance, in the FIF is transmitted from the calling party after reception of an initial identification signal. When the talking request signal having the FIF including the information of the telephone to be called is received, a designated telephone is caused to generate a ringing tone on a called party side, thus informing the receiving party of information.

Thus, information transmission can be performed after it is confirmed that a receiving party is present, and wasteful communication can be prevented.

According to the present invention as described above, the person who should receive information can reliably and quickly know reception of information and can immediately obtain information. In addition, a fruitless action can be prevented.

THIRD EMBODIMENT

In the above description, transmission of communication data from a facsimile apparatus of a party on the other end of the line is informed to a telephone near a receiving party. The present invention is not limited to this. For example, when a telephone is connected to the facsimile apparatus, control can be made such that a so-called operator reservation for reserving telephone communication with the party during facsimile communication can be reliably performed. In this case, the telephone connected to the facsimile apparatus can be an arbitrary telephone normally used.

In this case, the controller 150 can have the same arrangement as that shown in FIGS. 6A and 6B, and in order to realize the control operation of this embodiment, the holding tone generator 27 shown in FIGS. 6A and 6B may be omitted. Note that the ROM 2 stores a program shown in FIG. 10 to be described later. Thus, communication according to a transmission control procedure shown in FIGS. 11 and 12 are allowed.

Figure 11A:
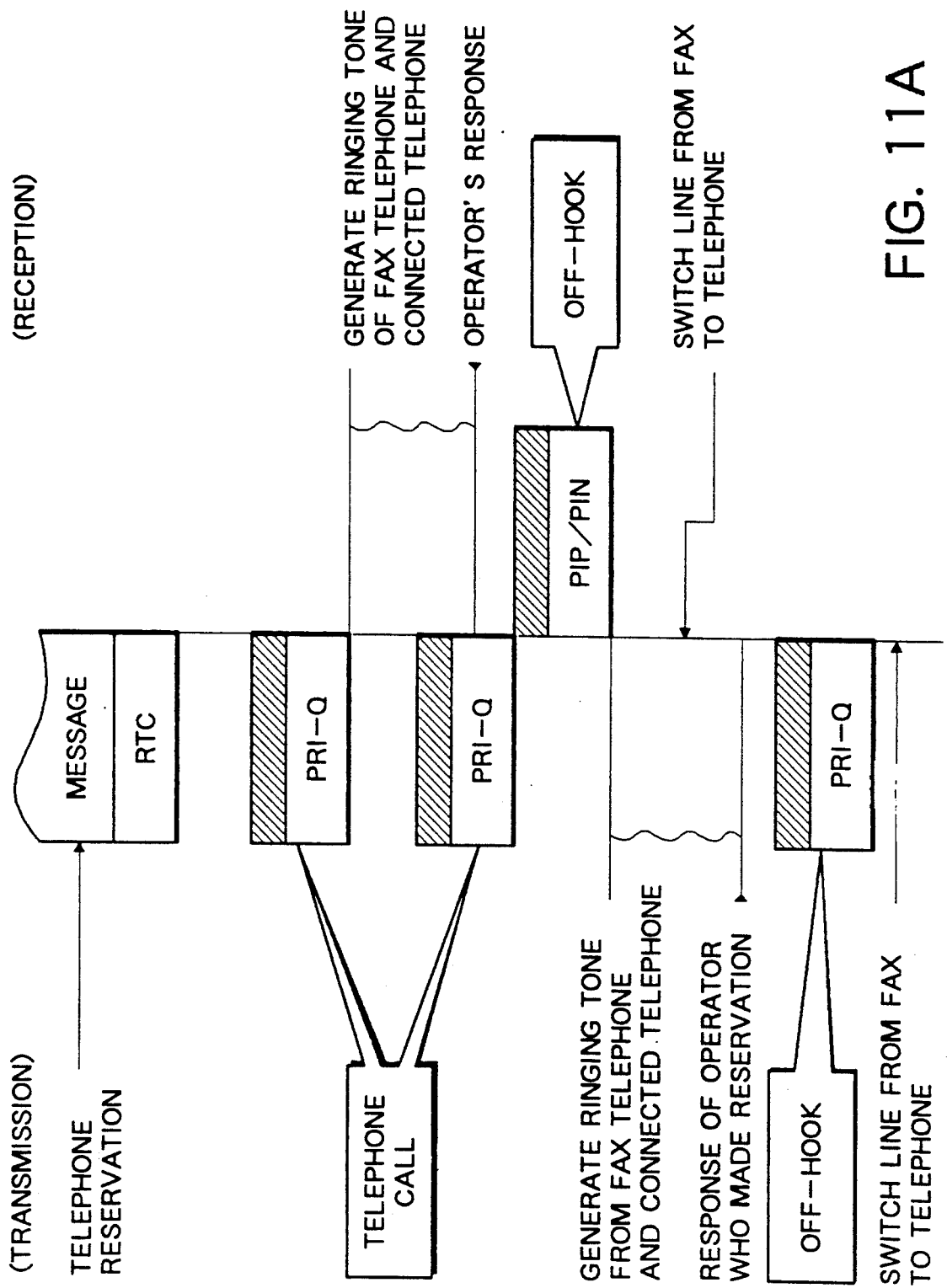
FIG. 11A is a chart showing a transmission control procedure when an operator call request is sent from a transmission side, and is responded at a reception side in the third embodiment.
Figure 11B:
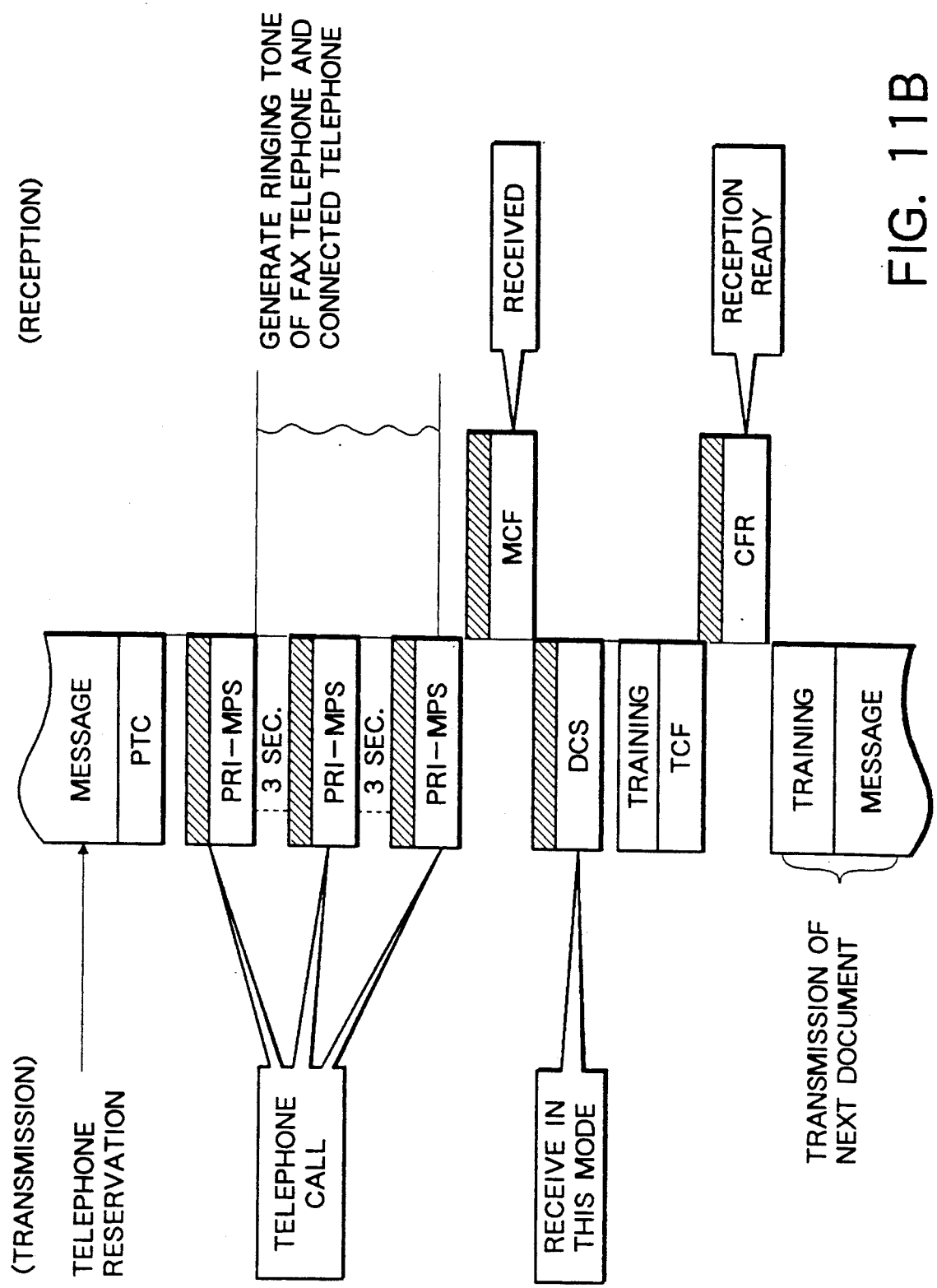
FIG. 11B is a chart showing a transmission control procedure when an operator call request is sent from a transmission side, and is not responded at a reception side in the third embodiment.
Figure 12:
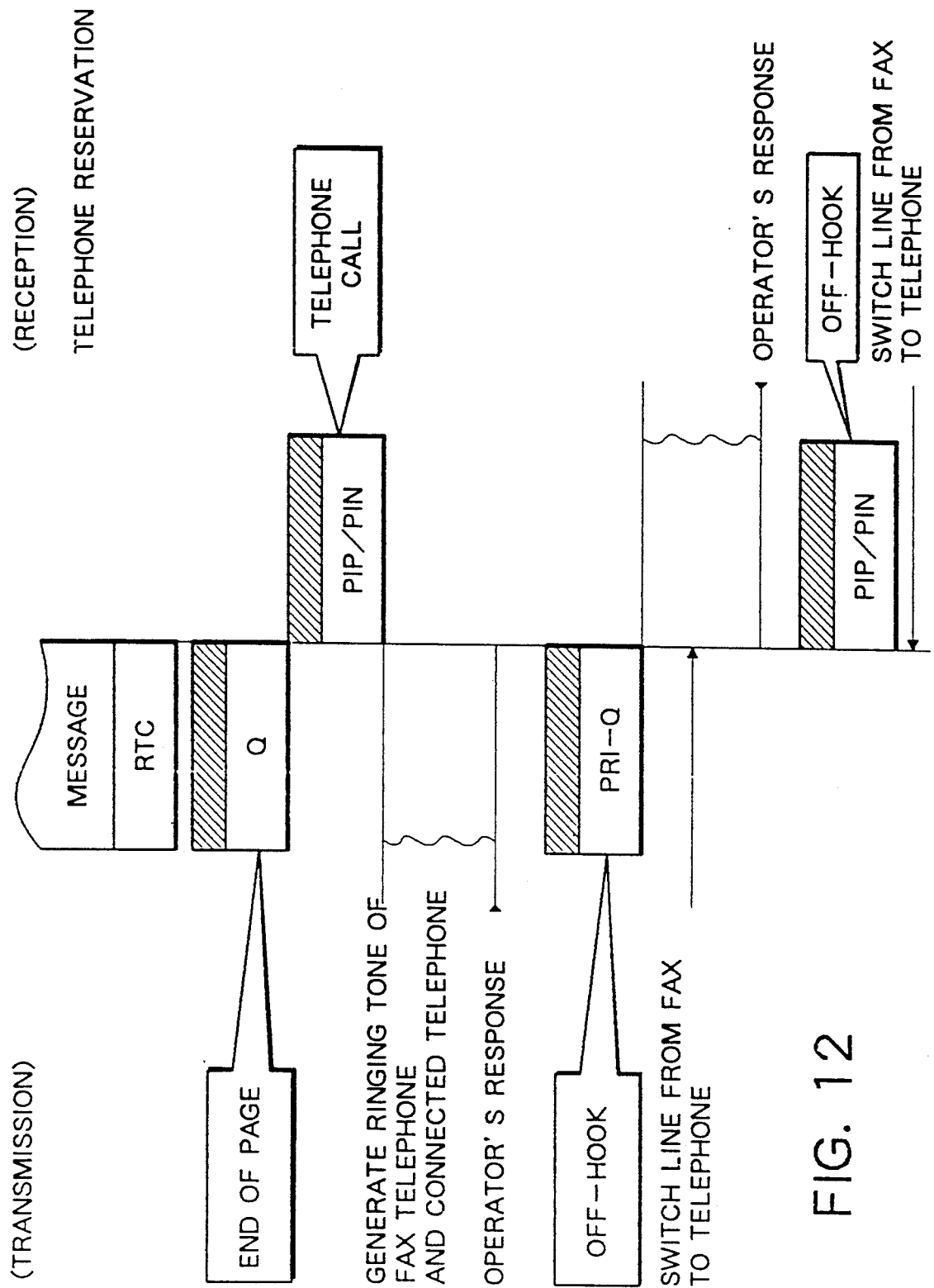
FIG. 12 is a chart showing a transmission control procedure when an operator call request is sent from a reception side, and is responded at a transmission side in the third embodiment.
Figure 13:
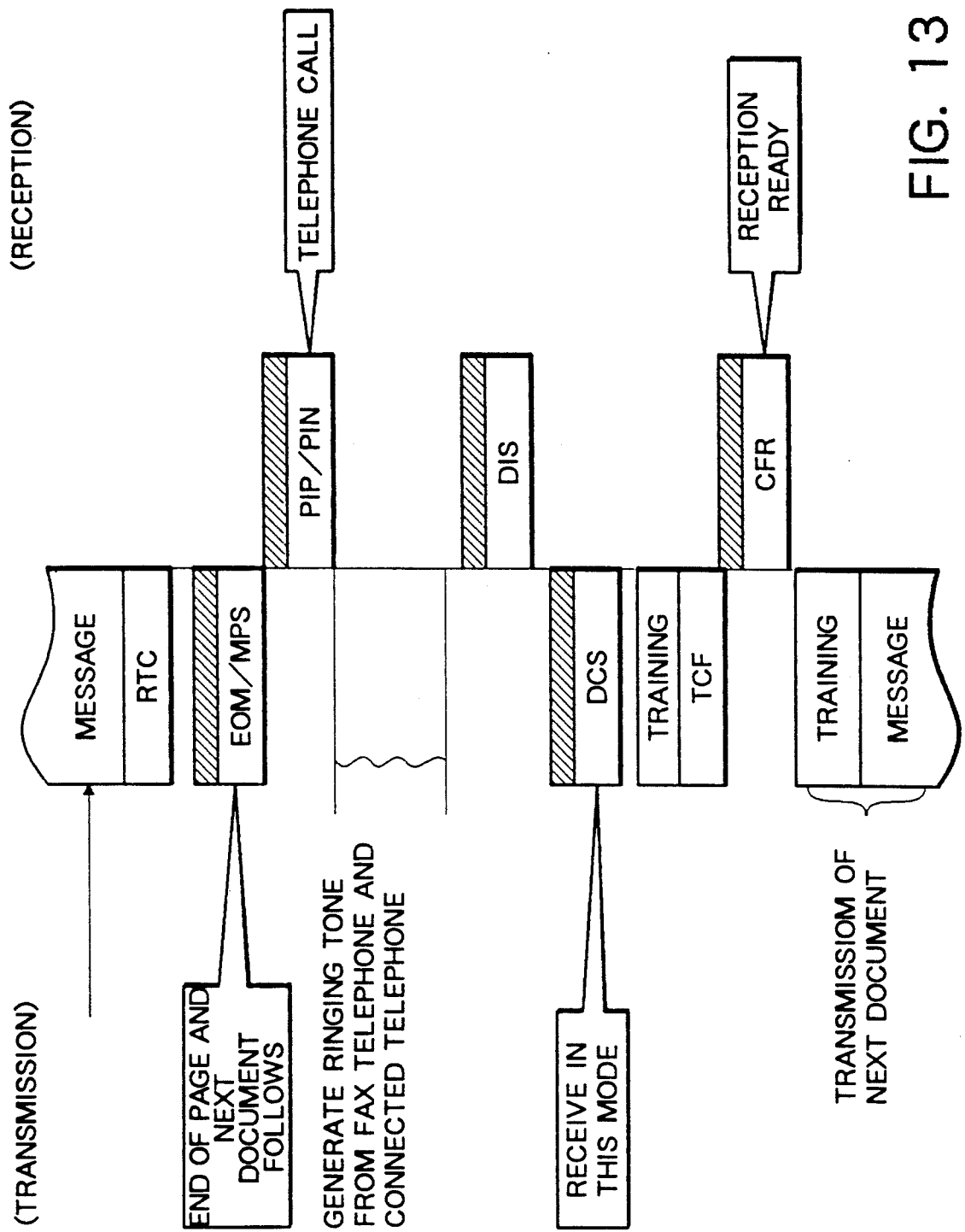
FIG. 13 is a chart showing a transmission control procedure when an operator call request is sent from a reception side, and is not responded at a transmission side in the third embodiment.

FIGS. 10A(1) to 10B(2) and 10B show communication control including operator reservation control of this embodiment with the above arrangement, and FIGS. 11A and 11B and FIG. 12 particularly show a transmission control procedure of operator call control (telephone reservation control).

The control operation of this embodiment will be described hereinafter with reference to these drawings.

The control circuit 1 checks in step S1001 if the handset (not shown) of one of telephones A 105 to C 107 is taken off the hook to issue a call originating request. If the call originating request is detected, the flow advances to step S1002, and the telephone line switching control circuit 4 is controlled so that an open outside line is connected to the connecting telephone line of the telephone issuing the request. In step S1003, known call originating processing is performed. In this processing, a telephone number of a party to be called is input, a telephone number signal corresponding to a telephone number input from the ACU 26 is transmitted, and so on, thus forming a channel with a telephone of the party to be called. In step S1004, completion of communication is waited, and thereafter, the flow returns to step S1001. Note that processing in steps S1003 and S1004 can be performed in parallel with other processing operations. In the case of communication between extension telephones, the telephone line is not connected to an open outside line, and a channel is formed between the designated extensions.

If no call originating request from a telephone is detected in step S1001, it is checked in step S1010 if a call originating request from the facsimile unit 152 is detected. If YES in step S1010, the flow advances to step S1011, and the open outside line is connected to the hybrid circuit 6, so that the facsimile unit 152 is connected to the open outside line. In steps S1012 to S1014, known call originating processing and the like is executed, and a response from a called party is waited within a predetermined period of time.

If YES in step S1014, the flow returns to step S1001; otherwise, the flow advances to step S1020. The transmission-side facsimile apparatus performs communication control in the facsimile mode in the processing after step S1020.

In step S1020, pre-procedure processing such as synchronization processing in known facsimile communication is executed. In step S1021, one-page document data is read by the reader 10, and is transmitted. It is then checked in step S1022 if an operator call request of a party to be called is input by operating the telephone reservation key of the operation unit 30. If YES in step S1022, the flow advances to step S1035; otherwise, the flow advances to step S1023. It is checked in step S1023 if an operator call request is input from an apparatus of a called party to the facsimile unit 152 of a calling party. If NO in step S1023, the flow advances to step S1024 to check if another document to be transmitted is left on the reader 10. If YES in step S1024, necessary intermediate procedure processing is executed in step S1025, and the flow returns to step S1021.

If NO in step S1024, the flow advances to step S1026, and a telephone line is switched to a telephone side, and in step S1033, the line is released. Thereafter, the flow returns to step S1001.

If the operator call request of the called party (reception side) is detected in step S1022, the flow advances to step S1035, and an operator call signal is output to the reception side, thus outputting a ringing tone from the telephone on the reception side. This operation is controlled through the data transmission control circuit 14. In steps S1036 and S1037, control waits for a response of an operator to be called while a ringing signal is output predetermined times. If YES in step S1037, the operator call is interrupted, and the flow advances to step S1024. In step S1024, transmission processing of next document data is performed. FIG. 11B illustrates communication control during this interval.

When a response signal (e.g., a PIP/PIN signal) from the reception side is received, the flow advances from step S1036 to step S1038, and all the connecting telephones are caused to generate a ringing tone. In step S1039, control waits for a response from the connecting telephone. If YES in step S1039, the ringing tone is stopped, and the flow advances to step S1030. An operator response signal (e.g., a PRI-Q signal) is output and informed to the party, and the telephone line is connected to the responding telephone to allow talking communication. In steps S1031 and S1032, control waits for completion of communication, i.e., on-hook, or a carrier tone for restarting transmission.

In this manner, when talking communication with the party is performed and facsimile transmission is restarted after communication, the flow advances from step S1032 to step S1026.

When transmission is not restarted after completion of talking communication, the handset of the telephone is hung up. In this case, the flow advances from step S1031 to step S1033 to release a telephone line. Thereafter, the flow returns to step S1001. FIG. 11A illustrates transmission control during this interval.

Meanwhile, if an operator call request signal (e.g., a PIP/PIN signal) is sent from the party (reception) side in step S1023, the flow advances to step S1027, and all the connecting telephones are caused to output a ringing tone. It is monitored in steps S1028 and S1029 if a response is detected.

If YES in step S1028, the flow advances to step S1030 to prepare for a response at the reception side. FIG. 12 illustrates a transmission control procedure during this interval.

If YES in step S1029, the flow advances to step S1024 to prepare for restarting of data transmission. FIG. 12 illustrates a transmission control procedure during this interval.

If no call originating request from the facsimile unit 152 is detected in step S1010, the flow advances to step S1050 to check if an incoming call signal from the telephone line is input and is detected by the incoming call detector 28. If NO in step S1050, the flow returns to step S1001.

However, if YES in step S1050, the flow advances to step S1051, a ringing tone is output from a predetermined telephone. It is monitored in steps S1052 and S1055 if a response from the telephone is detected or the incoming call signal is input predetermined times. If the response from the telephone is detected and the handset is taken off the hook, the flow advances to step S1053, and the responding telephone is connected to a called telephone line, thus establishing a talking communication state. Thereafter, talking communication is performed therebetween. In step S1054, on-hook upon completion of talking communication is monitored. If YES in step S1054, the flow advances to step S1033.

When a switching request to the facsimile mode is input upon operation of the operation unit 30, the flow preferably advances to the processing after step S1020.

If no response from the telephone is detected while the incoming call signal is input predetermined times in step S1055, the flow advances to step S1056. The called telephone line is switched to the facsimile unit 152 side (hybrid circuit 6 side), and the flow advances to step S1057. It is checked in step S1057 if a carrier signal is sent from a calling party. If the apparatus of the calling party comprises the facsimile apparatus, since the carrier signal follows, arrival of the carrier signal is monitored in step S1057. If the apparatus of the calling party is not the facsimile apparatus, since no carrier signal follows, a wrong telephone call or no response is determined, and the flow advances to step S1033 to release a telephone line.

If the apparatus of the calling party also comprises the facsimile unit 152 and the carrier signal is detected, the flow advances to step S1060, and pre-procedure processing is performed using the following communication data to perform synchronization. In step S1061, one-page document data is received, and known demodulation/decoding processing is performed. Thus, data is printed out from the printer 18. Upon completion of reception of one-page data (for example, when the RTC signal is received), the flow advances to step S1062 to check if an operator call request is issued from the facsimile unit 152 of the reception side.

If NO in step S1062, it is checked in step S1063 if an operator call signal (e.g., a PRI-Q signal) received from the apparatus of the party (transmission side). If NO in step S1063, the flow advances to step S1064 to check if data transmission is ended. If YES in step S1064, the flow advances to step S1026, and the telephone line is released.

If NO in step S1064, intermediate procedure processing is executed in step S1065 as needed, and the flow then returns to step S1061. Then, reception processing of the next data is executed.

If the telephone reservation key is operated at the operation unit 30 of the facsimile unit 152 of the reception side to issue a transmission-side operator call, the flow advances to step S1070, and an operator call signal (e.g., a PIP/PIN signal) is output and informed to the transmission side. It is monitored in step S1071 if a response signal (e.g., a PRI-Q signal) indicating a response is sent within a predetermined period of time. If YES in step S1071, the flow advances to step S1072, and all the connecting telephones are caused to output ringing tones. In steps S1073 and S1074, a response upon off-hook of the connecting telephone or a transmission restart signal (e.g., a PCS signal) from the transmission side is monitored.

If the connecting telephone is taken off the hook and a response is detected, the flow advances from step S1073 to step S1075. In step S1075, a response signal (e.g., a PIP/PIN signal) is sent to the transmission side, and a telephone line is connected to the responding telephone, thus establishing a talking communication state. FIG. 12 illustrates a transmission control procedure during this interval. In steps S1076 and S1077, on-hook upon completion of communication or transmission restart (continue) input upon depression of the start switch of the facsimile unit 152 is monitored.

If YES in step S1076, the flow advances to step S1026. In step S1026, the transmission processing is ended and the telephone line is released. If YES in step S1077, the flow advances to step S1065, and data reception processing is restarted.

If no response is detected within a predetermined period of time in step S1071, the flow advances to step S1065. The operator call is interrupted and data transmission is restarted. FIG. 12 illustrates a transmission control procedure in this case.

If an operator call from the party (transmission side) is detected in step S1063, the flow advances to step S1080, and all the connecting telephones are caused to output ringing tones. It is checked in step S1081 if a response is made within a predetermined period of time and off-hook is detected.

If YES in step S1081, the flow advances to step S1082, and a response signal (e.g., a PIP/PIN signal) is sent to the party. It is checked in step S1083 if an operator on the transmission side responds within a predetermined period of time and a response signal (e.g., a PRI-Q signal) is input.

If YES in step S1081, the flow advances to step S1084, and the telephone line is connected to the responding telephone, thus allowing a talking communication state. FIG. 11A illustrates a transmission control procedure during this interval.

It is monitored in steps S1085 and S1086 if on-hook upon completion of communication is performed or a transmission continue instruction is input by operating, e.g., the start key. If YES in step S1085, the flow advances to step S1033. If YES in step S1086, the flow advances to step S1065.

If no response is detected in step S1081, the flow advances to step S1065. In step S1065, the operator call is interrupted and transmission is restarted. FIG. 12 illustrates a transmission control procedure in this case.

If no response is detected in step S1083 the operator call is interrupted, and the flow advances to step S1065 to restart data transmission.

Note that as shown in FIG. 11B, a telephone ringing time upon an operator call is at most 6 sec, and a ringing time in other cases is substantially equal to or less than 6 sec. However, a ringing tone output from a telephone is output from not only a telephone (e.g., the telephone C 104) equipped on the facsimile unit 152 but also all other connecting telephones.

For this reason, an operator can recognize this call using a telephone at his desk, and can respond to this call by taking up the handset of the corresponding telephone. Thus, the conventional drawback wherein an operator cannot respond to an operator call since he is not near the facsimile unit 152, can be prevented.

With the above effects, if the facsimile unit 152 is placed not near a desk where a person ordinarily sits but at the corner of a room, an operator call can be reliably responded.

As described above, according to the present invention, an operator call can be reliably responded.

FOURTH EMBODIMENT

In this embodiment, when facsimile communication is performed, presence of data received at a facsimile apparatus can be informed to a telephone of a message receiving party of those connected to a reception-side apparatus.

Figure 16A:
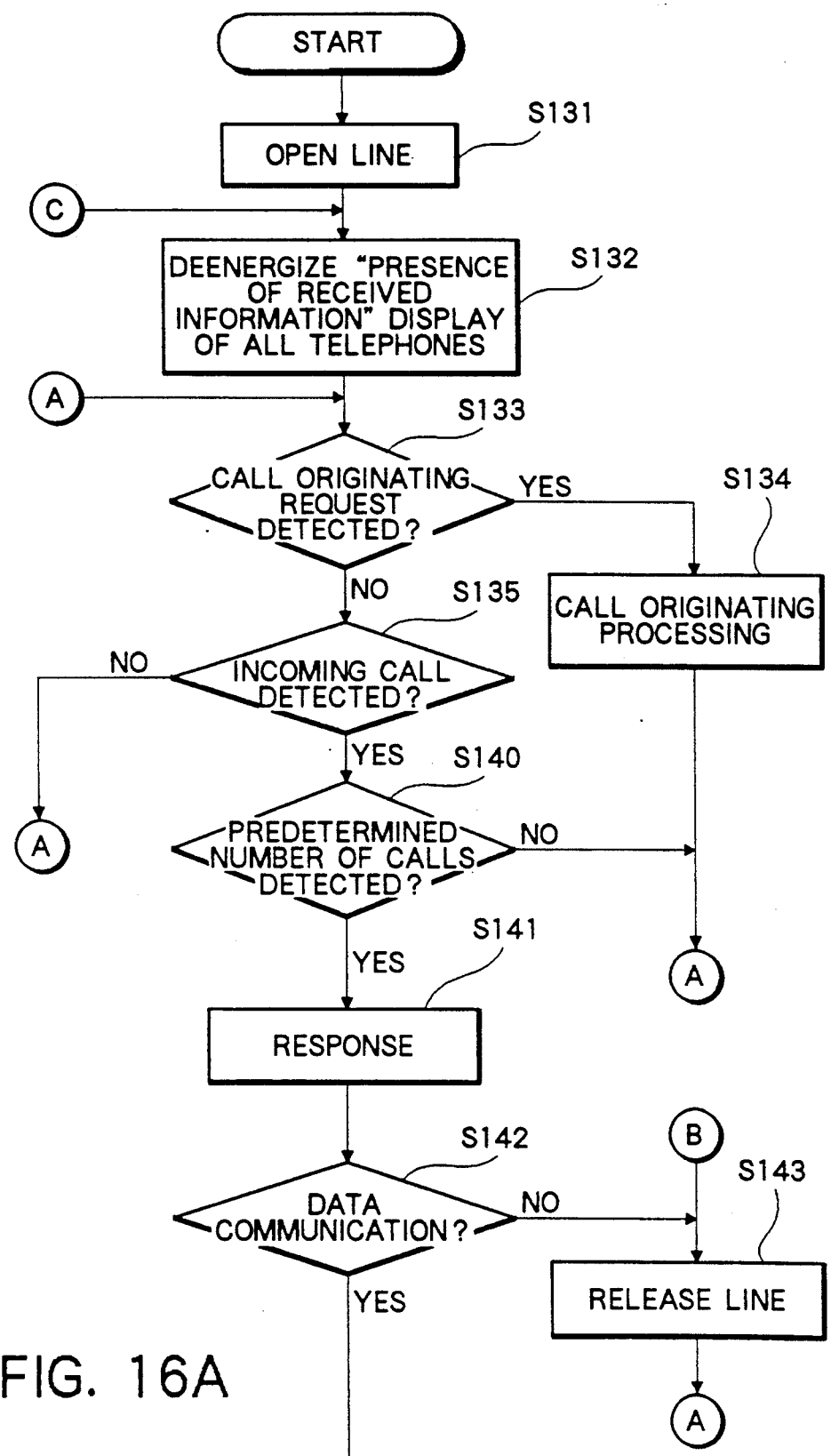
FIGS. 16A and 16B are control flow charts of the controller of the fourth embodiment.
Figure 16B:
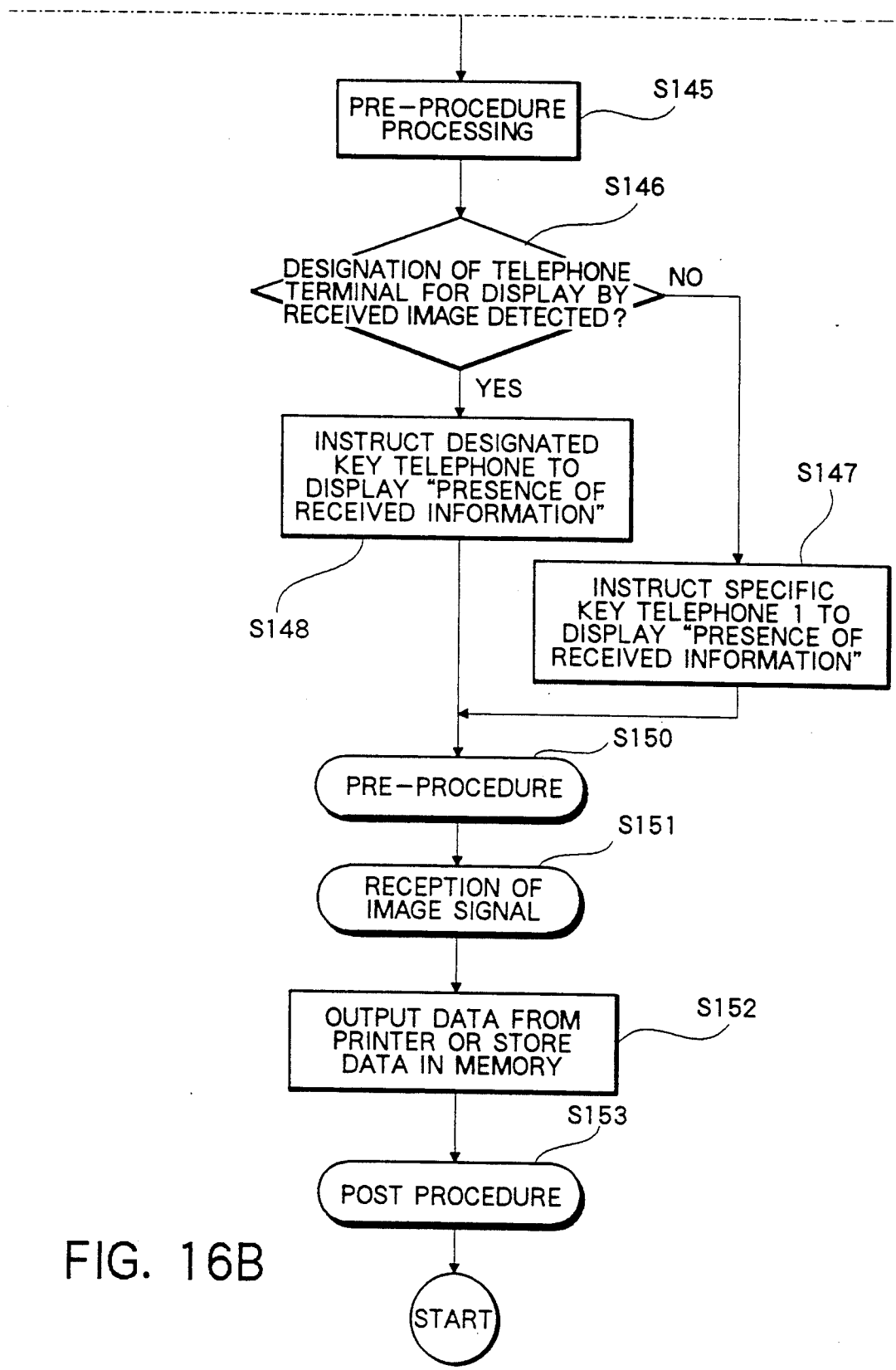

The arrangement of the controller 150 for performing the above-mentioned controlled can be the same as that shown in FIGS. 6A and 6B, and the program stored in the ROM 2 can be replaced with a control program shown in FIGS. 16A and 16B.

The detailed arrangement of telephones A to C (105 to 107) used in this embodiment will be described hereinafter with reference to FIG. 14.

The telephones of this embodiment have the same arrangement, and a difference from the telephone illustrated in FIG. 3 is that the emergency information display circuit 208 and the stop button depression detector 215 are omitted, and the presence of received information display circuit 217 for performing a "presence of received information" display under the control of the control circuit 1 is added. A ROM 201a of the telephone of this embodiment stores a program shown in FIG. 17 to be described later.

The reception-side apparatus of this embodiment has the arrangement as described above, and selects a telephone near a receiving party based on receiver designation from a transmission-side apparatus and causes the selected telephone to display the "presence of received information", as will be described later.

Figure 15A:
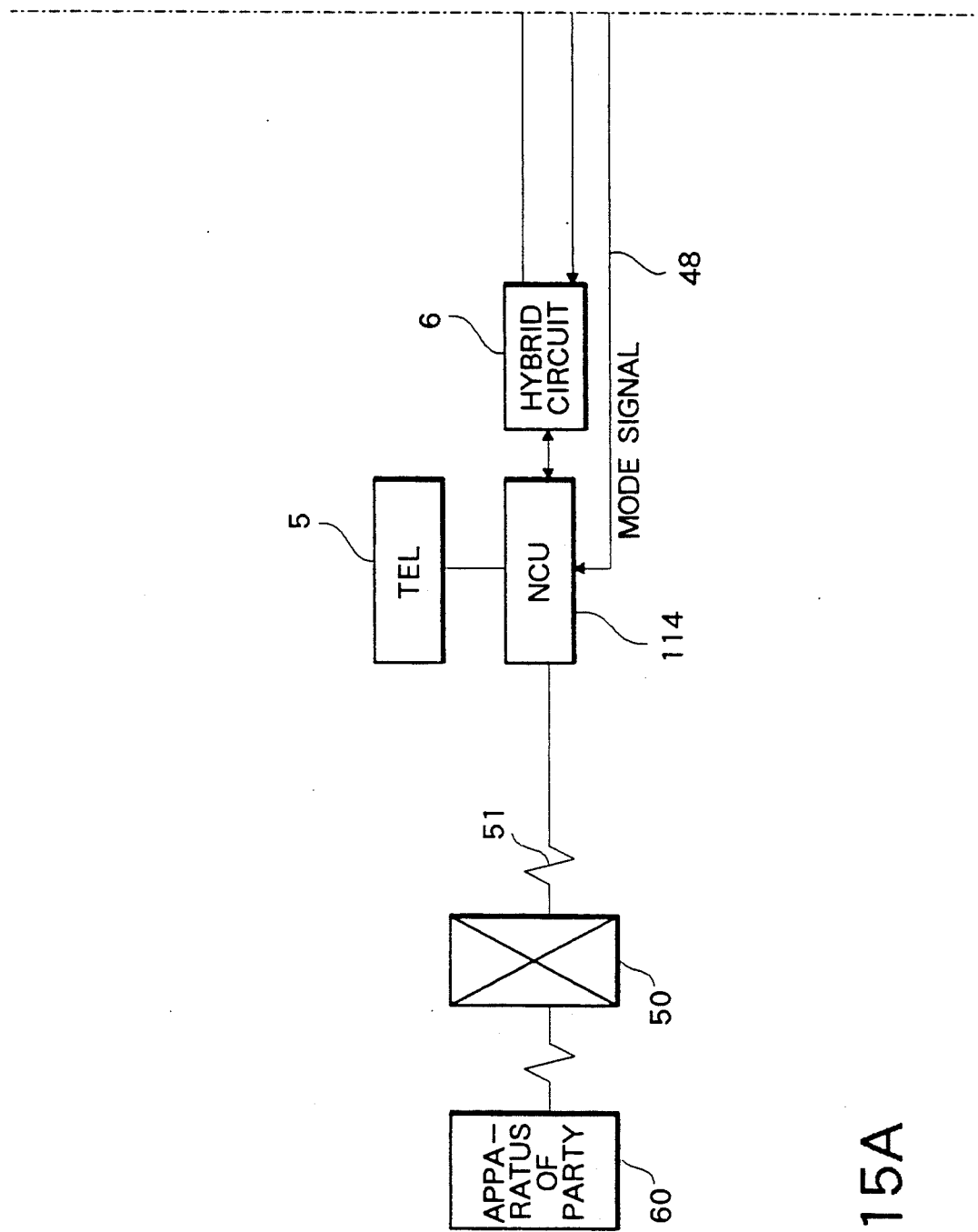
FIGS. 15A and 15B are detailed block diagrams of a transmission-side apparatus of the fourth embodiment.
Figure 15B:
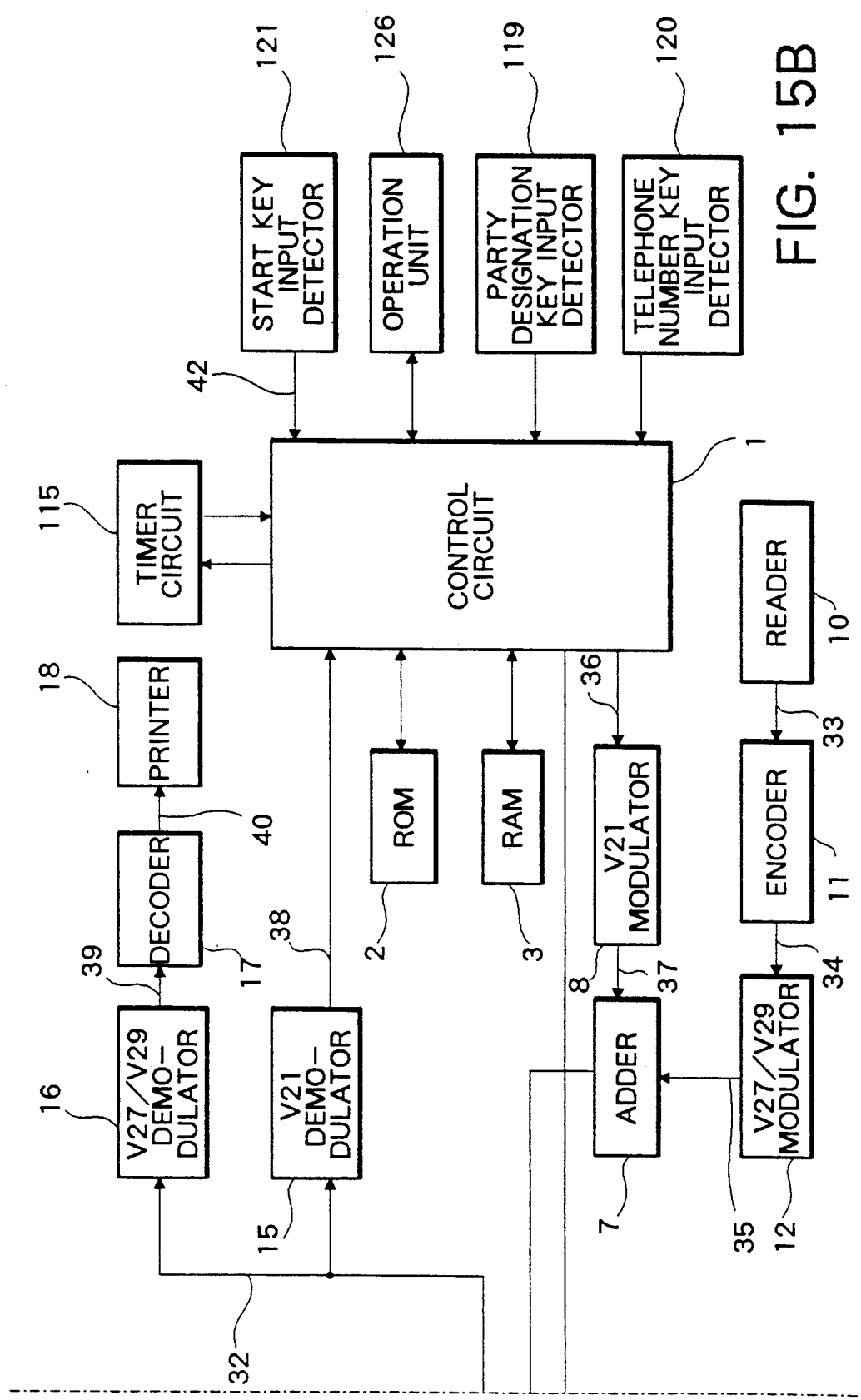

The transmission-side apparatus, e.g., a facsimile apparatus, need not have a special arrangement as described above, and can only be a conventional facsimile apparatus. FIGS. 15A and 15B are block diagrams of the transmission-side apparatus.

The same reference numerals in FIGS. 15A and 15B denote the same parts as in FIGS. 2A, 2B, 6A and 6B, and a detailed description thereof will be omitted.

Figure 18A:
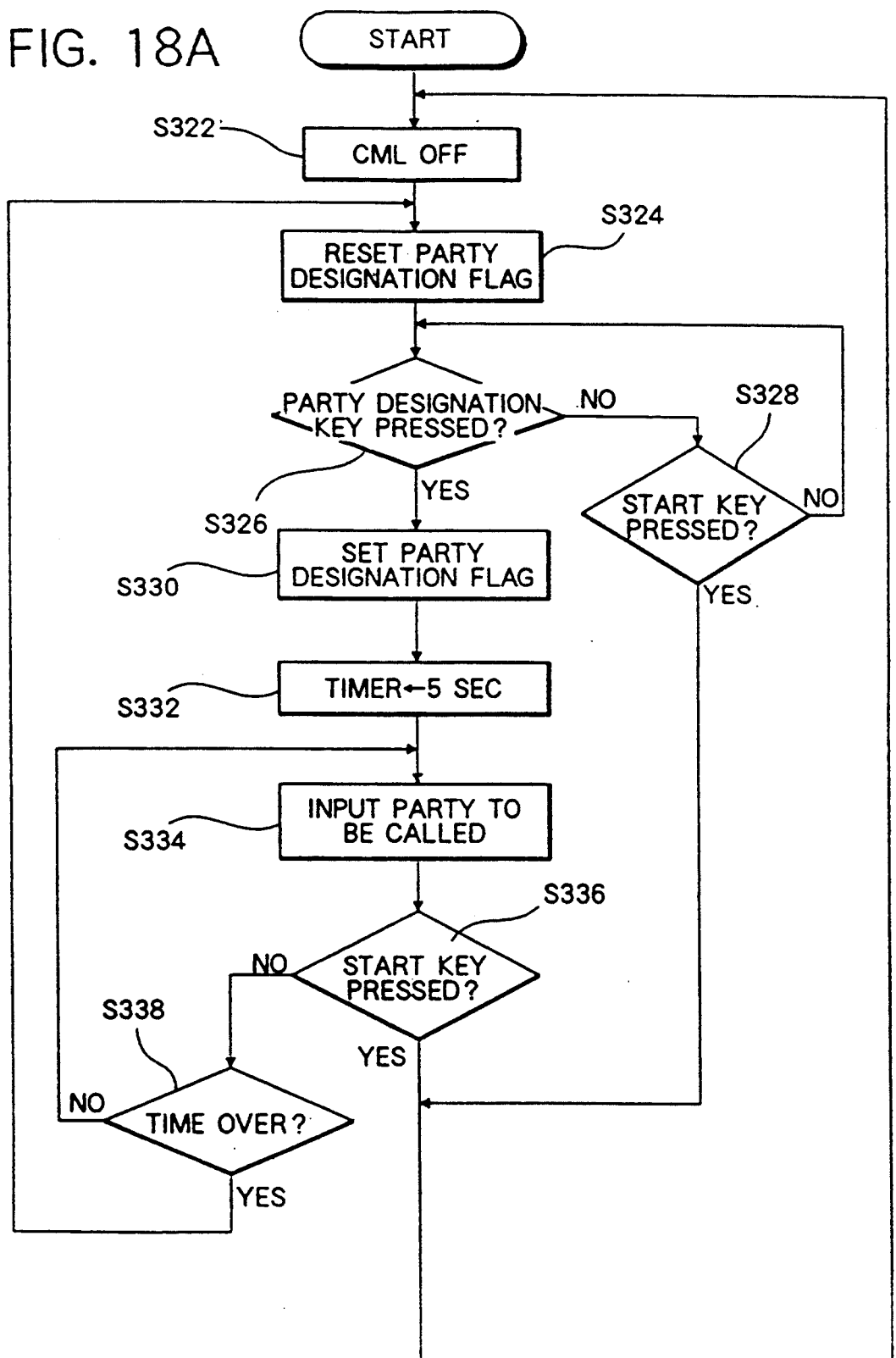
FIGS. 18A and 18B are control flow charts of the transmission-side apparatus of the fourth embodiment.
Figure 18B:
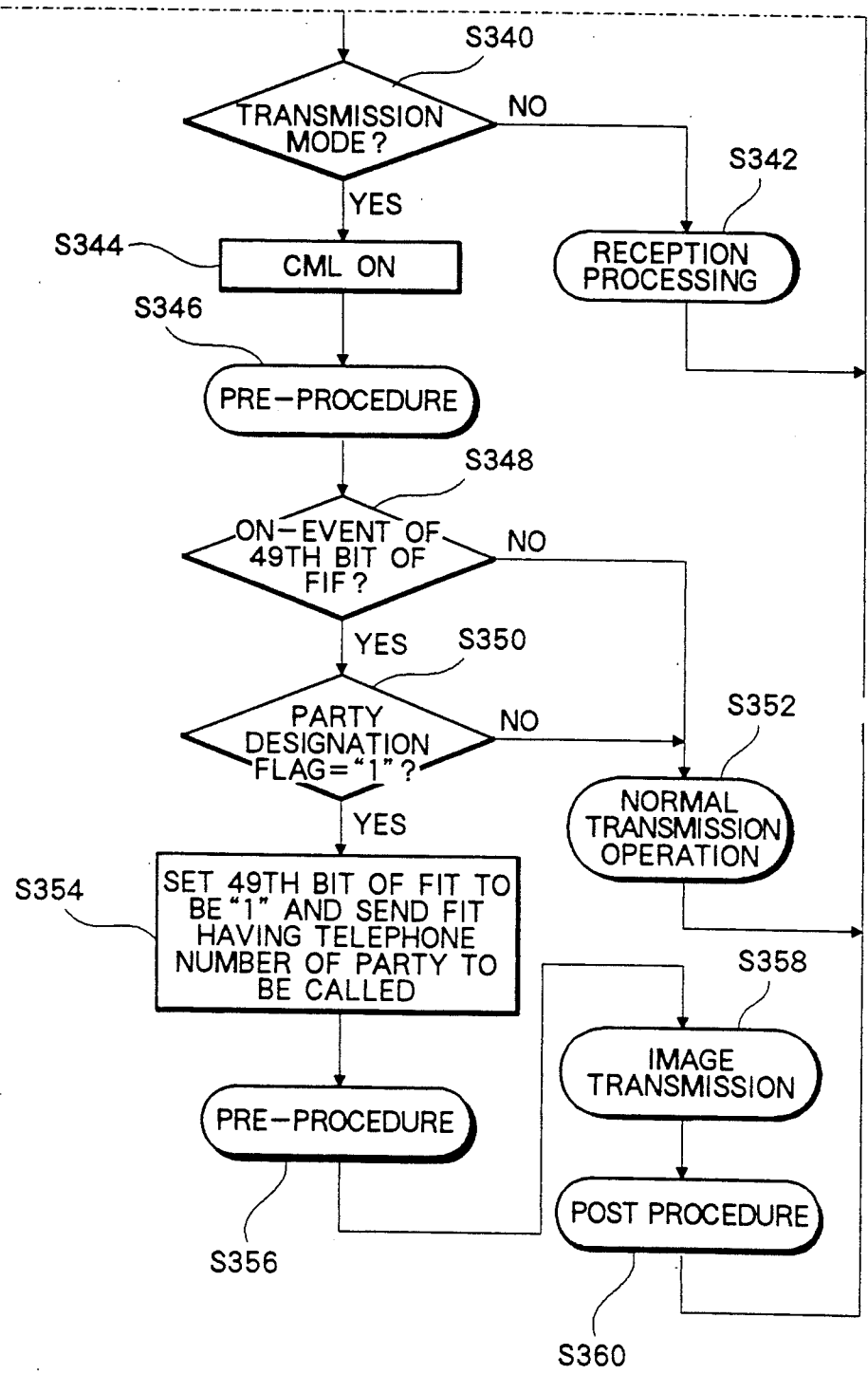

In FIGS. 15A and 15B, reference numeral 1 denotes the control circuit for controlling the entire apparatus in accordance with a program shown in FIGS. 18A and 18B stored in the ROM 2; and 5, a telephone (TEL) connected to an NCU (Network Control Unit) 114. The NCU 114 connects the telephone line 31 to the TEL 5 when a mode signal 41 is at "0", and connects the line 31 to a facsimile apparatus, i.e., a communication line 32 to the hybrid circuit when the signal 41 is at "1". The mode signal 48 is normally "0", and the telephone line 31 is connected to the TEL 5. The NCU 114 is connected to the central office network 50 through the telephone lie 31, and performs data communication with another facsimile apparatus, e.g., the apparatus 60 of a party on the other end of the line, connected to the central office network 50. Reference numeral 115 denotes a timer circuit; 119, a party designation key input detector for detecting that a "party designation key" (ten keys and the like) of an operation unit 126 is depressed; 121, a start key input detector for detecting that a start key of the operation unit 126 is operated; and 126, the operation unit, comprising the party designation key, a telephone number input key, a telephone number key, an index number key, a one-touch dialing key, and the like, for performing various operation instruction inputs.

In the transmission-side apparatus with the above arrangement, upon transmission of transmission data, a document to be transmitted is read by the reader 10, and is encoded by the encoder 11. The encoded data is modulated by the V27/V29 modulator 12, and is added to the procedure modulation signal 37 from the V21 modulator 18 by the adder 7. The sum data is transmitted to the apparatus 60 of the party through the hybrid circuit 6 and the NCU 114. In this case, a telephone number of a receiving party can be designated, and when this telephone number is transmitted, the presence of data transmission can be displayed on the designated telephone.

Reception data from the apparatus 60 of the party is received by the NCU 114, and is demodulated by the hybrid circuit 6 and the V27/V29 demodulator 16. The demodulated data is decoded by the decoder 17, and is printed by the printer 18. A procedure signal is demodulated by the V21 demodulator 15, and is supplied to the control circuit 1.

These reception processing operations are known to those who are skilled in the art, and a detailed description thereof will be omitted.

The operation of this embodiment with the above arrangement will be described hereinafter with reference to the flow charts shown in FIGS. 16A, 16B, 17 and 18.

The control operation of the controller 150 as the reception-side apparatus shown in FIGS. 6A and 6B will be explained blow with reference to FIGS. 16A and 16B.

When the controller 150 is powered, the flow advances to step S131, and the telephone line switching circuit 4 is instructed to open the telephone line 31. In step S132, the data transmission control circuit 14 is controlled to output a control signal for deenergizing the presence of received information display circuits 217 of all the connected telephones, so that a "presence of received information" display is not made. It is monitored in step S133 if a call originating request is input by operating the one-touch dialing or index number dialing key of the operation unit 126 or the handset 203 of the connecting telephone is taken off the hook to issue a call originating request. If YES in step S133, known predetermined call originating processing is executed.

If NO in step S133, the flow advances to step S135 to check if the incoming call detector 28 detects an incoming call from the telephone line 31. If NO in step S135, the flow returns to step S133.

If YES in step S135, when a telephone which should output a ringing signal (should ring a bell) is designated, the designated telephone is connected to the telephone line 31, and the corresponding telephone is caused to output a ringing tone. It is then checked in step S140 if the incoming call signal is input predetermined times (e.g., three times). If NO in step S140, calling is continued. During this interval, if the handset 203 is taken off the hook, a channel is formed between the corresponding telephone and the calling party side, thus allowing talking communication.

If the handset 203 is not taken off the hook after the predetermined number of incoming call signals are input, the flow advances from step S140 to step S141, and the telephone line switching circuit 4 is instructed to form a DC loop with the telephone line 31, thus making a response. Then, the telephone line 31 is connected to the hybrid circuit 6. Thereafter, it is checked in step S142 if data reception accompanying a carrier signal as facsimile reception is performed. If the carrier signal cannot be detected from the telephone line, since the data communication cannot be performed, a wrong telephone call is determined, and the telephone line is released in step S143. Thereafter, the flow returns to step S133. If another special processing is determined in step S143, the corresponding processing is executed.

If a data signal is detected in step S142, the flow advances to step S145, pre-procedure processing, e.g., detection of states of various apparatuses, is executed to execute synchronization processing with the apparatus of the party. In this case, in the apparatus of this embodiment, a receiving party can be designated upon reception, and a 49th bit of an FIF of an "NSS" signal is set to be "1" so as to inform that the apparatus can perform receiving party designation described above. It is checked in step S146 if designation of a telephone on which the "presence of received information" is to be displayed is detected, i.e., the 49th bit of the FIF of the "NSS" signal (to be described later) is "1". If the 49th bit of the FIF of the "NSS" signal is "0" and no telephone designation is made, the flow advances to step S147, and the presence of received information display circuit 217 of a specific telephone which is predetermined to perform display when no designation is made, e.g., the telephone A 105 is caused to display the "presence of received information". The flow advances to step S150.

If the 49th bit of the FIF of the "NSS" signal is "1", the flow advances to step S148, and the presence of received information display circuit 217 of the designated telephone is caused to display the "presence of received information". The flow then advances to step S150.

In step S150, the pre-procedure processing is executed again. In step S151, reception processing of image information transmitted after the pre-procedure processing is executed. At the same time, in step S152, the received information is supplied to the V27/V29 demodulator 16 through the above-mentioned path, and is demodulated thereby. The demodulated signal is sent to the decoder 17 without going through the memory circuit 19 and is printed out by the printer 18. Upon completion of reception of the image information, predetermined post procedure processing is executed in step S153, and the flow returns to step S131.

If recording paper is used up during printing, the signal demodulated by the V27/V29 demodulator 16 is temporarily stored in the memory circuit 19. After new recording paper is loaded, the received information stored in the memory circuit 19 is read out and is printed out by the printer 18.

With the above-mentioned control operation, when received data is present, it can be displayed on a nearby telephone. Thus, a receiver can obtain desired received information without taking a fruitless action.

Figure 17:
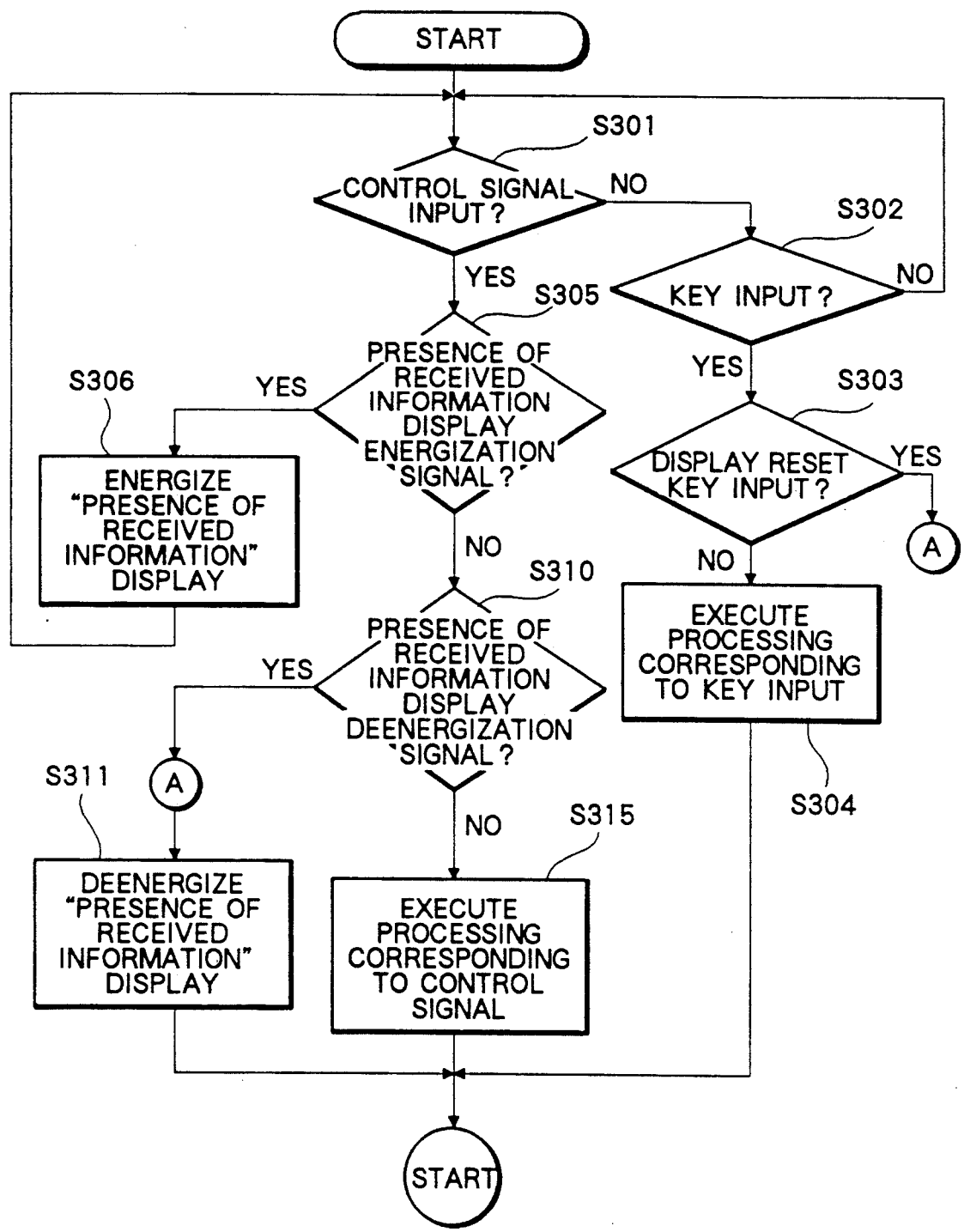
FIG. 17 is a control flow chart of the connecting telephone of the fourth embodiment.

Control of the above-mentioned processing on the side of the telephone will be described below with reference to FIG. 17.

The control unit 201 checks in step S301 if the data interface 211 receives a control signal from the data transmission control circuit 14. If NO in step S301, it is checked in step S302 if a key input from the keyboard 206 is detected. If NO in step S302, the flow returns to step S301.

If YES in step S302, the flow advances to step S303 to check if the "display reset key" is operated. If YES in step S303, the flow advances to step S311, and the presence of received information display circuit 217 is deenergized to turn off the "presence of received information" display. Thereafter, the flow returns to step S301.

If NO in step S303, processing corresponding to the key input is executed in step S304. For example, when the handset 203 is taken off the hook and a telephone number key is operated, the signal tone generator 204 is instructed to output a corresponding telephone number signal (e.g., a DTMF signal). After the corresponding processing is completed, the flow returns to step S301 to prepare for the next key input.

If YES in step S301, i.e., if the control signal from the data transmission control circuit 14 is received, the flow advances to step S305 to check if the received control signal is an energization signal of the presence of received information display circuit 217. If YES in step S305, the presence of received information display circuit 217 is energized to display "presence of received informational . Then, the flow returns to step S301.

If NO in step S305, the flow advances to step S310 to check if the received control signal is a deenergization signal of the presence of received information display circuit 217. If YES in step S310, the flow advances to step S311. The deenergization signal of the presence of received information display circuit 217 is output when the information stored in the memory circuit 19 is read out and output from the printer 18.

If NO in step S310, the flow advances to step S315, and processing corresponding to the received control signal is executed. The flow then returns to step S301.

As described above, according to this embodiment, when the data communication apparatus performs reception, the presence of reception can be known using a nearby telephone, and received data can be quickly obtained.

When a telephone is placed on a desk and a facsimile apparatus is placed at the corner of a room, a receiving party of information can quickly know at his desk that reception addresssed to him was made, and can obtain received information.

Transmission control of the facsimile apparatus on the transmission side will be described below with reference to FIGS. 18A and 18B.

When the apparatus is powered, the flow advances to step S322, and a CML signal is turned off to release a telephone line. In step S324, a party designation flag in a control circuit (not shown) is reset. It is then checked in step S326 if the party designation key of the operation unit 126 is depressed and a detection signal is input from the party designation key input detector 119. If NO in step S326, the flow advances to step S328 to check if the start key of the operation unit 126 is depressed and a detection signal is input from the start key input detector 121. If NO in step S328, the flow returns to step S326. If YES in step S328, the flow advances to step S340.

If YES in step S326, the flow advances to step S330, and the party designation flag is set. In step S332, 5 sec are set in the timer circuit 115, thus starting a 5-sec timer. In step S334, a party to be called is designated using the telephone number key of the operation unit 126 and is fetched. It is checked in step S336 if the start key is operated and a detection signal from the start key input detector 121 is input. If NO in step S336, it is checked in step S338 if the timer circuit 115 is time out, i.e., if the party information and the start key are input before the lapse of 5 sec from the input of the party designation key. If NO in step S338, the flow returns to step S334 to wait for the party information and the input of the start key. Therefore, when a telephone, which should display the presence of reception, of a party to be called, i.e., a receiving party, is designated, an input is made within 5 sec. If no input is made within this interval, the following processing is made without designation of a telephone.

If YES in step S336, i.e., if the start key is operated and the detection signal is input from the start key input detector 121, the flow advances to step S340 to check if a present transmission mode is a transmission mode. If NO in step S340, since the reception mode is selected, the flow advances to step S342, and reception processing is executed.

If YES in step S340, the flow advances to step S344, and the CML signal is turned off. In step S346, pre-procedure processing is executed. More specifically, the mode signal is set to be "1" to connect the telephone line 31 to the hybrid circuit 6 side, and synchronization with the apparatus of the party is performed to initialize the respective components. It is checked in step S348 if a receiver of the party to be called is an apparatus capable of designating a party to be called shown in FIGS. 6A and 6B as a result of pre-procedure (it can be determined to check if the 49th bit of the FIF is "ON"). If NO in step S348, the flow advances to step S352, and known image information transmission control is executed.

If YES in step S348, the flow advances to step S350 to check if a party designation input was made beforehand and the party designation flag is "1". If NO in step S350, the flow advances to step S352; otherwise, the flow advances to step S354. In step S354, the 49th bit of the FIF area of an NSF signal is set to be "1", and an NSS/TSI/DCS signal having telephone number information of the previously input telephone number of the party in the FIF area is output. The formats of these signals and sending techniques are known to those who are skilled in the art, and a detailed description thereof will be omitted.

In step S356, pre-procedure processing is executed again. In step S358, image information to be transmitted is read from a document to be transmitted set on the reader 10, and is transmitted to the apparatus of the party. Upon completion of transmission of image information, the flow advances to step S360, and post procedure processing is executed, thus completing transmission processing.

In this embodiment, in order to perform a "presence of received information" display, a transmission-side operator depresses the party designation key and then inputs a telephone number of the seat of a party to be called. Upon the telephone number input, the telephone which displays the "presence of received information" is designated, and thereafter, the start key is operated.

However, the present invention is not limited to the above procedure. For example, in place of inputting a party's telephone number, a name of a receiving party is input, and the transmission- or reception-side apparatus comprises a table in which names and telephone numbers are corresponded to each other, so that a telephone number can be specified with reference to this table. In addition, the number of names corresponding to a telephone is not limited to one. If a plurality of nicknames are given, a single telephone may be specified by these nicknames.

If a name is transmitted to the reception side but cannot find a coincidence, a telephone corresponding to a most similar name can be specified.

With this arrangement, a desired telephone can be designated using a name normally used in place of a series of numerals which are not easy to remember. As a result, an apparatus which can be easily used and free from a designation error can be provided.

In this embodiment, a telephone number or the like is manually input. However, the present invention is not limited to this. For example, in an apparatus comprising one-touch dialing and index number dialing keys, and a time designated transmission function of the operation unit 126, the receiving party designation telephone number is assigned to these function keys to be registered. With this arrangement, an apparatus which is free from an input error and is easy to operate can be provided.

In the above description, when a telephone which should display the "presence of received information" is not designated, a predetermined telephone is caused to perform a "presence of received information" display. However, the present invention is not limited to this. For example, when a telephone is not designated, all the telephones connected to the reception apparatus may be controlled to display the "presence of received information". Thus, even if a receiving party does not sit at a predetermined telephone position, he or she can reliably know reception of image information.

As described above, according to the present invention, an operator can reliably and quickly know reception of information, and can obtain the information soon without taking a fruitless action.

FIFTH EMBODIMENT

In this embodiment, a communication system constituted by connecting a plurality of telephones and a plurality of data communication apparatuses through communication media comprises an arrangement for detecting a time to an end of transmission/reception upon data transmission/reception, and a data transmission/reception time can be displayed on a telephone.

Thus, an operator can immediately recognize using a telephone on his desk when communication is ended. The operator can know a wait time until next data communication will be allowed and a data communication result without taking a fruitless action so as not to frequently come to a data communication apparatus to check if data communication is completed.

Figure 19A:
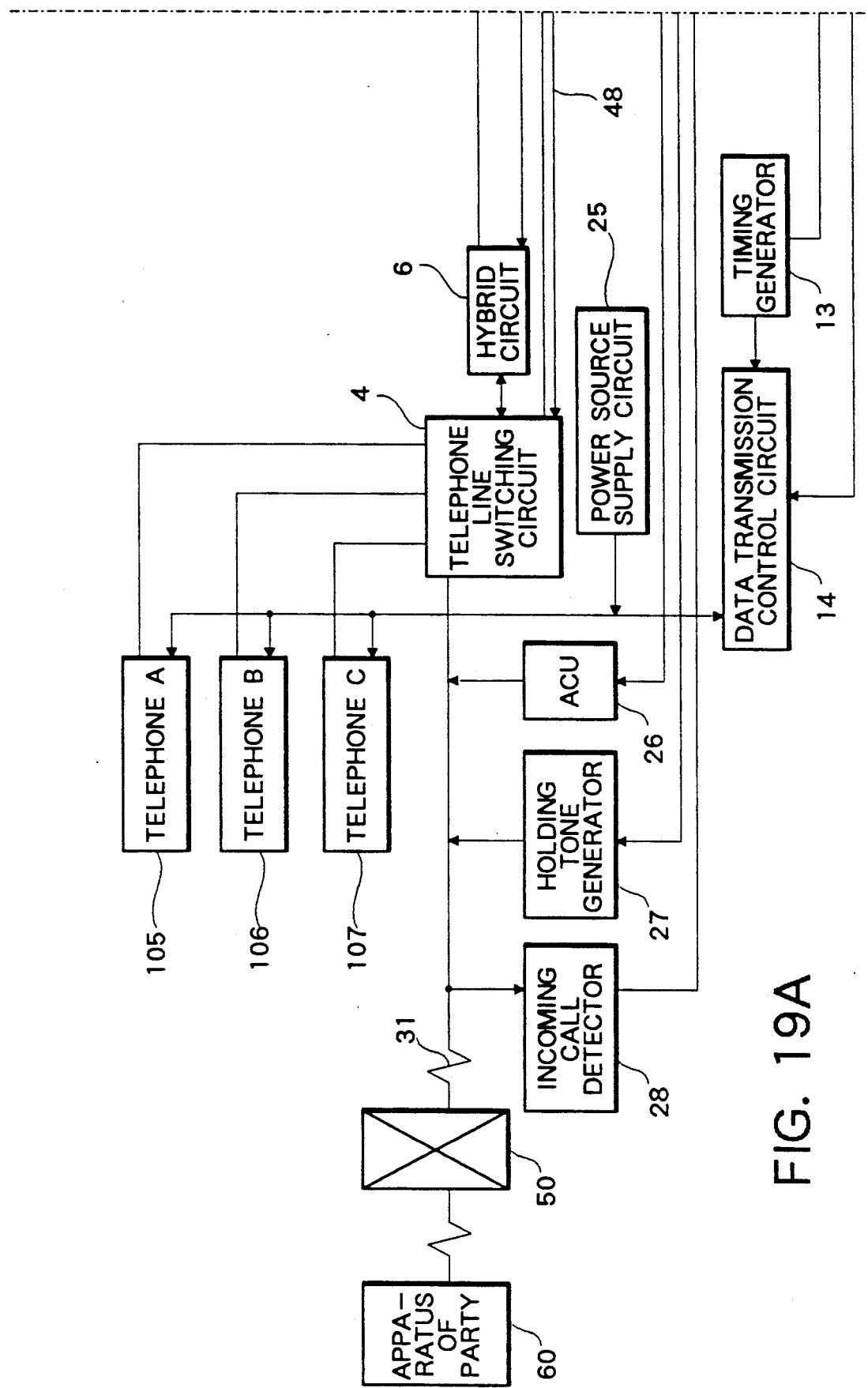
FIGS. 19A and 19B are detailed block diagrams of a controller according to a fifth embodiment of the present invention.
Figure 19B:
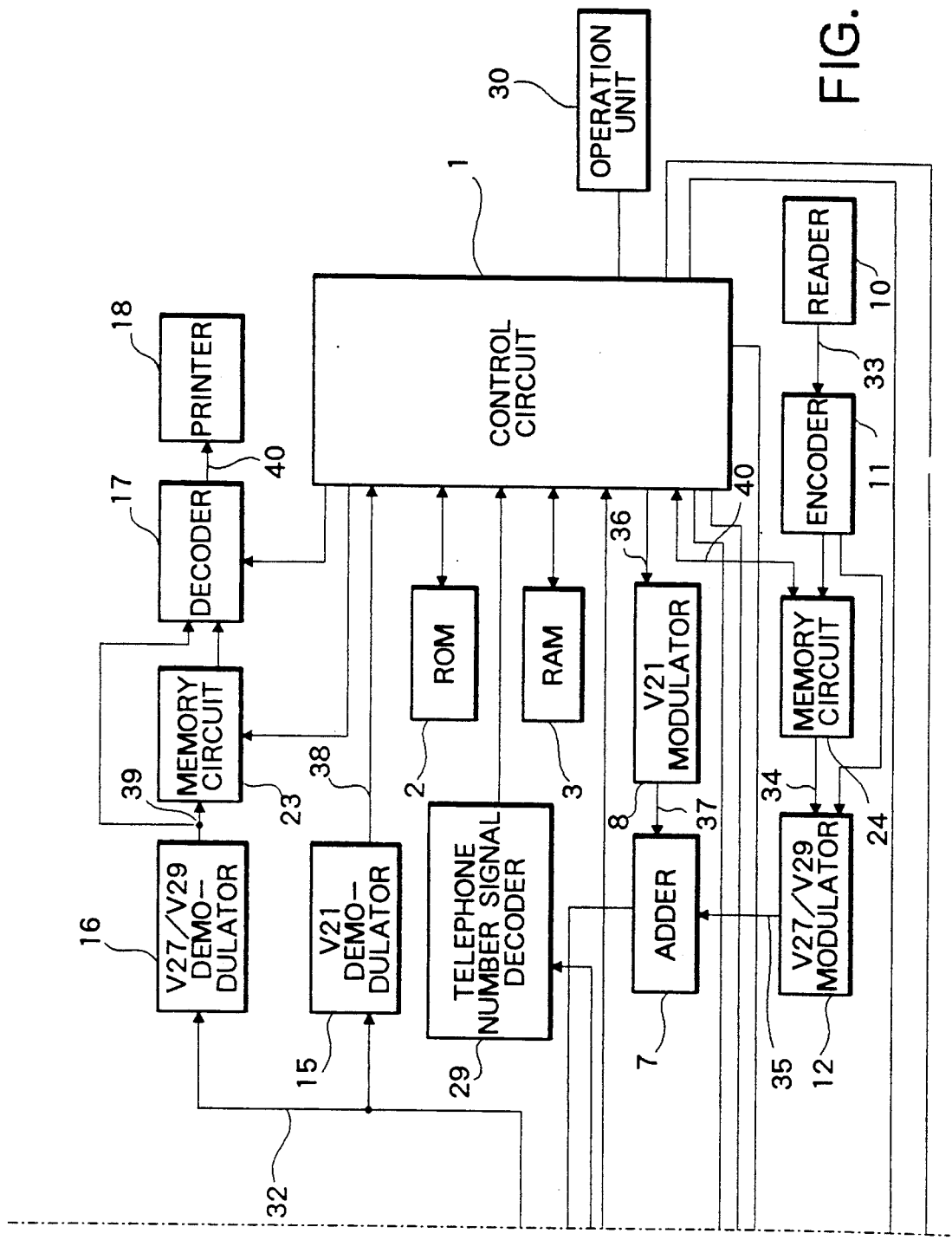

FIGS. 19A and 19B are block diagrams of the controller 150 of this embodiment for performing the above-mentioned control operation. In the arrangement of the controller 150 of this embodiment illustrated in FIGS. 19A and 19B, the same reference numerals denote the same parts as in the arrangement shown in FIGS. 6A and 6B, and a detailed description thereof will be omitted.

In FIGS. 19A and 19B, a memory circuit 24 is added between the encoder 11 and the V27/V29 modulator 12 as compared to FIGS. 6A and 6B. The memory circuit 24 temporarily stores encoded data from the encoder 11. The memory circuit 24 is used when transmission data read by the reader 10 is temporarily stored and is simultaneously transmitted after all the transmission data are prepared. With this arrangement, a total facsimile transmission amount can be recognized.

The program stored in the ROM 2 can be replaced with a control program shown in FIGS. 21A(1), 21A(2) and 21B.

The controller 150 of this embodiment with the above arrangement performs data transmission as follows. That is, a document to be transmitted is read by the reader 10, and is encoded by the encoder 11. The encoded signal is supplied to the V27/V29 modulator 12 directly or after it is stored in the memory circuit 24 and is read out at a transmission timing. The encoded signal is modulated by the V27/V29 modulator 12, and is added to the procedure modulation signal 37 from the V21 modulator 18 by the adder 7. The sum signal is transmitted to the apparatus 60 of a called party through the hybrid circuit 6 and the telephone line switching circuit 4.

These processing operations are known to those skilled in the art, and a detailed description thereof will be omitted.

Normal reception data from the apparatus 60 of the party is received at the telephone line switching circuit 4, and is modulated by the hybrid circuit 6 and the V27/V29 demodulator 16. The demodulated data is supplied directly to the decoder 17 or after it is temporarily stored in the memory circuit 23. The decoded data is printed out by the printer 18. The procedure signal is demodulated by the V21 demodulator 15, and is supplied to the control circuit 1.

These reception processing operations are known to those skilled in the art, and a detailed description thereof will be omitted.

Figure 20:
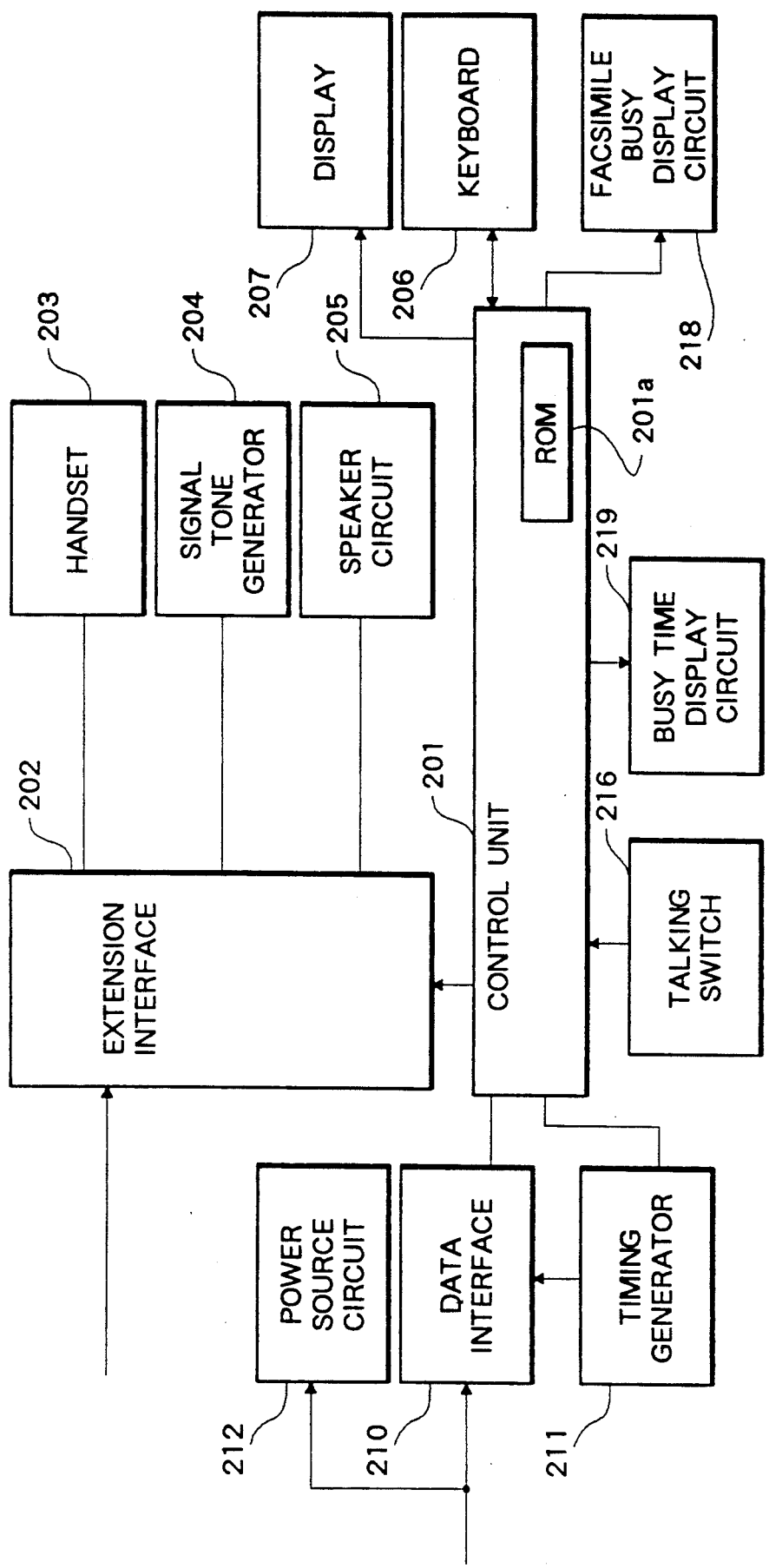
FIG. 20 is a detailed block diagram of a connecting telephone of the fifth embodiment.

The detailed arrangement of the telephones A to C (105 to 107) used in this embodiment will be described below with reference to FIG. 20. In FIG. 20, the same reference numerals denote the same parts as in FIGS. 3 and 7, and a detailed description thereof will be omitted.

In FIG. 20, the dummy tone generator 209, the talking request button depression detector 213, and the talking call display circuit 214 are omitted from the arrangement shown in FIG. 7. Note that in this embodiment, although some components are omitted from the arrangement of FIG. 7, the arrangement shown in FIG. 7 can be used without omissions, as a matter of course.

In FIG. 20, a facsimile busy display circuit 218 for indicating that the facsimile unit 152 is performing data transmission (transmission/reception) and is busy and a busy time display circuit 219 for real-time displaying a time until the busy facsimile unit 152 can be set in a next communication standby state under the control of the control unit 201 are added to the arrangement described above.

The facsimile busy display circuit 218 turns on/off a facsimile busy lamp under the control of the control unit 201. The busy time display circuit 219 displays "x hours, x minutes, x seconds".

When the telephone of this embodiment is selected by the telephone line switching circuit 4, an incoming call signal is output, and a ringing tone is output in accordance with the incoming call signal. When an operator who hears this tone takes up the handset 203 of the corresponding telephone, a DC loop is formed with the telephone line. The telephone line switching circuit 203 detects this to detect a response of the telephone, thus forming a channel. When a facsimile busy lamp on instruction is received, the facsimile busy display circuit 218 is energized to turn on the facsimile busy lamp. When a facsimile busy lamp off instruction is received, the facsimile busy display circuit 218 is deenergized to turn off the facsimile busy lamp. Whenever time information until a next facsimile communication standby state is established is input, the received time information is displayed on the busy time display circuit 219, and the displayed information is always updated.

Figure 22:
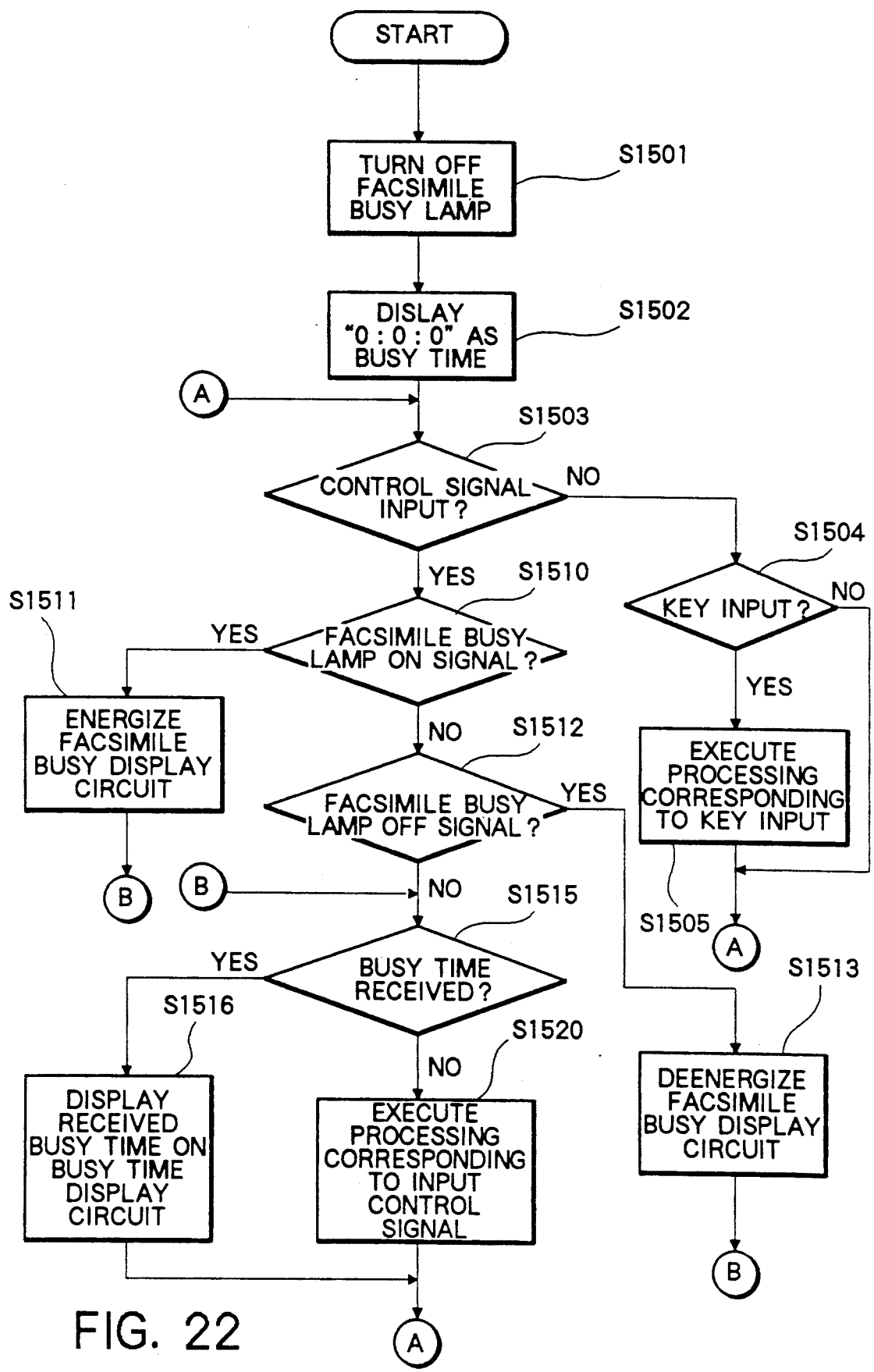
FIG. 22 is a control flow chart of the connecting telephone of the fifth embodiment.

The ROM 201a stores a program shown in FIG. 22.

In this embodiment with the above arrangement, when image information communication processing is performed between facsimile units 152 of transmission- and reception-side controllers 150, a time required for the image information communication processing can be displayed n the telephones connected to these controllers.

Figure 21B:
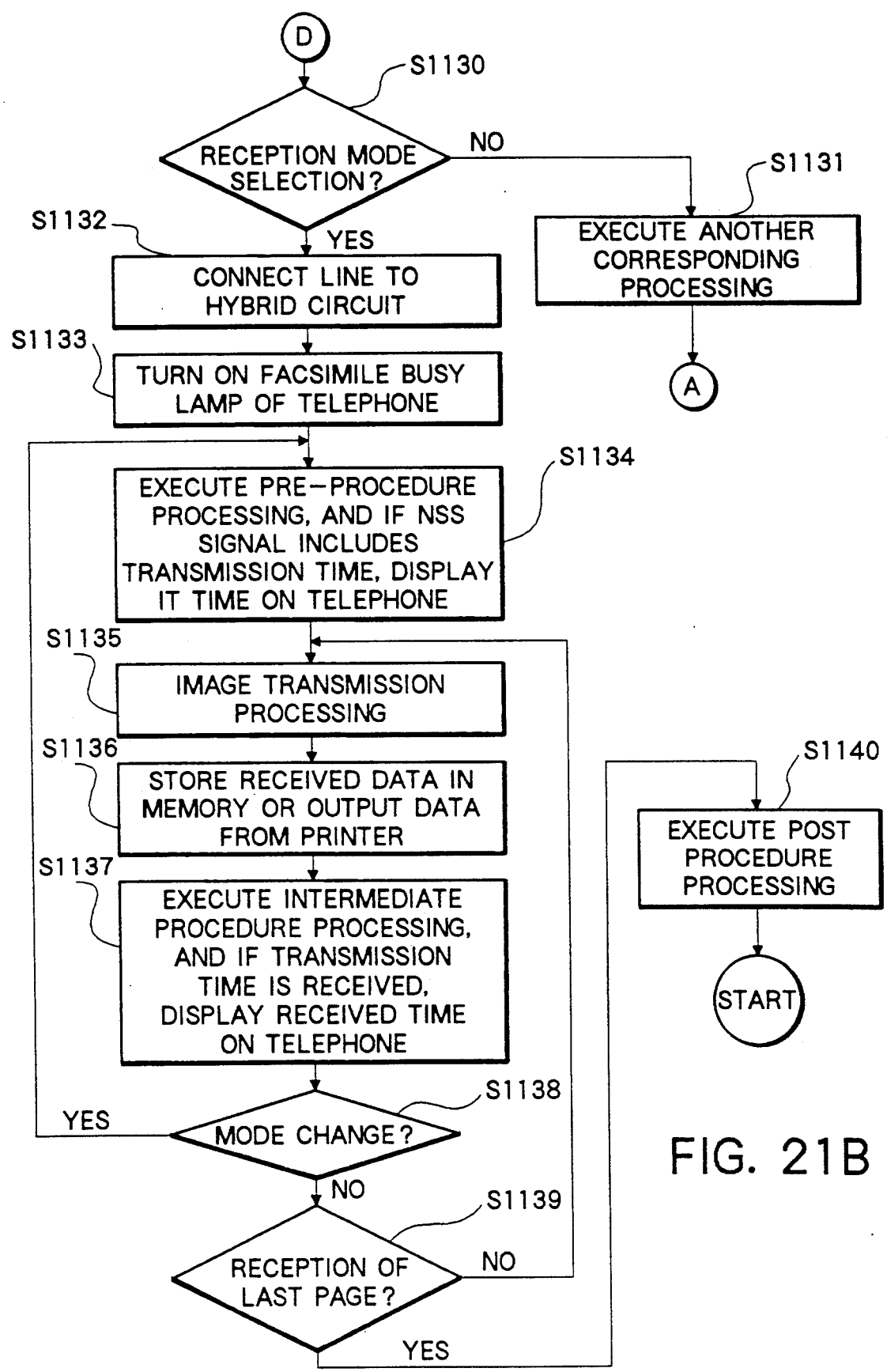
FIGS. 21A(1) to 21B are control flow charts of the controller of the fifth embodiment.

The operation control of this embodiment with the above arrangement will be described hereinafter with reference to the flow charts shown in FIGS. 21A and 21B and FIG. 22.

The control operation of the controller 150 shown in FIGS. 19A and 19B will be described below with reference to FIGS. 21A(1), 21A(2) and 21B.

In this embodiment, the transmission- and reception-side apparatuses have the same arrangement. The facsimile unit 152 temporarily stores transmission information read by the reader 10 in the memory circuit 24, and after all the transmission information is stored in the memory circuit 24, call originating processing is performed. Therefore, the memory circuit 24 outputs an image information amount to be transmitted to the control circuit 1 through the signal line 40. The control circuit 1 divides the storage amount of the memory circuit 24 with a transmission rate, and adds a procedure signal transmission time to the quotient to obtain a necessary transmission time. The control circuit 1 supplies the calculated time to the reception-side apparatus and connecting telephones, and the calculated time can be displayed on the telephones.

When the controller 150 is powered, the flow advances to step S1101, and the telephone line switching circuit 4 is instructed to open the telephone line 31. In step S1102, the data transmission control circuit 14 is controlled to output a reset signal for deenergizing the facsimile busy display circuits 218 of all the connected telephones. In step S1103, a control signal is output to the busy time display circuits 219 to initialize a displayed time to "0:0:0".

It is checked in step S1104 if a "function key", "memory key", "W key", and "function key" of the operation unit 30 are operated to select a memory mode in the memory circuit 24. If YES in step S1104, the flow advances to step S1105. In step S1105, a document to be transmitted set on the reader 10 is read and is encoded by the encoder 11, and the encoded data is stored in the memory circuit 24. In this case, an amount of stored image information, e.g., a stored count, is counted and accumulated. It is checked in step S1106 if all the documents set on the reader 10 are read. If NO in step S1106, the flow returns to step S1105, and the reading of the document and storage processing are continued. However, if YES in step S1106, the flow returns to step S1101.

If NO in step S1104, the flow advances to step S1110 to check if the "function key", "memory key", "R key", and "function key" are depressed to select the transmission mode from the memory circuit 24. If YES in step S1110, the flow advances to step S1111, and the telephone line switching circuit 4 is instructed to form a DC loop with the telephone line 31, thus issuing a call originating request. The ACU 26 generates a necessary telephone number signal and outputs it onto the telephone line 31 to call the apparatus of the party. In addition, the telephone line 31 is connected to the hybrid circuit 6. In step S1112, the facsimile busy display circuits 218 of the connecting telephones are energized to turn on their facsimile busy lamps, thus displaying that the connecting facsimile apparatus is busy. Note that when a plurality of connecting facsimile apparatuses are arranged, facsimile busy lamps are arranged in correspondence with the facsimile apparatuses so that it can be discriminated in units of the facsimile apparatuses whether or not the corresponding facsimile apparatus is busy. Alternatively, one facsimile busy lamp is arranged, so that only when all of the connecting facsimile apparatuses are busy, the facsimile busy lamp may be turned on, and when any of the facsimile apparatuses can perform transmission, the facsimile busy lamp is not turned on.

In steps S1113 and S1114, pre-procedure processing is executed. In the pre-procedure processing, synchronization is performed with the reception-side apparatus before transmission control. A transmission time required for transmitting documents to be transmitted from now on is calculated. More specifically, {(storage capacity of the memory circuit 24)÷(transmission rate)}+{(procedure signal transmission time)×(non-transmitted document count)} is calculated, and a talking request signal (reception command signal; e.g., an NSS/TSI/DCS signal having an FIF (facsimile information field)) including the time information is output to the communication system of the reception side. In step S1114, the connecting telephones are caused to display the calculated time until the next communication is allowed using their busy time display circuits 219. In step S1115, one-page image information to be transmitted is read out from the memory circuit 24, and is transmitted to the apparatus of the party.

Upon completion of transmission of the image information, the flow advances to step S1120. In steps S1120 and S1121, intermediate procedure processing is executed. More specifically, a transmission time required for transmitting non-transmitted documents to be transmitted from now on is calculated in the same manner as described above. In step S1120, an FIF is provided to a known post message command signal, and when a series of signals (EOM/MPS/EOP/PRI-EOM/PRI-MPS/PRI-EOP signals) are transmitted, the calculated transmission time required for transmitting non-transmitted documents is informed to the communication system of the reception side. In step S1121, the transmission time is also supplied to the connecting telephones so that a time required until the next communication is allowed is displayed on their busy time display circuits 219. For this reason, the busy time displayed on each telephone is sequentially decreased, and is stopped when time "0:0:0" reaches. The reason why each time the post message signal is output, a time required for transmitting non-transmitted document, i.e., a time until a next communication state is allowed is calculated is as follows. That is, a transmission rate may be changed due to fall back during transmission of second and subsequent pages, and transmission times of one-page data have a variation so as to minimize an time error until a next communication state is allowed.

It is checked in step S1122 if a mode is changed. If YES in step S1122, the flow advances to step S1123, and an EOM signal indicating mode change is set to transmit the reception-side apparatus. The flow then returns to step S1113, and a mode change instruction including an EOM signal in an NSS signal is transmitted. If NO in step S1122, the flow advances to step S1125 to check if the last page is transmitted. If NO in step S1125, the flow advances to step S1126, and an MPS signal is set to transmit to the reception side. Thereafter, the flow returns to step S1115. Thus, the post message command signal includes the MPS signal, and read and transmission operations of the image information of the next page are performed. If YES in step S1125, post procedure processing is executed in step S1127 to complete a series of image information transmission processing. Then, the flow returns to step S1101.

If NO in step S1110, i.e., if the transmission mode from the memory circuit is not selected, the flow advances to step S1130 to check if a reception mode is selected. If YES in step S1130, the flow advances to step S1132; otherwise, the flow advances to step S1131. In step S1131, corresponding processing is executed. For example, if a call originating request to the telephone line is issued by taking up the handset 203 of the connecting telephone, a DC loop is formed with the telephone line, and an open line is acquired to allow talking communication. In addition, when the index number dialing or one-touch dialing key is operated, the ACU 26 is instructed to send out a corresponding telephone number signal onto the acquired open line to form a channel with a called party.

YES is obtained in step S1130, i.e., the reception mode is selected, and an incoming call is input from the telephone line 31 and is detected by the incoming call detector 28, thus outputting a ringing signal. An operator hears this tone, and inputs a facsimile reception from the operation unit 30 in order to perform image data reception processing. For this reason, in step S1132, the telephone line switching circuit 4 is instructed to connect the telephone line 31 to the hybrid circuit 6. In step S1133, the facsimile busy display circuits 218 of the connecting telephones are energized to turn on their facsimile busy lamps. Thus, each telephone displays that the connecting facsimile apparatus is busy. Note that when a plurality of connecting facsimile apparatuses are arranged, facsimile busy lamps are arranged in correspondence with the facsimile apparatuses so that it can be discriminated in units of the facsimile apparatuses whether or not the corresponding facsimile apparatus is busy. Alternatively, one facsimile busy lamp is arranged, so that only when all of the connecting facsimile apparatuses are busy, the facsimile busy lamp is turned on, and when any of the facsimile apparatuses can perform transmission, the facsimile busy lamp may not be turned on.

In step S1134, pre-procedure processing is executed. In the pre-procedure processing, synchronization with the transmission-side apparatus is performed. If the FIF of an NSS signal sent from the transmission-side apparatus includes time information required for transmitting non-transmitted documents, the connecting telephones are instructed to display the designated time until a next communication state is allowed using the busy time display circuits 219. In step S1135, reception processing of image information sent after the pre-procedure processing is executed.

At the same time, in step S1136, the received information is sent to the V27/V29 demodulator 16 through the above-mentioned path, and the demodulated signal is stored in the memory circuit 23 or is sent to the decoder 17 without going through the memory circuit 23. Thereafter, the decoded signal is printed out by the printer 18. For example, upon completion of reception of one-page image information, the flow advances to step S1137, and intermediate procedure processing is executed. In the intermediate procedure processing, when the FIF of the post message command signal includes time information required for transmitting non-transmitted documents sent thereafter, the connecting telephones are instructed to display the designated time until a next communication state is allowed using the busy time display circuits 219. It is checked in step S1138 if the EOM signal is received and the mode change instruction is input. If YES in step S1138, the flow returns to step S1134 to execute mode change processing, and the flow returns to step S1134. Thus, reception processing of image information is executed in a new mode.

If NO in step S1138, the flow advances to step S1139 to check if the last page is received. If NO in step S1139, an MPS signal is input. When the MPS signal is received, the flow returns to step S1135, and reception processing of image information of the next page is executed.

If YES in step S1139, an EOP signal is input. When the EOP signal is received, the flow advances from step S1139 to step S1140, and known post procedure processing is executed. Then, the flow advances to step S1101.

With the above-mentioned control operation, one-page image information to be transmitted is read out from the memory circuit 24, and a transmission time required for transmitting non-transmitted documents is calculated each time one-page information is transmitted. The calculated time is informed to the connecting telephones and the reception-side apparatus using the FIF each time one-page information is transmitted. Thus, a time until the next communication is allowed can be displayed on the busy time display circuits 219 of all the telephones connected to the facsimile apparatus.

Control in the above-mentioned processing of the controller 150 on the side of the telephone will be explained below with reference to FIG. 22.

The control unit 201 deenergizes the facsimile busy display circuit 218 in step S1501. In step S1502, the busy time display circuit 219 is caused to display time "0:0:0", and the flow advances to step S1503. It is checked in step S1503 if the data interface 211 receives a control signal from the data transmission control circuit 14. If NO in step S1503, the flow advances to step S1504 to check if a key input from the keyboard 206 is detected. If NO in step S1504, the flow returns to step S1503.

If YES in step S1504, the flow advances to step S1505, and processing corresponding to the key input is executed. After the corresponding processing, the flow returns to step S1503 to prepare for the next key input. The corresponding processing is performed as follows. For example, when the handset 203 is taken off the hook and a telephone number key is operated, the signal tone generator 204 is instructed to send a corresponding telephone number signal (e.g., a DTMF signal). When a party's telephone number is input after the talking switch 216 is operated, the input number is temporarily stored, and thereafter, is output together with the talking request signal.

If YES in step S1503, i.e., if the control signal from the data transmission control circuit 14 is received, the flow advances to step S1510 to check if the received control signal is an energization signal of the facsimile busy display circuit 218. If YES in step S1510, the flow advances to step S1511, and the facsimile busy display circuit 218 is energized to turn on the "facsimile busy lamp". Then, the flow advances to step S1515 to prepare for a response by, e.g., taking up the handset 203.

If NO in step S1510, the flow advances to step S1512 to check if the received control signal is a deenergization signal of the facsimile busy display circuit 218. If YES in step S1512, the flow advances to step S1513, and the facsimile busy display circuit 218 is deenergized to turn off the "facsimile busy lamp". Then, the flow advances to step S1515.

If NO in step S1512, the flow advances to step S1515.

It is checked in step S1515 if busy time information is received. If NO in step S1515, the flow advances to step S1520; otherwise, a "time until a next communication state is allowed" indicated by the control signal is displayed on the busy time display circuit 219 in step S1517. The flow then advances to step S1520. In step S1520, processing corresponding to another input control signal is executed, and the flow returns to step S1503.

As described above, according to this embodiment, when the data communication apparatus performs transmission/reception, a time required for completing the transmission/reception until a next communication state is allowed can be known at a nearby telephone.

Thus, when a telephone is placed on a desk and a facsimile apparatus is placed on the corner of a room, a person who wishes to operate the facsimile apparatus or a person who wishes to know an amount of information to be received or reception end time can know such information while sitting at the desk.

In the fifth embodiment, transmission processing from the facsimile apparatus is performed as memory transmission wherein a document to be transmitted is temporarily stored in the memory circuit 24, and actual transmission is performed by reading out the storage information from the memory circuit 24. Once read information is encoded by the encoder 11, its encoding condition is not changed or re-encoding processing is not performed depending on the latest transmission condition. Therefore, a time required for transmission is calculated under this condition. However, the method of calculating the transmission time is not limited to this, but other methods may be employed.

For example, when facsimile communication by memory transmission is not performed, information is transmitted each time it is read by the reader 10, and the reader can obtain the remaining number of documents to be transmitted. A time obtained by multiplying a standard transmission time under the transmission condition of current transmission with the remaining number of documents can be displayed on a telephone.

In the above description, a time until the next communication is allowed is displayed on the telephone. However, the present invention is not limited to this. For example, a timepiece means for counting a present time may be arranged, so that a time until the next communication state is allowed may be added to the present time, and can be displayed on the telephone.

According to this embodiment as described above, when data transmission processing cannot be performed during transmission/reception of information, a time until executing data transmission is ended can be acknowledged, and a proper action can be taken. Since this time is displayed on a telephone on the desk far from the data reception apparatus, a fruitless action can be prevented.

SIXTH EMBODIMENT

In this embodiment, in a communication system constituted by connecting a plurality of telephones and a plurality of data communication apparatuses through communication media, received information is temporarily stored, and the received information can be checked upon operation control from a connecting telephone. In addition, received data can be output-controlled by the telephone, so that a person who should receive data can reliably and quickly know reception of information, and can obtain the information soon without taking an unnecessary action.

Figure 23A:
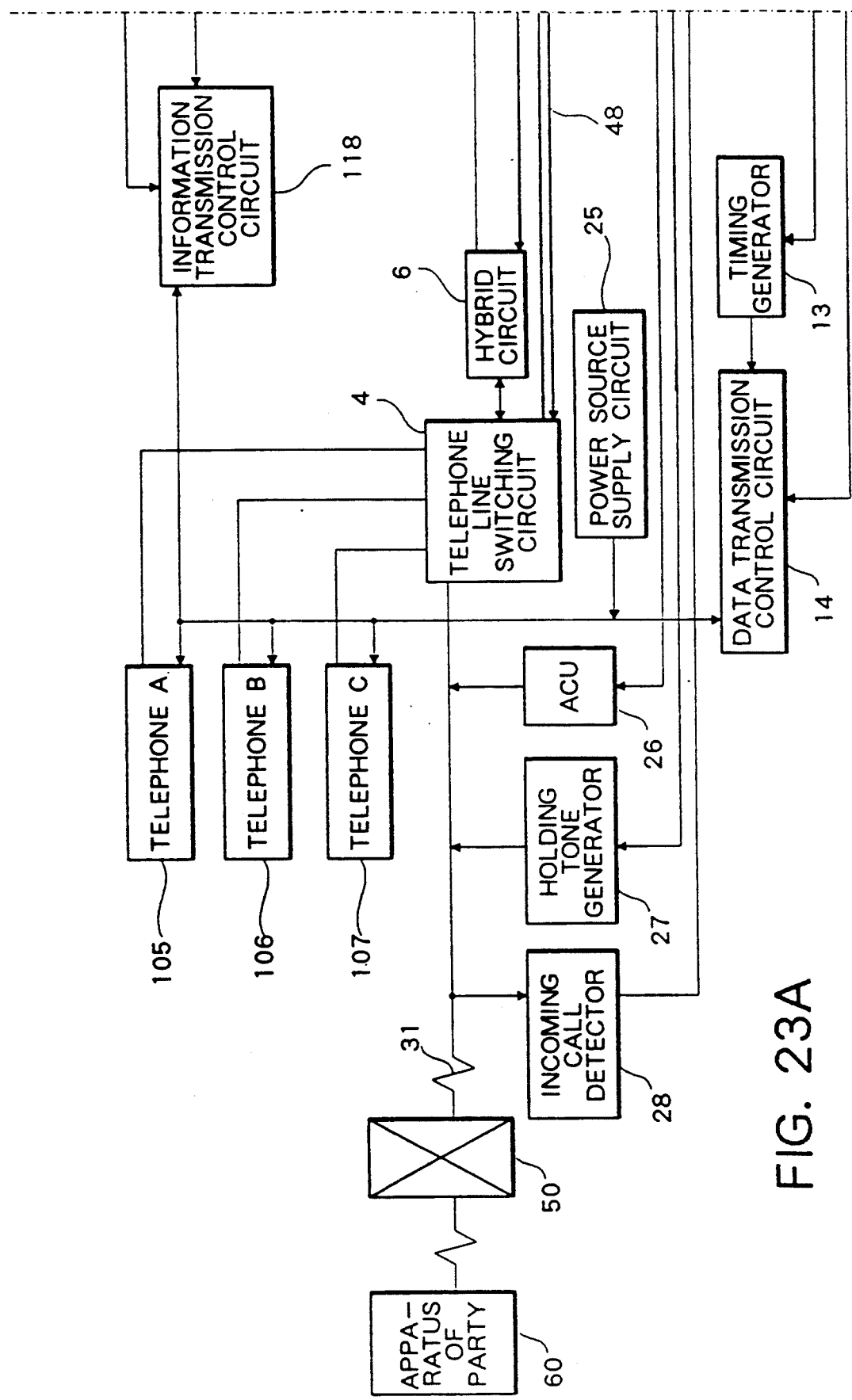
FIGS. 23A and 23B are detailed block diagrams of a controller according to a sixth embodiment of the present invention.
Figure 23B:
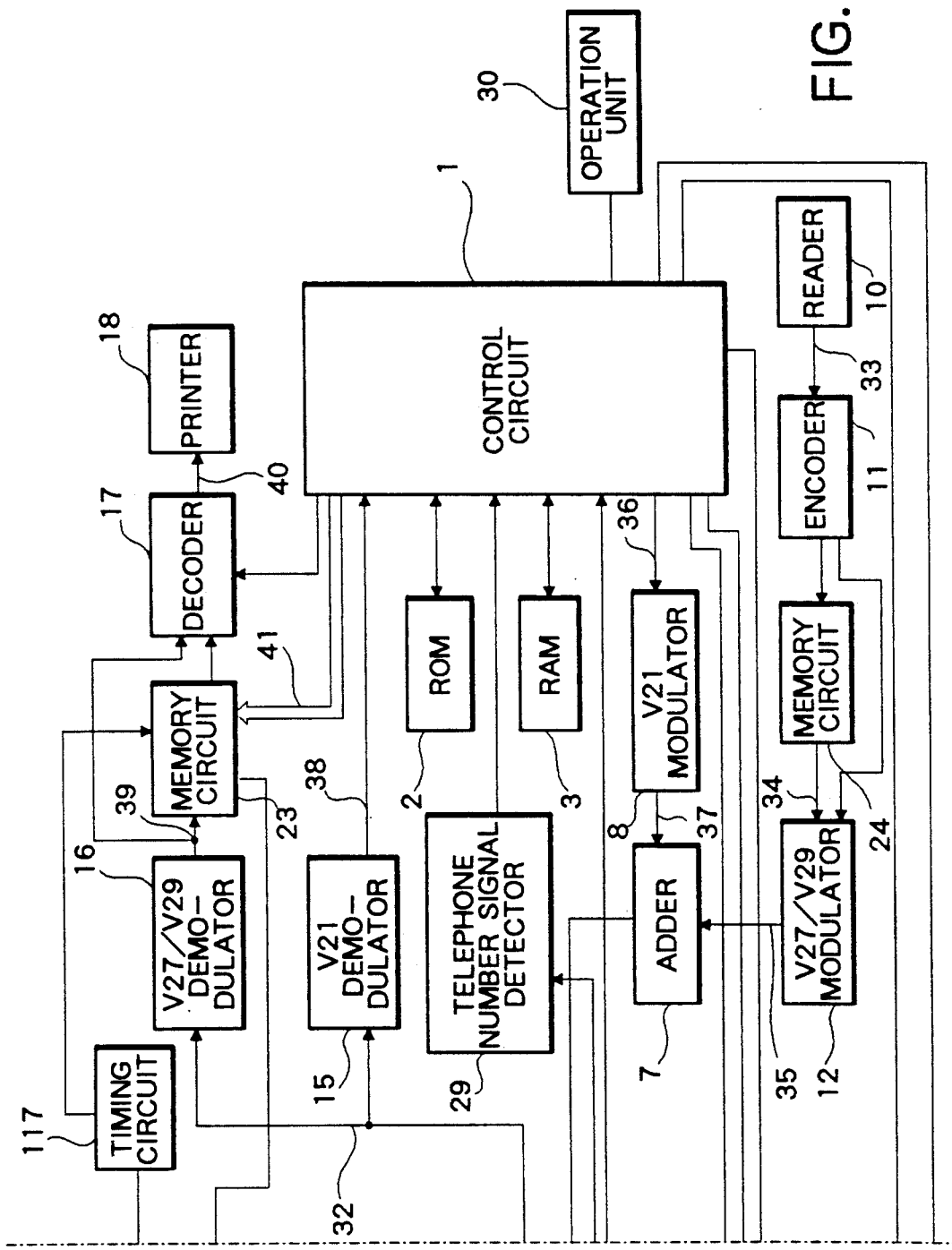

FIGS. 23A and 23B are block diagrams of the controller 150 of this embodiment for performing the above-mentioned control operation. In the arrangement of the controller 150 of this embodiment shown in FIGS. 23A and 23B, a timing circuit 117 for generating a timing signal synchronous with a transmission timing of data which is output to a telephone through an information transmission control circuit 118 and outputting it to the information transmission control circuit 118 and the memory circuit 19, and the information transmission control circuit 118 for outputting data read out from the memory circuit 19 to each telephone in accordance with the timing signal from the timing circuit 117 are added to the arrangement illustrated in FIGS. 19A and 19B. A program stored in the ROM 2 can be replaced with a control program shown in FIGS. 25A to 26B to be described later.

The detailed arrangement of the telephones A to C (105 to 107) used in this embodiment will be described below with reference to FIGS. 24A and 24B. Note that the same reference numerals in FIGS. 24A and 24B denote the same parts as in FIGS. 3 and 14, and a detailed description thereof will be omitted.

Figure 14:
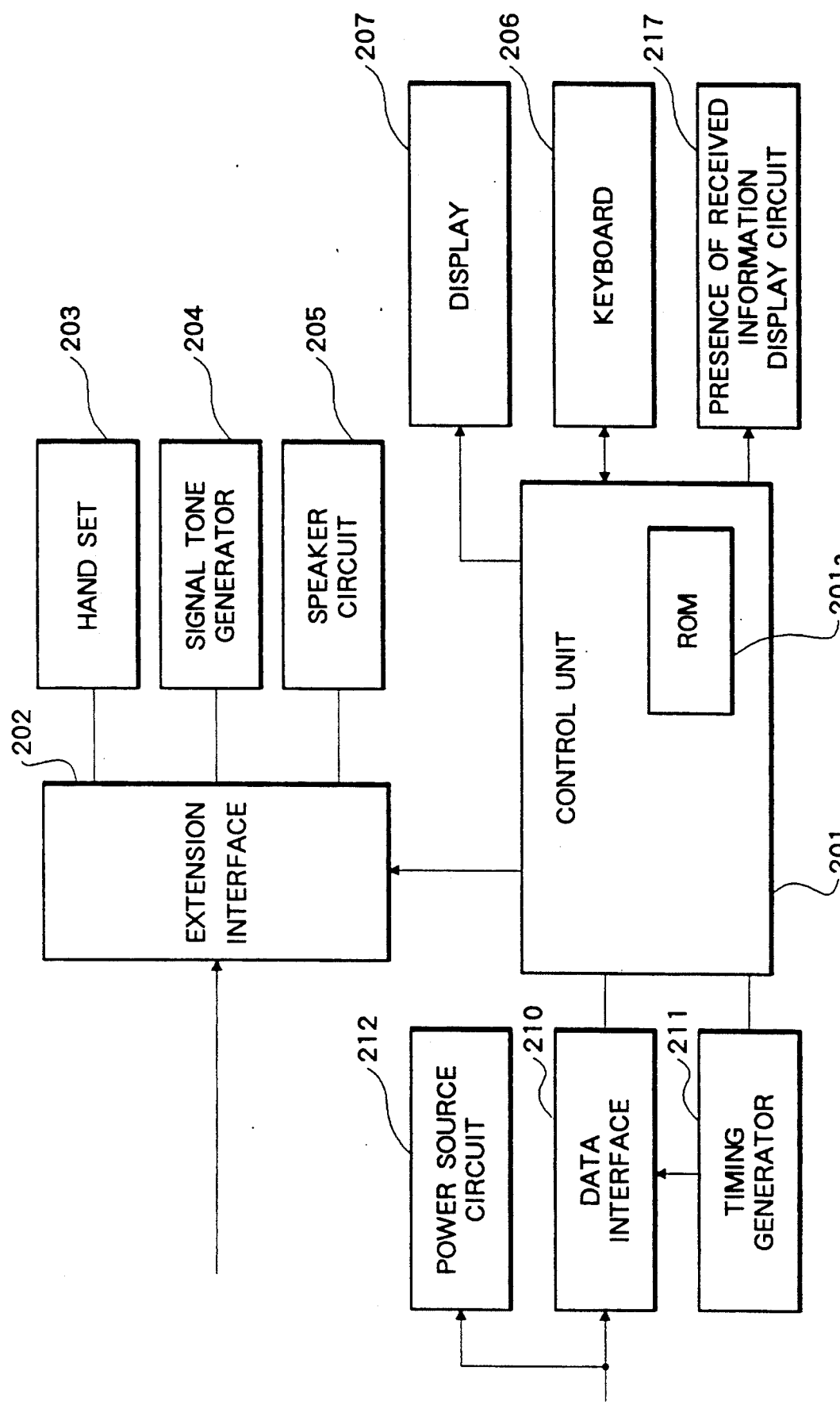
FIG. 14 is a detailed block diagram of a connecting telephone according to a fourth embodiment of the present invention.
Figure 24A:
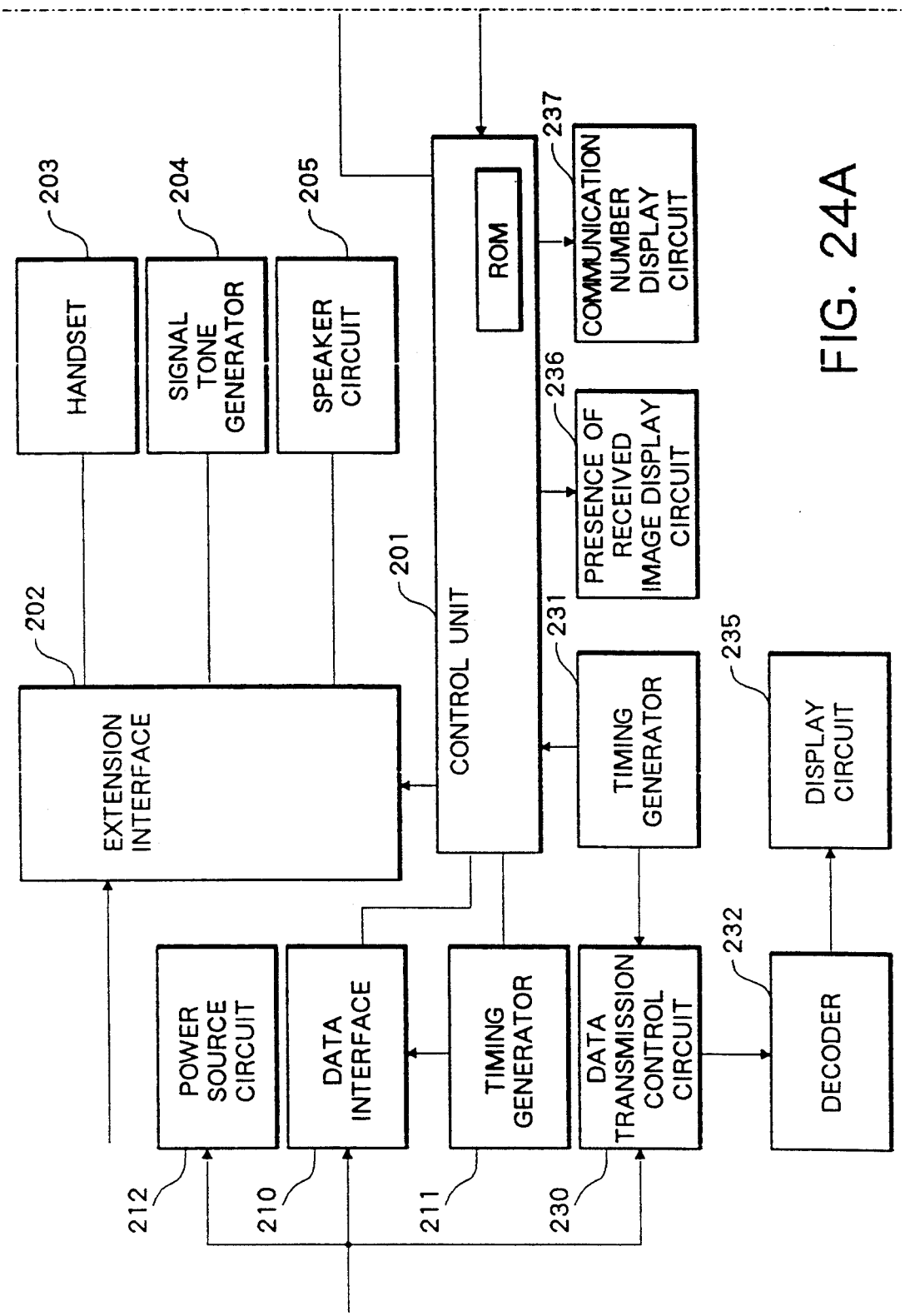
FIGS. 24A and 24B are detailed block diagrams of a connecting telephone of the sixth embodiment.
Figure 24B:
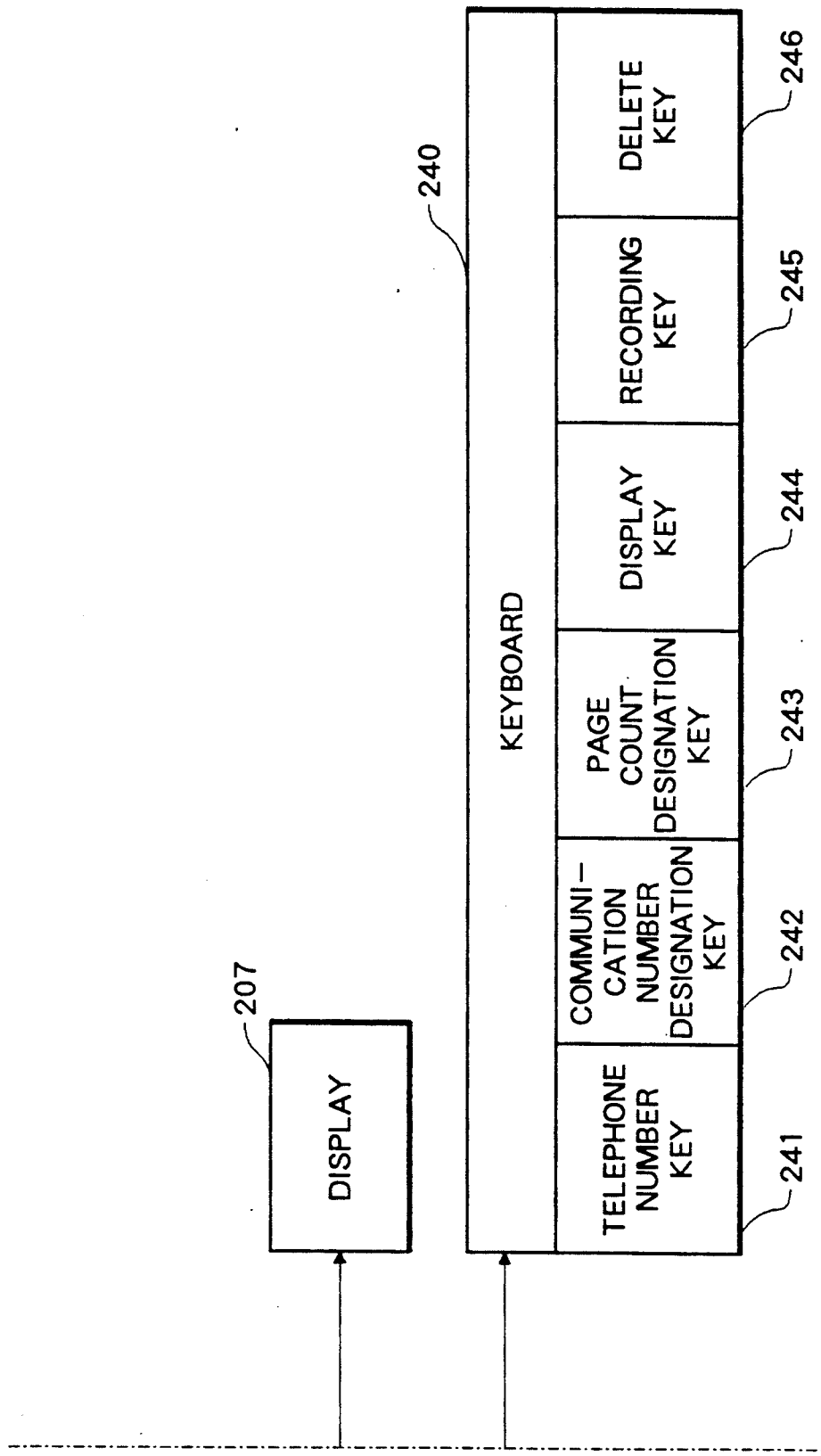

In FIGS. 24A and 24B, the received information display circuit 217 is omitted from the arrangement shown in FIG. 14, and the following arrangement is added. Note that a ROM 201a stores a program shown in FIGS. 27A and 27B.

In the added arrangement, reference numeral 230 denotes a data transmission control circuit for control data transmission with the information transmission control circuit 118 of the controller 150 under the control of the control unit 201. Binary digital data is used between the data transmission control circuit 230 and the information transmission control circuit 118, and for example, FSK-modulated information is time-divisionally transmitted at a timing allocated in units of telephones. Reference numeral 231 denotes a timing generator for generating an operation clock signal and a timing signal for data transmission; and 232, a decoder for executing known decoding processing, e.g., MH (modified Huffman) or MR (modified READ) decoding, of a received signal from the data transmission control circuit 230. The decoded data is sent to a display circuit 235. Reference numeral 235 denotes the display circuit for displaying the decoded data. Reference numeral 236 denotes a presence of received image display circuit for turning on/off a "presence of received image" display in accordance with a control signal from the controller 150; and 237, a communication number display circuit for displaying a communication number sent from the controller 150. Reference numeral 240 denotes a keyboard comprising telephone number keys 241 including a ten-key pad, a communication number designation key 242, a page count designation key 243, a display key 244, a recording key 245, a delete key 246, and the like.

Normal talking communication processing in the telephone is performed as follows. When the telephone is selected by the telephone line switching circuit 4, an incoming call signal is output, and a ringing tone is output in accordance with the incoming call signal. When an operator who hears this tone takes up the handset 203, a DC loop is formed with the line, and the telephone line switching circuit 4 detects this to detect a response from the telephone, thus forming a channel.

In this embodiment with the above arrangement, when image information communication processing is performed between the facsimile units 152 of the transmission- and reception-side controllers 150, a connected telephone can display a communication number and received information can be recorded. When the communication number is input from the telephone, received data of the input communication number can be read out.

The operation of this embodiment with the above arrangement will be described hereinafter with reference to the flow charts shown in FIGS. 25A to 27B.

The operation of the controller 150 will be described below with reference to FIGS. 25A, 25B, 26A and 26B.

Figure 25A:
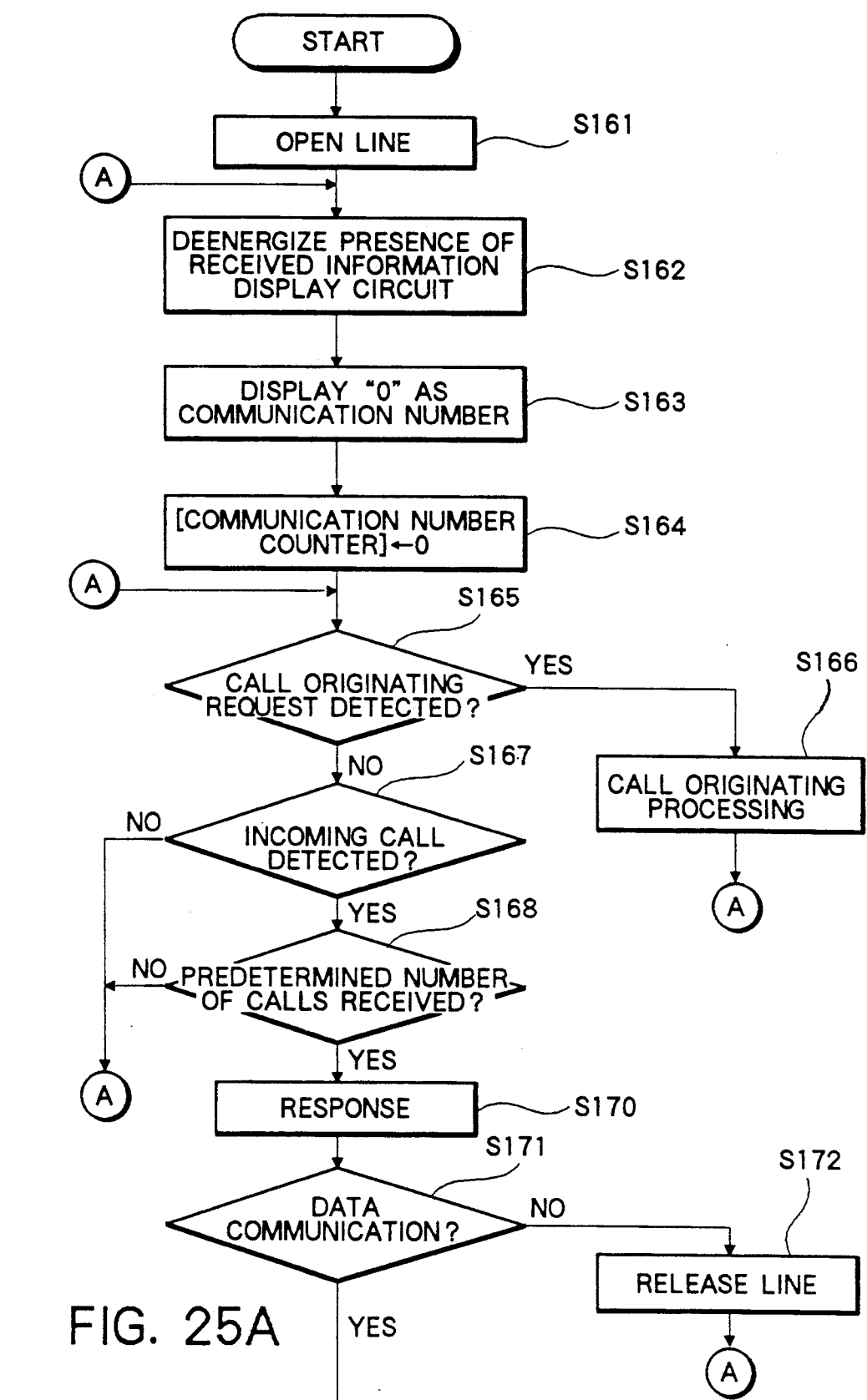
FIGS. 25A and 25B are control flow charts of normal processing of the controller of the sixth embodiment.
Figure 25B:
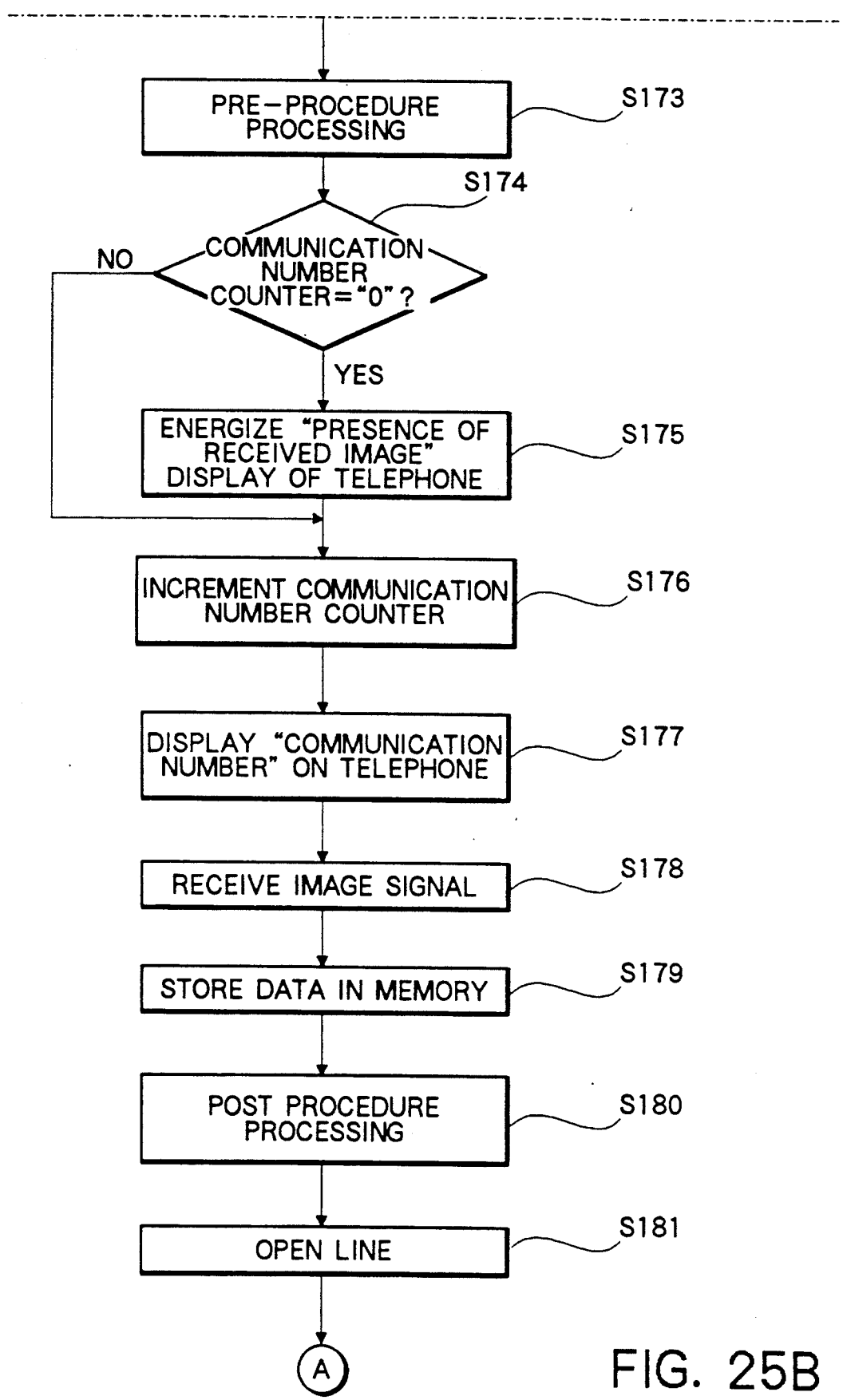

A normal operation of the controller 150 as the reception-side apparatus shown in FIGS. 23A and 23B will be described with reference to FIGS. 25A and 25B.

When the controller 150 is powered, the flow advances to step S161, and the telephone line switching circuit 4 is instructed to open the telephone line 31. In step S162, the data transmission control circuit 14 is controlled to output a deenergization signal for deenergizing the presence of received image display circuit 236 of all the connected telephones. In step S163, the displays of the communication number display circuits 237 of all the telephones are initialized to "0". In step S164, a communication number counter in the RAM 3 is reset to be "0". It is checked in step S165 if a call originating request is input by operating the one-touch dialing or index number dialing key of the operation unit 30 or the handset 203 of the connecting telephone is taken off the hook to issue a call originating a request. If YES in step S165, the flow advances to step S166, and known telephone line call originating processing is performed.

If NO in step S165, the flow advances to step S167 to check if the incoming call detector 28 detects an incoming call from the telephone line 31. If NO in step S167, the flow returns to step S165.

If YES in step S167, when a telephone which should output a ringing tone signal (should ring a bell) is designated, the designated telephone is connected to the telephone line 31, and the corresponding telephone is caused to output a ringing tone. It is then checked in step S168 if the incoming call signal is input predetermined times (e.g., three times). If NO in step S168, the calling is continued. When the handset 203 is taken off the hook during this interval, a channel is formed between the responding and calling telephones, thus allowing talking communication.

If the handset 203 is not taken off the hook after the incoming call signal is input the predetermined times, the flow advances from step S168 to step S170, and the telephone line switching circuit 4 is instructed to form a DC loop with the telephone line 31 to make a response. Thus, the telephone line 31 is connected to the hybrid circuit 6. It is then checked in step S171 if data reception accompanying a carrier signal as facsimile reception is performed. If the carrier signal is not detected from the telephone line, since data communication cannot be performed, a wrong telephone call is determined, and the telephone line is released in step S172. The flow then returns to step S165. If another specific processing is determined in step S172, the corresponding processing is executed.

If the data signal is detected in step S171, the flow advances to step S173, and pre-procedure processing, e.g., detection of states of various apparatuses, is executed to execute synchronization processing with the apparatus of the party. It is checked in step S174 if the communication number counter is "0". If NO in step S174, the flow advances to step S176; otherwise, the presence of received image display circuit 236 of the connecting telephone is energized to turn on a "presence of received image" display. In step S176, the communication number counter is counted up (incremented) by one, and in step S177, the communication number display circuit 237 is caused to display the updated value of the communication number counter. In step S178, reception processing of image information sent after the pre-procedure processing is executed. At the same time, the received information is supplied to the V27/V29 demodulator 16 through the above-mentioned path, and the demodulated information is stored in the memory circuit 23. Upon completion of reception of image information, the flow advances to step S180, and known post procedure processing is executed. Thereafter, the telephone line is opened in step S181, and the flow returns to step S165.

Figure 26A:
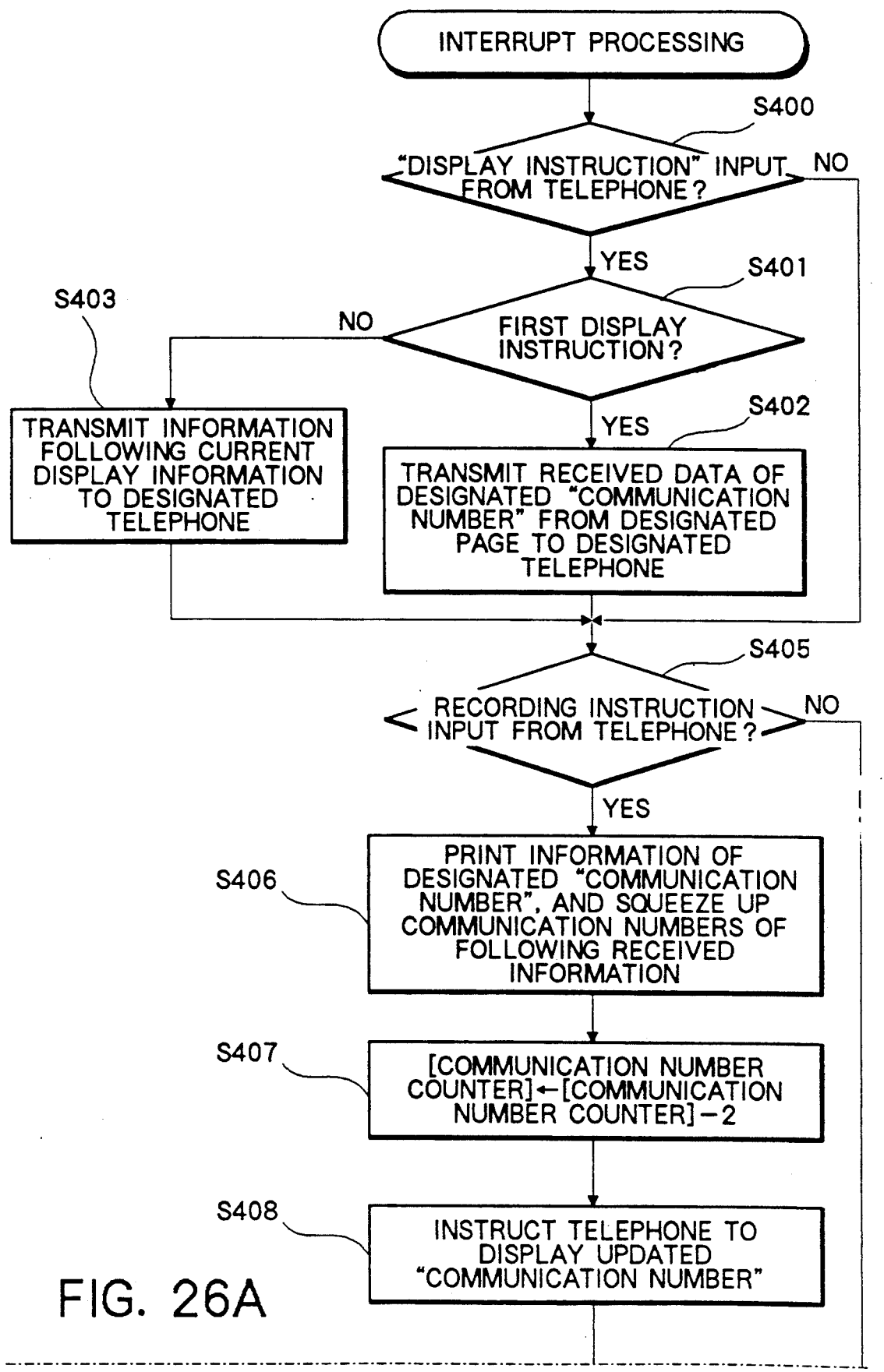
FIGS. 26A and 26B are control flow charts of interrupt processing of the controller of the sixth embodiment.
Figure 26B:
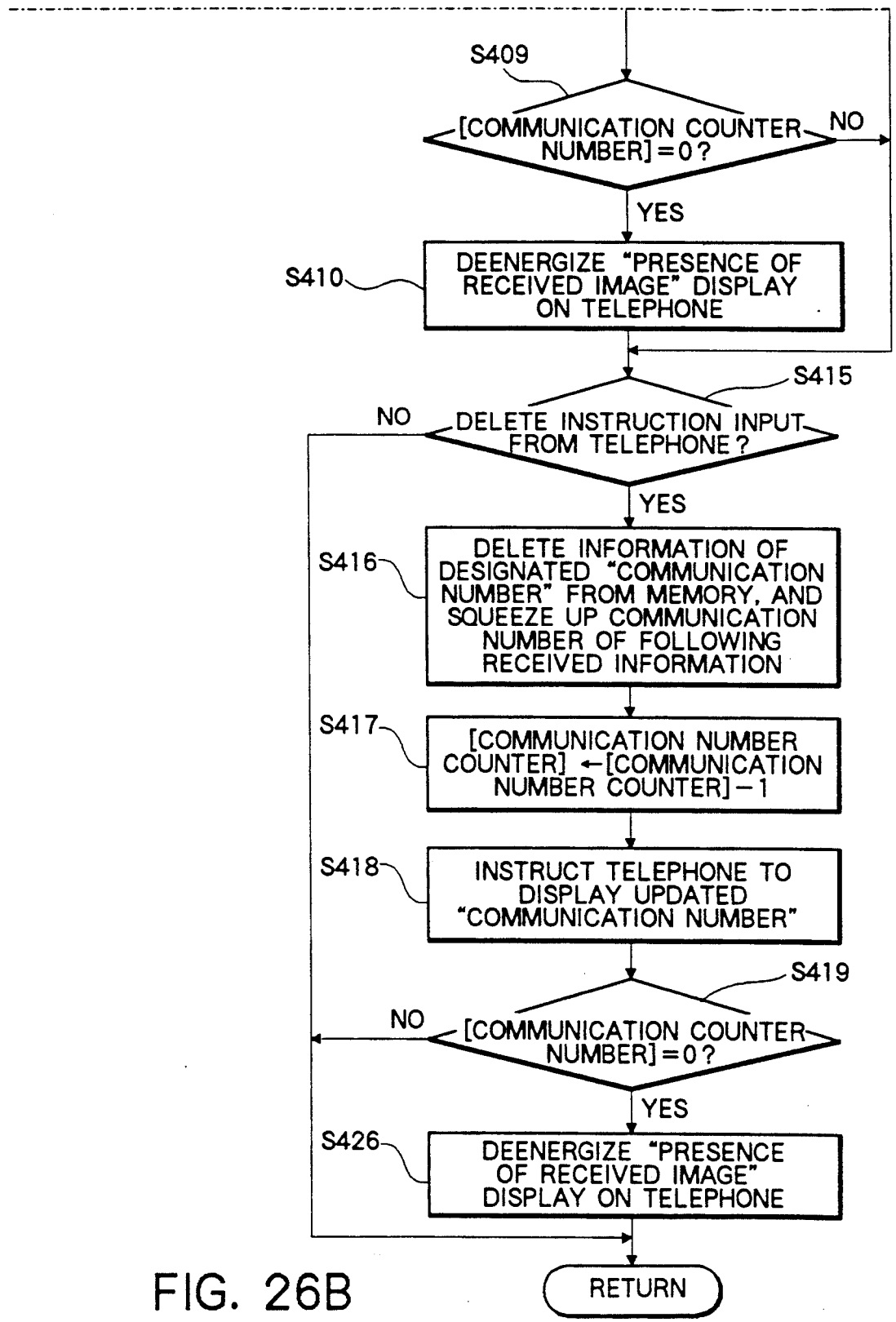

The ordinary processing has been described. When an interrupt request is input from a telephone through the data transmission control circuit 14, the above-mentioned processing is interrupted and interrupt processing shown in FIGS. 26A and 26B is executed. Alternatively, interrupt processing of FIGS. 26A and 26B is executed simultaneously with the above-mentioned processing.

Simultaneously with interruption, it is checked in step S400 if the connecting telephone designates the received information number stored in the memory circuit 23. This step is executed by reading out status information from the data transmission control circuit 14. If NO in step S400, the flow advances to step S405; otherwise, it is checked in step S401 if the input instruction is a first display instruction. If YES in step S401, the memory circuit 23 is instructed to read out data from a page count of the designated communication number and to sent the readout data to the information transmission control circuit 118 in step S402. The readout data is then transmitted from the control circuit 118 to a telephone issuing an interrupt request. The flow then advances to step S405. If NO in step S401, the flow advances to step S403, and information following immediately preceding readout information (information following one currently displayed on the telephone) is read out. The flow advances to step S405.

It is checked in step S405 if a recording instruction is input from the telephone together with the interrupt request. If NO in step S405, the flow advances to step S415; otherwise, the flow advances to step S406. In step S406, information of the designated communication number is read out, and is output to the decoder 17. The decoded information is printed on recording paper or the like by the printer 18. At the same time, the recording information of the printed communication number is deleted from the memory circuit 23, and the communication numbers corresponding to the following recording information are sequentially squeezed up. In step S407, the communication number counter is incremented by one. In step S408, a control signal is output so as to cause the communication number display circuit 237 of the telephone to display an updated communication number. It is then checked in step S409 if the updated value of the communication counter is "0". If NO in step S409, the flow advances to step S415. If YES in step S409, the flow advances to step S410, and a deenergization signal of the presence of received image display circuit 236 is output to turn off the "presence of received image" display of the telephone. The flow advances to step S415.

It is checked in step S415 if a delete instruction from the telephone is input together with the interrupt request. If NO in step S415, the flow returns to the ordinary processing; otherwise, the flow advances to step S416. In step S416, recording information of the designated communication number is deleted from the memory circuit 23, and the communication numbers corresponding to the following recording information are squeezed up. In step S417, the communication number counter is decremented by one, and in step S418, a control signal is output so as to cause the communication number display circuit 237 of the telephone to display the updated communication number. It is checked in step S419 if the updated value of the communication number counter is "0". If NO in step S419, the flow returns to the ordinary processing; otherwise, the flow advances to step S426. In step S426, a deenergization signal of the presence of received image display circuit 236 is output to turn off the "presence of received image" display of the telephone. The processing is ended, and the flow returns to the ordinary processing.

As described above, received image information stored in the memory circuit 23 can be read out/deleted under the control of the telephone.

Figure 27B:
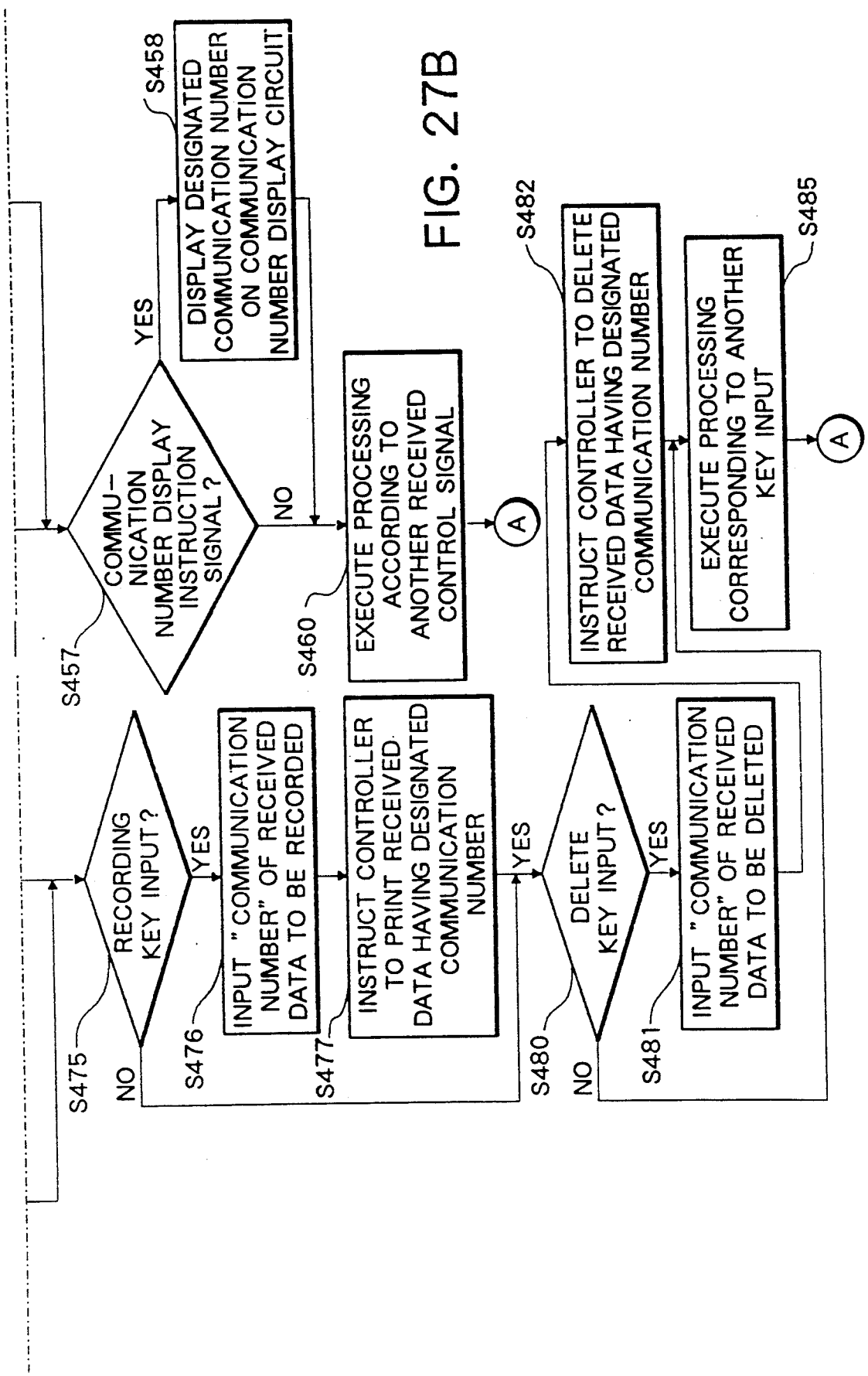

Control with respect to the controller 150 on the side of the telephone will be described below with reference to FIGS. 27A and 27B.

The control unit 201 checks in step S451 if the data interface 210 receives a control signal from the data transmission control circuit 14. If NO in step S451, it is checked in step S452 if a key input from the keyboard 240 is detected. If NO in step S452, the flow returns to step S451.

If YES in step S451, the flow advances to step S453 to check if the received control signal is an energization signal of the presence of received image display circuit 236. If YES in step S453, the presence of received image display circuit 236 is energized to display the "presence of received image" in step S454. The flow then advances to step S457.

If NO in step S453, the flow advances to step S455 to check if the received control signal is a deenergization signal of the presence of received image display circuit 236. If NO in step S455, the flow advances to step S457; otherwise, the flow advances to step S456. In step S456, the presence of received image display circuit 236 is deenergized to turn off the "presence of received image" display, and the flow advances to step S457.

It is checked in step S457 if the received control signal is a communication number display signal for causing the communication number display circuit 237 to display a "communication number". If NO in step S457, the flow advances to step S460; otherwise, the flow advances to step S458. In step S458, the communication number display circuit 237 displays the communication number designated by the communication number display signal in place of the current display, and the flow advances to step S460. In step S460, processing corresponding to another received control signal is executed.

If YES in step S451, i.e., if the key input from the keyboard 240 is detected, the flow advances to step S470 to check if the key operated at the keyboard 240 is the display key 244. If NO in step S470, the flow advances to step S475; otherwise, the flow advances to step S471. It is checked in step S471 if the display key 244 is operated for the first time (first key input of the display key 244 with respect to the designated communication number). If YES in step S471, the flow advances to step S472, and the "communication number" is input using the telephone number keys 241. Thereafter, the communication number designation key 242 is input to validate the input result of the communication number. Subsequently, a "page count" is input using the telephone number keys 221, and then, the page count designation key 243 is input to validate the input result of the page count.

After these designation inputs are performed, the flow advances to step S473, and the input designation information is output to the controller 150, so that a the transmission line of image information is instructed to output a corresponding image signal. Then, the flow advances to step S475.

The controller 150 which receives the instruction information reads out corresponding received information designated by the communication number from the memory circuit 23, and sends it back to the telephone connecting line through the information transmission control circuit 118, as described above. For this reason, on the telephone side, the sent-back information is received by the data transmission control circuit 230, and is decoded by the decoder 232. The decoded information is supplied to the display circuit 235, and is displayed on the display of the display circuit 235. This processing is performed independently of the control unit 201. The data transmission control circuit 230 always monitors the received information on the telephone line, and when image information addressed to the self telephone is sent, the circuit 230 fetches the information, decodes it using the decoder 232 and displays it on the display circuit 235.

Note that reception of the image information may be controlled such that all image information output onto the telephone line is fetched by the telephones and is displayed on the display circuits 235 of all the telephones in place of fetching information addressed to a specific telephone. Thus, received information can be easily confirmed from all the telephones.

If the display key 244 is operated not for the first time, the flow advances to step S474, and a request command for requesting to output received information following one which was previously sent and has already been displayed on the display circuit 235 is output. The flow advances to step S475. It is checked in step S475 if the recording key 245 is operated at the keyboard 240. If NO in step S475, the flow advances to step S480; otherwise, the flow advances to step S476. In step S476, a "communication number" to be recorded is input using the telephone number keys 241, and the communication number designation key 242 is operated to validate the input result of the communication number. In step S477, instruction information for instructing the controller 150 to print out the received information of the designated communication number together with the communication number using the printer 18 and to delete the received information on the memory circuit 23 is output, and the flow advances to step S480.

It is checked in step S480 if the delete key 246 of the keyboard 240 is operated. If NO in step S480, the flow advances to step S485; otherwise, the flow advances to step S481. In step S481, a "communication number" to be deleted is input using the telephone number keys 241, and the communication number designation key 242 is operated to validate the input result of the communication number. In step S482, instruction information for instructing the controller 150 to delete the received information of the designated communication number as well as the communication number from the memory circuit 23 is output, and the flow advances to step S485.

In step S485, processing corresponding to another key input is executed, and the flow returns to step S451. For example, when the telephone number keys 241 are operated while the handset 203 of the telephone is taken off the hook, the signal tone generator 204 is instructed to output a telephone number signal (e.g., a DTMF signal) corresponding to the input number.

As described above, according to this embodiment, when the data communication apparatus performs reception, the received information is stored in the memory circuit 23, and reception of the data can be displayed on a nearby telephone. Furthermore, the received information can be displayed on the telephone upon instruction from the telephone, and can also be printed out or deleted upon instruction from the telephone.

Thus, when a telephone is placed on a desk and the facsimile apparatus is placed at the corner of a room, a person who should receive information can immediately know at his desk that reception addressed to him is performed, and can output received information soon.

In this embodiment, all the received information at the facsimile unit 152 is stored in the memory circuit 23, and a printing operation from the printer 18 is performed in accordance with an instruction input from the telephone. However, the present invention is not limited to this. For example, received information may be immediately supplied to the decoder 17 through the V27/V29 demodulator and may be output from the printer 18. At the same time, the received information may also be output to the information transmission control circuit 118, so that the information is transmitted therefrom to all the telephones simultaneously with reception.

With this control operation, receiving information can be confirmed by a telephone on a desk. More specifically, an operator can confirm received information at his desk, and can determine whether the information is addressed to him, or is closely related to him, or is rarely related to him. Thus, a quick and reliable action can be taken.

In the above description, in communication between the data transmission control circuit 230 and the data interface 210 of the telephone, and the information transmission control circuit 118 and the data transmission control circuit 14 of the controller 150, a line use time is time-serially divided into six slots, and two, i.e., intercommunication time slots are assigned to each telephone. However, in practice, data transmission is not almost performed using all the time slots. An information receiving unit and a received information analyzing unit (encoding unit) are provided to a telephone, and various communication control techniques, e.g., polling/selecting control, packet communication control, and the like, may be employed using the controller as a master station. A technique having optimal efficiency may be employed.

According to this embodiment as described above, if the telephone is arranged remote from the controller 150 including the facsimile unit 152, information received at the facsimile unit 152 can be directly visually observed by a telephone on the desk. An operator can instruct from the telephone on his desk whether the received information is to be printed out or can be deleted without being printed out. For this reason, when unnecessary information, e.g., an advertisement, is received, the operator can immediately determine whether this received information with his telephone is necessary. If the received information is unnecessary, he can delete the information without printing it out. Thus, waste of recording paper cost can be prevented.

According to the present invention as described above, received information is temporarily stored, and the stored information can be controlled by a connecting telephone. Thus, a person who should receive information can reliably and quickly know reception of the information, and can immediately obtain the information without taking an unnecessary action.

SEVENTH EMBODIMENT

In the above description, normal facsimile communication has been exemplified. When a call is detected from one of the outside lines 121 to 123 and corresponds to a confidential reception request to the facsimile unit 152, received information should be prevented from being seen from a person other than a called party who should receive confidential information. For this reason, received information is not output unconditionally, and is normally stored in an internal memory of the controller 150.

In a conventional apparatus, a receiving facsimile apparatus merely displays or prints out a message indicating that confidential reception has been made. However, in this embodiment, a message indicating that confidential reception has been made is displayed on a connected extension telephone.

Display of confidential reception in this embodiment is performed as follows. That is, a plurality of called parties are classified into three groups according to the order of seats, and these groups are numbered 1 to 3 in correspondence with telephones A to C (105 to 107). When confidential reception is performed, the group to which a called party who should receive confidential information belongs is determined, and a message indicating the confidential reception is performed is displayed on only a telephone corresponding to the determined group. When the received confidential information is output by the corresponding called party, the message displayed on the corresponding telephone is deenergized.

Figure 28A:
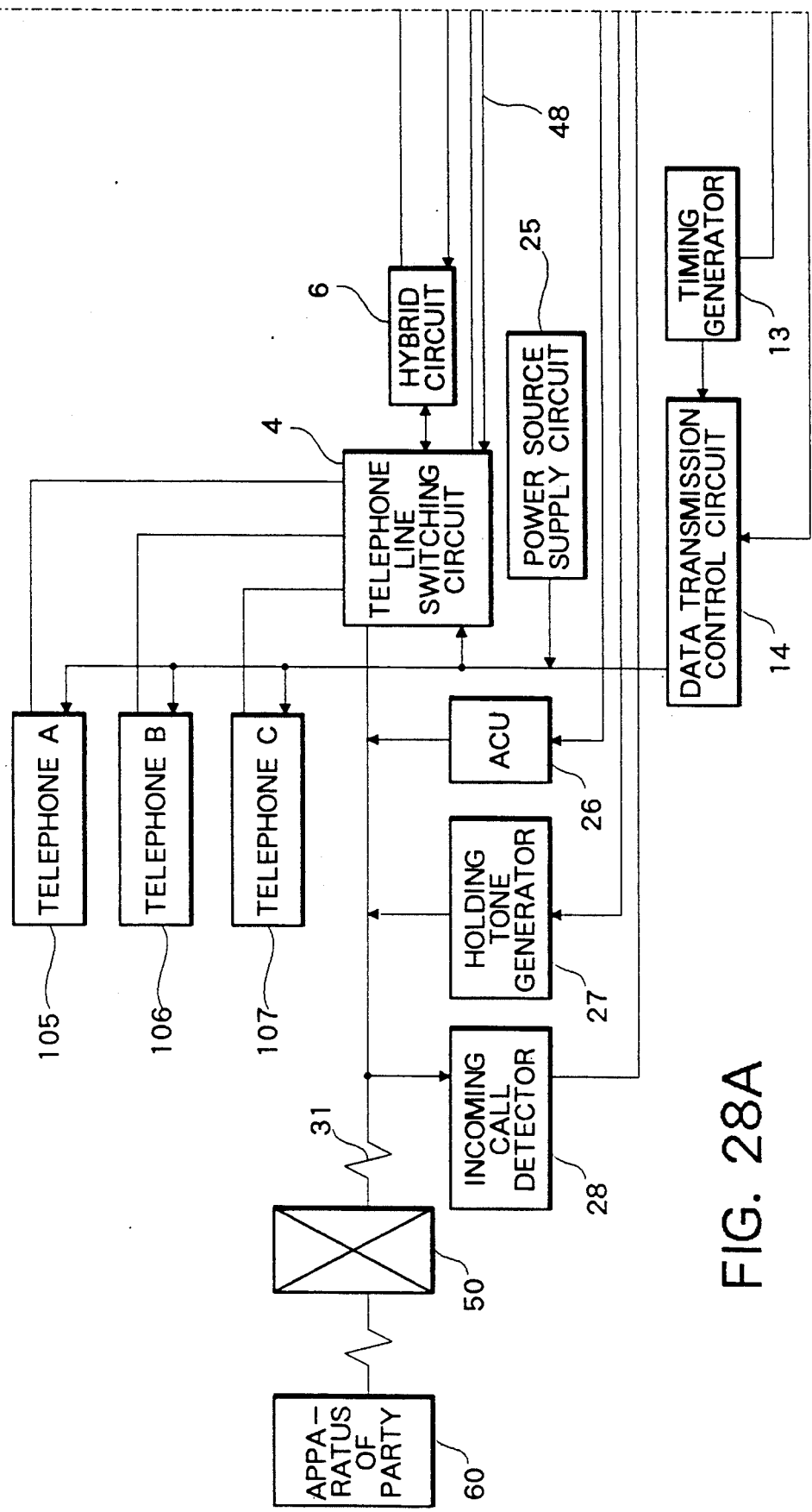
FIGS. 28A and 28B are detailed block diagrams of a controller according to a seventh embodiment of the present invention.
Figure 28B:
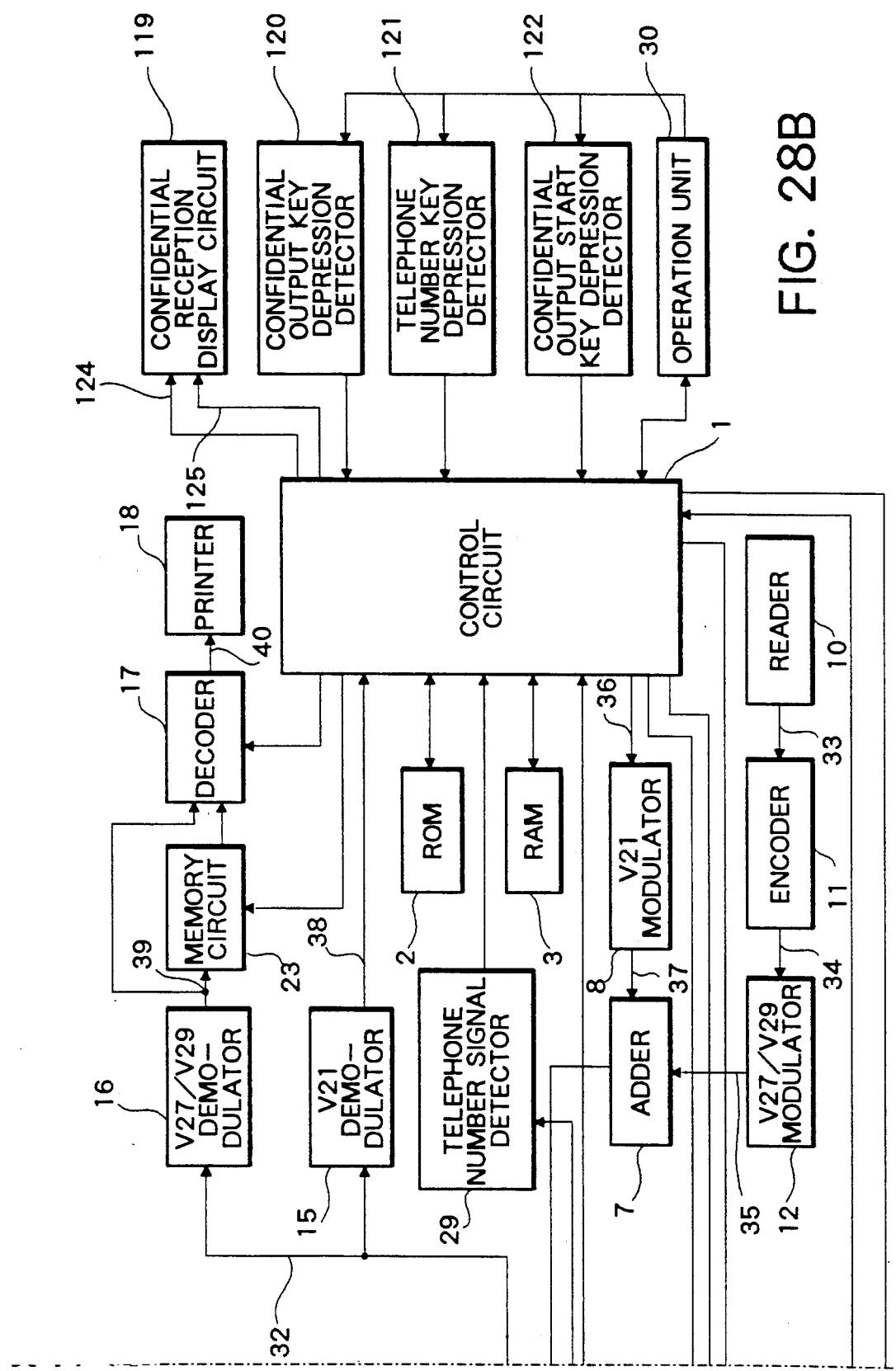

The detailed arrangement of the controller 150 which is arranged to perform the above-mentioned processing is shown in FIGS. 28A and 28B.

In FIGS. 28A and 28B, the same reference numerals denote the same parts as in FIGS. 6A and 6B described above, and a detailed description thereof will be omitted.

In this embodiment, a confidential reception display circuit 119 which performs a "presence of confidential communication" display when a signal line 124 is enabled, a confidential output key depression detector 120 for detecting depression of a "confidential output key" on the operation unit 30 of the controller, a telephone number key depression detector 121 for detecting depression of "telephone number keys" as a ten-key pad on the operation unit 30 for inputting a telephone number and the like, and a confidential output start key depression detector 122 for detecting depression of a "confidential output start key" on the operation unit 30 are arranged in addition to the arrangement illustrated in FIGS. 6A and 6B. The confidential reception display circuit 119 displays a telephone group number in accordance with the output on the signal line 124. Note that when the signal line 124 is disabled, the confidential reception display circuit 119 does not display the "presence of confidential reception".

The operation unit 30 of this embodiment comprises a call originating request key, the confidential output key, the confidential output start key, the telephone number keys, the index number dialing key, the one-touch dialing key, and the like for the facsimile unit, and performs various operation instruction inputs.

In this embodiment, in order to output confidential information stored in the memory circuit 23, the "confidential output key" on the operation unit 30 is depressed, and an "identification number" is then input using the ten-key pad. Thereafter, the "confidential output start key" is depressed. The control circuit 1 checks the input identification number, and when the input number coincides with a confidential party number designated by the received confidential information, the control circuit 1 reads out the received confidential information stored in the memory circuit 23 and outputs it from the printer 18 through the decoder 17.

In this embodiment, a total of four types of identification numbers are determined depending on cases with or without group number designation (when the group numbers are designated, called parties are classified into three groups, and a total of three identification numbers are set for these groups).

The detailed arrangement of the telephones A to C (105 to 107) of this embodiment having the same arrangement will be described hereinafter with reference to FIG. 29.

In FIG. 29, a confidential reception display circuit 238 is arranged in place of the presence of received information display circuit 217 shown in FIG. 14 described above. Since other arrangements are the same as those in FIG. 14, a detailed description thereof will be omitted.

In FIG. 29, the confidential reception display circuit 238 is a circuit for displaying the "presence of confidential reception" under the control of the control circuit 1.

Figure 30B:
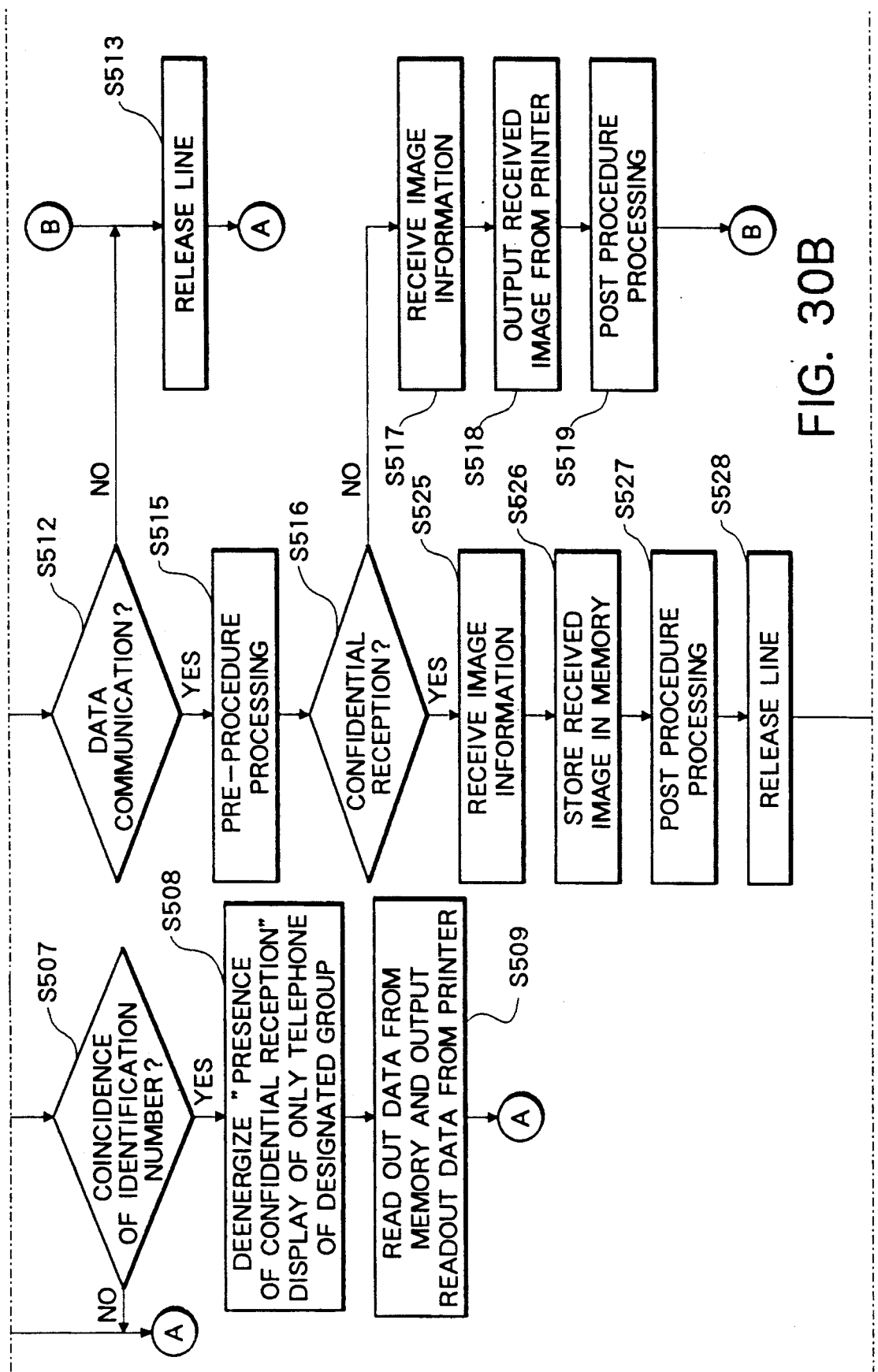
Figure 30C:
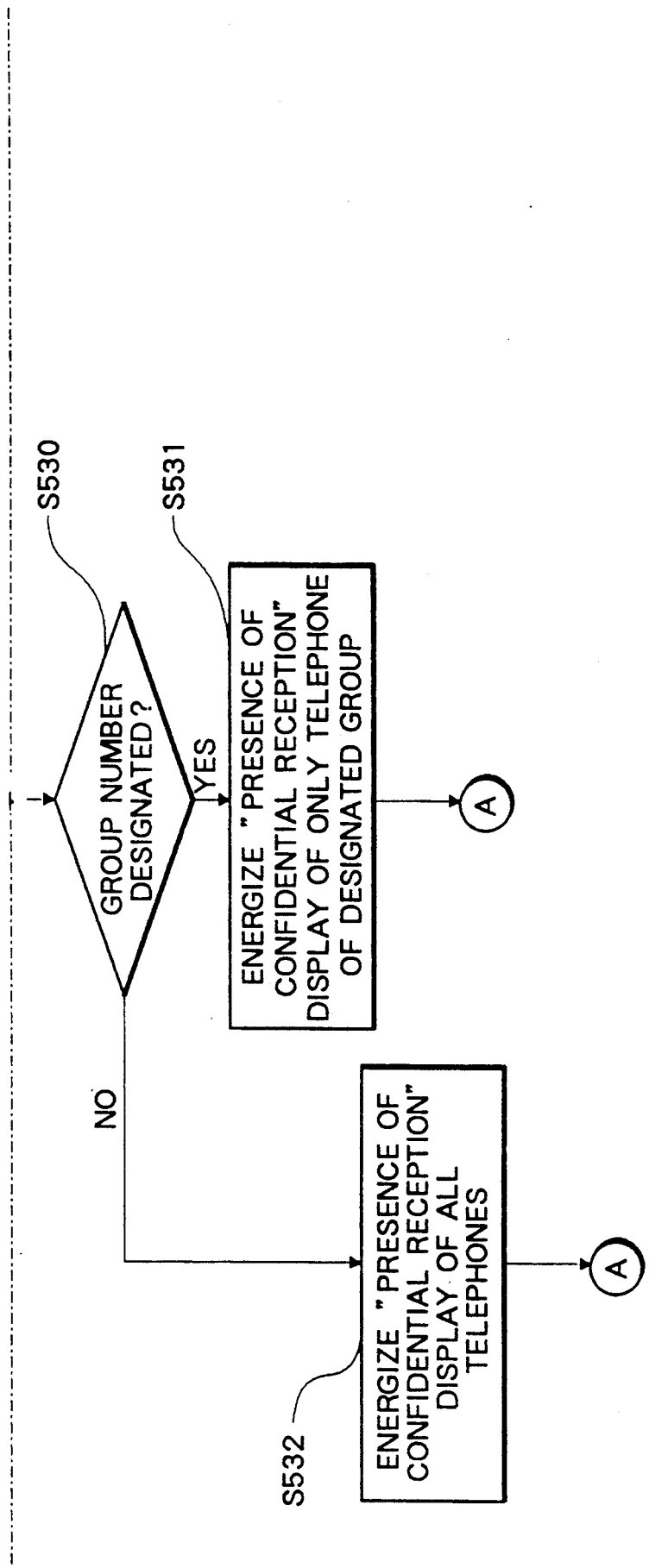
Figure 31:
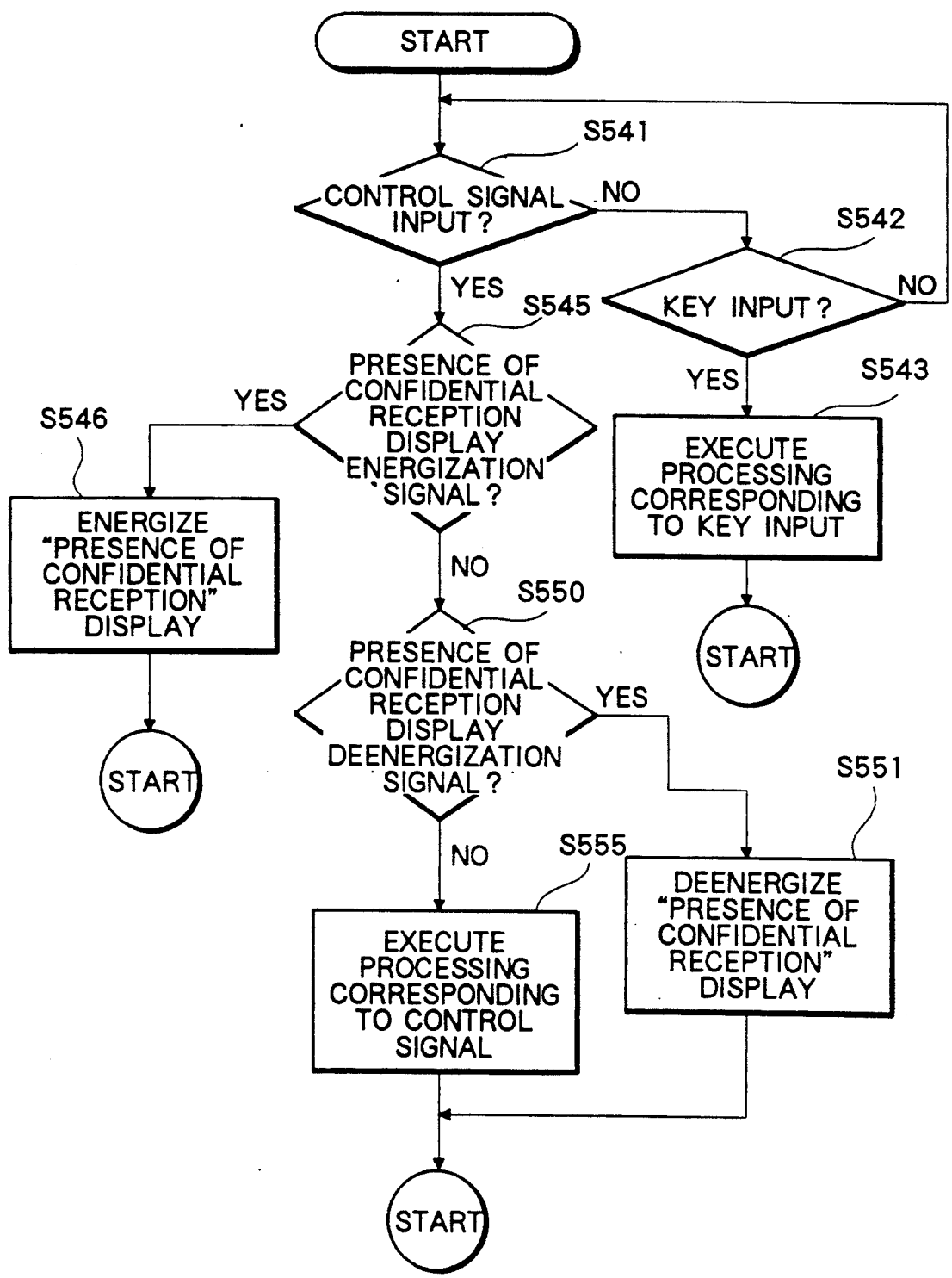
FIG. 31 is a control flow chart of the connecting telephone of the seventh embodiment.

The operation of this embodiment with the above arrangement will be described hereinafter with reference to the flow charts shown in FIGS. 30A to 31.

The control operation of the controller 150 will be explained below with reference to FIGS. 30A to 30C.

When the controller 150 is powered, the flow advances to step S501, and the telephone line switching circuit 4 is instructed to open the telephone line 31. In step S502, the data transmission control circuit 14 is controlled to output a control signal for deenergizing the confidential reception display circuits 238 of all the connected telephones so as not to display the "presence of confidential reception". It is checked in step S503 if a call originating request is issued by operating the one-touch dialing or index number dialing key of the operation unit 30 or the handset 203 of the connecting telephone is taken off the hook to issue a call originating request. If YES in step S503, known call originating processing is performed in step S504.

If NO in step S503, the flow advances to step S505. It is checked in steps S505 and S506 if the incoming call detector 28 detects an incoming call from the telephone line 31 or the like or an output request of received confidential information is input at the operation unit 30. If NO in steps S505 and S506, the flow returns to step S503.

If the output request of received confidential information is input at the operation unit 30, i.e., if the above-mentioned "confidential output key" is operated, an "identification number" is input, and finally, the "confidential output start key" is operated, the flow advances from step S506 to step S507. The control circuit 1 checks in step S507 whether or not this identification number coincides with the designated confidential party number in the received information stored in the memory circuit 23. If YES in step S507, the flow advances to step S508; otherwise, the flow returns to step S503 to ignore the input.

In step S508, a telephone corresponding to the designated group number is obtained, and the data transmission control circuit 14 is instructed to output a control signal for deenergizing the confidential reception display circuit 238 of this telephone, thereby turning off the "presence of confidential reception" display. In addition, the display of the confidential reception display circuit 119 is also deenergized.

If received confidential data does not include designation of a group number, "presence of confidential reception" displays of all the telephones are deenergized. In step S509, received confidential information stored in the memory circuit 23 is read out and is decoded by the decoder 17, and the decoded information is printed out by the printer 18. After the printing processing, the flow returns to step S503.

If the incoming call detector 28 detects the incoming call signal, when a telephone which should output a ringing signal (should ring a bell) is designated, the designated telephone is connected to the telephone line 31, and is caused to output a ringing tone. It is checked in step S510 if the incoming call signal is input predetermined times (e.g., three times). If NO in step S510, calling is continued. If the handset 203 is taken off the hook during this interval, a channel is formed between the responding and calling telephones, thus allowing talking communication.

If the handset 203 is not taken off the hook after the incoming call signal is input predetermined times, the flow advances to step S511, and the telephone line switching circuit 4 is instructed to form a DC loop with the telephone line 31, thus making a response. Then, the telephone line 31 is connected to the hybrid circuit 6. It is checked in step S512 if data reception accompanying a carrier signal as facsimile reception is performed. If the carrier signal cannot be detected from the telephone line, since data communication cannot be performed, a wrong telephone call is determined, and the telephone line is released in step S513. The flow then returns to step S503.

If the data signal is detected, the flow advances to step S515, pre-procedure processing, e.g., detection of states of various apparatuses, is executed. It is checked in step S516 if received information is confidential information. If NO in step S516, the flow advances to step S517; otherwise, the flow advances to step S525.

In step S517, reception processing of image information sent after the pre-procedure processing in step S515 is executed. At the same time, in step S518, the received information is supplied to the V27/V29 demodulator 16 through the above-mentioned path, and the demodulated signal is supplied to the decoder 17 without going through the memory circuit 23. Then, the decoded information is printed out from the printer 18. Upon completion of reception of image information, predetermined post procedure processing is executed in step S519, and the flow advances to step S513.

In step S525, input image information is received, and is demodulated by the V27/V29 demodulator 16. At the same time, in step S526, the demodulated data is sequentially stored in the memory circuit 23. Upon completion of reception of image information, predetermined post procedure processing is executed in step S527. In step S528, the line is released, and the flow advances to step S530.

It is checked in step S530 if the received confidential information designates a group number. If YES in step S530, the flow advances to step S531, and the data transmission control circuit 14 is instructed to energize the confidential reception display circuit 238 of only a telephone corresponding to the group designated by the group number to perform the "presence of confidential reception" display. At the same time, the confidential reception display circuit 119 is energized to display the designated group number, and the like. The flow then returns to step S503.

If NO in step S530, the flow advances to step S532, and the data transmission control circuit 14 is instructed to energize the confidential reception display circuits 238 of all the telephones to perform a "presence of confidential reception" display. At the same time, the confidential reception display circuit 119 is energized. The flow then returns to step S503.

Control on the side of the telephone will be explained below with reference to FIG. 31.

The control unit 201 checks in step S541 if the data interface 210 receives a control signal from the data transmission control circuit 14. If NO in step S541, it is checked in step S542 if a key input from the keyboard 206 is detected. If NO in step S542, the flow returns to step S541.

If YES in step S542, the flow advances to step S543, and processing corresponding to the key input is executed. For example, when the handset 203 is taken off the hook and the telephone number keys are operated, the signal tone generator 204 is instructed to generate a corresponding telephone number signal (e.g., a DTMF signal). After the corresponding processing, the flow returns to step S541 to prepare for the next key input.

If YES in step S541, i.e., if the control signal from the data transmission control circuit 14 is received, the flow advances to step S545 to check if the received control signal is an energization signal of the confidential reception display circuit 238. If YES in step S545, the flow advances to step S546, and the confidential reception display circuit 238 is energized to display the "presence of confidential reception". The flow then returns to step S541.

If NO in step S545, the flow advances to step S550 to check if the received control signal is a deenergization signal of the confidential reception display circuit 238. If YES in step S550, the flow advances to step S551, and the confidential reception display circuit 238 is deenergized to turn off the "presence of confidential reception" display. The flow then returns to step S541.

If NO in step S550, the flow advances to step S555, and processing corresponding to the received control signal is executed. The flow returns to step S541.

As described above according to the present invention, when confidential reception is performed for the data communication apparatus, reception of confidential information can be known at a nearby telephone, and received confidential data can be quickly output.

When a telephone is placed on a desk and the facsimile apparatus is placed at the corner of a room, a person who should receive confidential information can immediately know at his desk that confidential reception is performed, and can output the received confidential information. For this reason, the received data can be prevented from being kept unnecessarily stored in the memory circuit 23, and the memory circuit can be effectively utilized for next data reception.

In this embodiment, after confidential reception is completed, the "presence of confidential reception" display is performed on a telephone terminal. However, the present invention is not limited to this. For example, when confidential reception is started, the "presence of confidential reception" display can be performed on a telephone terminal.

According to the present invention as described above, confidential reception can be reliably and quickly detected, and confidential information can be quickly output. In addition, a memory of the apparatus can be effectively used.

EIGHTH EMBODIMENT

In this embodiment, in a communication system constituted by connecting a plurality of telephones and a plurality of data communication apparatuses through communication media, when a data communication apparatus performs data reception, a party to be called can be designated from the transmission side. A reception side comprises a means for classifying and sorting received data in units of telephones of the designated party, and a message indicating that data reception is performed can be displayed on the telephone of the designated party. After completion of the reception, while the classified data is left in the data communication apparatus, a message indicating the presence of received data is displayed on the telephone of the designated party.

When a plurality of persons use a single data communication apparatus, a telephone can display a message indicating which person's data being received is addressed to and which person's data being left is addressed to. Thus, a target person can be easily known.

A target person who should receive information can immediately know reception of data addressed to him or her, and can reliably and easily know the position of received data addressed to him or her.

Figure 32A:
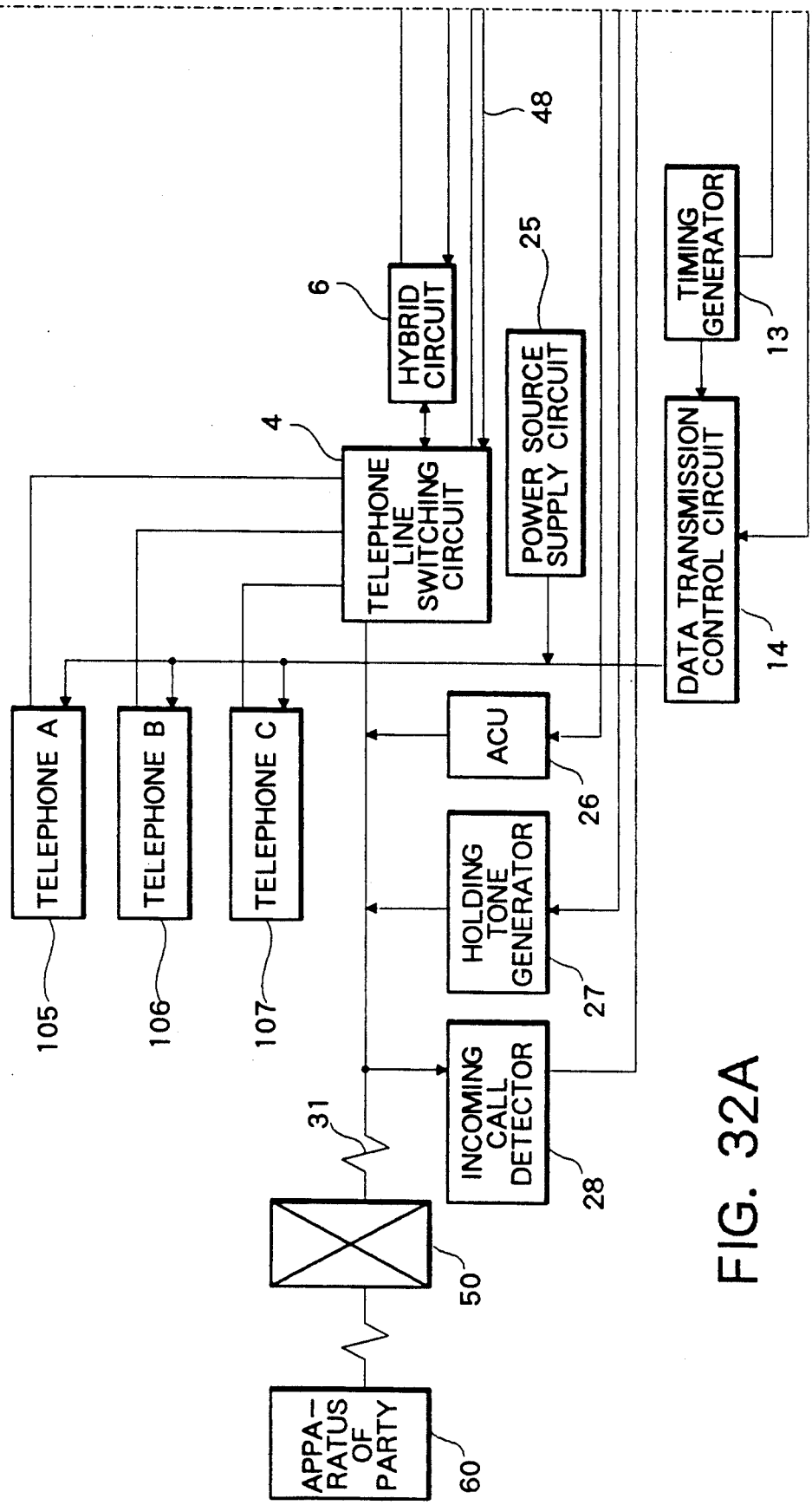
FIGS. 32A and 32B are detailed block diagrams of a controller according to an eighth embodiment of the present invention.
Figure 32B:
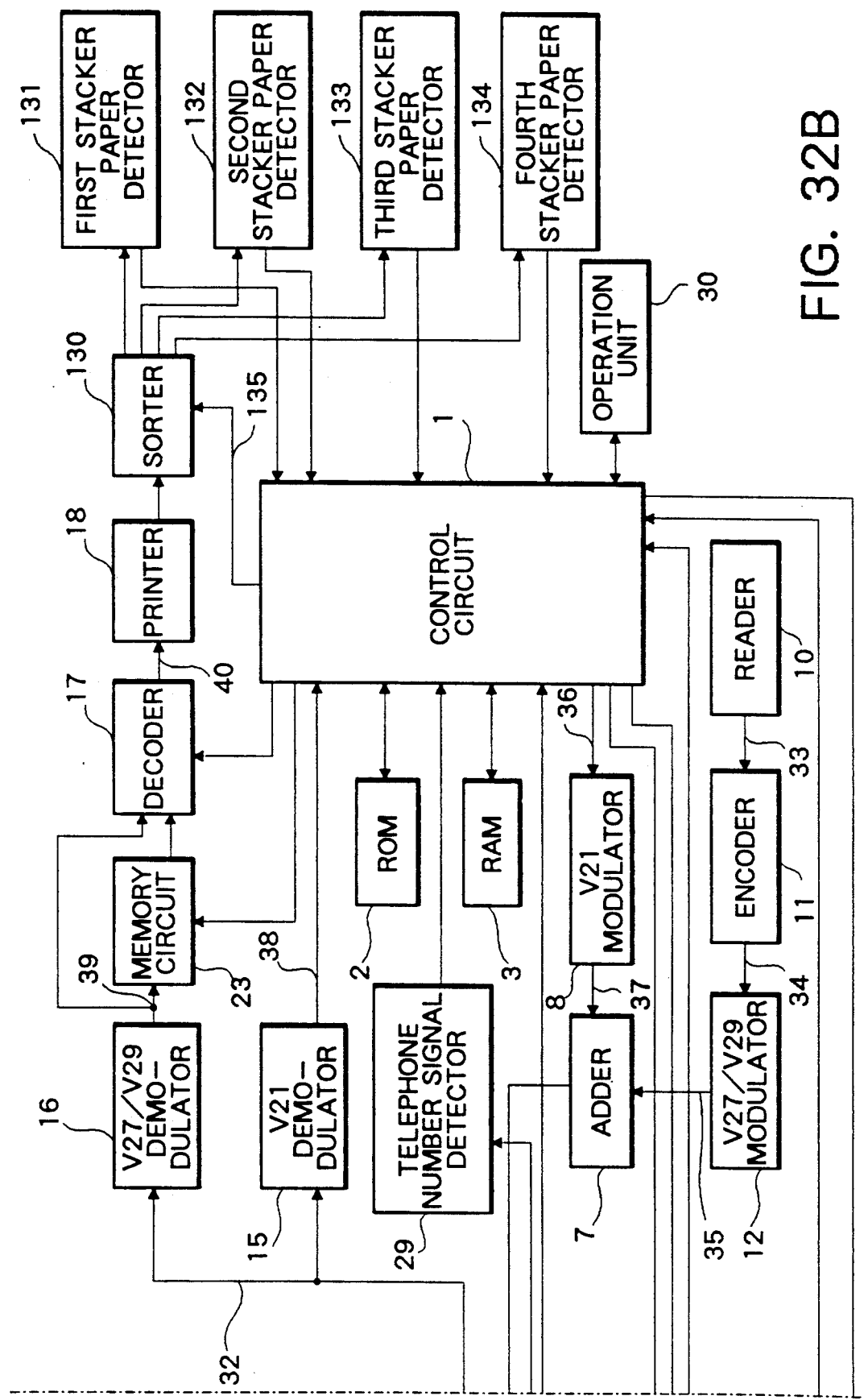

FIGS. 32A and 32B show the detailed arrangement of the controller 150 at the reception side. In FIGS. 32A and 32B, the same reference numerals denote the same parts as in FIGS. 6A and 6B, and a detailed description thereof will be omitted.

Figure 34B:
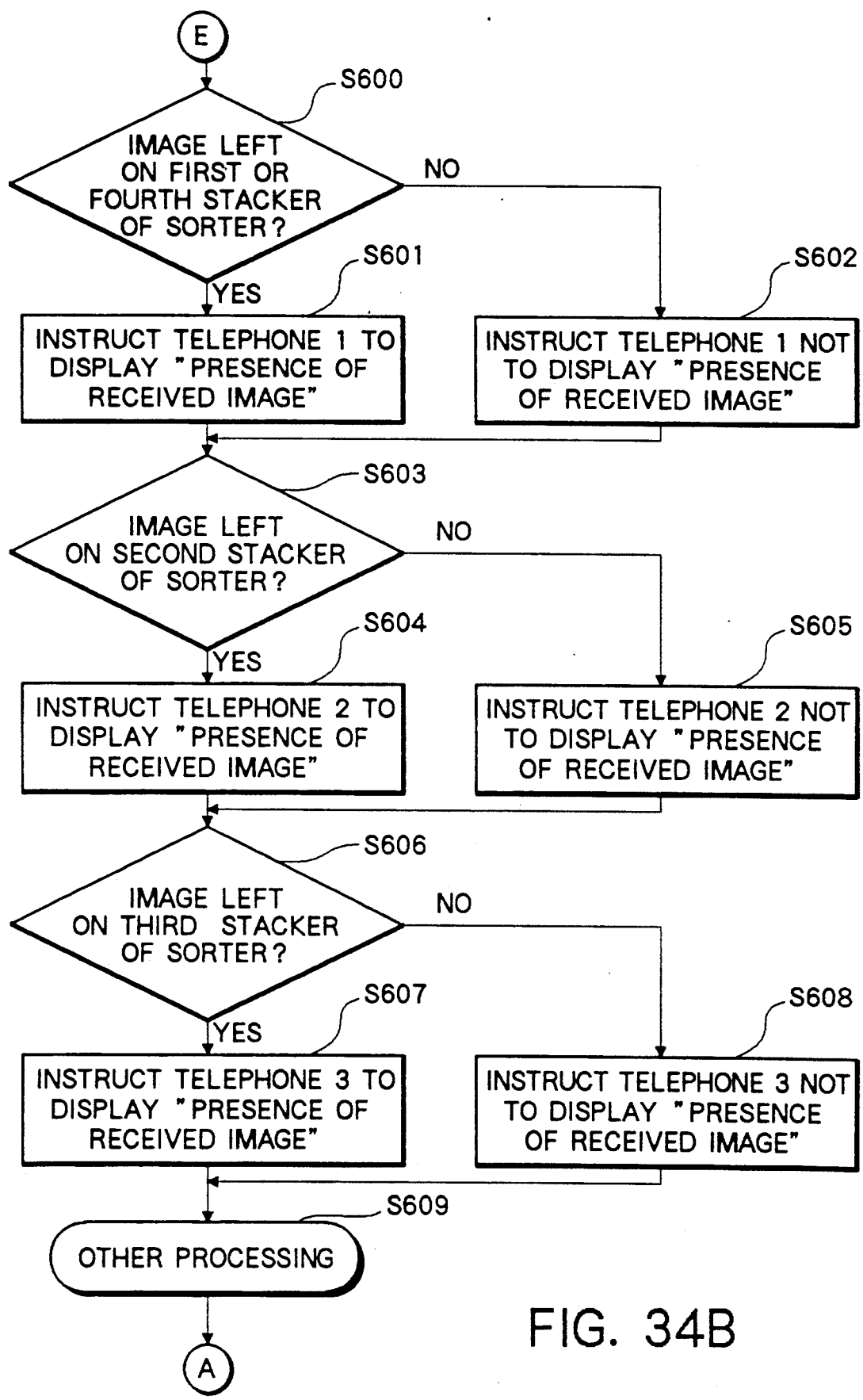
FIGS. 34A(1) to 34B are control flow charts of the controller of the eighth embodiment.

In FIGS. 32A and 32B, the ROM 2 stores a program shown in FIGS. 34A and 34B to be described later.

Reference numeral 130 denotes a sorter connected to the printer 18. Received data outputs are sorted to first to fourth stackers under the control of the printer 18. Reference numeral 131 denotes a first stacker paper detector for detecting whether nor not output paper is left in the first stacker; 132, a second stacker paper detector for detecting whether or not output paper is left in the second stacker; 133, a third stacker paper detector for detecting whether or not output paper is left in the third stacker; and 134, a fourth stacker paper detector for detecting whether or not output paper is left in the fourth stacker.

With the above arrangement, when received information is printed out by the printer 18, output paper sheets of the received data are sorted by the sorter 130, and the sorted sheets are output to the corresponding stackers. This sorting is performed under the control of the control circuit 1. If data "1" is supplied from a control signal line 135 to the sorter 130, the sheet is stored in the first stacker; if "2", the second stacker; if "3", the third stacker; and if "4", the fourth stacker.

The detailed arrangement of the telephones A to C (105 to 107) of this embodiment having the same arrangement will be described below with reference to FIG. 33.

Figure 33:
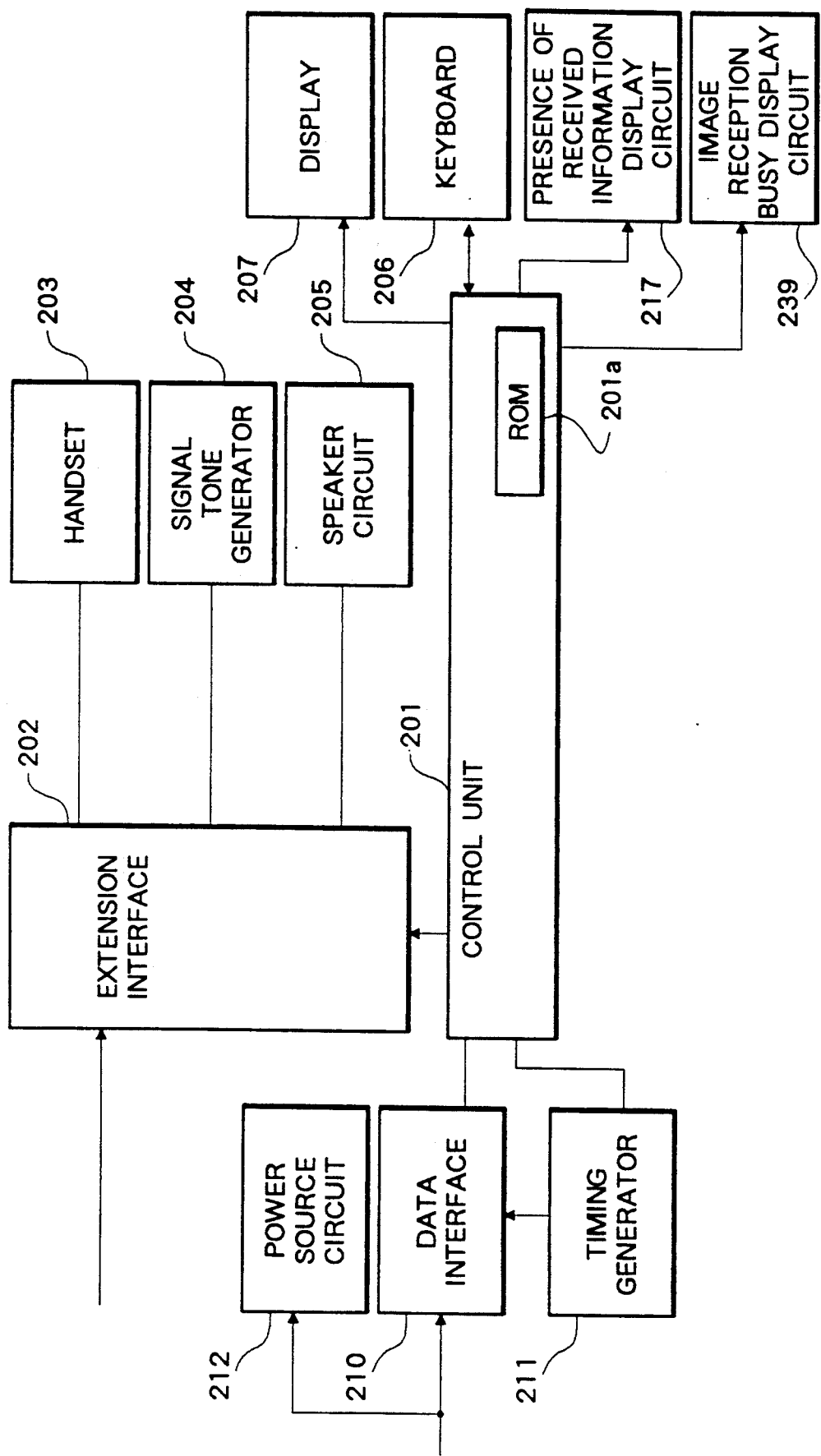
FIG. 33 is a detailed block diagram of a connecting telephone of the eighth embodiment.

In FIG. 33, the same reference numerals denote the same parts as in FIGS. 6A and 6B, and a detailed description thereof will be omitted.

Figure 35:
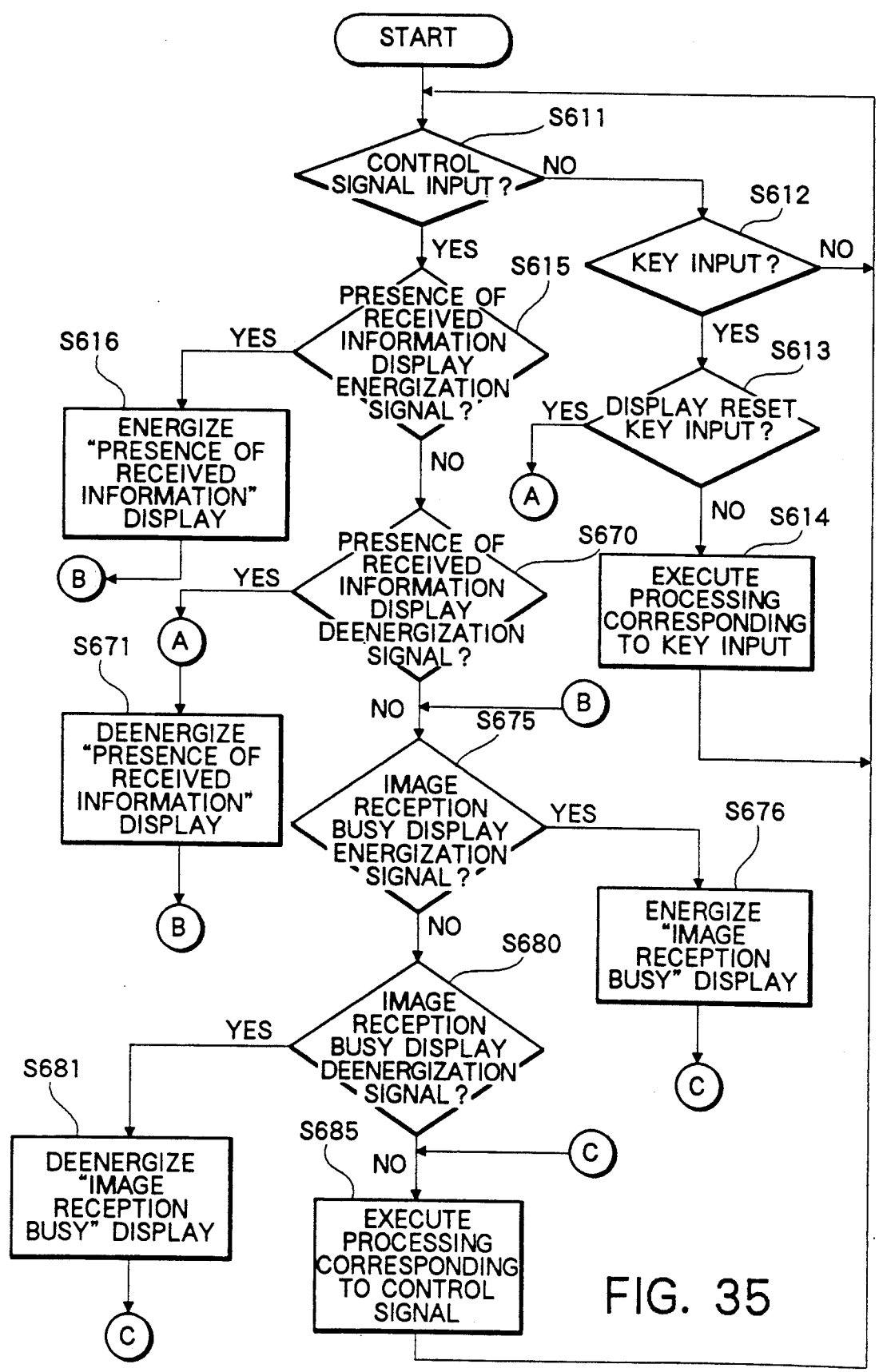
FIG. 35 is a control flow chart of the connecting telephone of the eighth embodiment.

In this embodiment, an image information reception busy display circuit 239 is added as compared to the arrangement of FIGS. 6A and 6B, and the ROM 201a stores a program shown in FIG. 35 to be described later.

The reception apparatus and the telephones of this embodiment have the arrangements as described above. A telephone near a party to be called is selected based on a party designation from the transmission-side apparatus and is caused to display the "presence of received information", and received information is selectively output to the stackers, as will be described later.

In the transmission-side apparatus, e.g., the facsimile apparatus, the above-mentioned specifial arrangement is not required, and can be a conventional one if it can designate a telephone number. Therefore, the transmission-side apparatus of this embodiment can be the apparatus illustrated in FIGS. 15A and 15B. For this reason, a description about the transmission-side apparatus will be made based on the arrangement shown in FIGS. 15A and 15B.

In the transmission-side apparatus of this embodiment, during data transmission, a document to be transmitted is read by the reader 10, and is encoded by the encoder 11. The encoded data is modulated by the V27/V29 modulator 12, and is added to procedure modulation signal 37 from the V21 modulator 18 by the adder 7. The sum data is transmitted to the apparatus of a party on the other end of the line through the hybrid circuit 6 and the NCU 114. In this case, a telephone number of a party to be called can be designated. When the telephone number of the party to be called is transmitted together with the image data, the transmitted information can be stored at a stacker position corresponding to the designated telephone at the reception side, and the presence of data transmission can be displayed on the designated telephone.

Figure 36A:
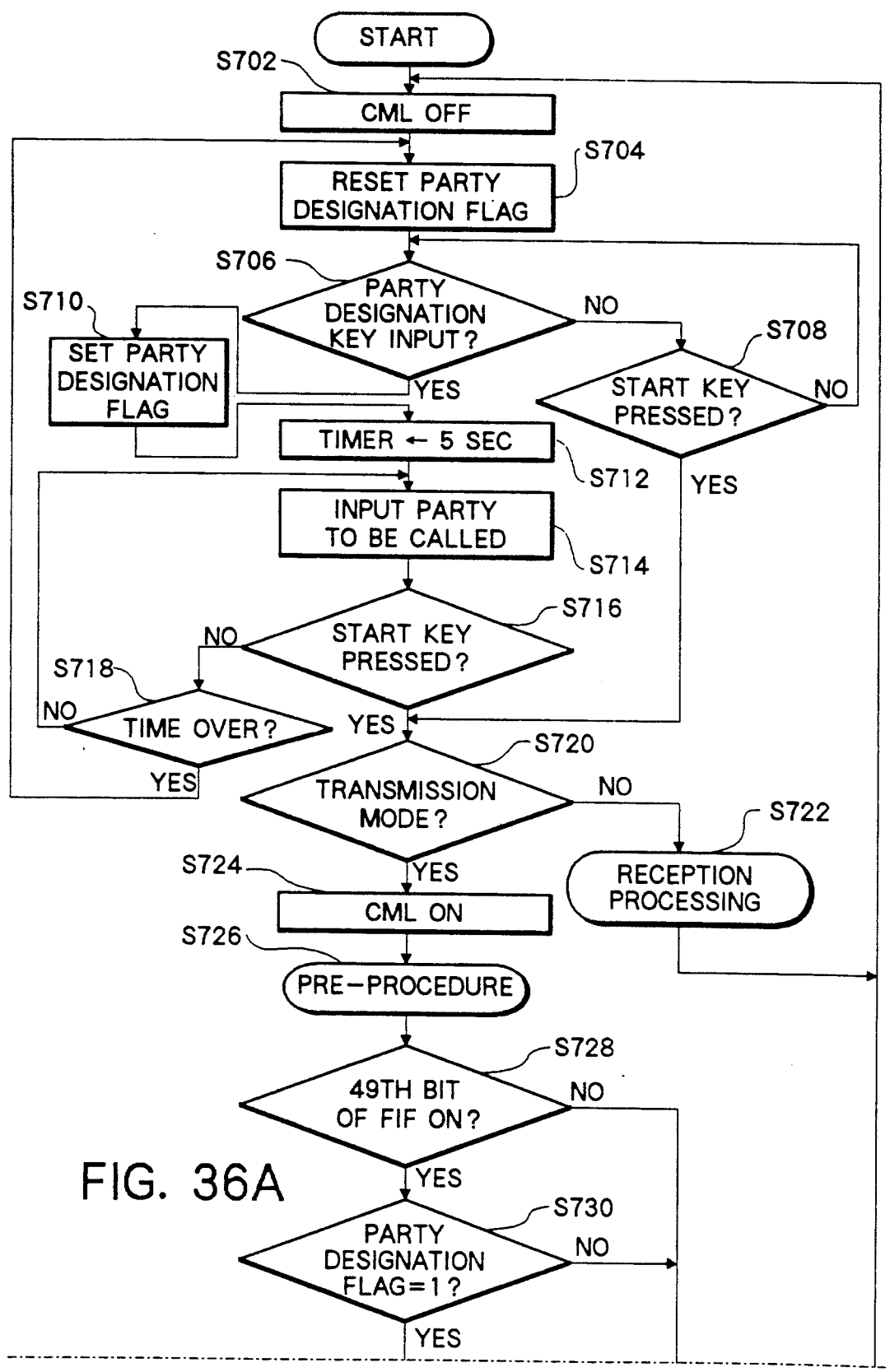
FIGS. 36A and 36B are control flow charts of a transmission-side apparatus of the eighth embodiment.
Figure 36B:
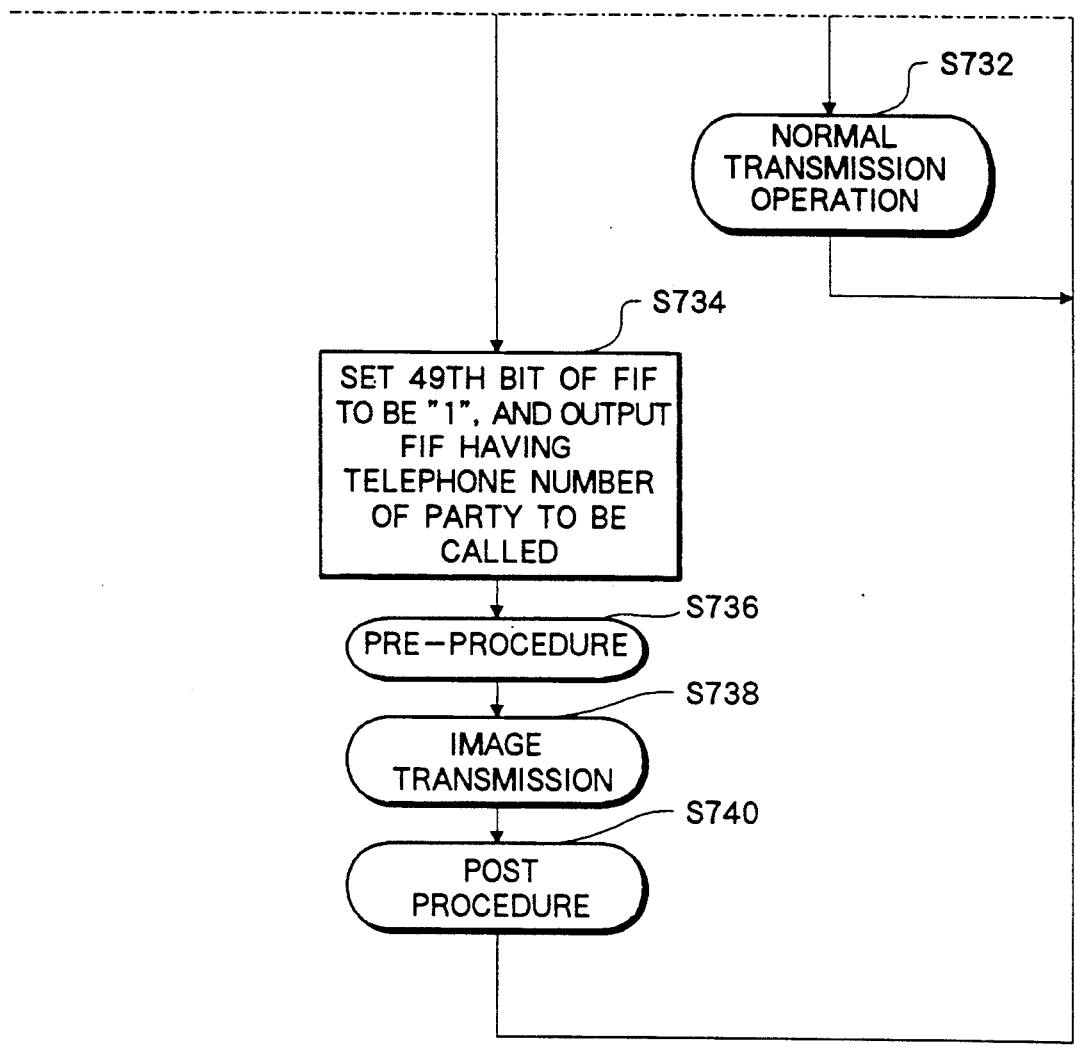

The ROM 2 of the transmission-side apparatus of this embodiment stores a program shown in FIGS. 36A and 36B to be described later.

The operation of the communication system of this embodiment with the above arrangement will be described hereinafter with reference to the flow charts of FIGS. 34A(1) to 36B.

The control operation of the controller 150 as the reception-side apparatus shown in FIGS. 32A and 32B will be explained below with reference to FIGS. 34A(1), 34A(2), 34B(1) and 34B(2).

When the controller 150 is powered, the flow advances to step S560, and the data transmission control circuit 14 is controlled to output a control signal for deenergizing the presence of received information display circuits 217 of all the connected telephones so as not to display the "presence of received information". In step S561, the telephone line switching circuit 4 is instructed to open the telephone line 31. In step S562, the data transmission control circuit 14 is controlled to output a control signal for deenergizing the image reception busy display circuits 217 of all the connected telephones so as not to display the "image reception busy". It is checked in step S563 if a call originating request is input by operating one-touch dialing or index number dialing key on the operation unit 30 or the handset 203 of the connecting telephone is taken off the hook to issue a call originating request. If YES in step S563, known call originating processing is executed in step S564.

If NO in step S563, the flow advances to step S565 to check if the incoming call detector 28 detects an incoming call from the telephone line 31 or the like or an incoming call is input. If NO in step S563, the flow advances to step S600.

If YES in step S563, the flow advances to step S566, and when a telephone which should output a ringing signal (should ring a bell) is designated, the designated telephone is connected to the telephone line 31 and is caused to output a ringing tone. When no telephone is designated, a predetermined specific telephone, e.g., the telephone A 105 is connected to the telephone line 31 and is caused to output a ringing tone. It is checked in step S567 if the incoming call signal is input predetermined times. If NO in step S567, calling is continued. If the handset 203 is taken off the hook during this interval, a channel between the responding and calling telephones is formed, thus allowing talking communication.

If the handset 203 is not taken off the hook after the incoming call signal is input predetermined times, the flow advances from step S567 to step S568. In step S568, the telephone line switching circuit 4 is instructed to form a DC loop with the telephone line 31 to make a response, and the telephone line 31 is connected to the hybrid circuit 6. It is checked in step S569 if data reception accompanying a carrier signal as facsimile transmission is performed. If the carrier signal cannot be detected from the telephone line, since data communication cannot be performed, the flow advances to step S599.

If YES in step S569, the flow advances to step S570, and pre-procedure processing, e.g., detection of states of various apparatuses, is executed to execute synchronization processing with the apparatus of the party. Note that when the facsimile reception mode is manually set after normal talking communication processing is performed, the flow advances to the processing after step S570.

In the apparatus of this embodiment, a party to be called can be designated upon reception. A 49th bit of an FIF of an "NSS" signal is set to be "1" to inform that this apparatus can designate the party to be called. It is checked in step S571 if a party to be called (telephone which should display the "presence of received information") is designated, i.e., if the 49th bit of the FIF of the "NSS" signal (to be described later) is "1". If the 49th bit of the FIF of the "NSS" signal is "0" and no telephone is designated, the flow advances to step S575, and an instruction is output to sort received information into the fourth stacker of the sorter 130, which is used when no designation is made. In step S576, the image reception busy display circuit 239 of a predetermined specific telephone, e.g., the telephone A 105 similarly used when no designation is made is caused to display the "image reception busy", and the flow advances to step S590.

If the 49th bit of the FIF of the "NSS" signal is "1", the flow advances to step S577 to check if the designated telephone is the telephone A 105. If YES in step S577, an instruction is made to sort received information into the first stacker of the sorter 130 used when the telephone A 105 is designated. In step S579, the image reception busy display circuit 239 of the telephone A 105 is caused to display the "image reception busy", and the flow advances to step S590.

If NO in step S577, the flow advances to step S580 to check if the designated telephone is the telephone B 106. If YES in step S580, an instruction is made to sort received information into the second stacker of the sorter 130 used when the telephone B 106 is designated. In step S582, the image reception busy display circuit 239 of the telephone B 106 is caused to display the "image reception busy", and the flow advances to step S590.

If NO in step S580, the flow advances to step S585 to check if the designated telephone is the telephone C 107. If YES in step S585, an instruction is made to sort received information into the third stacker of the sorter 130 used when the telephone C 107 is designated. In step S587, the image reception busy display circuit 239 of the telephone C 107 is caused to display the "image reception busy", and the flow advances to step S590.

In step S590, the pre-procedure processing is executed again, and in step S591, reception processing of image information sent after the pre-procedure processing is executed. At the same time, in step S592, the received information is supplied to the V27/V29 demodulator through the above-mentioned path, and the demodulated signal is supplied to the decoder 17 without going through the memory circuit 23. The decoded signal is then printed out by the printer 18. In this case, the sorter 130 is set up to be capable of sorting and stacking the image output print paper sheets into a corresponding stacker. Therefore, the output paper sheet is stacked in the previously designated stacker of the sorter 130. When reception and print-out of image information are completed, predetermined post procedure processing is executed in step S593, and the flow returns to step S561.

When the recording paper is used up during printing, the signal demodulated by the V27/V29 demodulator 16 is temporarily stored in the memory circuit 23, and when loading of new recording paper is completed, the received information stored in the memory circuit 23 is read ut and is output to the printer 18. In this case, the sorter 130 sorts and stacks the output prints in the designated stacker.

If NO in step S569, the flow advances to step S599, and a wrong telephone call is determined and the telephone line is released. Thereafter, the flow advances to step S600. The first and fourth stacker paper detectors 131 and 134 are checked to determine whether or not output paper sheets from the printer 18 are left stacked in the first or fourth stacker. If YES in step S600, the flow advances to step S601, and the presence of received information display circuit 217 of the telephone A 105 is energized to perform the "presence of received information" display. Thereafter, the flow advances to step S603.

If NO in step S600, the flow advances to step S602, and the presence of received information display circuit 217 of the telephone A 105 is deenergized to turn off the "presence of received information" display. The flow then advances to step S603.

The second stacker paper detector 132 is checked in step S603 to determine whether or not the output paper from the printer 18 is left stacked in the second stacker of the sorter 130. If YES in step S603, the flow advances to step S604, and the presence of received information display circuit 217 of the telephone B 106 is energized to perform the "presence of received information" display. Thereafter, the flow advances to step S606.

If NO in step S603, the flow advances to step S605, and the presence of received information display circuit 217 of the telephone B 106 is deenergized to turn off the "presence of received information" display. The flow then advances to step S606.

The third stacker paper detector 133 is checked in step S606 to determine whether or not the output paper from the printer 18 is left stacked in the third stacker of the sorter 130. If YES in step S606, the flow advances to step S607, and the presence of received information display circuit 217 of the telephone C 107 is energized to perform the "presence of received information" display. Thereafter, the flow advances to step S609.

If NO in step S606, the flow advances to step S608, and the presence of received information display circuit 217 of the telephone C 107 is deenergized to turn off the "presence of received information" display. The flow then advances to step S609.

In step S609, another corresponding processing is performed, and the flow returns to step S563.

With the above control operation, when received data is present, this can be displayed on a nearby telephone. A person who should receive the data can immediately obtain desired received data without taking an fruitless action. In this case, since received information is stacked in a stacker corresponding to a telephone (receiving person), information addressed thereto can be recognized as soon as possible.

Control on the telephone side will be explained below with reference to FIG. 35.

The control unit 201 checks in step S611 if the data interface 210 receives a control signal from the data transmission control circuit 14. If NO in step S611, the flow advances to step S612 to check if the key input from the keyboard 206 is detected. If NO in step S612, the flow returns to step S611.

If YES in step S612, the flow advances to step S613 to check if the key input corresponds to the "display reset key" input. If YES in step S613, the flow advances to step S671, and the presence of received information display circuit 217 is deenergized to turn off the "presence of received information" display. The flow returns to step S611.

If NO in step S613, the flow advances to step S614, and processing corresponding to the key input is executed. For example, if the handset 203 is taken off the hook and the telephone number keys are depressed, the signal tone generator 204 is instructed to output a corresponding telephone number signal (e.g., a DTMF signal). After the corresponding processing, the flow returns to step S611 to prepare for the next key input.

If YES in step S611, i.e., if the control signal from the data transmission control circuit 14 is received, the flow advances to step S615 to check if the received control signal is an energization signal of the presence of received information display circuit 217. If YES in step S615, the flow advances to step S616, and the presence of received information display circuit 217 is energized to display the "presence of received information". The flow then advances to step S675.

If NO in step S615, the flow advances to step S670 to check if the received control signal is a deenergization signal of the presence of received information display circuit 217. If YES in step S670, the flow advances to step S671, and the presence of received information display circuit 217 is deenergized to turn off the "presence of received information" display. The flow then advances to step S675. The deenergization signal of the presence of received information display circuit 217 is output when the information corresponding to the designated telephone is taken out from the corresponding stacker.

If NO in step S670, the flow advances to step S675 to check if the facsimile unit 152 is receiving image data, and the received control signal is an energization signal of image reception busy display circuit 239. If YES in step S675, the flow advances to step S676, and the image reception busy display circuit 239 is energized to display the "image reception busy". The flow then advances to step S685.

If NO in step S675, the flow advances to step S680 to check if a deenergization signal of the image reception busy display circuit 239 is received. If YES in step S680, the flow advances to step S681, and the "image reception busy" display is turned off. Thereafter, the flow advances to step S685. The deenergization signal of the image reception busy display circuit 239 is output when data reception of the facsimile unit 152 is ended.

If NO in step S680, the flow advances to step S685, and processing corresponding to the received control signal is executed. The flow then returns to step S611.

As described above, according to this embodiment, when the data reception apparatus performs reception, the reception can be known by a nearby telephone. After reception, since received information is sorted and stacked in a predetermined stacker position, data can be quickly obtained.

When a telephone is placed on a desk and the facsimile apparatus is placed at the corner of a room, a person who should receive information can immediately know at his or her desk that reception addressed to him or her is made, and can immediately obtain the received information.

Transmission control of the facsimile apparatus on the transmission side will be described below with reference to FIGS. 36A and 36B.

When the apparatus is powered, the flow advances to step S702, and a CML signal is turned off to release the line. In step S704, a party designation flag in a control circuit (not shown) is reset. It is checked in step S706 if the party designation key of the operation unit 126 is depressed and a detection signal from the party designation key input detector 119 is input. If NO in step S706, the flow advances to step S708 to check if the start key of the operation unit 126 is operated and a detection signal from the start key input detector 121 is input. If NO in step S708, the flow returns to step S706. However, if YES in step S708, the flow advances to step S720.

If YES in step S706, the flow advances to step S710, and the party designation flag is set. In step S712, 5 sec are set in the timer circuit 115, and the 5-sec timer is started. Since the party to be called is designated using the telephone number keys of the operation unit 126 in step S714, this information is fetched. It is checked in step S716 if the start key is depressed and a detection signal from the start key input detector 121 is input. If NO in step S716, it is checked in step S718 if the timer circuit 115 is time out, i.e., if the party information and start key are input before the lapse of 5 sec from the input of the party designation key. If NO in step S716, the flow returns to step S714 to wait for inputs of the party information and the start key. Therefore, when a party to be called, i.e., a telephone for performing reception display of the party is designated and the stacker position of the sorter 130 is designated, inputs are made within 5 sec. If no input is made within this time interval, processing is performed regardless of telephone designation.

If the start key is input and the detection signal from the start key input detector 121 is input, the flow advances from step S716 to step S720 to check if the current mode is the transmission mode. If NO in step S720, since the reception mode is selected, the flow advances to step S722, and reception processing is executed.

If YES in step S720, the flow advances to step S724, and the CML signal is turned on. In step S726, pre-procedure processing is executed. More specifically, the mode signal is set to be "1" to connect the telephone line 31 to the hybrid circuit 6. In addition, synchronization with the apparatus of the party is taken, and the respective components are initialized. It is checked as a result of pre-procedure in step S728 if the reception apparatus of the party is an apparatus capable of designating a party to be called, as shown in FIGS. 32A and 32B. If NO in step S728, the flow advances to step S732, and known image information transmission control is executed.

If YES in step S728, since the 49th bit of the FIF of an NSF signal is set to be "1", it is checked in step S730 if the party designation input was previously made and the party designation flag is "1". If NO in step S730, the flow advances to step S732; otherwise, the flow advances to step S734. In step S734, the 49th bit of the FIF area of the NSF signal is set to be "1", and an NSS/TSI/DCS signal having the previously input telephone number information of the telephone of the party in the FIF area is output. The format and transmission method of these signals are known to those who are skilled in the art, and a detailed description thereof will be omitted.

In step S726, pre-procedure processing is executed again. In step S738, image information to be transmitted is read from a document to be transmitted set on the reader 10, and is transmitted to the apparatus of the party. If image information transmission is completed, the flow advances to step S740, and post procedure processing is executed, thus completing transmission processing.

In this embodiment, in order to cause the telephone to perform "presence of received information" display and the like and to designate a stacker to stack transmitted image information, the following input operations are made. That is, at the transmission side, an operator depresses a party designation input key. Subsequently, he or she inputs a telephone number of the seat of a party to be called to specify the telephone to display the "presence of received information". Thereafter, the start key is operated.

However, the present invention is not limited to this. For example, in place of specifying a telephone of a party by inputting the party's telephone number, a party's name can be input, and the transmission- or reception-side apparatus comprises a table in which names and telephone numbers are corresponded to each other, so that a telephone number can be specified with reference to this table. In addition, the number of names corresponding to a telephone is not limited to one. If a plurality of nicknames are given, a single telephone may be specified by these nicknames.

If a name is transmitted to the reception side but cannot find a coincidence, a telephone corresponding to a most similar name can be specified.

With this arrangement, a desired telephone can be designated using a name normally used in place of a series of numerals which are not easy to remember. As a result, an apparatus which can be easily used and free from a designation error can be provided.

In this embodiment, a telephone number or the like is manually input. However, the present invention is not limited to this. For example, in an apparatus comprising one-touch dialing and index number dialing keys, and a time designated transmission function of the operation units 126, the receiving party designation telephone number is assigned to these function keys to be registered. With this arrangement, an apparatus which is free from an input error and is easy to operate can be provided.

In the above description, when no telephone is designated, a predetermined telephone (telephone A 105) is caused to display the "presence of received information, and a specific stacker (fourth stacker) is designated to stack transmitted image information. However, the present invention is not limited to this. For example, when no telephone is designated, all the telephones connected to the reception apparatus may be controlled to display the "presence of received information", and another stacker may be selected as stacker to stack transmitted image information. Thus, if a person who should receive information does not sit at a specific telephone position, he or she can reliably know reception of image information.

In the above description, received information is sorted by the sorter 130. However, the present invention is not limited to this. For example, received image data is stored in a specific area of the memory circuit 23, and a receiving telephone can be specified in accordance with this storage position. In this case, when received image data is stored in the memory circuit 23, the "presence of received image" display is energized. When no received image data is stored in the memory circuit 23, the "presence of received image" display is deenergized. When a readout or print-out request is input from a specific telephone, the received data corresponding to the print-out request can be read out from the corresponding area of the memory circuit 23.

According to this embodiment as described above, reception of information can be reliably and quickly known, and received information can be sorted and output. Thus, information can be quickly obtained without taking a fruitless action.

NINTH EMBODIMENT

In this embodiment, in a communication system constituted by connecting a plurality of telephones and a plurality of data communication apparatuses through communication media, when a data communication apparatus performs data transmission/reception, a receivable data amount at the reception side can be displayed on a telephone connected to the reception-side apparatus. When the receivable amount becomes small, an operator can take an appropriate action at his desk.

Figure 37A:
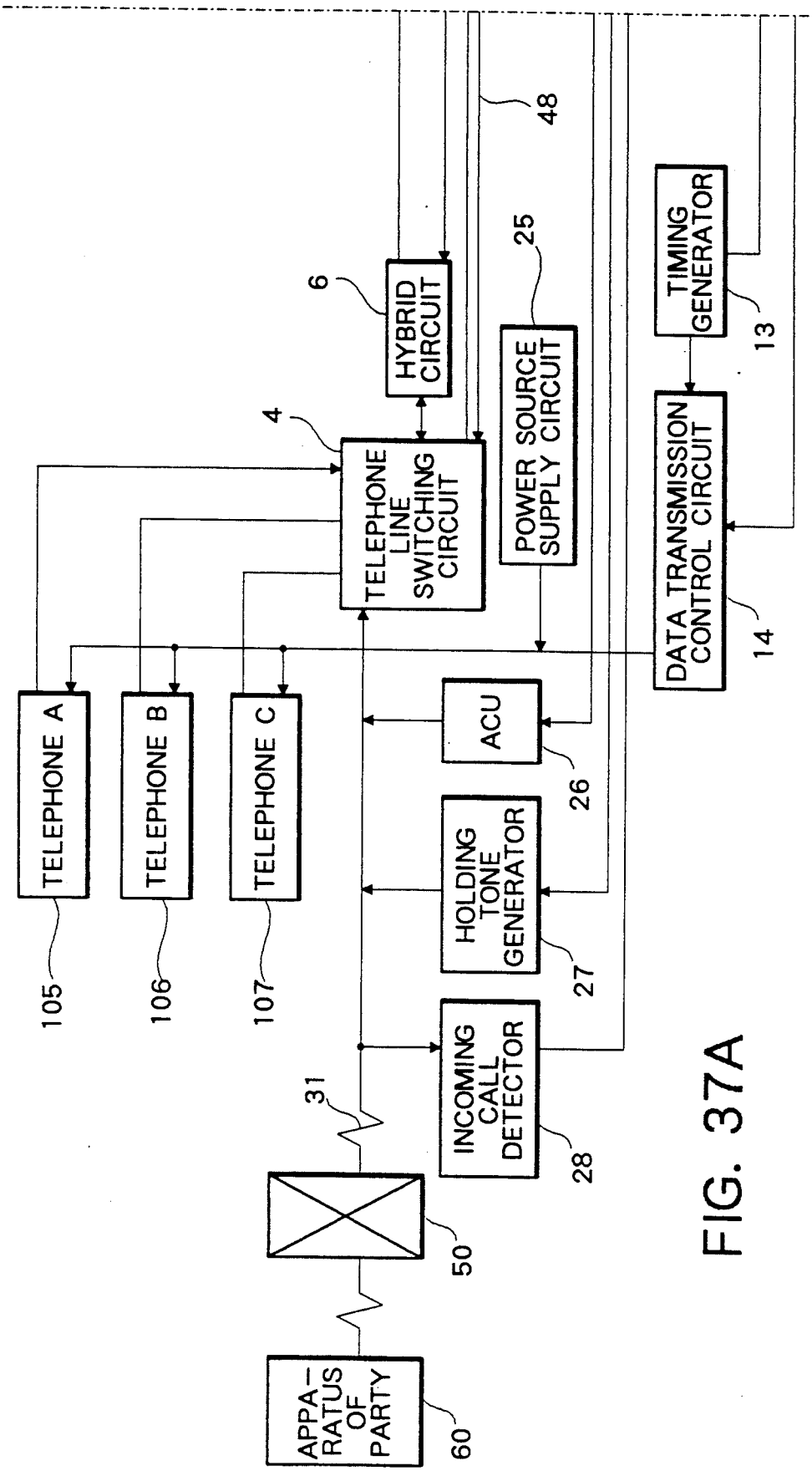
FIGS. 37A and 37B are detailed block diagrams of a controller according to a ninth embodiment of the present invention.
Figure 37B:
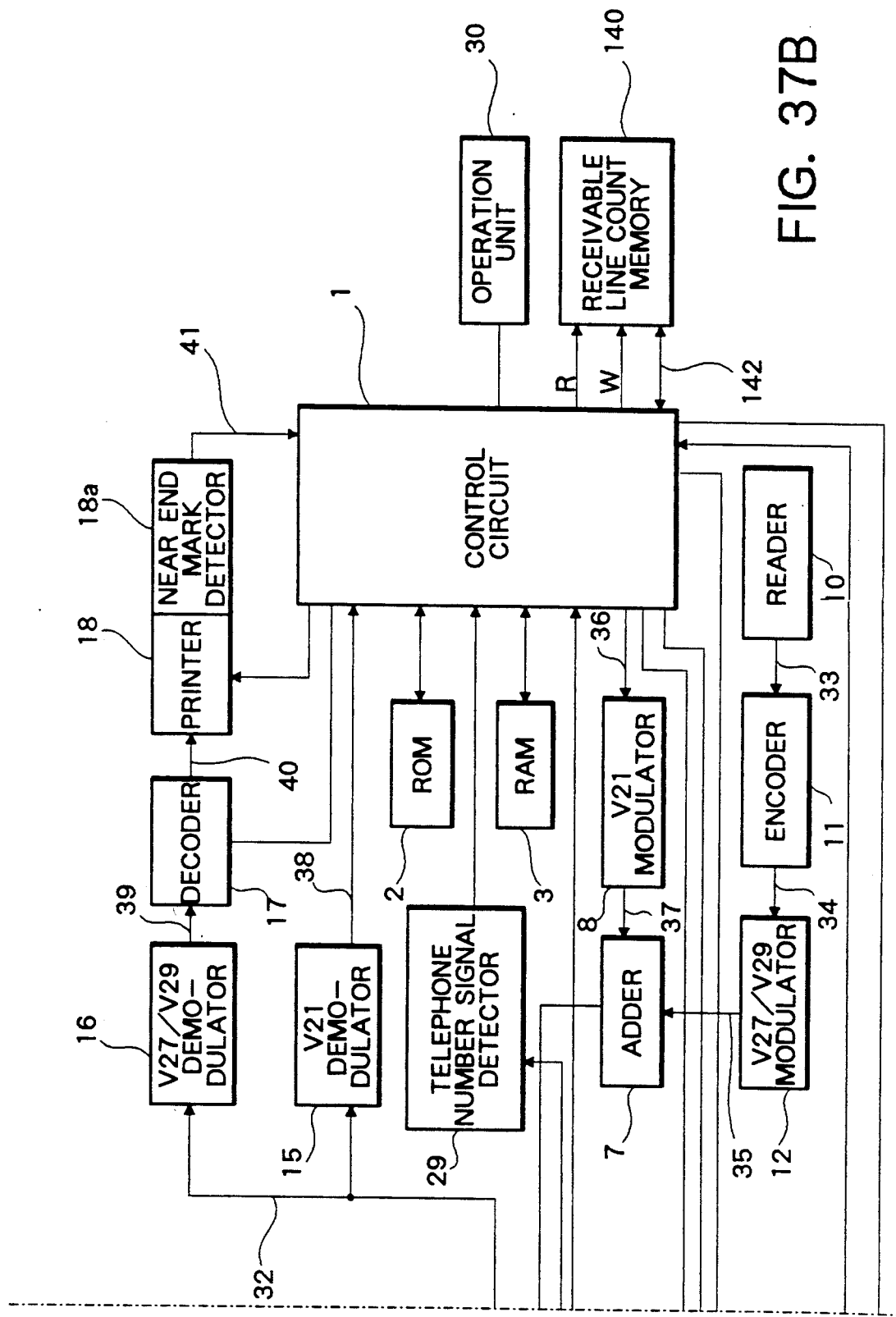

FIGS. 37A and 37B show the detailed arrangement of the controller 150 of this embodiment.

In FIGS. 37A and 37B, the same reference numerals denote the same parts as in FIGS. 2A and 2B, and a detailed description thereof will be omitted.

In this embodiment, the comparator 20 and the emergency pattern generator 21 are omitted from the arrangement shown in FIGS. 2A and 2B.

Figure 39C:
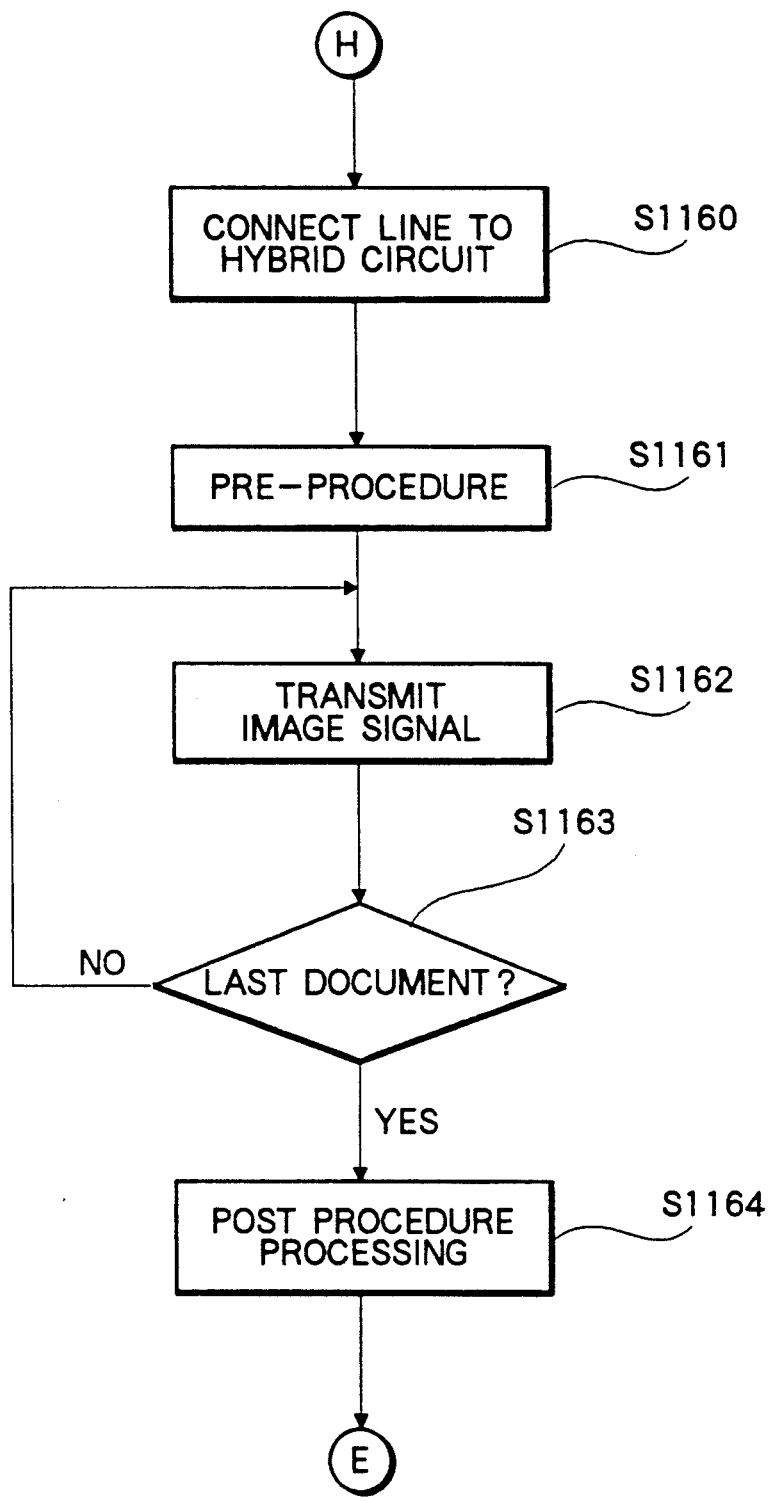
FIGS. 39A(1) to 39C are control flow charts of the controller of the ninth embodiment.

The ROM 2 stores a program shown in FIGS. 39A(1) to 39C. The printer 18 is a known printer for performing a printing operation in accordance with decoded data 40 for every line in the main scanning printer. A recording paper roll is set in the printer 18, and a black stripe indicating "near end" is printed on the rear surface of the recording paper roll by a predetermined length from the end of the recording paper. In this embodiment, a near end mark length is 5 m. The printer 18 comprises a near end mark detector 18a for detecting the near end mark. When the near end mark detector 18a does not detect the near end mark, it sets a detection signal 41 to be "0"; when it detects the mark, sets the signal 41 to be "1".

In this embodiment, a receivable line count memory 140 is added, and stores an amount of data capable of being output to the recording paper, i.e., a receivable line count during data reception in a standard mode (3.85 l/mm). In a data write mode, the control circuit 1 outputs data to be written onto a data signal line 142, and then outputs a write pulse (W) to the receivable line count memory 140 to execute write processing. In a read mode of the stored information, the control circuit 1 outputs a read pulse (R) and fetches data on the data line 142 at a readout timing of the stored data.

The detailed arrangement of the telephones A to C (105 to 107) of this embodiment having the same arrangement will be described hereinafter with reference to FIG. 38.

Figure 38:
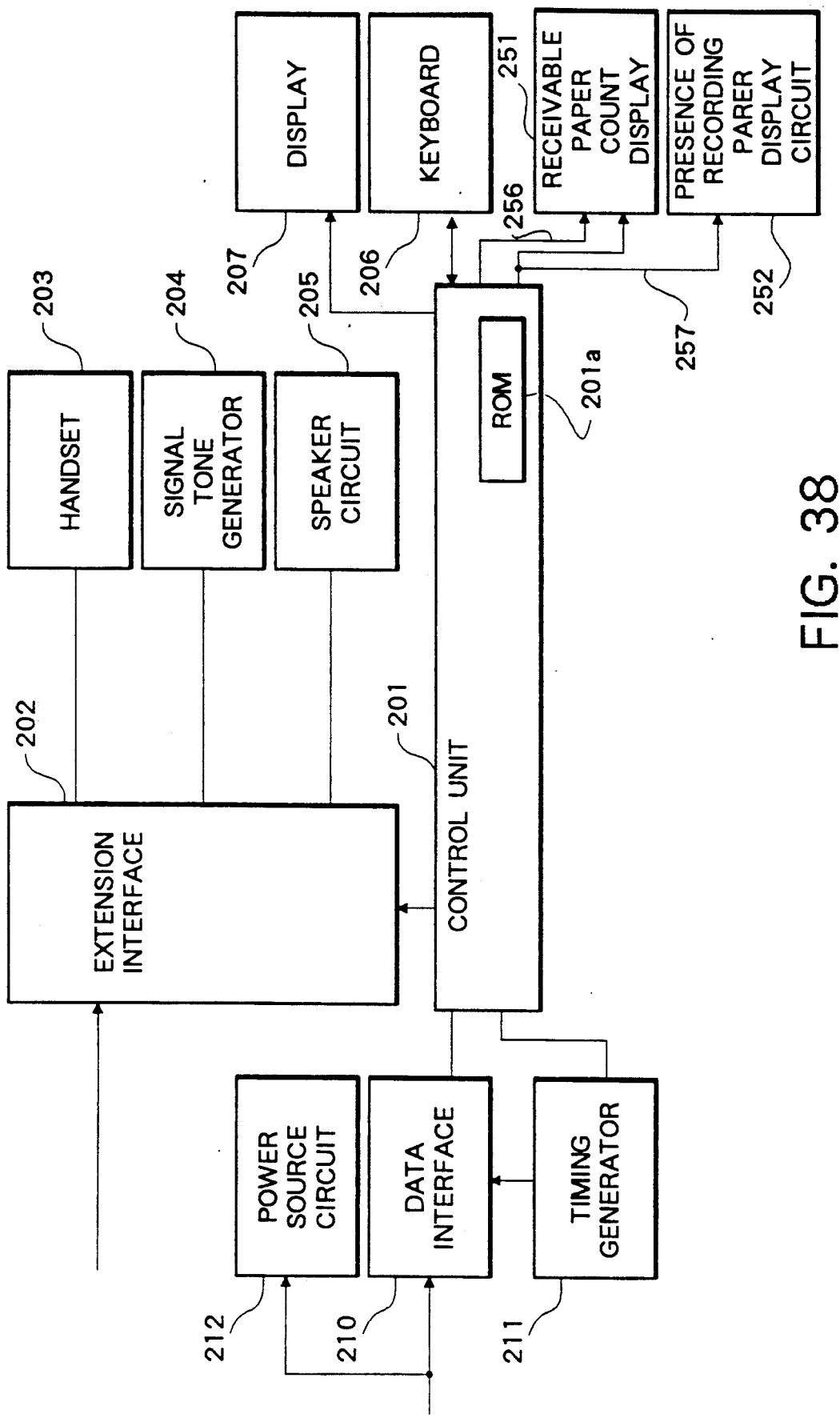
FIG. 38 is a detailed block diagram of a connecting telephone of the ninth embodiment.

In FIG. 38, the same reference numerals denote the same parts as in FIG. 14, and a detailed description thereof will be omitted.

In FIG. 38, the presence of received information display circuit 217 is omitted from the arrangement shown in FIG. 14, and a receivable page count display 251 and a presence of recording paper display circuit 252 are added thereto. The ROM 201a stores a program shown in FIG. 40 (to be described later) and the like.

The receivable page count display 251 receives receivable page count information from the controller 150, which is output onto a signal line 256, and visually displays it. The presence of recording paper display circuit 252 displays that the remaining amount of the recording paper set in the printer of the data reception apparatus is sufficient. When a "0"-level signal is output onto a signal line 257, the display circuit 252 does not perform this display. When a "1"-level signal is output onto the signal line 257, the display circuit 252 informs that the remaining amount is sufficient.

In this embodiment with the above arrangement, when image information communication processing is performed between the facsimile units 152 of the transmission- and reception-side controllers 150, if the recording paper of the reception-side apparatus becomes a near end state, a receivable page count can be recognized, and proper processing can be performed before the paper is used up.

The general operation of this embodiment with the above arrangement will be described hereinafter.

While the near end mark detector 18a of the facsimile unit 152 of the controller 150 does not detect the near end mark of the recording paper, the presence of recording paper display circuit 252 of the telephone displays the "presence of recording paper". When reception is performed, the print-out operation continues, and the recording paper becomes a near end state, the control circuit 1 informs the near end state of the recording paper (e.g., sends a PRI-EOP signal having an FIF (facsimile information field)) to the telephone through the data transmission control circuit 14. At the same time, the presence of recording paper display circuit 252 of the telephone is deenergized to turn off the "presence of recording paper" display. Thereafter, a receivable line count in the standard mode (sub-scanning line density = 3.85 l/mm) is checked. More specifically, immediately after near end mark detection, the remaining amount of the recording paper is 5 m, and can be divided by the sub-scanning line density to obtain the receivable line count. The obtained value is stored in the receivable line count memory 140. Thereafter, an output line count need only be subtracted from the value stored in the memory 140 every time information is output. In this case, if reception is performed in the standard mode, the value of the receivable line count memory 140 is decremented by one each time data of one line is received. If reception is performed in the fine mode, the value of the receivable line count memory 140 is decremented by one each time data of two lines is received.

When reception processing of image information is executed, a recording line count per page is determined based on an information size to be transmitted which is specified by synchronization processing or the like, and the receivable line count is divided by this value and rounded off to obtain a receivable page count. In this case, even if a long document is received, the receivable number of documents having a sub-scanning length which are to be received thereafter can be accurately displayed on the telephone in real time.

Figure 40:
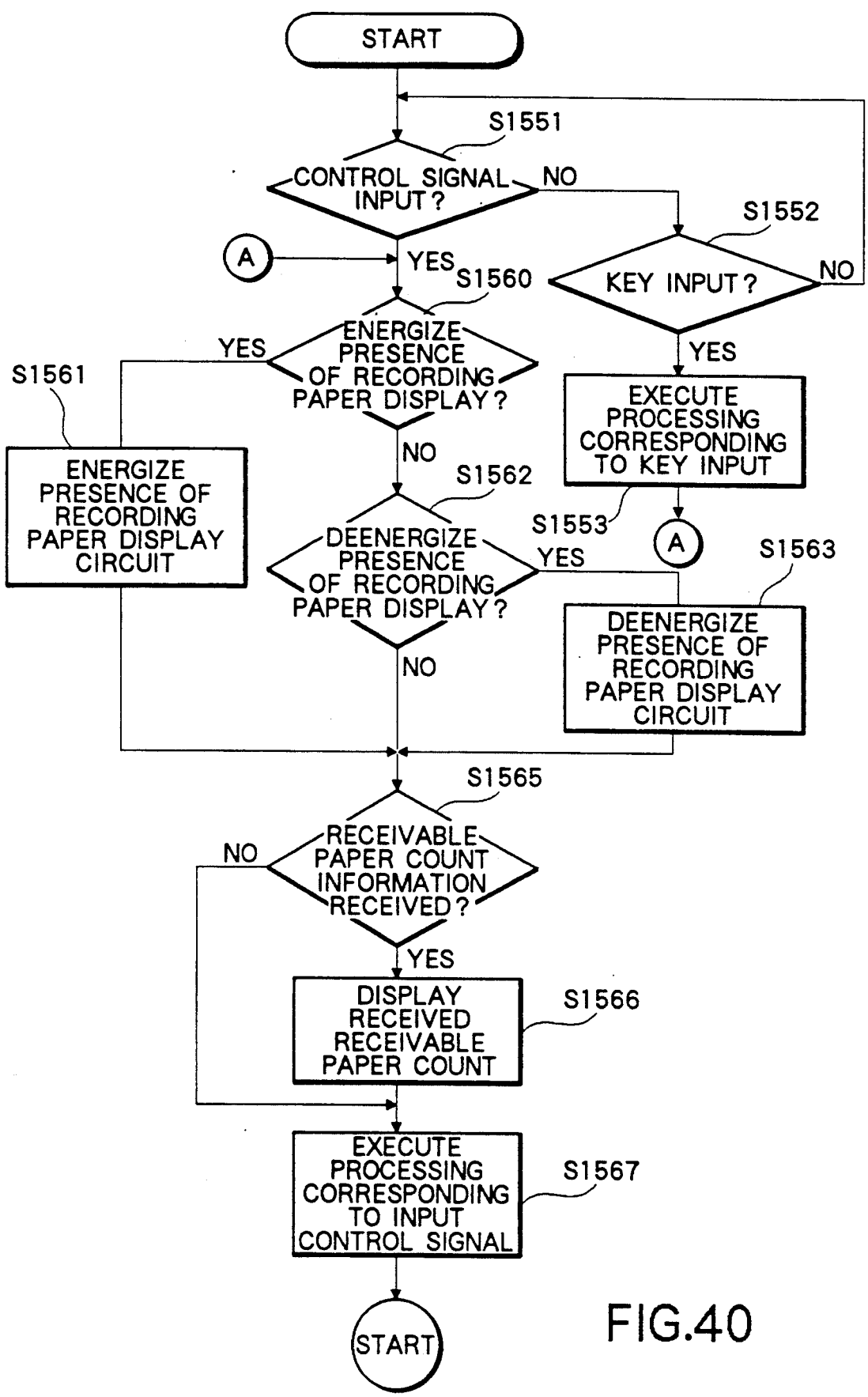
FIG. 40 is a control flow chart of the connecting telephone of the ninth embodiment.

The above-mentioned operation control will be described in detail hereinafter with reference to the flow charts shown in FIGS. 39A(1) to 39C and FIG. 40.

The communication control operation of the controller 150 shown in FIG. 37 will be explained below with reference to FIGS. 39A(1) to 39C.

When the controller 150 is powered, the flow advances to step S1151, and the telephone line switching circuit 4 is instructed to open the telephone line 31. In step S1152, an FBLKD flag in the RAM 3 indicating that the near end mark detector 18a detects the near end mark is reset to be "0". In step S1153, the presence of recording paper display circuit 252 is deenergized to turn off the "presence of recording paper" display. It is then checked in step S1154 if a call originating request is input by operating the one-touch dialing or index number dialing key of the operation unit 26 or the handset 203 of the connecting telephone is taken off the hook to issue a call originating request. If YES in step S1154, the flow advances to step S1155 to check if the facsimile communication transmission mode is set. If NO in step S1155, the flow advances to step S1156, and known telephone line call originating processing is executed.

If YES in step S1155, the flow advances to step S1160, and the telephone line switching circuit 4 is instructed to form a DC loop with the telephone line 31 to issue a call originating request. The telephone line 31 is then connected to the hybrid circuit 6. In step S1161, pre-procedure processing is executed, and document size information set on the reader 10, transmission mode information, and the like are transmitted to execute processing of synchronization with the reception-side apparatus. Thereafter, the flow advances to step S1162. Image information to be transmitted is read from a document to be transmitted set on the reader 10, and one-page information is sent to the reception-side apparatus of the party. Upon completion of transmission of image information, the flow advances to step S1163 to check if another document to be transmitted is present like a case wherein a document to be transmitted is placed on the reader 10. If YES in step S1163, the flow returns to step S1162, and transmission of the next document is performed. In this case, if the size of a document to be transmitted is changed or the transmission mode is to be changed, the same intermediate procedure processing as in the pre-procedure processing in step S1161 is executed, and new transmission state information is transmitted to the reception-side apparatus to perform synchronization. Thereafter, the flow advances to step S1162.

If NO in step S1163, the flow advances to step S1164, and known post procedure processing is executed. The flow then advances to step S1218.

If NO in step S1154, the flow advances to step S1190 to check if the incoming call detector 28 detects an incoming call from the telephone line 31 or the like. If NO in step S1190, the flow advances to step S1170 to check if the cover of a recording paper housing portion of the printer 18 is opened and the recording paper is replenished so that the near end mark detector 18a does not detect the near end mark. If YES in step S1170, the flow returns to step S1152; otherwise, the flow returns to step S1154.

If YES in step S1190, and when a telephone which should output a ringing signal (should ring a bell) is designated, the designated telephone is caused to output a ringing tone. When no telephone is designated, all the telephones are caused to output a ringing tone. It is checked in step S1191 if the incoming call signal is input predetermined times (e.g., three times). If NO in step S1191, the flow advances to step S1170 to continue calling. If the handset 203 is taken off the hook during this interval, a channel is formed between the responding and calling telephones, thus allowing talking communication.

If the handset 203 is not taken off the hook after the incoming call signal is input predetermined times, the flow advances from step S1191 to step S1192, and the telephone line switching circuit 4 is instructed to form a DC loop with the telephone line 31 to make a response. Thus, the telephone line 31 is connected to the hybrid circuit 6. It is checked in step S1193 if data reception accompanying a carrier signal as facsimile reception is performed. If the carrier signal cannot be detected from the telephone line, since data communication cannot be performed, a wrong telephone call is determined, and the telephone line is released in step S1194. Then, the flow returns to step S1152. If another special processing is determined in step S1194, the corresponding processing is executed.

If the data signal is detected in step S1193, the flow advances to step S1195, and pre-procedure processing, e.g., detection of states of various apparatuses, is executed to execute processing of synchronization with the apparatus of the party. In step S1196, reception processing of image information sent after the pre-procedure processing is executed. At the same time, the received information is supplied to the V27/V29 demodulator 16 through the above-mentioned path, and the demodulating processing is performed. The demodulated signal is supplied to the decoder 17, and is then printed out by the printer 18. It is checked in step S1198 if the near end mark detector 18a detects the near end mark (black stripe). If NO in step S1198, the flow advances to step S1215, and the presence of recording paper display circuit 252 is energized to turn on the "presence of recording paper" display. The flow advances to step S1216 to check if the last document information is received. If NO in step S1216, the flow returns to step S1196, and reception of the next page is continued. If YES in step S1216, the flow advances to step S1217, and the known post procedure processing is executed. In step S1218, the telephone line 31 is released, and the flow returns to step S1154.

If YES in step S1198, i.e., if the near end mark detector 18a detects the near end mark, the flow advances to step S1200 to check if the FBLKD flag is "0", i.e., is reset. If NO in step S1200, the flow advances to step S1203; otherwise, (5000×3.85) is calculated in step S1201 to obtain a recording line count from the near end mark. The calculated line count is stored in the receivable line count memory 140. In step S1202, the FBLKD flag is set to be "1", and the flow advances to step S1203.

It is checked in step S1203 if the communication mode is the standard mode. If YES in step S1203, the flow advances to step S1205, and the value of the receivable line count memory 140 is decremented by one each time data for one line is received. Thereafter, the flow advances to step S1206.

If NO in step S1203, i.e., if the fine mode is selected, the flow advances to step S1204, and the value of the receivable line count memory 140 is decremented by one each time data for two lines is received. Thereafter, the flow advances to step S1206.

In step S1206, the size (recording paper length for one page) of a currently transmitted document is checked to determine if the size is an A4 size as the standard document size. If YES in step S1206, the flow advances to step S1207, and the content of the receivable line count memory 140 is read out and is divided by (297×3.85) as the length of the A4-size document and is rounded off to obtain a receivable page count of the A4-size document. The obtained receivable page count is informed to the connecting telephones to cause their receivable page count display circuits 251 to display it, as will be described later. At the same time, in step S1209, the presence of recording paper display circuit 252 of each connecting telephone is deenergized, and the flow advances to step S1216.

If NO in step S1206, since another transmission size is a B4 size in this embodiment, the content of the receivable line count memory 140 is read out and is divided by (362×3.85) as the length of the B4-size document and is rounded off to obtain a receivable page count. The obtained receivable page count is informed to the connecting telephones to cause their receivable page count display circuits 251 to display it. Thereafter, the flow advances to step S1209.

In the above processing, if a document size to be transmitted/received does not include two sizes, i.e., A4 and B4 sizes but includes arbitrary document sizes, the document length per page is determined in correspondence with the transmitted size, and the receivable page count can be calculated based on this value.

With the above processing, since the receivable page count is calculated each time a one-page document is received, even if an immediately preceding received document is shorter or longer than the standard size, the receivable page count can be accurately obtained and displayed.

Control on the side of the telephone in the above processing of the controller 150 will be described hereinafter with reference to FIG. 40.

The control unit 201 checks in step S1551 if the data interface 211 receives a control signal from the data transmission control circuit 14. If NO in step S1551, it is checked in step S1552 if a key input from the keyboard 206 is detected. If NO in step S1552, the flow returns to step S1551.

If YES in step S1552, the flow advances to step S1553, and processing corresponding to the key input is executed. After the corresponding processing, the flow returns to step S1551 to prepare for the next key input. The corresponding processing is performed as follows. For example, when the handset 203 is taken off the hook and the corresponding telephone number keys are operated, the signal tone generator 204 is instructed to output a corresponding telephone number signal (e.g., a DTMF signal). When a party's telephone number is input after the talking switch 216 is operated, the input number is temporarily stored, and is thereafter output together with a talking request signal.

If YES in step S1551, i.e., if the control signal from the data transmission control circuit 14 is received, the flow advances to step S1560 to check if the received control signal is an energization signal of the presence of recording paper display circuit 252. If YES in step S1560, the presence of recording paper display circuit 252 is energized in step S1561 to display the "presence of recording paper". The flow then advances to step S1565.

If NO in step S1560, the flow advances to step S1562 to check if the received control signal is a deenergization signal of the presence of recording paper display circuit 252. If YES in step S1562, the flow advances to step S1563, and the presence of recording paper display circuit 252 is deenergized to turn off the "presence of recording paper" display. Thereafter, the flow advances to step S1565.

If NO in step S1562, the flow advances to step S1565 to check if receivable page count information is received. If NO in step S1565, the flow advances to step S1567; otherwise, the flow advances to step S1566. In step S1566, the received receivable page count is output to the receivable page count display 251 to cause it to display the receivable page count. Then, the flow advances to step S1567. In step S1567, processing corresponding to the received control signal is executed, and the flow returns to step S1551.

According to this embodiment as described above, when the data communication apparatus performs reception and the remaining amount of recording paper to be output becomes small, the receivable page count can be known by a nearby telephone, and a proper action can be quickly taken.

When a telephone is placed on the desk and the facsimile apparatus is placed at the corner of a room, a person who should receive information can recognize the exchange timing of recording paper at his desk, and can take a proper action.

In this embodiment, the "presence of recording paper" display is made on only the telephones connected to the reception-side apparatus. For example, the transmission-side apparatus is arranged to comprises at least the arrangement of FIGS. 37A and 37B, and a receivable page count is sent from the reception-side apparatus of this embodiment to the transmission-side apparatus, so that the transmission-side telephones can be controlled to display a receivable page count in the reception-side apparatus.

Thus, the number of pages to be transmitted can be recognized even at the transmission side, and a proper action can be taken.

In the above description, a receivable page count is displayed on the telephone. A memory for temporarily storing a received document may be arranged between the decoder 17 and the printer 18 of the facsimile unit 152. With this arrangement if the recording paper is used up, remaining data to be received is stored in this memory, and a page count including the number of pages that can be stored in the memory can be displayed as a receivable page count.

According to the present invention as described above, a receivable information amount at the reception-side apparatus can be recognized using a telephone. If the receivable information amount becomes small, a quick and proper action can be taken.

TENTH EMBODIMENT

In this embodiment, in a communication system constituted by connecting a plurality of telephone terminals and a data communication apparatus (e.g., a facsimile apparatus) which are connected through a central office network, if a call is originated to an apparatus of a party on the other end of the line, a telephone number registered in either the telephone terminal or the data communication apparatus can be designated from the telephone terminal or the data communication apparatus to automatically originate a call, thus allowing efficient call originating processing unlike in a conventional system wherein an index number dial for a telephone is used for only a telephone terminal and an index number dial for a data communication apparatus is used for only a data communication apparatus.

Figure 41B:
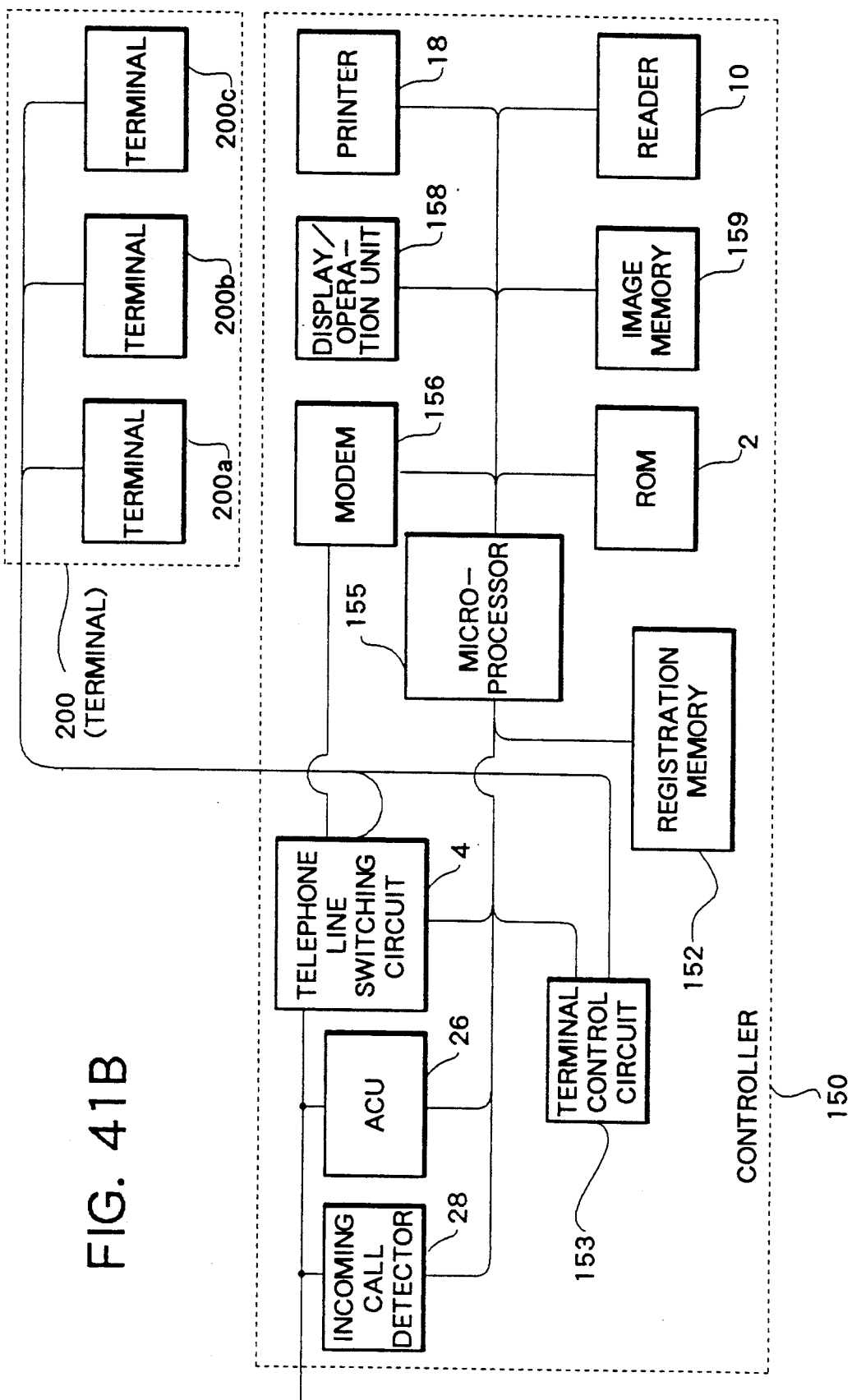

FIGS. 41A and 41B are block diagrams showing a communication system according to this embodiment. In FIGS. 41A and 41B, the same reference numerals denote the same parts as in FIGS. 1, 2A and 2B, and a detailed description thereof will be omitted.

In FIGS. 41A and 41B, a terminal 200 represents a telephone terminal, and terminals 200a to 200c correspond to the telephones 105 to 107 in FIGS. 1, 2A and 2B. The terminals 200a to 200c and the controller 150 are connected by private lines consisting of a talking signal line for an audio signal and a control signal line.

In FIGS. 41A and 41B, the incoming call detector 28 detects an incoming call from the outside line 31. The ACU 26 is equipped for each telephone, as will be described later. A registration memory 152 registers and stores index number telephone numbers, and one-touch dialing numbers registered under the control to be described later. A terminal control circuit 153 includes the generator 13 and the data transmission control circuit 14 shown in FIGS. 2A and 2B, and send a control signal to the telephone terminal 200 through the control signal line to control it.

Figure 50A:
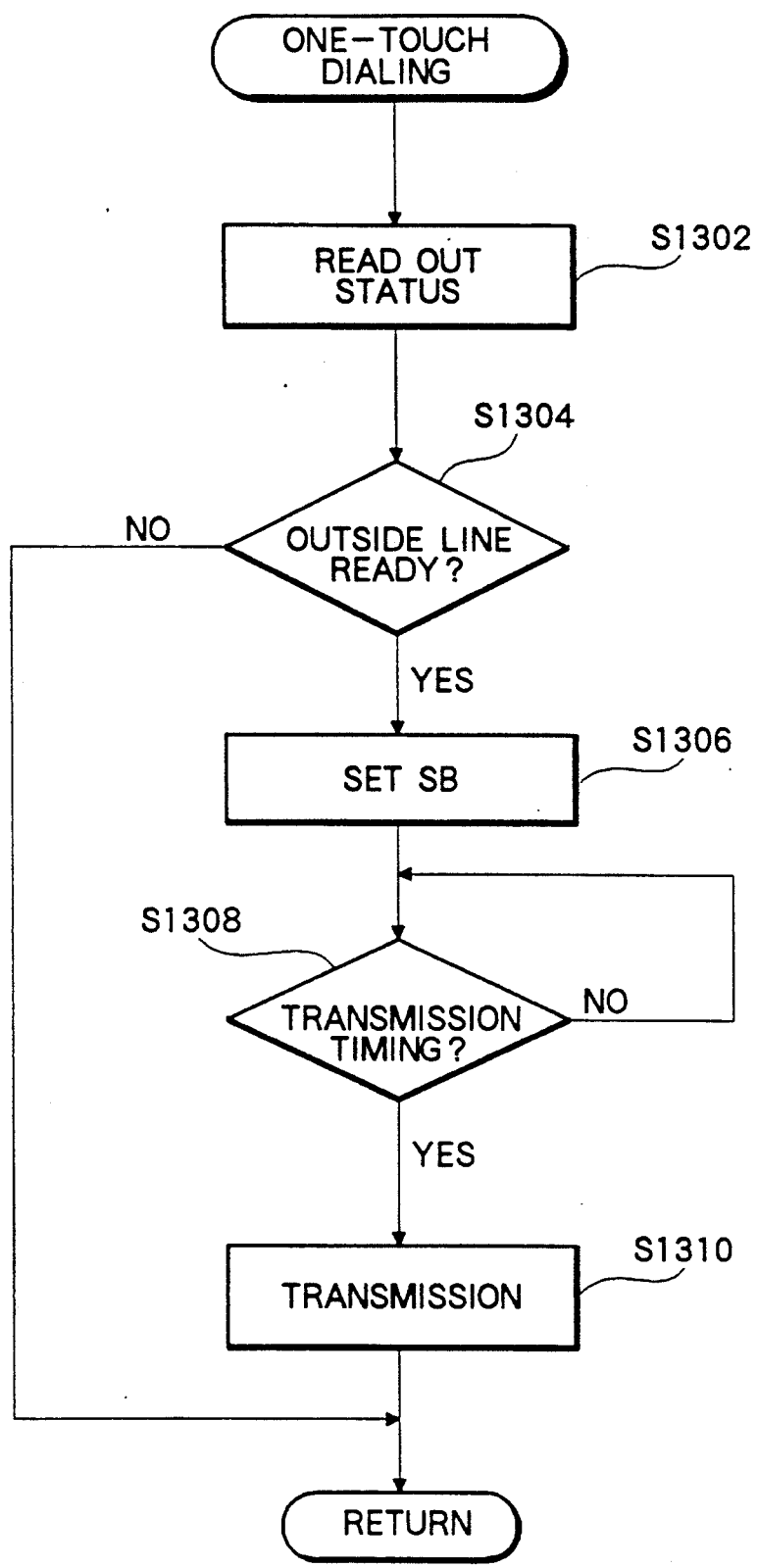
FIGS. 50A to 50C are control flow charts of the connecting telephone of the tenth embodiment.
Figure 50B:
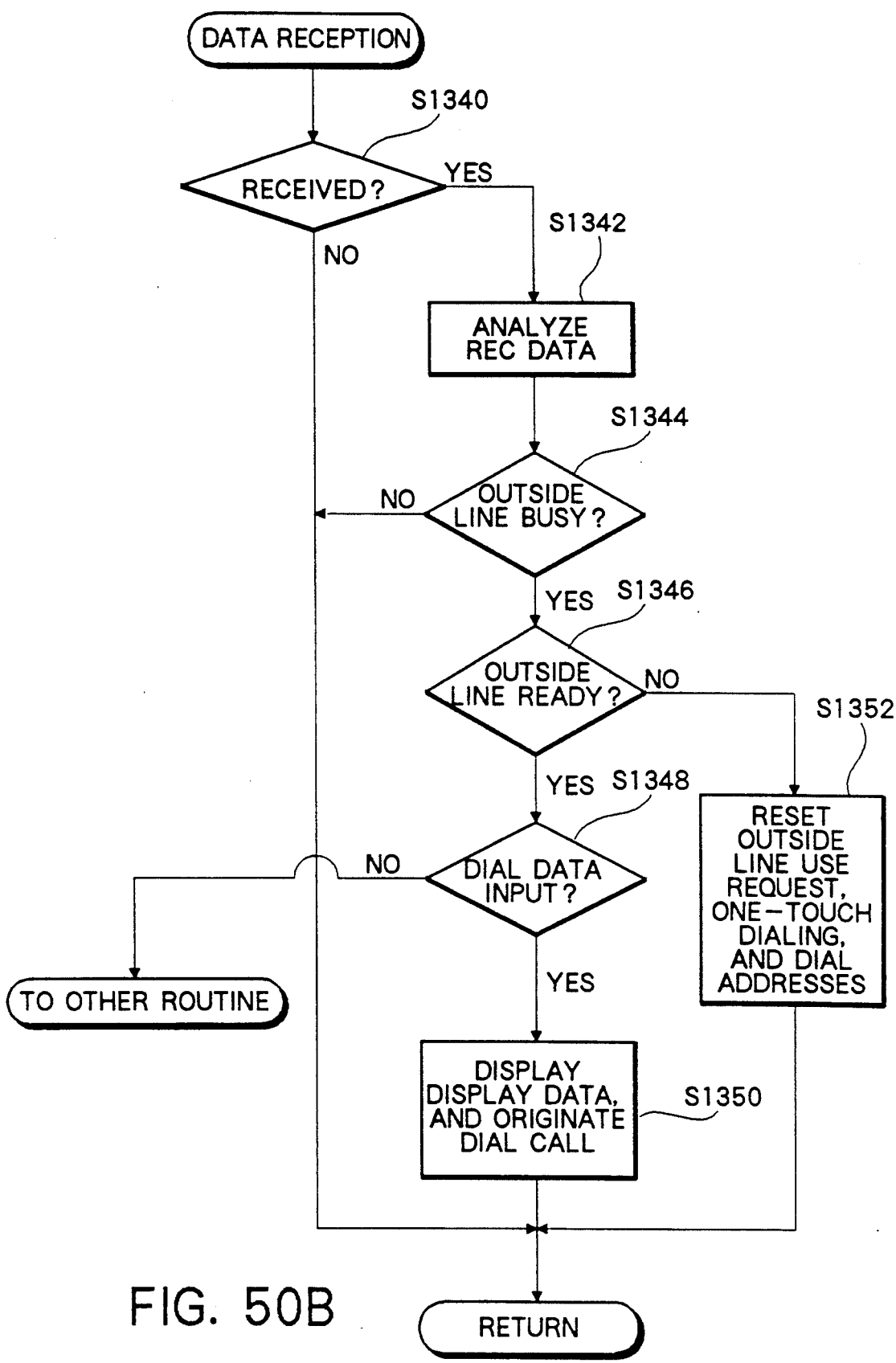
Figure 50C:
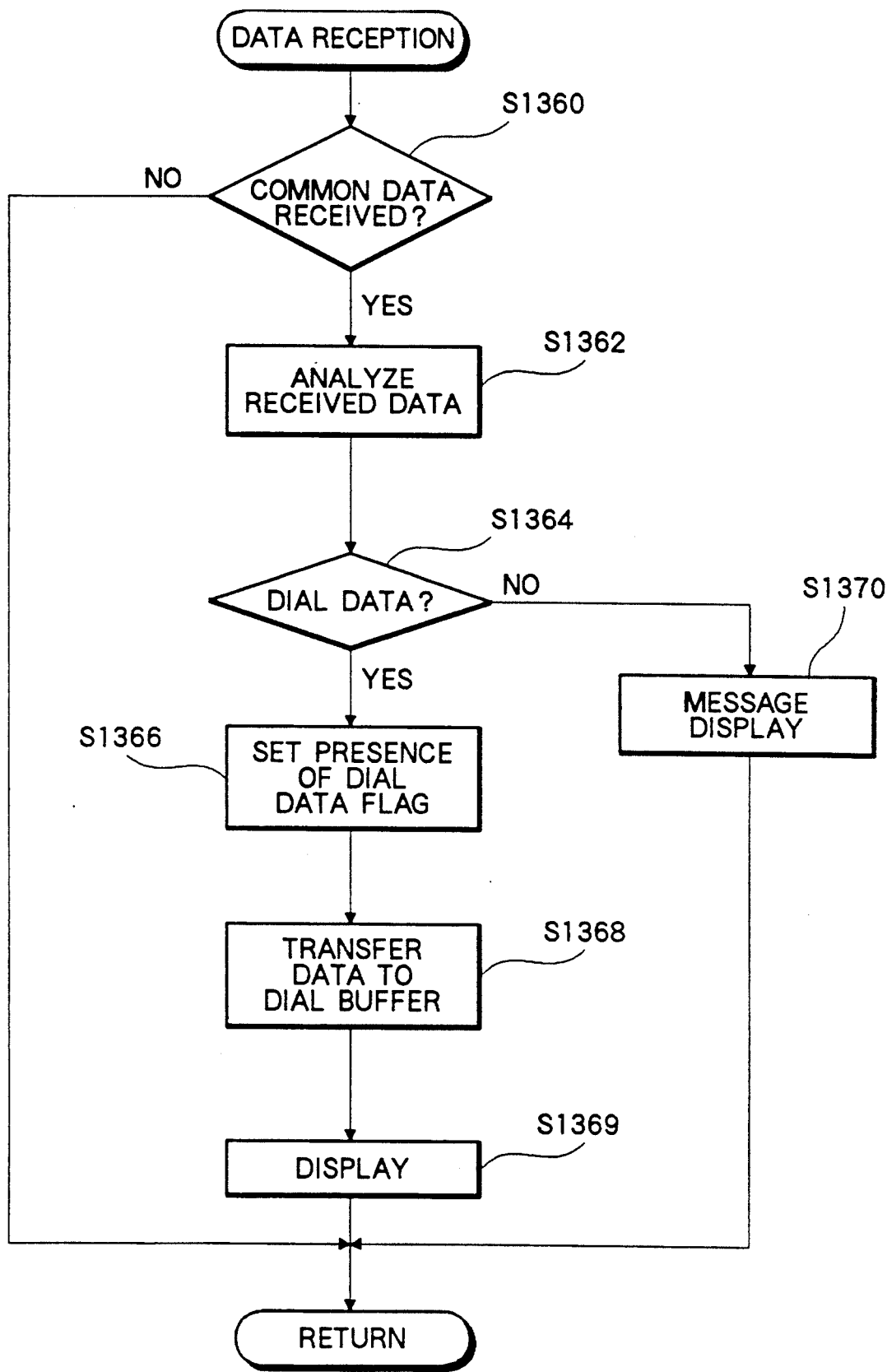

A microcomputer 155 controls the entire system in accordance with a control program shown in FIGS. 50A to 50C stored in the ROM 2, and includes the function of the control circuit 1 shown in FIG. 1. A modem 156 is a circuit including the functions of the V27/V29 demodulator/modulator, the V21 demodulator/modulator, and the adder. The microcomputer 155 stores received image data which is converted to a digital signal by the modem 156 in an image memory 159, decodes the image data in accordance with the MH or MR coding, and outputs it to the printer 18. A display/operation unit 158 consists of a display for displaying various states, and an operation unit, including the function of the operation unit 30 shown in FIGS. 2A and 2B, for inputting various instructions. The image memory 159 temporarily stores transmission/reception data.

The main control unit or controller 150 of this embodiment with the above arrangement receives data from the line 31 at the modem 156 in a facsimile reception mode. The received image data which is converted to a digital signal by the modem 156 is temporarily stored in the image memory 159. The data encoded in accordance with the MH or MR coding is decoded by the function of the decoder 17 shown in FIGS. 2A and 2B included in the microprocessor 155, and the decoded data is output to the printer 18 to be printed out therefrom.

In a facsimile transmission mode, image data read by the reader 10 is temporarily stored in the image memory 159, and thereafter, the stored data to be transmitted is read out and is encoded in accordance with the above-mentioned MH or MR coding method. The encoded data is modulated by the modem 156, and is sent onto the line 31.

A line switching operation of the telephone line switching circuit 4 will be described below. When the apparatus of this embodiment serves as a transmission-side apparatus, the microcomputer 155 causes the telephone line switching circuit 4 to switch the line 31 to the telephone terminal 200 side or the controller 150 side.

When the apparatus of this embodiment serves as a reception-side apparatus and when the incoming call detector 28 detects an incoming call signal from the line 31, the microcomputer 155 informs this to the telephones through the terminal control circuit 153. The informed telephones generate a dummy ringing tone. In response to this, when an operator answers the phone by off-hook, the telephone line switching circuit 4 is controlled to connect the line 31 to the responding telephone terminal connecting line.

If no response is made after the ringing tone is generated for a predetermined period of time, the microcomputer 155 controls the telephone line switching circuit 4 to switch the line 31 to the controller 150 side (facsimile side).

The detailed arrangement of the telephone terminal 200 (200a to 200c) will be described hereinafter with reference to FIG. 42.

Figure 42:
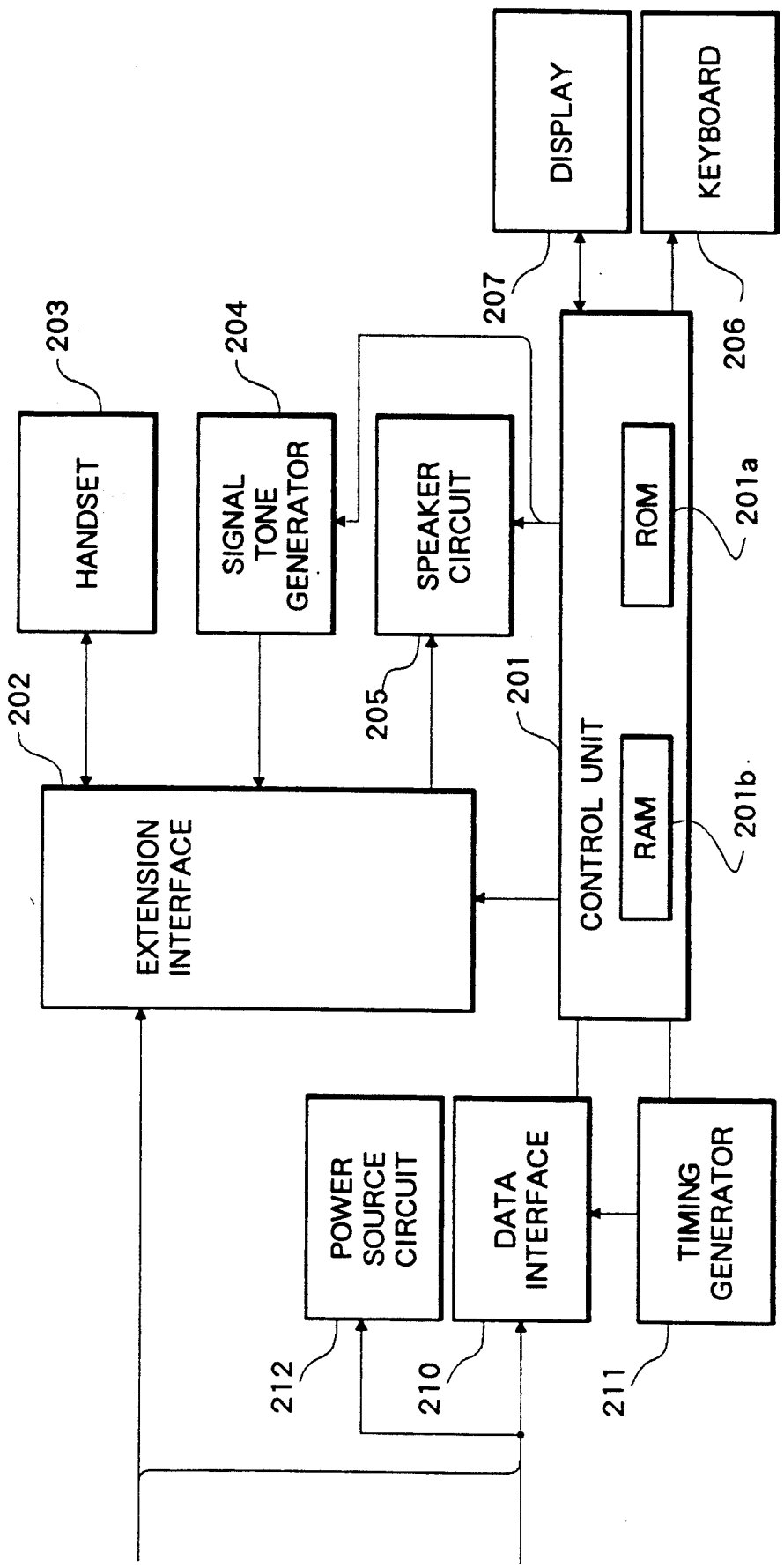
FIG. 42 is a detailed block diagram of a connecting telephone of the tenth embodiment.

In FIG. 42, the same reference numerals denote the same parts as in FIG. 14, and a detailed description thereof will be omitted. In FIG. 42, the presence of received information display circuit is omitted, and a RAM 201b is arranged in the control unit 201, as compared to FIG. 14.

Figure 43:
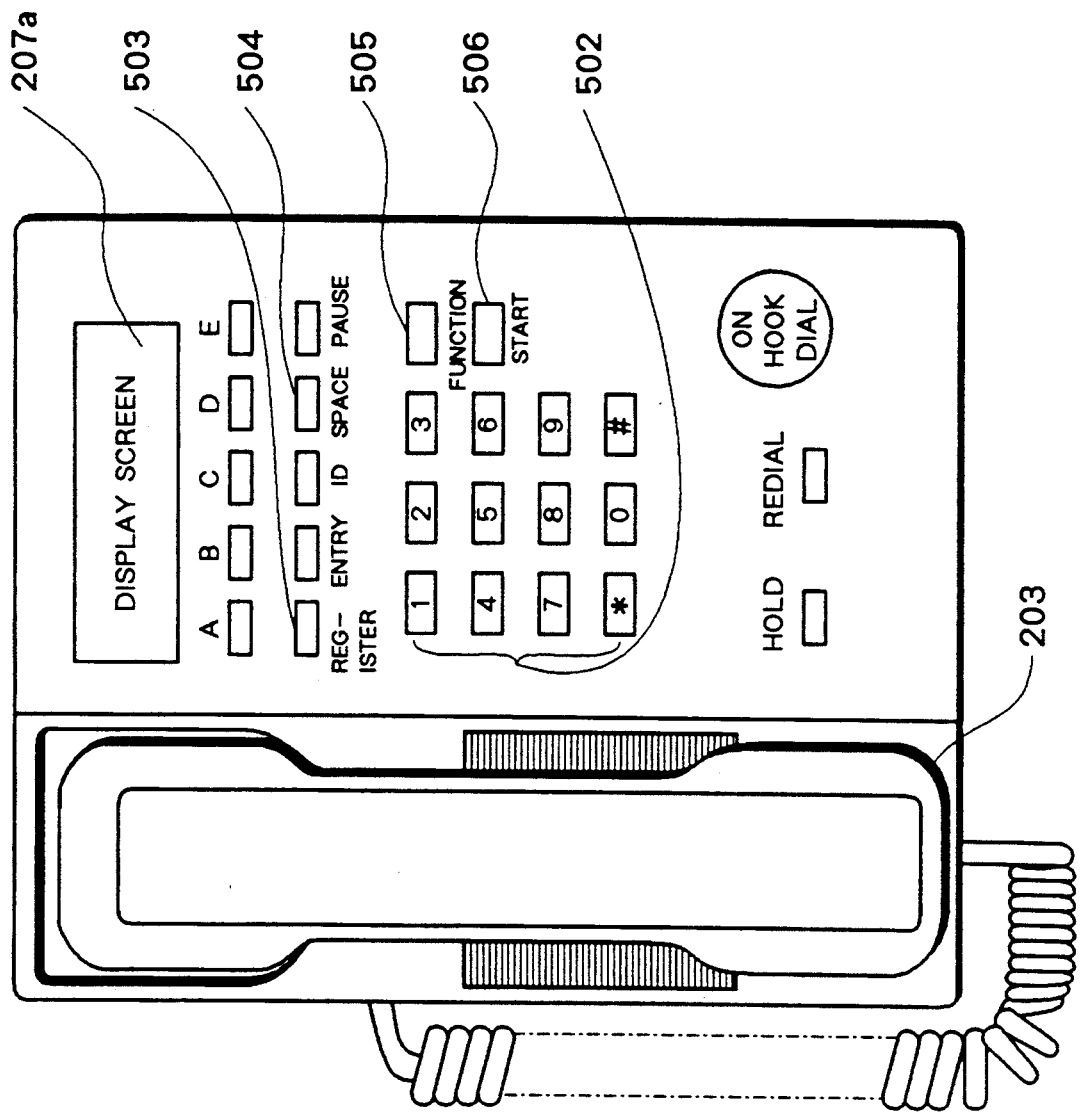
FIG. 43 is a plan view showing an outer appearance of the connecting telephone of the tenth embodiment.

FIG. 43 shows an outer appearance of the telephone terminal of this embodiment with the above arrangement. However, the outer appearance of the telephone terminal is not limited to that of this embodiment, and the above-mentioned telephones 105 to 107 have substantially the same outer appearance.

Some keys equipped on the panel shown in FIG. 43 associated with the operation of this embodiment will be briefly described below. "A" to "E" indicate one-touch dialing keys. Reference numeral 502 denotes telephone number keys (ten-key pad); 503, a registration key for instructing registration of a one-touch or index number; and 504, a space key. Other function keys 505, and the like will be described later.

Figure 44A:
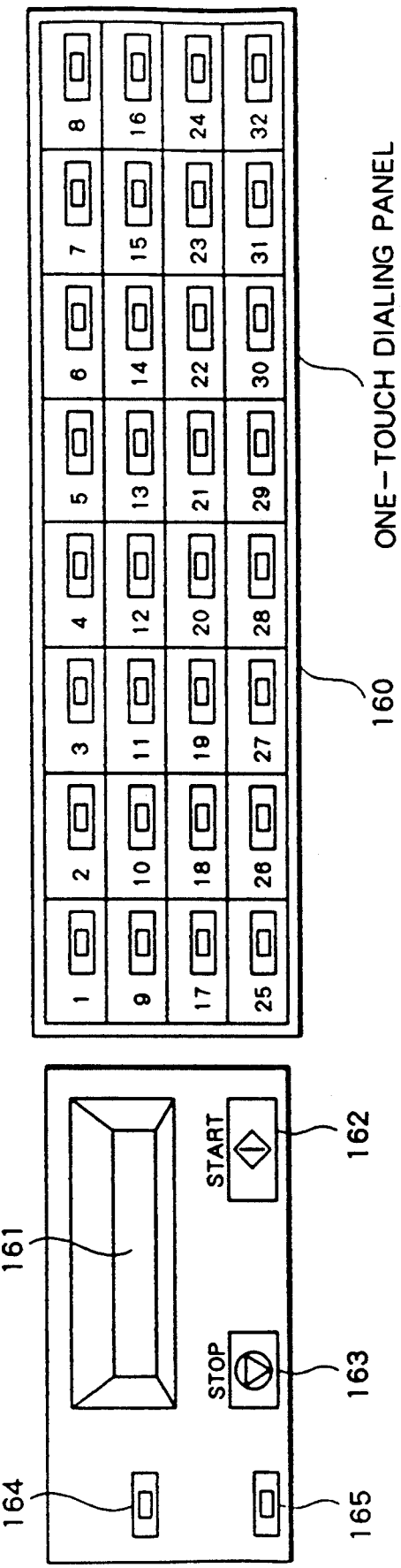
FIG. 44A is a view showing an outer appearance of a display/operation unit when the one-touch panel of the controller of the tenth embodiment is set.
Figure 44B:
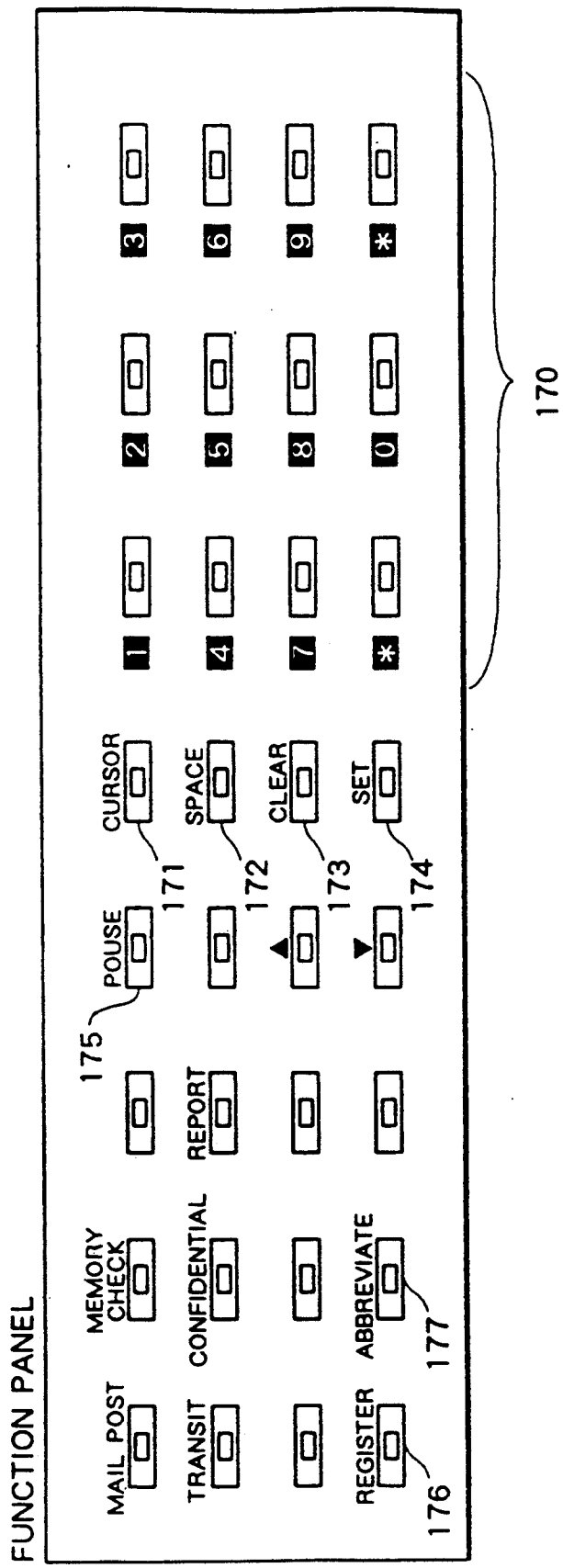
FIG. 44B is a view showing an outer appearance of an operation unit when an operation panel of the controller of the tenth embodiment is set.

FIG. 44A shows the outer appearance of the display/operation unit 158 of the controller 150. FIG. 44A illustrates a state wherein a one-touch dialing panel for inputting a one-touch daial is set on an input key group 160. When the one-touch dialing panel set on the input key group 160 is removed, an input panel display in a function mode shown in FIG. 44B appears, and the respective keys have functions according to the display. When an input in the function mode is completed, the one-touch dialing panel is set to display a function in the normal mode.

Keys associated with the operation of this embodiment will be briefly described below. A start key 162 is a key for instructing start of facsimile transmission. In the normal mode, when one key of the input key group 160 is depressed, call originating processing to a facsimile apparatus specified by a party's facsimile telephone number which is registered in correspondence with the input key is performed. A stop key 163 is used for interrupting currently executing processing, and a telephone key 164 is used for instructing to connect the line connected to the controller 150 (facsimile communication state) to the telephone terminal side. A function key 165 is used for setting an operation mode in the function mode, and sets the input key group 160 to have functions as shown in the function panel illustrated in FIG. 44B. A registration key 176 is used for instructing registration of a party's facsimile telephone number to be registered in correspondence with the input key group 160 in the one-touch dialing mode. An input index number is registered in a predetermined area of the registration memory 152 in correspondence with, e.g., a designated one-touch key upon operation of the registration key 176. An index number key 177 is a key for selecting an index number dialing function. When the index number key 177 is operated and then an index number consisting of predetermined number of figures (e.g., two figures) is input using the telephone number keys 170, an "index dialing number" is registered, and a call can be automatically originated. These arrangements are known to those who are skilled in the art, and a detailed description thereof will be omitted.

Figure 45:
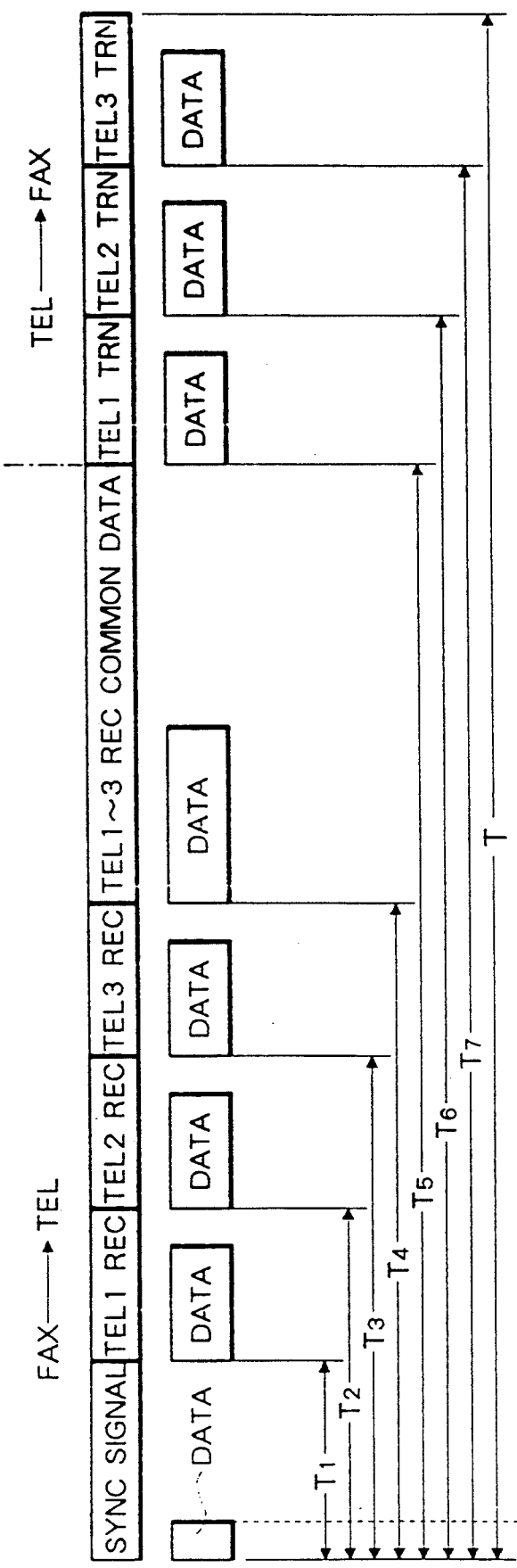
FIG. 45 is a timing chart of data transfer among the controller and the connecting telephones according to the tenth embodiment.

Transmission control between the terminal control circuit 153 of the controller 150 and the data interface 210 of the telephone terminal 200 of this embodiment with the above arrangement will now be described with reference to FIG. 45.

Transmission control of the control signal is performed by sequentially polling/selecting the telephone terminals by the controller 150. The polling/selecting period takes an asynchronous period "T" with respect to the three telephone terminals (TEL1 to TEL3) 200a to 200c, as shown in FIG. 45. Each control signal unit consists of a start bit, 8 data bits, and a stop bit. Note that in FIG. 45, reception when viewed from the telephone terminal is represented by "REC", and transmission when viewed from the telephone terminal is represented by "TRN".

First, a sync signal having the above-mentioned bit format is sent from the terminal control circuit 153 of the controller 150 onto each telephone terminal connecting control signal line. When the data interface 210 of each telephone terminal receives this sync signal, each telephone terminal determines start of a polling/selecting sequence. Each telephone terminal monitors a timer at a time interval according to an apparatus set for each telephone terminal. For example, in a data transfer sequence (REC from the controller 150 to the telephone terminal, the first telephone terminal (TEL1) monitors a timer for a time $T_1$ from reception of the sync signal, the second telephone terminal (TEL2) monitors a timer for a time $T_2$, the third telephone terminal (TEL3) monitors a timer for a time $T_3$, . . . .

The control signal transmission/reception sequence will be described below with reference to data transmission/reception of the first telephone terminal (apparatus number="1").

When the sync signal is detected, since data (command) is sent after the time $T_1$, the time $T_1$ is set in a timer (not shown) of the data timing generator 211. When the time $T_1$ is time-up, reception of data addressed to the self terminal, which is sent from the controller 150, is performed. In this manner, data for only the first telephone terminal is received.

Then, a time ($T_4-T_1$) is set in the timer, and common data for the telephone terminals 1 to 3 which is sent after the lapse of this is received. The common data is sent, for example, when display data indicating that the controller 150 is in a facsimile reception busy state and the outside line is busy is sent to all the telephone terminals.

In this manner, the control signal is transmitted from the controller 150 to the telephone terminal (TEL).

The above transmission processing is similarly performed for the telephone terminals 2 and 3.

Processing for supplying a control signal or the like (e.g., a data request signal) from the telephone terminal (TEL) to the controller 150 will be described below.

In this case, after reception of the common control signal from the controller 150 described above, a time ($T_5-T_4$) is set in the timer for the first telephone terminal, and a control signal (e.g., a data request signal or the like to the facsimile unit 152) from the telephone terminal (TEL) to the controller 150 is output. This applies to other telephone terminals.

The above operation is repeated according to the period "T".

In this manner, transmission/reception of the control signal between the controller 150 and the telephone terminals 200a to 200c is performed.

FIGS. 46A to 46D show transmission frame formats used in this transmission control procedure.

Figure 46A:
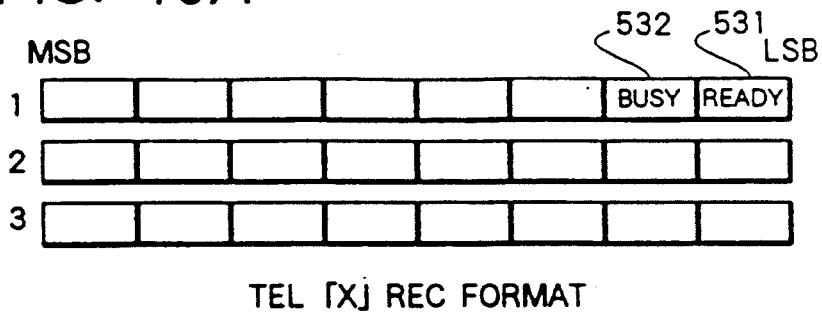
FIGS. 46A to 46D show data formats of data transfer among the controller and the connecting telephones according to the tenth embodiment.

FIG. 46A shows an "REC" format to the telephone terminal, and a status portion is sent first. When a bit 531 is ON, the outside line is ready, and indicates that the telephone terminal can originate an outside line call. A bit 532 indicates that the outside line is busy. When this bit is ON, this indicates that a call originating to the outside line is disabled. Thereafter, data to be transmitted is stored as needed.

Figure 46B:
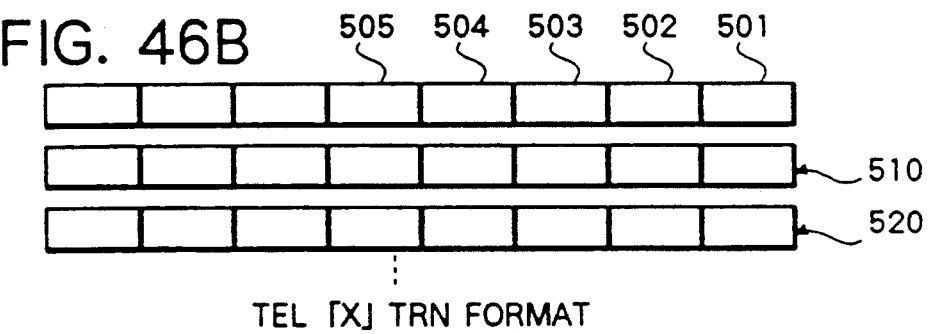

FIG. 46B shows a "TRN" format from the telephone terminal. In a first status portion, when a bit 501 is ON, this indicates an outside line use request. When a bit 502 is ON, this indicates a call originated by the one-touch dialing. When a bit 503 is ON, this indicates a call originated by the index number dialing. A bit 504 is a bit indicating a registration request instruction to the controller 150. When the bit 504 is ON, this indicates that a registration request frame of a called party's telephone number using the index number or one-touch dialing follows. A bit 505 is an identification bit for identifying one-touch/index number dialing registration. When the bit 505 is ON, this indicates one-touch dialing registration. When the bit 505 is OFF, this indicates index number dialing registration. In the case of registration, telephone number data to be registered is stored in the following bits 510 and 520. This data volume can be changed as needed, and telephone number data corresponding to the required number of figures is sent.

Figure 46C:
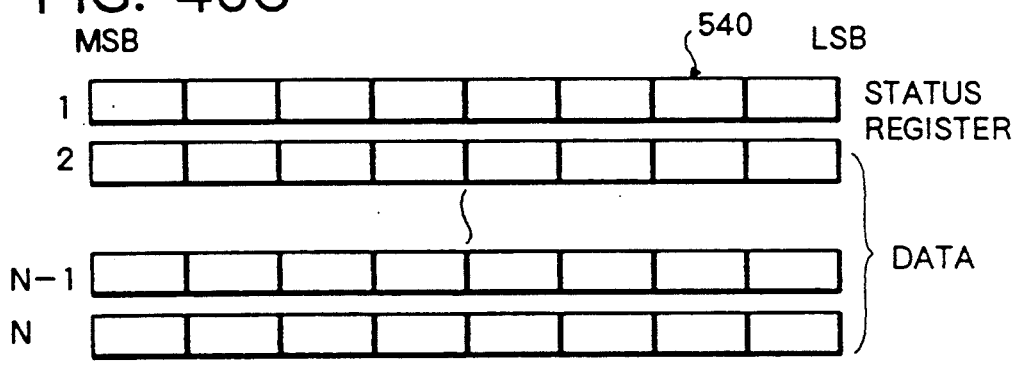

FIG. 46C shows a common "REC" format to each telephone terminal. A required volume of data follows status register bits 540.

Figure 46D:
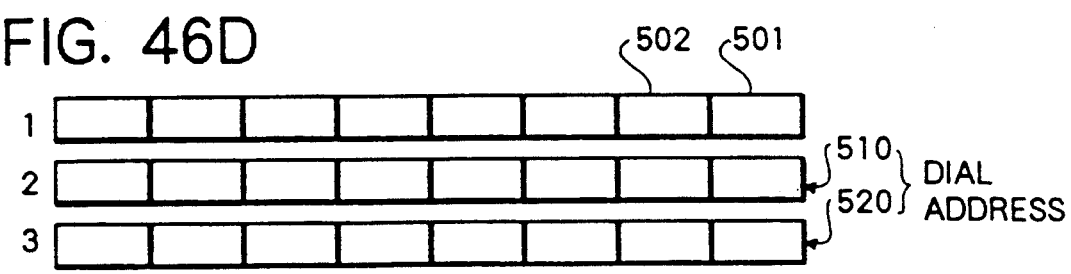

FIG. 46D shows a transmission format sent from the telephone terminal to the controller 150 when a call originating request using the index number dialing function is issued. In this case, bits 501 and 502 are ON, and a dial address is stored in data areas 510 and 520. Note that in this embodiment, each figure of a telephone number is represented by 4 bits.

A registration operation of the one-touch dialing and index number dialing to the registration memory 152 in the telephone terminal 200 and the controller 150 which exchange the control signal as described above, will be described below.

One-touch dialing is registered in the facsimile unit 152 of the controller 150 using the keys on the display/operation unit 158 shown in FIG. 44.

For example, a case will be explained below wherein "A . . . 03-123-4567" and "B . . . 0166-25-6251" are respectively registered to the one-touch and index number dialing. The above registration operations are performed in accordance with operation procedures illustrated in FIGS. 47 and 48, respectively.

One-touch dialing registration processing from the telephone terminal will now be described with reference to FIG. 47. The registration processing is performed on an operation panel of the terminal shown in FIG. 43.

In the case of one-touch dialing registration, as shown in step 1 in FIG. 47, the function key 505 is first depressed to select a registration function. In step 2, a "0" key of the telephone number keys 502 is depressed to select what to do. Thus, the one-touch dialing registration function is selected, and a message "DIAL REGISTRATION" is displayed on a display screen 207a of a display 207, thus completing function selection.

In step 3, in order to register dial data in an "A" area of the registration memory 152, an "A" key is operated. Thus, "A" is displayed on the display screen 207a.

In step 4 and thereafter, one-touch dial data is input using the telephone number keys 502 and the space key 504. The space key 504 is pressed to facilitate discrimination of divisions of an input telephone number, and does not influence actual call originating processing. Therefore, the space key 504 may be or may not be used. Note that the input result is displayed on the display screen 207a. Control during this time interval is performed solely by the control unit 201 in the telephone terminal. The input data is temporarily stored in the RAM 202B of the control unit 201.

Upon completion of the input of the dial data, the start key 506 is pressed to enter the input data as valid data in step 5.

Thus, input processing of the one-touch dial data for the "A" key is completed. This input data is sent to the controller 150 in processing to be described later, and is registered in the registration memory 152. When this registration is completed, a buzzer tone is generated from a speaker circuit 205, thus informing that registration has been made.

In steps 6 to 8, key operations for registering one-touch dial data for a "B" key are similarly performed.

Registration of the index number dialing is basically the same as that of the one-touch dialing. In this case, the operation is the same as that in the case of setting index number dialing from a normal telephone. First, the function key 505 is operated, and a key for selecting an index number function, e.g., an "*" key is operated. Thereafter, an index number, and a telephone number to be registered in correspondence with the index number are input using the telephone keys 502. Thereafter, the start key 506 can be operated. FIG. 48 shows an input sequence in this case. Note that a detailed description of this operation will be omitted.

In the registration operation by the telephone terminal, when processing before the start key 506 is depressed is completed, data having the format shown in FIG. 46B described above is formed in the RAM 201b of the control unit 201. In FIG. 46B, a data portion is constituted not only by bits 510 and 520 but also by an area indicating an index number (or one-touch number) and a party's telephone number area following this area, and the length of the party's telephone number area can be changed as needed.

When the start key 506 is depressed, the above-mentioned data is validated, transmitted from the telephone terminal to the terminal control circuit 153 through the data interface 210 in the "TRN" processing in the above-mentioned transmission sequence, and is registered in the registration memory 152.

Figure 49:
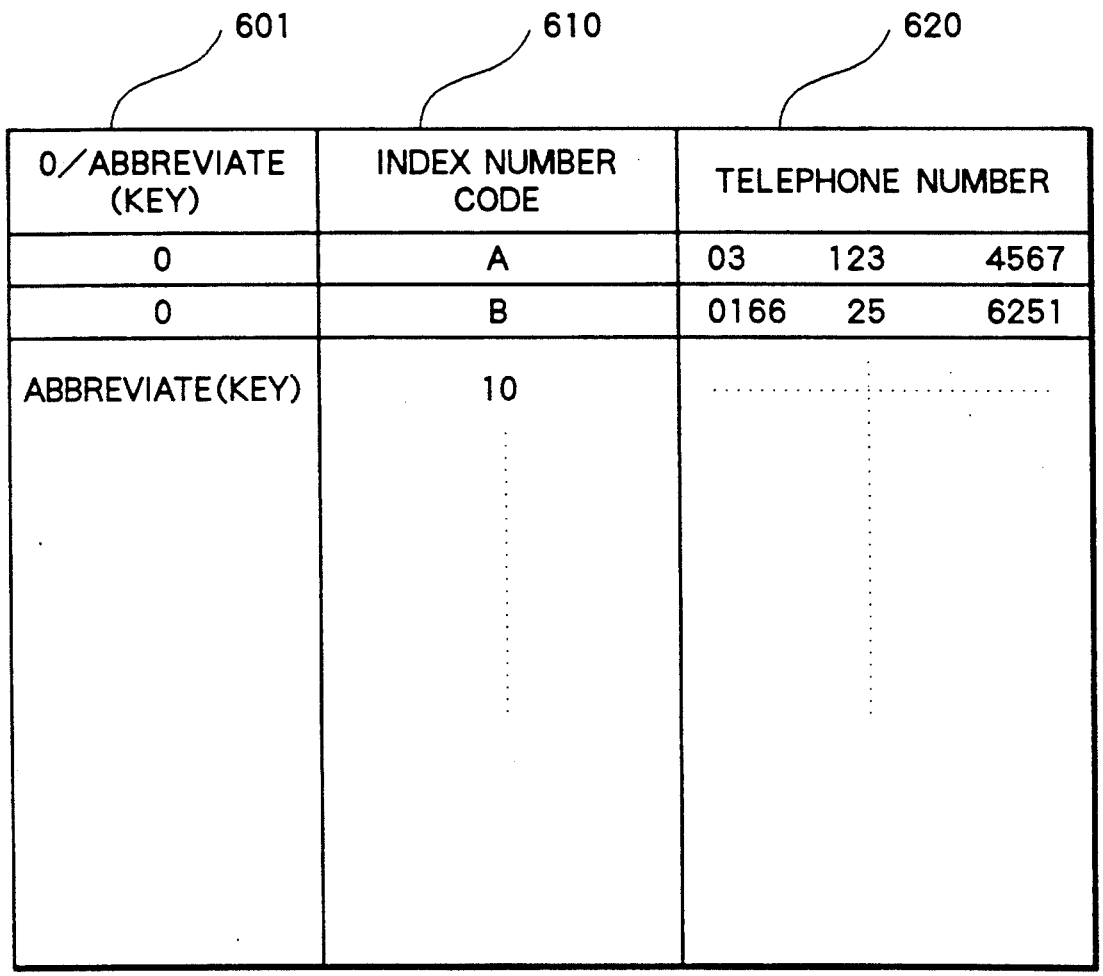
FIG. 49 is a view showing an arrangement of a registration memory of the tenth embodiment.

The controller 150 (facsimile) side which has received this data stores the received registered number in the registration memory 152 in accordance with the format shown in FIG. 49.

The format of the registration memory 152 will be described below with reference to FIG. 49.

Each entry is constituted in units of registered number, and a first field 601 indicates whether the registered number corresponds to one-touch or index number dialing. A next field 610 indicates a one-touch dialing number or index dialing number. A field 620 is a telephone number area of a called party to be registered corresponding to the number designated by the field 610.

In this manner, one-touch dialing and index dialing numbers for the telephone terminal are registered from the telephone terminal 200 in the registration memory 152 of the controller 150.

Note that one-touch dialing and index dialing numbers for the facsimile unit 152 in the controller 150 can be registered in the same manner as in the case of the telephone terminal. In this case, descriptions of operations and registration are substantially the same as described above, and are omitted.

Call originating processing using the one-touch or index number dialing in this embodiment registered as described above will be described below.

A one-touch dial call originating operation from the telephone terminal is performed by depressing a key where a party's telephone number is registered (e.g., the above-mentioned "A" or "B" key, or the like) once.

In the case of index number dial calling, after the "*" key indicating the index number dial calling is operated, an index number (e.g., two figures) where a party's telephone number is registered is input using the telephone number keys 502.

The detailed control operation in response to the above operation inputs will be described below with reference to FIGS. 50A to 50C and FIG. 51.

Figure 51:
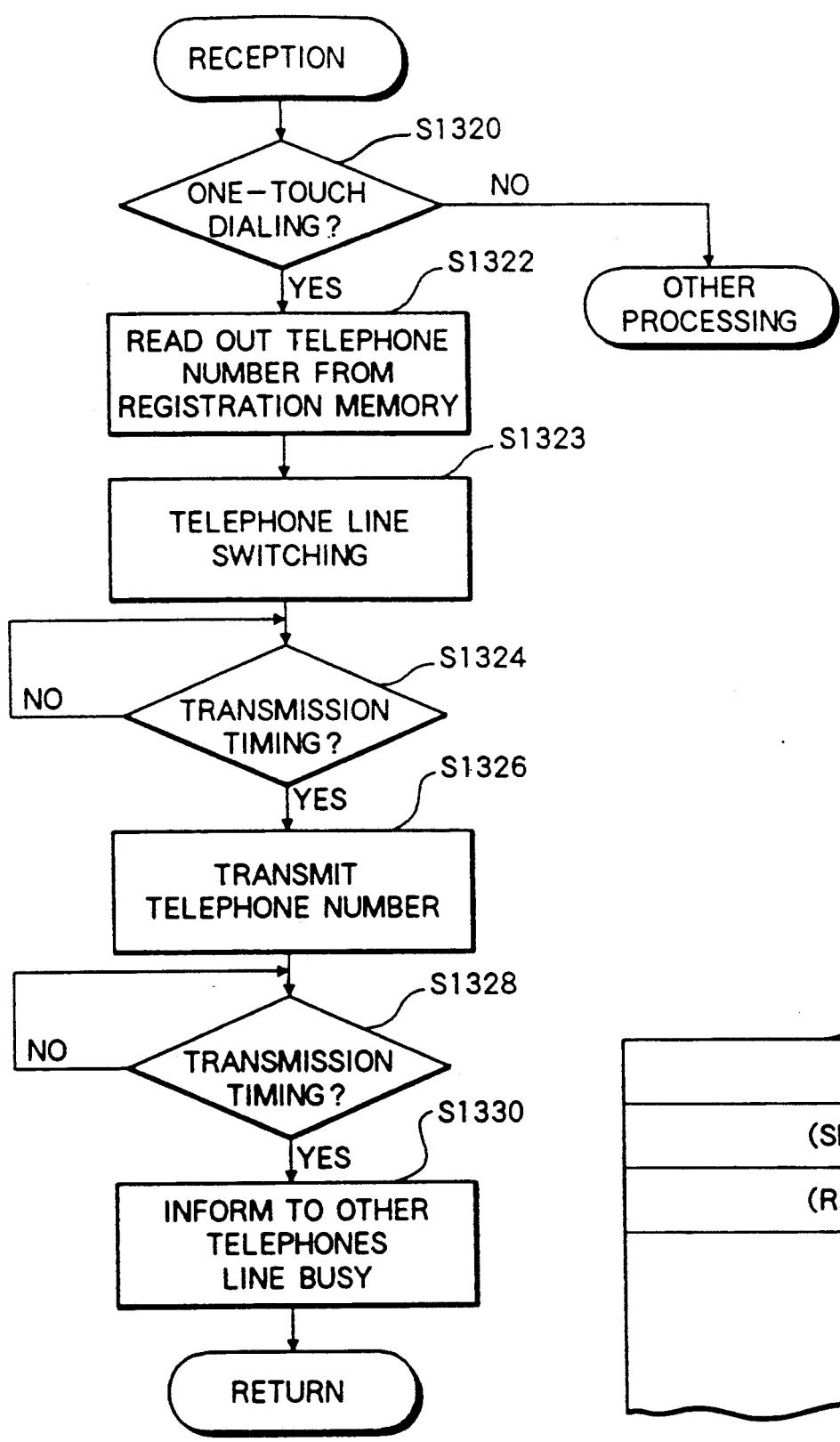
FIG. 51 is a control flow chart of the controller of the tenth embodiment.

FIGS. 50A to 50C are control flow charts of the control unit 201 of the telephone terminal having a one-touch dial call originating function, and FIG. 51 is a flow chart of call originating control by an index number dialing in the microprocessor 155 of the controller 150.

When the "A" key is operated, a program shown in FIG. 50A is executed at the telephone terminal side.

In step S1302, status data (busy/ready) showing a state of the outside line 31 is read out from the RAM 201b. This status data is updated by a transmission procedure from the controller 150 to the telephone terminal, which is periodically performed. The transmission format in this procedure is as shown in FIG. 46A. It is checked in step S1304 based on this status data if the outside line is ready. If YES in step S1304, the flow advances to step S1306, and the transmission format shown in FIG. 46D is generated. The outside line use request bit 501 is ON, and the bit indicating that the one-touch dial calling is ON to form a status portion. Then, a data area such as a one-touch key number (dial address) is formed, and these data are stored in a transmission buffer of the RAM 201b. Note that the transmission frame can be similarly formed in the case of index number dial calling.

Figure 52:
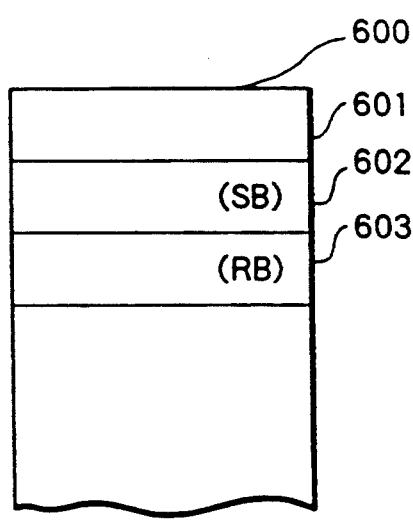
FIG. 52 is a view showing an arrangement of a RAM in the connecting telephone of the tenth embodiment.

In the RAM 201b of the telephone terminal, a transmission buffer area 600 shown in FIG. 52 is allocated. In FIG. 52, reference numeral 601 denotes an outside line status area (ST) for holding the above-mentioned outside line state; 602, a transmission buffer area (SB) for storing transmission data; and 603, a reception buffer (RB) for storing received data.

In step S1308, a transmission timing from the self telephone terminal to the controller 150 is awaited. If YES in step S1308, the flow advances to step S1310, and the call originating request frame prepared in the transmission buffer 602 is transmitted. The transmission format in this case is as shown in FIG. 48D.

Control of the microprocessor 150 which receives the call originating request frame through the terminal control circuit 153 will now be described with reference to FIG. 51.

The microprocessor 155 which receives the call originating request frame through the terminal control circuit 153 executes control shown in FIG. 51.

In step S1320, a status frame is checked to determine if the received request is the one-touch dialing or index number dialing request. If NO in step S1320, another processing is executed.

If it is determined based on the outside line use request bit 501, the one-touch bit 502, and the like that the one-touch dial call originating request is received, the flow advances to step S1322, and a called party's telephone number registered in correspondence with the one-touch dial number or index number of the received frame is read out. In step S1323, the telephone line switching circuit 4 is caused to switch the outside line 31 to the telephone terminal 200 side. In step S1324, a transmission timing to the telephone terminal which has issued the call originating request is awaited. If YES in step S1324, the flow advances to step S1326, and a message indicating that the outside line 31 is acquired is informed. The called party's telephone number read out in step S1322 is transmitted as data having the format illustrated in FIG. 46A. Note that in a data area, each figure of the telephone number is represented by 4 bits, and a required volume of data is transmitted.

In step S1328, a common REC data transmission timing is awaited. In step S1330, a message indicating that the outside line 31 is busy is informed to other telephone terminals. In this case, the data is output to have the format shown in FIG. 48C. In the status register, the bit 532 shown in FIG. 48A and indicating "busy" is ON. In this case, in order to cause the display 207 of the telephone terminal to display this message, message data of "outside line busy" is added to the following data area, and is transmitted.

Control of the telephone terminal issuing the call originating request will be described again. The call originating telephone terminal 200 which receives the transmission frame from the controller 150 in step S1328 executes the processing shown in FIG. 50B. More specifically, it is checked in step S1340 if an REC reception transmission frame addressed to the self terminal is supplied from the controller 150. If NO in step S1340, the processing is ended. However, if YES in step S1340, the flow advances to step S1342. In this case, the reception frame is stored in the reception buffer 603 shown in FIG. 52. For this reason, the reception frame in the reception buffer (RB) 603 is analyzed in step S1342. It is then checked in step S1344 if the outside line is busy. If NO in step S1344, the outside line is not acquired for the call originating request, and this processing is ended. Thereafter, the next processing is started.

If YES in step S1344, the flow advances to step S1346 to check if the outside line is acquired for the self terminal or another terminal. If NO in step 1346, outside line calling from the self terminal cannot be performed, the flow advances to step S1352. In step S1352, the outside line use request in the transmission buffer 602, one-touch dial, dial address, and the like are reset, and the flow returns.

If YES in step S1346, the flow advances to step S1348 to check if the dial data (called party's telephone number) is received. If NO in step S1348, since the dial data is not registered, another necessary processing is executed.

If YES in step S1348, the flow advances to step S1350, and the received telephone number is displayed on the display 207, and is also sent to the signal tone generator 204. The telephone number is converted to a corresponding telephone number signal (dial pulse signal or DTMF signal), and is sent onto the outside line 31 through the telephone line switching circuit 4. Then, a called party is called, and if the party answers the phone, intercommunication is performed.

Control of the telephone terminal received when the common REC frame transmitted in step S1330 will be described below with reference to FIG. 50C.

FIG. 50C shows control of the telephone terminal other than one which issues a one-touch request.

In step S1360, the reception buffer 603 is checked to determine whether or not the common data has been received. If NO in step S1360, this processing is ended. However, if YES in step S1360, the flow advances to step S1362, and the received common data is analyzed. If it is determined in step S1364 that the received common data is not dial data, the flow advances to step S1370, and a transmitted message (e.g., "outside line busy") is displayed.

If YES in step S1364, the flow advances to step S1366, and the presence of dial data flag is set. The flow then advances to step S1368, and the received data is stored in the dial buffer in the RAM 201b. When the received data is stored in the dial buffer, the stored dial data is displayed on the display screen 207a in step S1369. This display corresponds to the party's telephone number when, e.g., facsimile reception is made.

According to the aforementioned embodiment, (1) One-touch dial or index number dial data of the facsimile apparatus can be commonly used;

(2) A one-touch dial or index number dial memory of the telephone terminal can be omitted, and the terminal can have an inexpensive and simple arrangement; and (3) A backup memory for the telephone terminal can be omitted.

In the above embodiment, the telephone number signal is transmitted from the telephone terminal using the signal tone generator 204 arranged therein. However, this circuit may be shared with the controller.

The communication apparatus in this invention is not limited to the facsimile apparatus and the telephone terminal. For example, the present invention can be applied to a telex if it uses a telephone number.

A memory for storing a registered number need not be arranged in the controller, and may be arranged in any apparatus having a space margin.

In the above description, registration of the index number and one-touch dial numbers are performed at the telephone terminal. However, these numbers can be registered from both the telephone terminal and the controller 150. In this case, in a normal facsimile apparatus, an index number for the facsimile can be registered but a number for a normal telephone cannot be registered, and vise versa. In the communication system of this embodiment, a party's facsimile number can be index number and registered at the telephone terminal, and vice versa. For this reason, the telephone terminal of this embodiment may originate a call while mistaking a number for a telephone for that for a facsimile. In order to avoid such confusion, when an index number or the like is registered, information for discriminating whether the registered number is for the facsimile or for the telephone can be additionally registered as registration data. This information can be readily added upon registration. When the index number is transmitted, a display indicating whether the registered party is the facsimile or the normal telephone is made on the display screen 207 of the telephone terminal 200 (or controller 150). In this manner, since the called party can be discriminated using the display screen 207a, even if a wrong index number is pressed due to operation confusion, an erroneous operation can be known soon.

As described above, according to the present invention, in a communication system including an apparatus having a line exchange function and a facsimile communication function, and normal telephones, their registered index telephone numbers can be commonly used.

As many apparently widely different embodiments of the present invention can be made without departing from the spirit and scope thereof, it is to be understood that the invention is not limited to the specific embodiments thereof except as defined in the appended claims.

What is claimed is:

1. A communication system which has telephone terminals having display means, facsimile communication means for receiving image data and telephone selection information, and storing the received image data into a memory, and connecting means for connecting a telephone line with one of said telephone terminals or said facsimile communication means selectively, comprising:

display control means for controlling said display means of said telephone terminals in accordance with the telephone selection information received by said facsimile communication means; and output means for visibly outputting the image data in the memory in accordance with whether predetermined data corresponding to the telephone selection information is manually inputted.

2. The system according to claim 1, wherein the telephone selection information includes a group number for designating one of a plurality of groups of the telephone terminals.

3. The system according to claim 1, wherein said output means includes a printer.

4. The system according to claim 1, wherein said display control means has an operation unit for inputting the predetermined data.

5. A data communication method for a communication system comprising telephone terminals and a facsimile communication unit, comprising the steps of:

receiving image data and telephone selection information into a memory;

sending a signal representing the image data received in said receiving step to predetermined telephone terminals in accordance with the telephone selection information; and visibly outputting the image data in the memory in accordance with whether or not the predetermined data corresponding to the telephone selection information is manually inputted.

6. The method according to claim 5, wherein the telephone selection information includes a group number for designating one of a plurality of groups of the telephone terminals.

7. The method according to claim 5, wherein said outputting step outputs the image data from a printer.

8. The method according to claim 5, wherein the predetermined data is inputted from an operation unit.

9. The method according to claim 5, wherein the signal sent by said sending step includes a display signal.

10. A communication system which comprises telephone terminals having display means, facsimile communication means for storing received image data and telephone selection information into a memory, and telephone line switching means for connecting a telephone line with one of said telephone terminals or said facsimile communication means selectively, comprising:

display control means for controlling display means of said telephone terminals in accordance with the telephone selection information received by said facsimile communication means; and output means for outputting said image data stored in said memory in accordance with whether or not predetermined data corresponding to the telephone selection information is manually inputted, and wherein said display control means resets said display means in accordance with the output of the image data.

11. The system according to claim 10, wherein the telephone selection information includes a group number for designating one of a plurality of groups of the telephone terminals.

12. The system according to claim 10, wherein said output means includes a printer.

13. The system according to claim 10, wherein said display control means has an operation unit for inputting the predetermined data.

14. A data communication method for a communication system comprising telephone terminals and facsimile function means, comprising the steps of:

receiving image data and telephone selection information into a memory;

controlling display units of the telephone terminals which correspond to the telephone selection information to indicate the reception of the image data visibly outputting the data in the memory in accordance with whether or not predetermined data corresponding to the telephone selection information is manually inputted; and resetting said display units in accordance with the visible output of the image data.

15. The method according to claim 14, wherein the telephone selection information includes a group number for designating one of a plurality of groups of the telephone terminals.

16. The method according to claim 14, wherein said outputting step outputs the image data from a printer.

17. A communication apparatus comprising:

a facsimile communication unit which stores received image data and telephone selection information into a memory;

a sending unit which sends a signal representing the received image data to predetermined telephone terminals in accordance with the telephone selection information; and an output unit which visibly outputs the image data in the memory in accordance with whether or not predetermined data corresponding to the telephone selection information is manually inputted.

18. The method according to claim 17, wherein the predetermined data is inputted from an operation unit.

19. The apparatus according to claim 17, wherein the telephone selection information includes a group number for designating one of a plurality of groups of the telephone terminals.

20. The apparatus according to claim 17, wherein said output unit includes a printer.

21. The apparatus according to claim 17, wherein said output unit has an operation unit for inputting the predetermined data.

22. The apparatus according to claim 17, wherein the signal sent by said sending unit includes a display signal.

23. The apparatus according to claim 17, further comprising: a line switching unit which connects a telephone line with one of the telephone terminals or said facsimile communication unit selectively.

24. A communication apparatus comprising:

a facsimile communication unit which receives image data and telephone selection information and has a memory for storing the received image data;

a line switching unit which connects a telephone line with one of telephone terminals or said facsimile communication unit selectively; and a controller which controls display means of said telephone terminals in accordance with the telephone selection information, wherein said facsimile communication unit has an output unit for outputting the image data stored in the memory in accordance with whether or not predetermined data corresponding to the telephone selection information is manually inputted, and when said output unit outputs the image data received by said facsimile communication unit, said controller resets said display means of said telephone terminals.

25. The apparatus according to claim 24, wherein the telephone selection information includes a group number for designating one of a plurality of groups of the telephone terminals.

26. The apparatus according to claim 24, wherein said output unit includes a printer.

27. The apparatus according to claim 24, wherein said facsimile communication unit has an operation unit for inputting the predetermined data.

* * * * *

UNITED STATES PATENT AND TRADEMARK OFFICE
CERTIFICATE OF CORRECTION

PATENT NO. : 5,315,643
DATED : May 24, 1994
INVENTOR(S) : TAKEHIRO YOSHIDA, ET AL.

It is certified that error appears in the above-identified patent and that said Letters Patent is hereby corrected as shown below:

ON TITLE PAGE

In [30] Foreign Application Priority Data:
"Dec. 19, 1987  [JP]  Japan ....... 62-319013" should read
--Dec. 18, 1987  [JP]  Japan ....... 62-319013--.

IN THE DRAWINGS

Sheet 11 of 95, "DEENEGRIZE" should read --DEENERGIZE--.
Sheet 83 of 95, "POUSE" should read --PAUSE--.

COLUMN 1

Line 34, "phones" should read --phone--.

COLUMN 28

Line 42, "and 10B" should be deleted.

COLUMN 33

Line 13, "lie" should read --line--.

COLUMN 39

Line 37, "n" should read --on--.

COLUMN 49

Line 47, "arc" should read --are--.

UNITED STATES PATENT AND TRADEMARK OFFICE
CERTIFICATE OF CORRECTION

PATENT NO. : 5,315,643
DATED : May 24, 1994
INVENTOR(S) : TAKEHIRO YOSHIDA, ET AL.

It is certified that error appears in the above-identified patent and that said Letters Patent is hereby corrected as shown below:

COLUMN 58

Line 23, "ut" should read --out--.

COLUMN 69

Line 56, "daial" should read --dial--.

COLUMN 70

Line 52, "(REC" should read --(REC)--.

COLUMN 77

Line 57, "data" should read --data;--.

COLUMN 78

Line 19, "method" should read --apparatus--.

Signed and Sealed this

Twentieth Day of December, 1994

Attest:

BRUCE LEHMAN

*Attesting Officer*    *Commissioner of Patents and Trademarks*